United States Patent
Adato et al.

(10) Patent No.: US 10,643,060 B2
(45) Date of Patent: May 5, 2020

(54) CAMERA CONFIGURED TO BE MOUNTED TO STORE SHELF

(71) Applicant: Trax Technology Solutions Pte Ltd., Singapore (SG)

(72) Inventors: Yair Adato, Kfar Shmuel (IL); Itai Lishner, Yahud (IL); Daniel Shimon Cohen, Hoboken, NJ (US)

(73) Assignee: Trax Technologies Solutions Pte Ltd., Singapore (SG)

( * ) Notice: Subject to any disclaimer, the term of this patent is extended or adjusted under 35 U.S.C. 154(b) by 0 days.

(21) Appl. No.: 16/354,652

(22) Filed: Mar. 15, 2019

(65) Prior Publication Data
US 2019/0215424 A1   Jul. 11, 2019

Related U.S. Application Data

(63) Continuation of application No. PCT/US2019/013054, filed on Jan. 10, 2019.
(Continued)

(51) Int. Cl.
*H04N 7/18* (2006.01)
*G06K 9/00* (2006.01)
(Continued)

(52) U.S. Cl.
CPC ......... *G06K 9/00201* (2013.01); *G06F 16/23* (2019.01); *G06F 16/235* (2019.01);
(Continued)

(58) Field of Classification Search
CPC ...... G01C 11/02; G06K 9/00; G06K 9/00771; G06K 9/00671; G06K 2209/01;
(Continued)

(56) References Cited

U.S. PATENT DOCUMENTS

2008/0306787 A1   12/2008   Hamilton et al.
2009/0059270 A1*   3/2009   Opalach .................. G06K 9/00
                                                      358/1.15
(Continued)

FOREIGN PATENT DOCUMENTS

WO   WO 2018/002709   1/2018

OTHER PUBLICATIONS

PCT/IB2018/001107, filed Sep. 5, 2018, "Using Augmented Reality for Image Capturing a Retail Unit."
(Continued)

*Primary Examiner* — Masum Billah
(74) *Attorney, Agent, or Firm* — Finnegan, Henderson, Farabow, Garrett & Dunner, LLP

(57) ABSTRACT

A system for acquiring images of products in a retail store is disclosed. The system may include a first housing configured for location on a retail shelving unit, and an image capture device included in the first housing and configured relative to the first housing such that an optical axis of the image capture device is directed toward an opposing retail shelving unit when the first housing is fixedly mounted on the retail shelving unit. The system may further include a second housing configured for location on the retail shelving unit separate from the first housing, the second housing containing a processor configured to control the image capture device and a network interface for communicating with a remote server. The system may further include a data conduit configured to enable transfer of control signals from the processor to the image capture device.

27 Claims, 70 Drawing Sheets

Related U.S. Application Data

(60) Provisional application No. 62/615,512, filed on Jan. 10, 2018, provisional application No. 62/681,718, filed on Jun. 7, 2018, provisional application No. 62/695,469, filed on Jul. 9, 2018.

(51) Int. Cl.

| | |
|---|---|
| *G06Q 20/20* | (2012.01) |
| *H04N 5/232* | (2006.01) |
| *G06Q 10/08* | (2012.01) |
| *G06F 16/583* | (2019.01) |
| *G06T 7/73* | (2017.01) |
| *G06F 16/23* | (2019.01) |
| *G06F 16/28* | (2019.01) |
| *G06K 9/62* | (2006.01) |
| *G06Q 30/06* | (2012.01) |
| *G06T 7/70* | (2017.01) |
| *G06Q 10/06* | (2012.01) |
| *G06T 7/00* | (2017.01) |
| *G06T 7/20* | (2017.01) |
| *G06T 7/55* | (2017.01) |
| *G06T 7/521* | (2017.01) |
| *H04N 5/225* | (2006.01) |
| *H04N 5/247* | (2006.01) |
| *G06F 16/55* | (2019.01) |
| *G06F 17/18* | (2006.01) |
| *G06Q 50/28* | (2012.01) |
| *G08B 21/18* | (2006.01) |
| *G06K 9/32* | (2006.01) |
| *G06F 16/903* | (2019.01) |
| *G06T 7/13* | (2017.01) |

(52) U.S. Cl.
CPC ............ *G06F 16/288* (2019.01); *G06F 16/55* (2019.01); *G06F 16/583* (2019.01); *G06F 16/5846* (2019.01); *G06F 16/90335* (2019.01); *G06F 17/18* (2013.01); *G06K 9/00362* (2013.01); *G06K 9/00624* (2013.01); *G06K 9/00671* (2013.01); *G06K 9/00771* (2013.01); *G06K 9/325* (2013.01); *G06K 9/6231* (2013.01); *G06Q 10/06311* (2013.01); *G06Q 10/06316* (2013.01); *G06Q 10/063112* (2013.01); *G06Q 10/087* (2013.01); *G06Q 10/0875* (2013.01); *G06Q 20/203* (2013.01); *G06Q 30/0629* (2013.01); *G06Q 30/0639* (2013.01); *G06Q 30/0643* (2013.01); *G06Q 50/28* (2013.01); *G06T 7/0002* (2013.01); *G06T 7/13* (2017.01); *G06T 7/20* (2013.01); *G06T 7/521* (2017.01); *G06T 7/55* (2017.01); *G06T 7/70* (2017.01); *G06T 7/75* (2017.01); *G08B 21/18* (2013.01); *G08B 21/182* (2013.01); *H04N 5/2252* (2013.01); *H04N 5/2253* (2013.01); *H04N 5/23203* (2013.01); *H04N 5/23219* (2013.01); *H04N 5/23229* (2013.01); *H04N 5/247* (2013.01); *G06K 2209/01* (2013.01); *G06K 2209/17* (2013.01); *G06T 2207/30196* (2013.01); *G06T 2207/30232* (2013.01); *G06T 2207/30242* (2013.01)

(58) Field of Classification Search
CPC .......... G06K 2209/17; G06K 9/00201; G06K 9/00362; G06K 9/00624; G06K 9/325; G06K 9/6231; G06K 9/00664; G06Q 10/087
USPC ........................................................ 348/150
See application file for complete search history.

(56) References Cited

U.S. PATENT DOCUMENTS

| | | | |
|---|---|---|---|
| 2012/0065937 A1 | 3/2012 | de Graff et al. | |
| 2013/0142494 A1* | 6/2013 | Valiulis ............ | G08B 13/1672 386/225 |
| 2013/0235206 A1 | 9/2013 | Smith et al. | |
| 2014/0240469 A1 | 8/2014 | Lee | |
| 2014/0324642 A1 | 10/2014 | Winkel | |
| 2015/0348060 A1* | 12/2015 | Ogawa ................ | G06Q 30/02 705/7.29 |
| 2017/0054965 A1* | 2/2017 | Raab .................... | G01C 11/02 |
| 2017/0107742 A1 | 4/2017 | Moock et al. | |

OTHER PUBLICATIONS

International Search Report and Written Opinion of PCT/US2019/013054 dated May 30, 2019, 22 pages.

\* cited by examiner

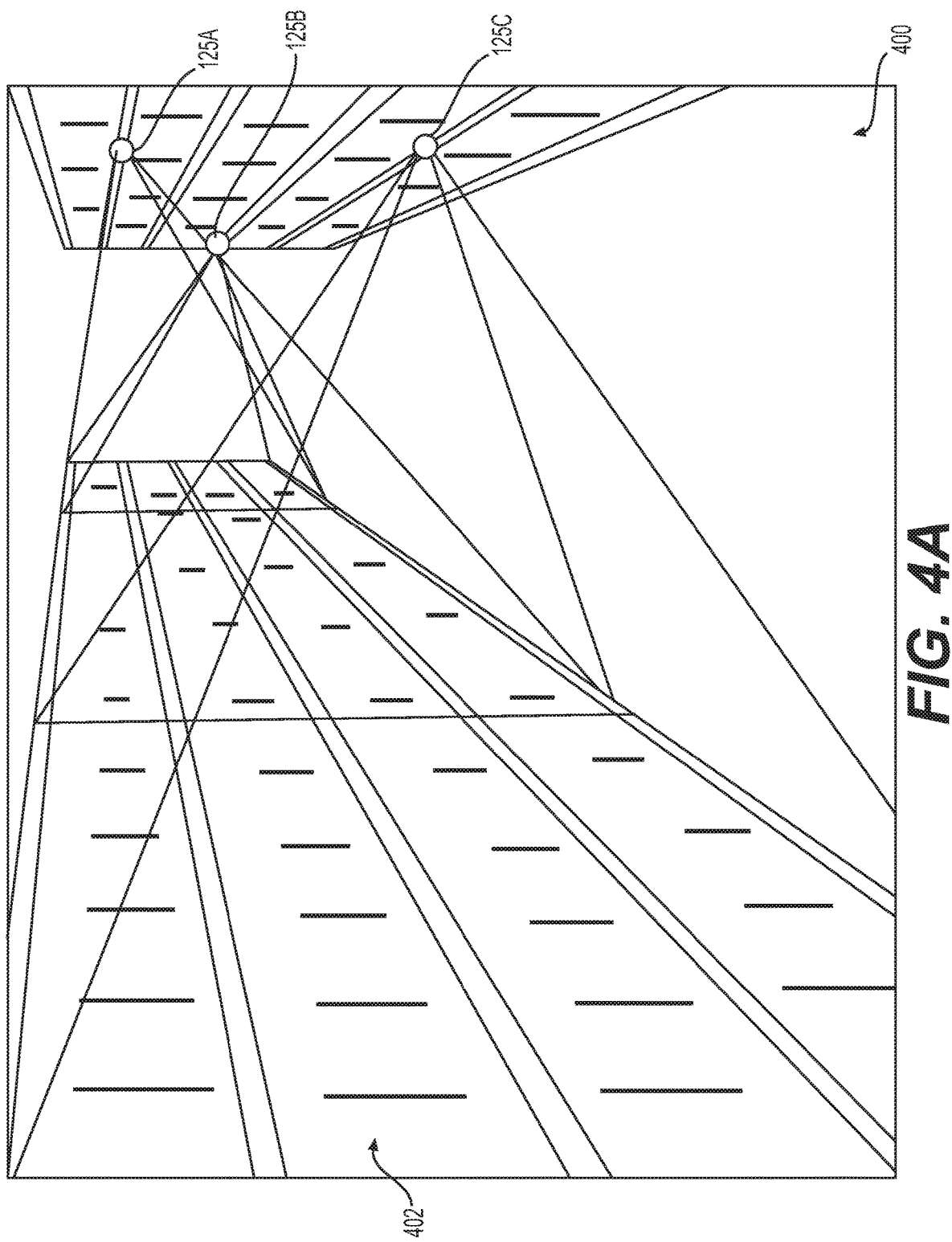

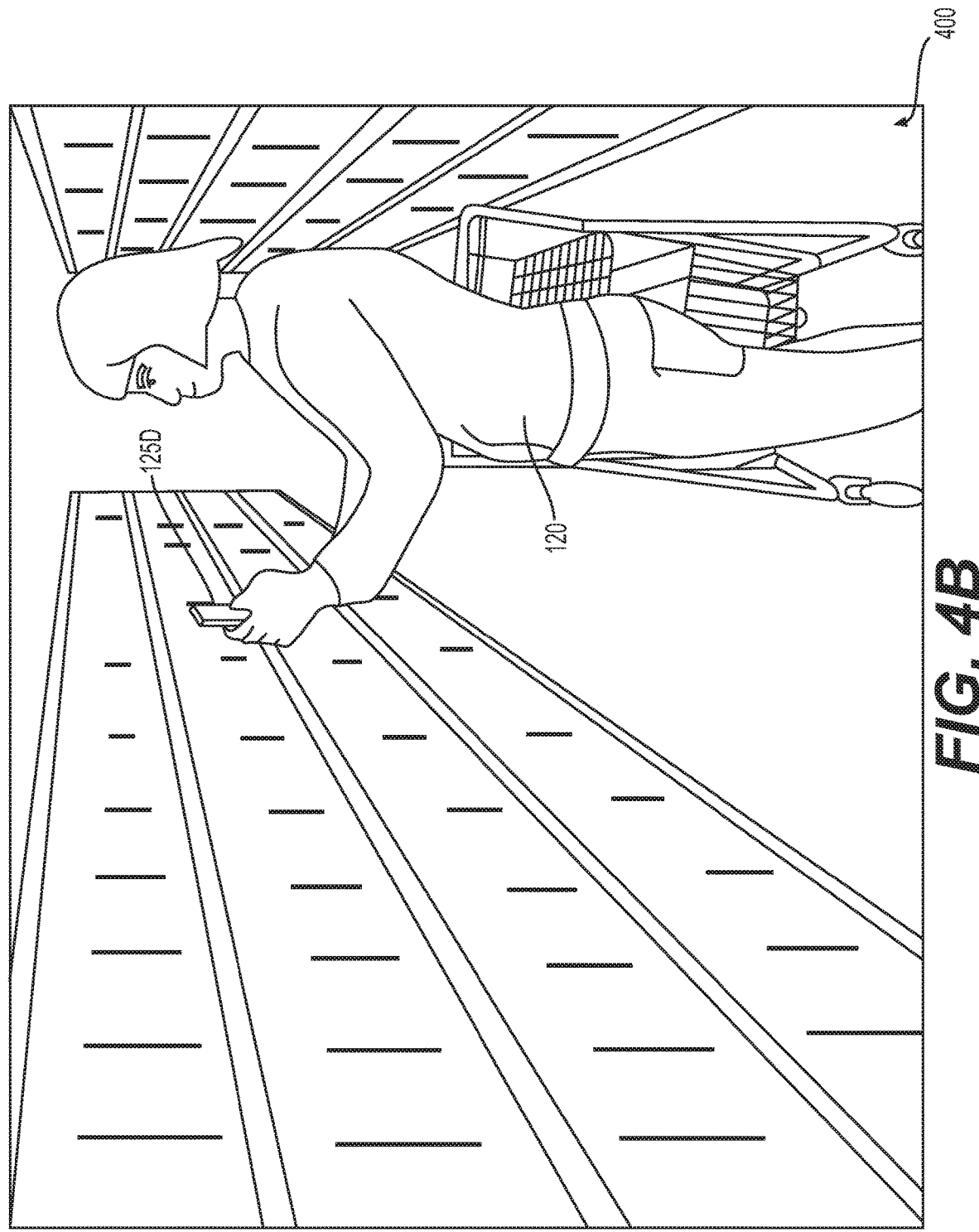

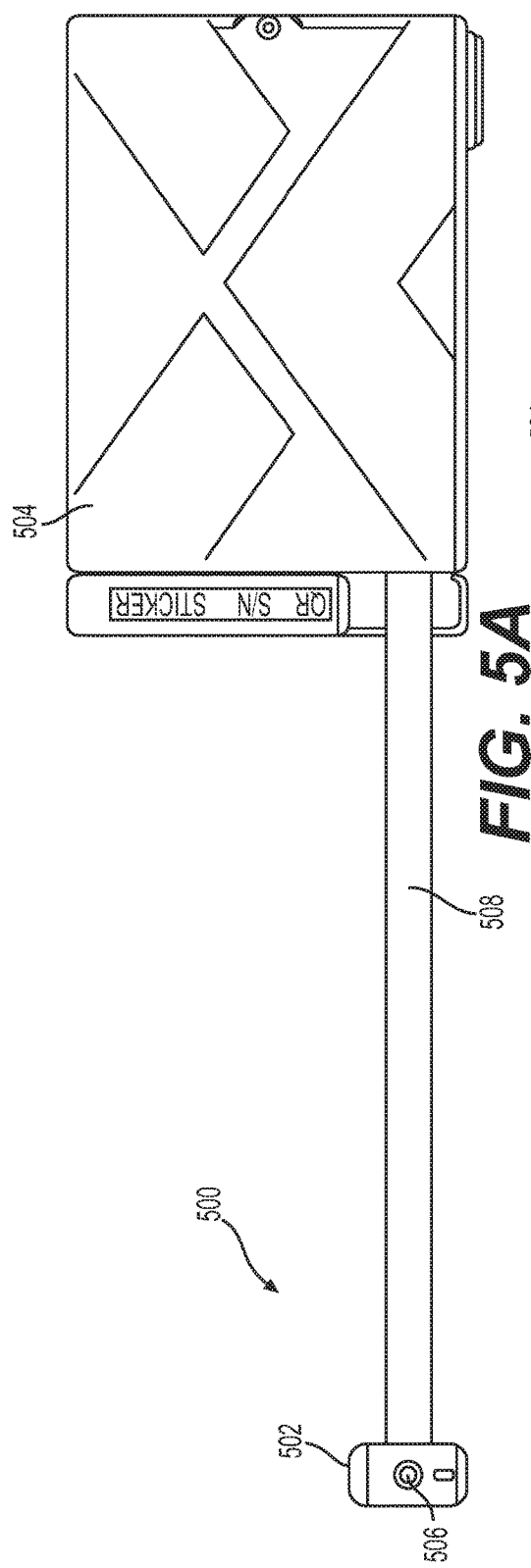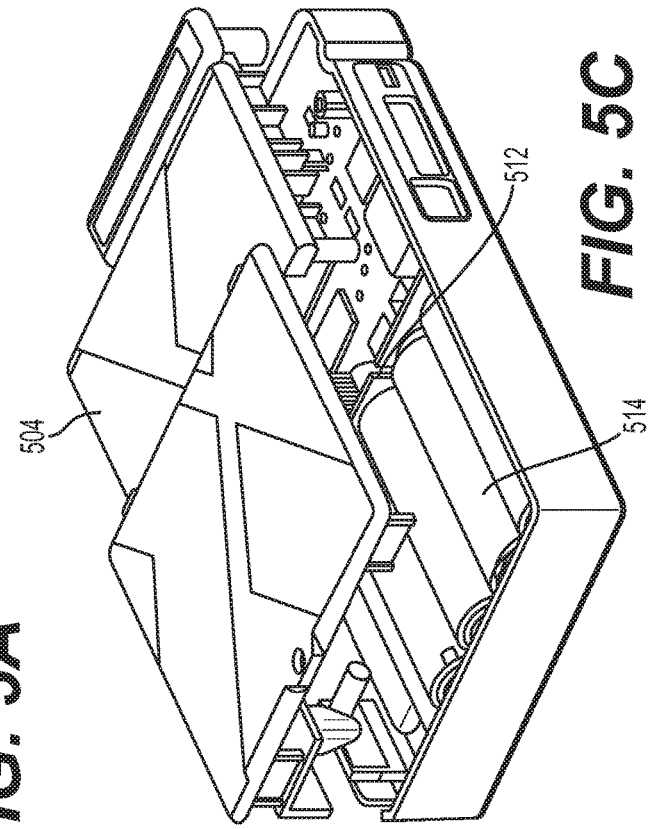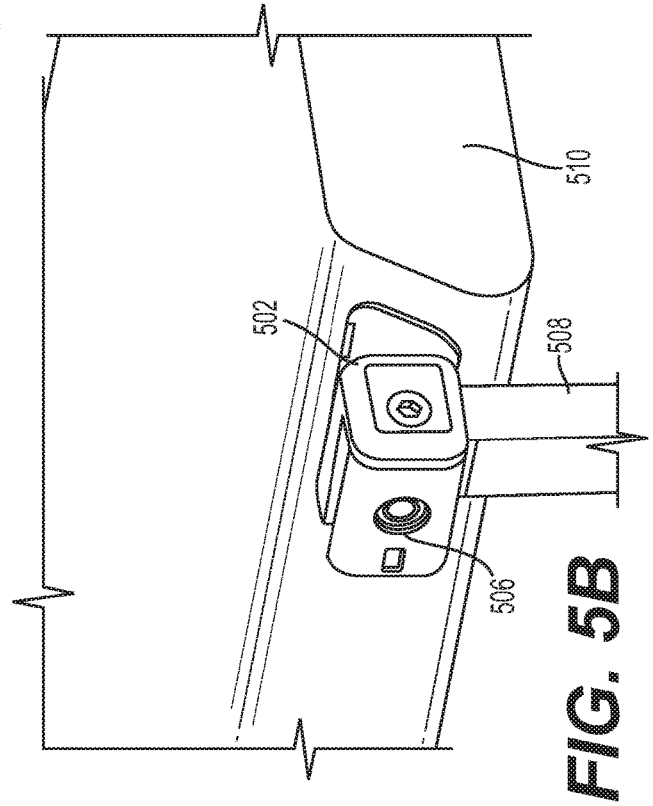

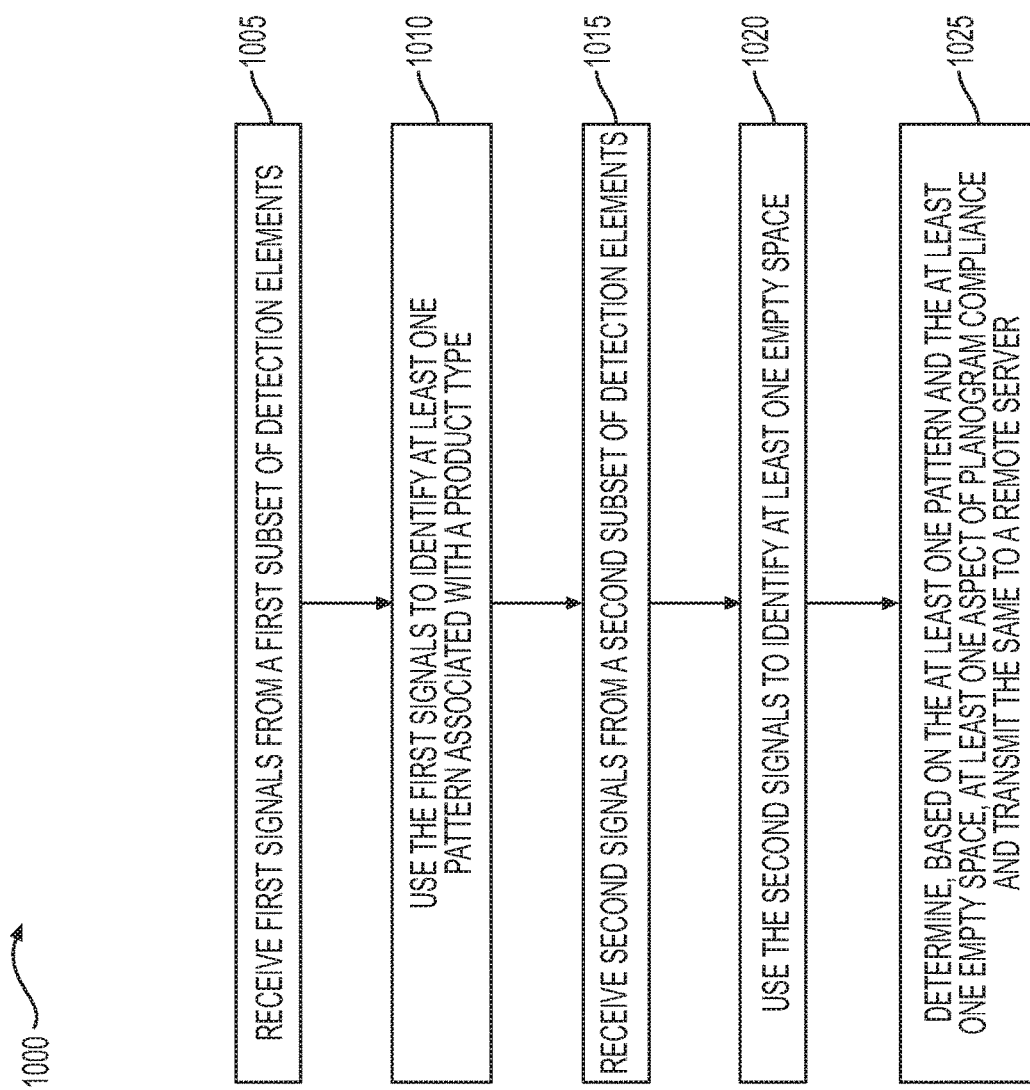

1880

```
┌─────────────────────────────────┐
│ Receive image depicting a store shelf │ ─── 1882
└─────────────────────────────────┘
                │
                ▼
┌─────────────────────────────────┐
│ Analyze image to detect a bottle │ ─── 1884
└─────────────────────────────────┘
                │
                ▼
┌─────────────────────────────────┐
│ Determine size of the bottle    │ ─── 1886
└─────────────────────────────────┘
                │
                ▼
┌─────────────────────────────────┐
│ Determine confidence level for  │ ─── 1888
│ determined size                 │
└─────────────────────────────────┘
                │
                ▼
┌─────────────────────────────────┐
│ Analyze image to identify another│ ─── 1890
│ product with a third outline element│
│ or identify a third outline element of│
│ same bottle                     │
└─────────────────────────────────┘
                │
                ▼
┌─────────────────────────────────┐
│ Confirm size of the bottle based on │ ─── 1892
│ the third outline element the other │
│ two outline elements            │
└─────────────────────────────────┘
```

```
┌─────────────────────────────────────┐
│  Receive image depicting a store shelf  │──── 1922
└─────────────────────────────────────┘
                 │
                 ▼
┌─────────────────────────────────────┐
│  Analyze image to detect a first bottle and a │──── 1924
│           second bottle             │
└─────────────────────────────────────┘
                 │
                 ▼
┌─────────────────────────────────────┐
│  Identify visual characteristics of the first bottle │──── 1926
│           and second bottle         │
└─────────────────────────────────────┘
                 │
                 ▼
┌─────────────────────────────────────┐
│  Identify different two outline elements for the │──── 1928
│        first and second bottle      │
└─────────────────────────────────────┘
                 │
                 ▼
┌─────────────────────────────────────┐
│  Determine size of the first bottle and the second │──── 1930
│                 bottle              │
└─────────────────────────────────────┘
                 │
                 ▼
┌─────────────────────────────────────┐
│  Determine product type of the first bottle and │──── 1932
│            the second bottle        │
└─────────────────────────────────────┘
```

*FIG. 20*

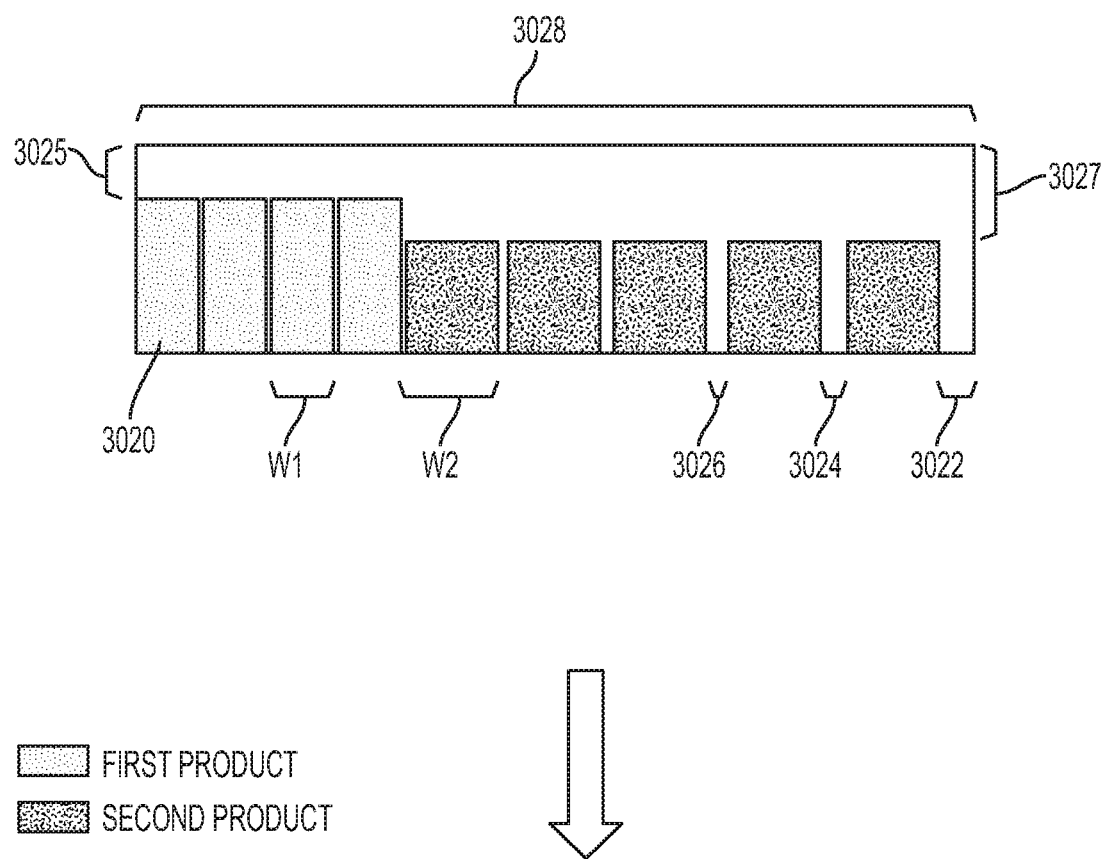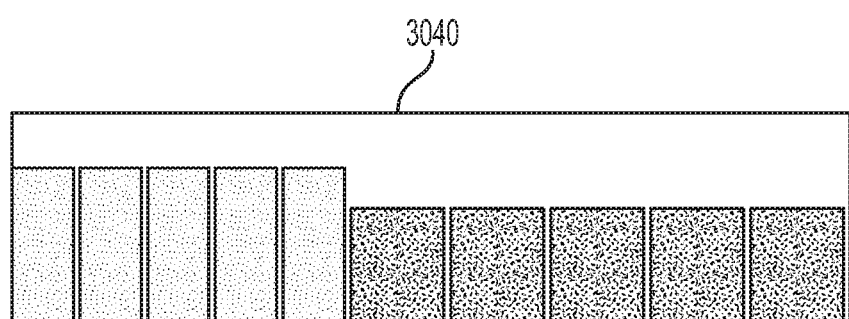
FIG. 30A

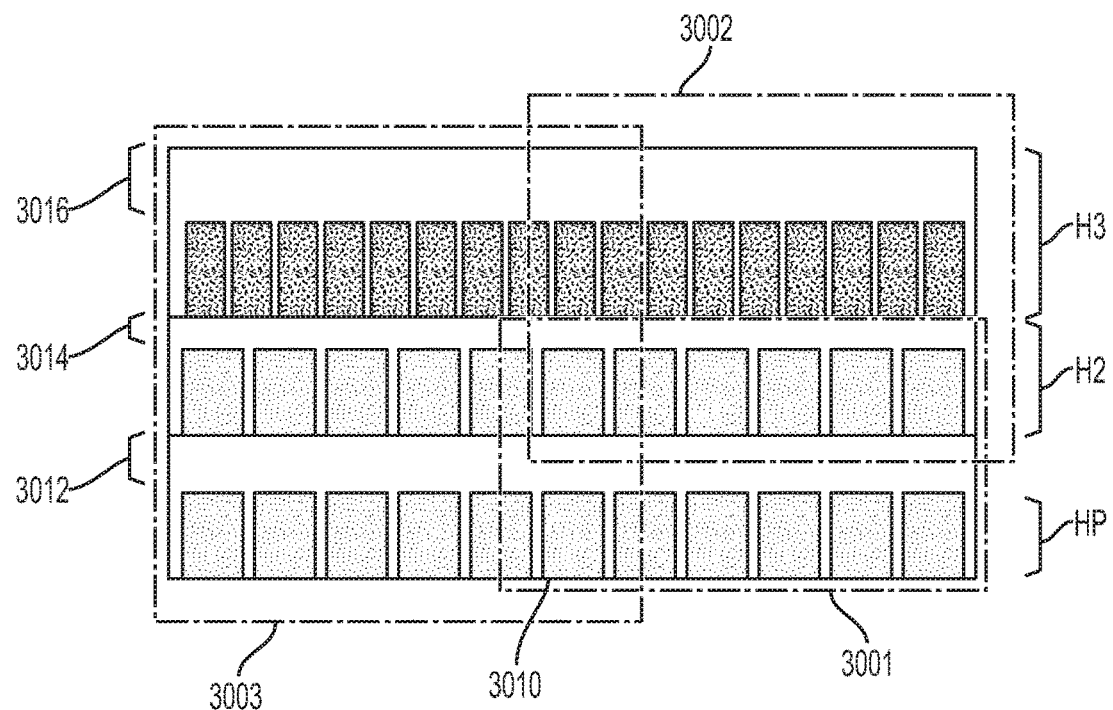
FIRST PRODUCT
SECOND PRODUCT
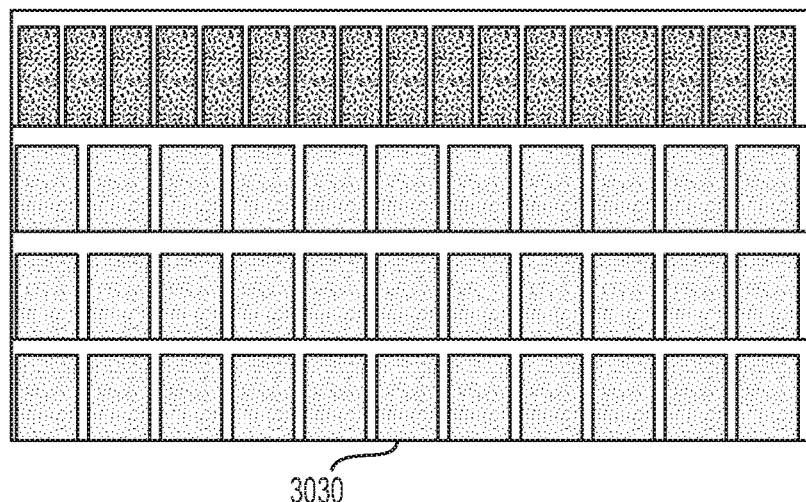
FIG. 30B

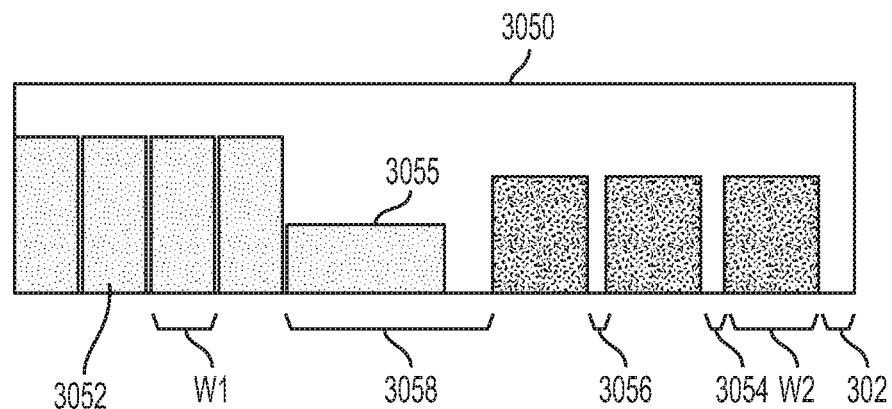
☐ FIRST PRODUCT
▒ SECOND PRODUCT
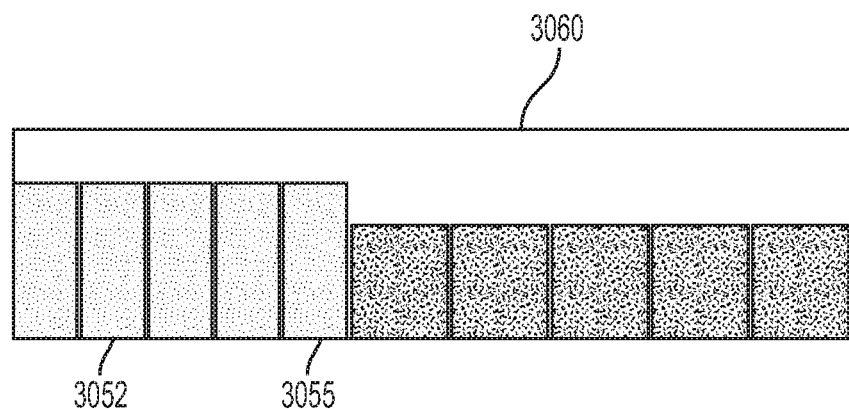
FIG. 30C

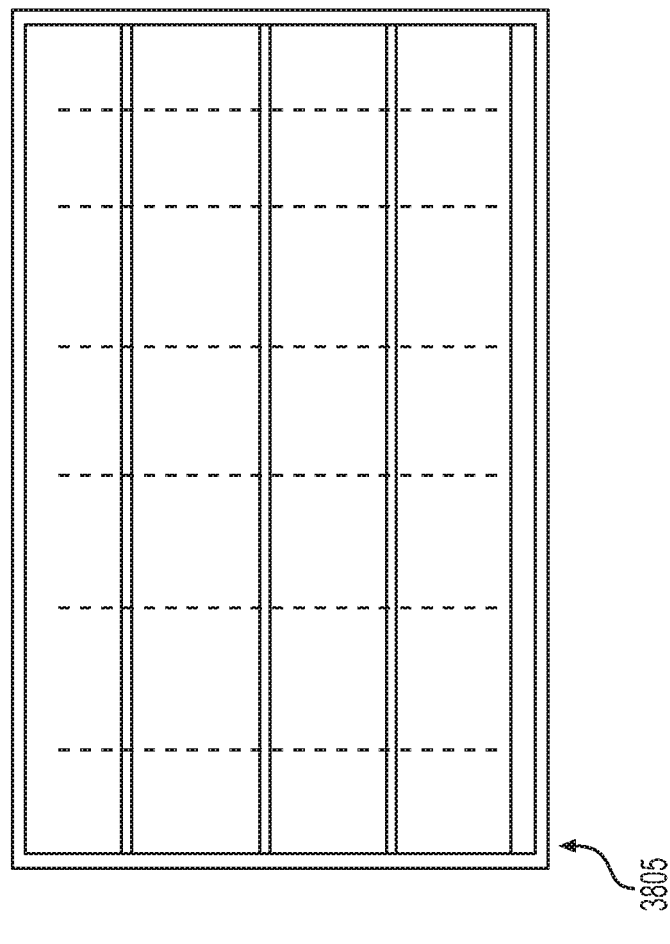
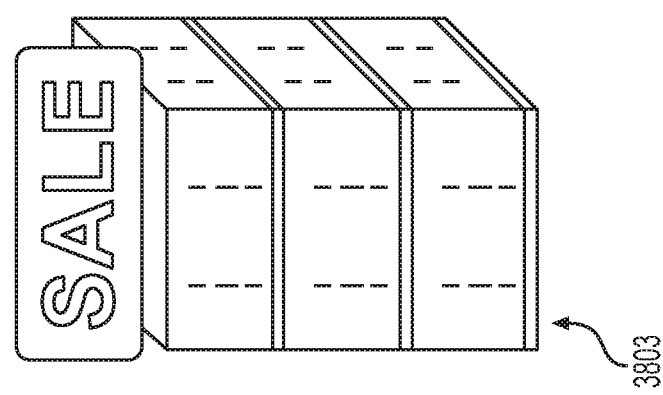
FIG. 38

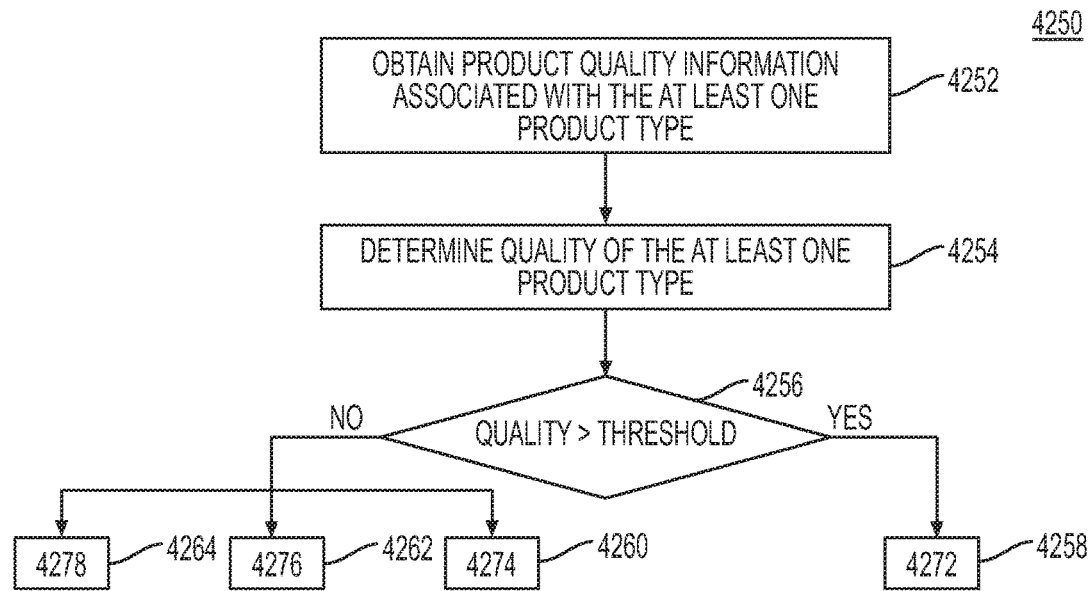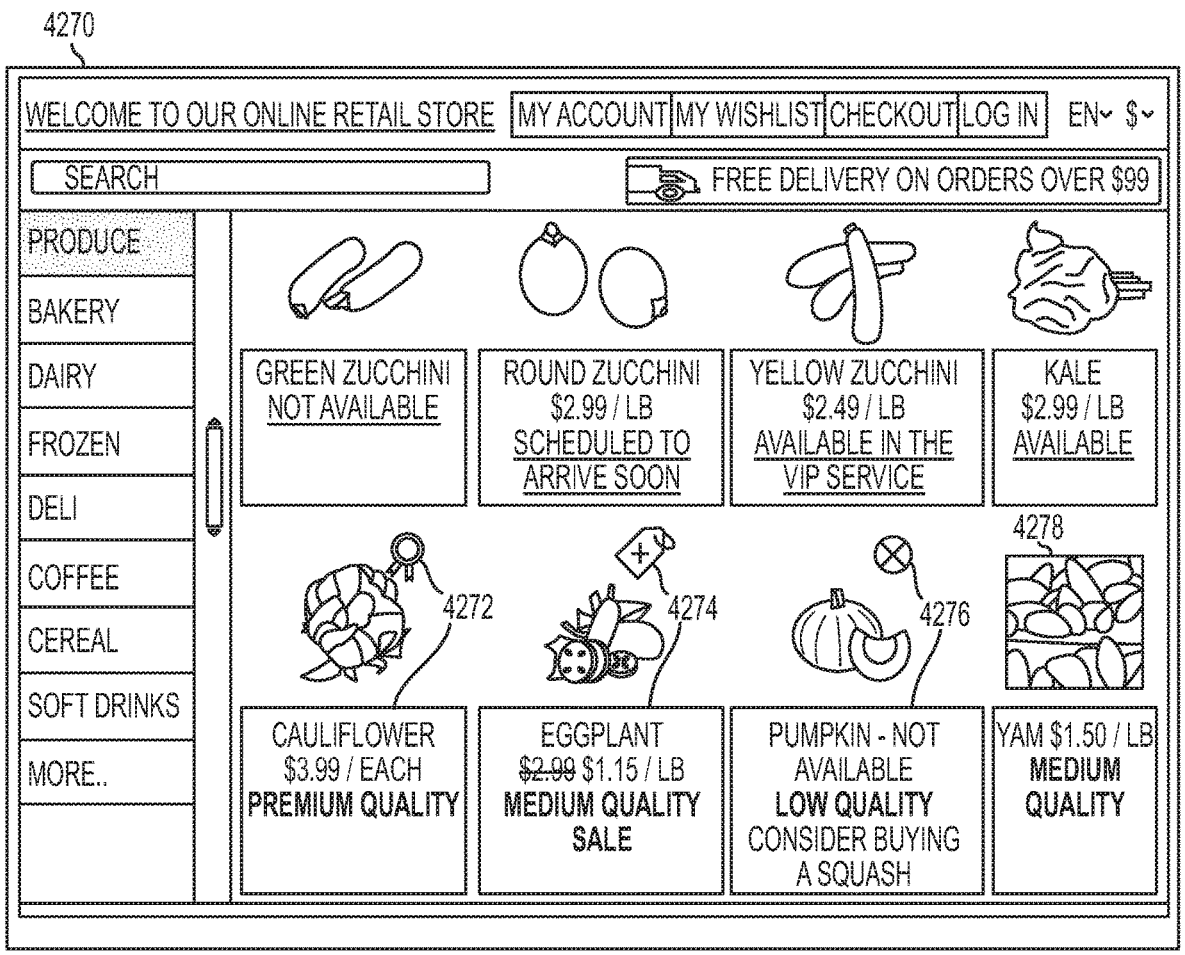
FIG. 42B

CAMERA CONFIGURED TO BE MOUNTED TO STORE SHELF

CROSS REFERENCES TO RELATED APPLICATIONS

This application is a continuation of PCT International Application No. PCT/US2019/013054, filed Jan. 10, 2019, which claims the benefit of priority of U.S. Provisional Patent Application No. 62/615,512, filed on Jan. 10, 2018, U.S. Provisional Patent Application No. 62/681,718, filed on Jun. 7, 2018, and U.S. Provisional Patent Application No. 62/695,469, filed on Jul. 9, 2018, all of which are incorporated herein by reference in their entirety.

BACKGROUND

I. Technical Field

The present disclosure relates generally to systems, methods, and devices for identifying products in retail stores, and more specifically to systems, methods, and devices for capturing, collecting, and automatically analyzing images of products displayed in retail stores for purposes of providing one or more functions associated with the identified products.

II. Background Information

Shopping in stores is a prevalent part of modern daily life. Store owners (also known as "retailers") stock a wide variety of products on store shelves and add associated labels and promotions to the store shelves. Typically, retailers have a set of processes and instructions for organizing products on the store shelves. The source of some of these instructions may include contractual obligations and other preferences related to the retailer methodology for placement of products on the store shelves. Nowadays, many retailers and suppliers send people to stores to personally monitor compliance with the desired product placement. Such a monitoring technique, however, may be inefficient and may result in nonuniform compliance among retailers relative to various product-related guidelines. This technique may also result in significant gaps in compliance, as it does not allow for continuous monitoring of dynamically changing product displays. To increase productivity, among other potential benefits, there is a technological need to provide a dynamic solution that will automatically monitor retail spaces. Such a solution, for example and among other features, may automatically determine whether a disparity exists between a desired product placement and an actual product placement.

The disclosed devices and methods are directed to providing new ways for monitoring retail establishments using image processing and supporting sensors.

SUMMARY

Embodiments consistent with the present disclosure provide systems, methods, and devices for capturing, collecting, and analyzing images of products displayed in retail stores. For example, consistent with the disclosed embodiments, an example system may receive an image depicting a store shelf having products displayed thereon, identify the products on the store shelf, and trigger an alert when disparity exists between the desired product placement and the actual product placement.

Consistent with disclosed embodiments, a system for acquiring images of products in a retail store is disclosed. The system may include at least one first housing configured for location on a retail shelving unit, and at least one image capture device included in the at least one first housing and configured relative to the at least one first housing such that an optical axis of the at least one image capture device is directed toward an opposing retail shelving unit when the at least one first housing is fixedly mounted on the retail shelving unit. The system may further include a second housing configured for location on the retail shelving unit separate from the at least one first housing, the second housing may contain at least one processor configured to control the at least one image capture device and also to control a network interface for communicating with a remote server. The system may also include at least one data conduit extending between the at least one first housing and the second housing, the at least one data conduit being configured to enable transfer of control signals from the at least one processor to the at least one image capture device and to enable collection of image data acquired by the at least one image capture device for transmission by the network interface.

Consistent with disclosed embodiments, a method for acquiring images of products in a retail store is disclosed. The method may include fixedly mounting on a retail shelving unit at least one first housing containing at least one image capture device such that an optical axis of the at least one image capture device is directed to an opposing retail shelving unit. The method may also include fixedly mounting on the retail shelving unit a second housing at a location spaced apart from the at least one first housing, the second housing containing at least one processor. The method may further include extending at least one data conduit between the at least one first housing and the second housing. The method may additionally include capturing images of the opposing retail shelving unit using the at least one image capture device, and transmitting at least some of the captured images from the second housing to a remote server configured to determine planogram compliance relative to the opposing retail shelving unit.

In one embodiment, a sensing system for monitoring planogram compliance on a store shelf may comprise a plurality of detection elements configured to detect placement of products on the store shelf and at least one processor. The at least one processor may be configured to receive first signals from a first subset of detection elements from among the plurality of detection elements after one or more of a plurality of products are placed on at least one area of the store shelf associated with the first subset of detection elements and use the first signals to identify at least one pattern associated with a product type of the plurality of products. The at least one processor may be further configured to receive second signals from a second subset of detection elements from among the plurality of detection elements. The second signals may be indicative of no products being placed on at least one area of the store shelf associated with the second subset of detection elements. The at least one processor may be further configured to use the second signals to determine at least one empty space on the store shelf; determine, based on the at least one pattern and the at least one empty space, at least one aspect of planogram compliance; and transmit an indicator of the at least one aspect of planogram compliance to a remote server.

In one embodiment, a method for monitoring planogram compliance in a store shelf may comprise receiving first signals from a first subset of a plurality of detection elements after one or more of a plurality of products are placed on at least one area of the store shelf associated with the first subset of detection elements and using the first signals to identify at least one pattern associated with a product type of the plurality of products. The method may further comprise receiving second signals from a second subset of the plurality of detection elements. The second signals may be indicative of no products being placed on at least one area of the store shelf associated with the second subset of detection elements. The method may further comprise using the second signals to determine at least one empty space on the store shelf; determining, based on the at least one pattern and the at least one empty space, at least one aspect of planogram compliance; and transmitting an indicator of the at least one aspect of planogram compliance to a remote server.

In one embodiment, a computer program product for monitoring planogram compliance a store shelf may be embodied in a non-transitory computer-readable medium and executable by at least one processor. The computer program product may include instructions for causing the at least one processor to execute a method. The method may comprise receiving first signals from a first subset of a plurality of detection elements after one or more of a plurality of products are placed on at least one area of the store shelf associated with the first subset of detection elements and using the first signals to identify at least one pattern associated with a product type of the plurality of products. The method may further comprise receiving second signals from a second subset of the plurality of detection elements. The second signals may be indicative of no products being placed on at least one area of the store shelf associated with the second subset of detection elements. The method may further comprise using the second signals to determine at least one empty space on the store shelf; determining, based on the at least one pattern and the at least one empty space, at least one aspect of planogram compliance; and transmitting an indicator of the at least one aspect of planogram compliance to a remote server.

In one embodiment, a sensing system for monitoring planogram compliance on a store shelf may comprise a plurality of detection elements configured for location on the store shelf, wherein the plurality of detection elements are configured to detect placement of products when the products are placed above at least part of the plurality of detection elements. The system may further comprise at least one processor configured to receive first signals from a first subset of detection elements from among the plurality of detection elements after one or more of a plurality of products are placed on at least one area associated with the first subset of detection elements and use the first signals to identify at least one pattern associated with a product type of the plurality of products. The at least one processor may be further configured to receive second signals from a second subset of detection elements from among the plurality of detection elements. The second signals may be indicative of no products being placed on at least one area associated with the second subset of detection elements. The at least one processor may be further configured to use the second signals to determine at least one empty space on the store shelf; determine, based on the at least one pattern and the at least one empty space, at least one aspect of planogram compliance; and transmit an indicator of the at least one aspect of planogram compliance to a remote server.

The disclosed embodiments describe non-transitory computer readable media, systems, and methods for controlling changes to authentication credentials. For example, in an exemplary embodiment, there may be a non-transitory computer readable medium including instructions that, when executed by at least one processor, cause the at least one processor to perform operations for controlling changes to authentication credentials. The operations may comprise accessing a database storing a group of product models, each relating to at least one product in the retail store. The operations may also include receiving at least one image depicting at least part of at least one store shelf having a plurality of products of a same type displayed thereon. The operations may also include analyzing the at least one image and determining a first candidate type of the plurality of products based on the group of product models and the image analysis. The operations may also include determining a first confidence level associated with the determined first candidate type of the plurality of products. When the first confidence level associated with the first candidate type is below a confidence threshold, the operations may also include determining a second candidate type of the plurality of products using contextual information. The operations may also include determining a second confidence level associated with the determined second candidate type of the plurality of products. When the second confidence level associated with the second candidate type is above the confidence threshold, the operations may also include initiating an action to update the group of product models stored in the database.

Aspects of the disclosed embodiments may include tangible computer readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor (s) based on software instructions that are programmed with logic and instructions that perform, when executed, one or more operations consistent with the disclosed embodiments.

The disclosed embodiments describe non-transitory computer readable media, systems, and methods for selective usage of product model. For example, in an exemplary embodiment, there may be a non-transitory computer readable medium including instructions that, when executed by at least one processor, cause the at least one processor to perform operations for controlling changes to authentication credentials. The operation may include accessing a database storing a set of product models relating to a plurality of products. The operation may also include receiving at least one image depicting at least one store shelf and at least one product displayed thereon. The operation may further include selecting a product model subset from among the set of product models based on at least one characteristic of the at least one store shelf and based on analysis of the at least one image. A number of product models included in the product model subset may be less than a number of product models included in the set of product models. The operation may also include determining whether the selected product model subset is applicable to the at least one product. When the selected product model subset is determined to be applicable to the at least one product, the operation may also include analyzing a representation of the at least one product depicted in the at least one image using the product model subset, and identifying the at least one product based on the analysis of the representation of the at least one product depicted in the at least one image using the product model subset. When the selected product model subset is determined to be not applicable to the at least one product, the operation may include updating the selected product model subset to include at least one additional product model from the stored set of product models not previously included in the selected product model subset to provide an updated product model subset, analyzing the representation of the at least one product depicted in the at least one image in comparison to the updated product model subset, and identifying the at least one product based on the analysis of the representation of the at least one product depicted in the at least one image in comparison to the updated product model subset.

Aspects of the disclosed embodiments may include tangible computer readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

In accordance with the present disclosure, there is provided a system and method for processing images captured in a retail store. The system may include at least one processor. The at least one processor may be configured to perform the method for processing images captured in a retail store. The method may include receiving an image depicting a store shelf having at least one bottle displayed thereon. The method may also include analyzing the image to detect a representation in the image of the at least one bottle, wherein the bottle has an outline design. Further, the method may include identifying in the image two outline elements being associated with the outline design of the at least one bottle. Each of the two outline elements may have a specific length. In addition, the method may include determining a size of the at least one bottle based on a comparison of the lengths of the two outline elements. In accordance with the present disclosure, there is further provided a computer program product for processing images captured in a retail store in a non-transitory computer-readable medium. The non-transitory computer-readable medium may be executable by at least one processor. The computer program product may include instructions for causing the at least one processor to execute the instructions in order to perform the method for processing images captured in a retail store.

Consistent with disclosed embodiments, a method for processing images captured in a retail store is disclosed. The method may include receiving at least one image depicting a store shelf having a product displayed thereon. The method may also include analyzing the at least one image to detect the product represented in the at least one image. The method may further include determining that the detected product is either a first type of product or a second type of product. The first type of product and the second type of product may have similar visual appearances. The first type of product and the second type of product may be associated with different price ranges. A first price range associated with the first type of product may be higher than a second price range associated with the second type of product. The method may include analyzing the at least one image to determine a price associated with the detected product. Further, the method may include determining that the detected product is of the first type of product when the determined price falls within the first price range. Additionally, the method may include determining that the detected product is of the second type of product when the determined price falls within the second price range. Consistent with disclosed embodiments, a system for processing images captured in a retail store and differentiating between products with similar visual appearances is disclosed. The system may include at least one processor configured to perform the method for processing images captured in a retail store. Consistent with disclosed embodiments, a computer program product for processing images captured in a retail store embodied in a non-transitory computer-readable medium and executable by at least one processor is disclosed. The computer program product may include instructions for causing the at least one processor to execute the method for processing images captured in a retail store.

Consistent with disclosed embodiments, a system for processing images captured in a retail store and automatically identifying misplaced products is provided. The system may include at least one processor. The at least one processor may be configured to receive one or more images captured by one or more image sensors from an environment of a retail store and depicting a plurality of products displayed on at least one store shelf. The at least one processor may also be configured to detect in the one or more images a first product, wherein the first product has an associated first correct display location. The at least one processor may also be configured to determine, based on analysis of the one or more images, that the first product is not located in the first correct display location. The at least one processor may also be configured to determine an indicator of a first level of urgency for returning the first product to the first correct display location. The at least one processor may also be configured to cause an issuance of a user-notification associated with the first product, wherein the user-notification is issued within a first period of time from when the first product was determined not to be located in the first correct display location. The at least one processor may also be configured to detect in the one or more images a second product, wherein the second product has an associated second correct display location. The at least one processor may also be configured to determine, based on analysis of the one or more images, that the second product is not located in the second correct display location. The at least one processor may also be configured to determine an indicator of a second level of urgency for returning the second product to its associated second correct display location. After determining that the second product is not located in the second correct display location and when the second urgency level is lower than the first urgency level, the at least one processor may also be configured to withhold issuance of a user-notification associated with the second product within a time duration equal to the first period of time.

Consistent with disclosed embodiments, a method for processing images captured in a retail store and automatically identifying misplaced products is provided. The method may include receiving one or more images captured by one or more image sensors from an environment of a retail store and depicting a plurality of products displayed on at least one store shelf. The method may also include detecting in the one or more images a first product, wherein the first product has an associated first correct display location. The method may also include determining, based on analysis of the one or more images, that the first product is not located in the first correct display location. The method may also include determining an indicator of a first level of urgency for returning the first product to the associated first correct display location. The method may also include causing an issuance of a user-notification associated with the first product, wherein the user-notification is issued within a first period of time from when the first product was determined not to be located in the first correct display location. The method may also include detecting in the one or more images a second product, wherein the second product has an associated second correct display location. The method may also include determining, based on analysis of the one or more images, that the second product is not located in the second correct display location. The method may also include determining an indicator of a second level of urgency for returning the second product to its associated second correct display location. The method may also include withholding issuance of a user-notification associated with the second product within a time duration equal to the first period of time, after determining that the second product is not located in the second correct display location and when the second urgency level is lower than the first urgency level.

Consistent with other disclosed embodiments, a non-transitory computer readable medium for processing images captured in a retail store is provided. The computer readable medium including instructions that, when executed by at least one processor, cause the at least one processor to perform operations comprising: receiving one or more images captured by one or more image sensors from an environment of a retail store and depicting a plurality of products displayed on at least one store shelf; detecting in the one or more images a first product, wherein the first product has an associated first correct display location; determining, based on analysis of the one or more images, that the first product is not located in the first correct display location; determining an indicator of a first level of urgency for returning the first product to the associated first correct display location; causing an issuance of a user-notification associated with the first product, wherein the user-notification is issued within a first period of time from when the first product was determined not to be located in the first correct display location; detecting in the one or more images a second product, wherein the second product has an associated second correct display location; determining, based on analysis of the one or more images, that the second product is not located in the second correct display location; determining an indicator of a second level of urgency for returning the second product to its associated second correct display location. After determining that the second product is not located in the second correct display location and when the second urgency level is lower than the first urgency level, the operations may also comprise withholding issuance of a user-notification associated with the second product within a time duration equal to the first period of time.

The disclosed embodiments describe non-transitory computer readable media, systems, and methods for identifying occlusions in retail stores. For example, in an exemplary embodiment, there may be a non-transitory computer readable medium including instructions that, when executed by at least one processor, cause the at least one processor to perform operations for controlling changes to authentication credentials. The operation may include receiving one or more images captured by one or more image sensors from an environment of a retail store and depicting a plurality of products displayed on at least one store shelf. The operation may also include detecting in the one or more images a first occlusion event, wherein the first occlusion event is associated with a first occluding object in the retail store. The operation may further include analyzing the plurality of images to determine an indicator of a first level of urgency for resolving the first occlusion event. The operation may also include causing issuance of a user-notification associated with the first occlusion event, wherein the user-notification is issued within a first period of time from when the first occlusion event was detected. The operation may also include detecting in the one or more images a second occlusion event, wherein the second occlusion event is associated with a second occluding object in the retail store. Further, the operation may include analyzing the plurality of images to determine an indicator of a second level of urgency for resolving the second occlusion event. When the second urgency level is lower than the first urgency level, the operation may further include withhold issuance of a user-notification associated with the second occlusion event within a time duration equal to the first period of time.

Aspects of the disclosed embodiments may include tangible computer readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor (s) based on software instructions that are programmed with logic and instructions that perform, when executed, one or more operations consistent with the disclosed embodiments.

Consistent with disclosed embodiments, a system for processing images captured in a retail store may include at least one processor. The at least one processor may be configured to receive at least one image depicting at least part of at least one store shelf having a plurality of products displayed thereon. The plurality of products may include a group of first products associated with a first product size and a group of second products associated with a second product size. The second product size may differ from the first product size. The at least one processor may also be configured to analyze the at least one image to detect the plurality of products. Further, the at least one processor may be configured to identify one or more vacant spaces associated with the plurality of products on the at eat one store shelf. The at least one processor may also be configured to determine that at least one additional first product may be displayed on the at least one store shelf next to the group of first products. The determination may be based on the one or more identified vacant spaces and a determination that the group of second products may be rearranged on the at least one store shelf to at least partially eliminate the one or more vacant spaces. Further, the at least one processor may be configured to provide information to a user indicative of the identified vacant spaces. The information may be provided based on the determination that at least one additional first product may be displayed on the at least one store shelf.

Consistent with disclosed embodiments, a system for processing images captured in a retail store may include at least one processor. The at least one processor may be configured to receive at least one image depicting at least part of a shelving unit with a plurality of shelves having a plurality of products displayed thereon. The at least one processor may also be configured to analyze the at least one image to detect the plurality of products. Further, the at least one processor may be configured to identify one or more vacant spaces associated with the shelving unit. The at least one processor may be further configured to determine, based on the one or more identified vacant spaces, that by rearranging the plurality of products, at least one shelf may be added to the shelving unit. Further, the at least one processor may be configured to provide, based on the determination that at least one shelf may be added to the shelving unit, information to a user indicative of the identified vacant spaces.

Consistent with disclosed embodiments, a method for processing images captured in a retail store may include receiving at least one image depicting at least part of at least one store shelf having a plurality of products displayed thereon. The plurality of products depicted in the at least one image may include a group of first products associated with a first product size and a group of second products associated with a second product size. The second product size may differ from the first product size. The method may further include analyzing the at least one image to detect the plurality of products. The method may also include identifying one or more vacant spaces associated with the plurality of products on the at least one store shelf. Based on the one or more identified vacant spaces, the method may include determining that by rearranging the group of second products on the at least one store shelf to at least partially eliminate the one or more identified vacant spaces, at least one additional first product may be displayed on the at least one store shelf next to the group of first products. The method may include additional steps based on the determination that at least one additional first product may be displayed. The method may include providing information to a user indicative of the identified vacant spaces.

Consistent with disclosed embodiments, a computer program product for processing images captured in retail stores, embodied in a non-transitory computer-readable medium and executable by at least one processor, may include instructions for causing the at least one processor to execute a method. The method may include receiving at least one image depicting at least part of at least one store shelf having a plurality of products displayed thereon. The plurality of products may include a group of first products associated with a first product size and a group of second products associated with a second product size, the second product size may differ from the first product size. The method may further include analyzing the at least one image to detect the plurality of products. The method may also include identifying one or more vacant spaces associated with the plurality of products on the at least one store shelf. Further, the method may include determining, based on the one or more identified vacant spaces, that by rearranging the group of second products on the at least one store shelf to at least partially eliminate the one or more identified vacant spaces, at least one additional first product may be displayed on the at least one store shelf next to the group of first products. Additionally, the method may include providing, based on the determination that at least one additional first product may be displayed, information to a user indicative of the identified vacant spaces.

In one aspect, a system for processing images captured in a retail store and automatically addressing detected conditions within the retail store is disclosed. The system may include at least one processor configured to receive a plurality of images depicting a plurality of products displayed on a plurality of store shelves. The processor may also be configured to detect in the plurality of images an indicator of a first service-improvement condition relating to the plurality of products and detect in the plurality of images an indicator of a second service-improvement condition relating to the plurality of products. The processor may be configured to determine a first product-related task for addressing the first service-improvement condition and determine a second product-related task for addressing the second service-improvement condition. The processor may also be configured to access a database storing information indicative of a first employee and a second employee on duty during a time interval over which the plurality of images was received and assign the first product-related task to the first employee and assign the second product-related task to the second employee.

In another aspect, a method for processing images captured in a retail store and for automatically addressing detected conditions within the retail store is disclosed. The method may include receiving a plurality of images depicting a plurality of products displayed on a plurality of store shelves. The method may also include detecting in the plurality of images an indicator of a first service-improvement condition relating to the plurality of products and detecting in the plurality of images an indicator of a second service-improvement condition relating to the plurality of products. The method may further include determining a first product-related task for addressing the first service-improvement condition and determining a second product-related task for addressing the second service-improvement condition. The method may include accessing a database storing information indicative of a first employee and a second employee on duty during a time interval over which the plurality of images was received and assigning the first product-related task to the first employee and assign the second product-related task to the second employee.

In another aspect, a computer program product for processing images captured in a retail store and for automatically addressing detected conditions within the retail store is provided. The computer program product may be embodied in a non-transitory computer-readable medium and may be executable by at least one processor. The computer program product may include instructions for causing the at least one processor to execute the method described above.

According to an aspect of the present disclosure, a system is disclosed for identifying products in retail stores based on analysis of image data and for automatically generating performance indicators relating to the identified products. The system may comprise at least one processor configured to receive a first set of images depicting a first plurality of products associated with single product type displayed on a first shelving unit in a retail store. The at least one processor may receive a first set of images depicting a first plurality of products associated with a single product type displayed on a first shelving unit in a retail store and may analyze the first set of images to determine first product turnover data associated with the first shelving unit. The at least one processor may further receive a second set of images depicting a second plurality of products also associated with the single product type displayed on a second shelving unit in the retail store nonadjacent to the first shelving unit and may analyze the second set of images to determine second product turnover data associated with the second shelving unit. The at least one processor may automatically generate a performance indicator associated with the product type using the first product turnover data and the second product turnover data Another aspect of the present disclosure is directed to a method for identifying products in a retail store based on image analysis of captured images and for automatically generating performance indicators relating to the identified products. The method may include receiving a first set of images depicting a first plurality of products associated with a single product type displayed on a first shelving unit in a retail store and analyzing the first set of images to determine first product turnover data associated with the first shelving unit. The method may further include receiving a second set of images depicting a second plurality of products also associated with the single product type displayed on a second shelving unit in the retail store nonadjacent to the first shelving unit and analyzing the second set of images to determine second product turnover data associated with the second shelving unit. The method may further include automatically generating a performance indicator associated with the product type using the first product turnover data and the second product turnover data.

Another aspect of the present disclosure is directed to a computer program product for identifying products in a retail store based on image analysis of captured images embodied in a non-transitory computer-readable medium and executable by at least one processor, the computer program product including instructions for causing the at least one processor to execute a method as described above.

Consistent with disclosed embodiments, a system for tracking inventory in a retail store based on analysis of image data is disclosed. The system may include at least one processor configured to receive image data from a plurality of image sensors mounted in a retail store and to analyze the image data to estimate a current inventory of at least one product type in the retail store. The at least one processor is further configured to receive product supply information associated with the at least one product type in the retail store and to determine that an online order from a virtual store made during a first time period will be fulfilled by an employee of the retail store during a second time period. The at least one processor is also configured to determine, based on the current inventory estimated by analyzing the image data and the product supply information, a predicted inventory of the at least one product type during the second time period. The at least one processor is also configured to provide information to the virtual store regarding the predicted inventory of the at least one product type during the second time period such that the virtual store can present during the first time period an inventory indicator for the at least one product type.

According to an aspect of the present disclosure, a method is disclosed for identifying products and monitoring planogram compliance using analysis of image data. The method may include accessing at least one planogram describing a desired placement of a plurality of product types on shelves of a plurality of retail stores; receiving image data from the plurality of retail stores; analyzing the image data to determine an actual placement of the plurality of product types on the shelves of the plurality of retail stores; determining at least one characteristic of planogram compliance based on detected differences between the at least one planogram and the actual placement of the plurality of product types on the shelves of the plurality of retail stores; receiving checkout data from the plurality of retail stores reflecting sales of at least one product type from the plurality of product types; estimating, based on the determined at least one characteristic of planogram compliance and based on the received checkout data, an impact of the at least one characteristic of planogram compliance on the sales of the at least one product type; based on the estimated impact, identifying an action, associated with the at least one characteristic of planogram compliance, for potentially increasing future sales of the at least one product type; and providing information associated with the identified action to an entity.

Another aspect of the present disclosure is directed to a system identifying products and monitoring planogram compliance using analysis of image data. The system may comprise at least one processor configured to access at least one planogram describing a desired placement of a plurality of product types on shelves of a plurality of retail stores; receive image data from the plurality of retail stores; analyze the image data to determine an actual placement of the plurality of product types on the shelves of the plurality of retail stores; determine at least one characteristic of planogram compliance based on detected differences between the at least one planogram and the actual placement of the plurality of product types on the shelves of the plurality of retail stores; receive checkout data from the plurality of retail stores reflecting sales of at least one product type from the plurality of product types; estimate, based on the determined at least one characteristic of planogram compliance and based on the received checkout data, an impact of the at least one characteristic of planogram compliance on the sales of the at least one product type; based on the estimated impact, identify an action, associated with the at least one characteristic of planogram compliance, for potentially increasing future sales of the at least one product type; and provide information associated with the identified action to an entity.

Another aspect of the present disclosure is directed to a computer program product for identifying products and monitoring planogram compliance using analysis of image data embodied in a non-transitory computer-readable medium and executable by at least one processor, the computer program product including instructions for causing the at least one processor to execute the method described above.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 4A is a schematic illustration of an example configuration for capturing image data in a retail store, consistent with the present disclosure;

FIG. 4B is a schematic illustration of another example configuration for capturing image data in a retail store, consistent with the present disclosure;

FIG. 5A is an illustration of an example system for acquiring images of products in a retail store, consistent with the present disclosure.

FIG. 5B is an illustration of a shelf-mounted camera unit included in a first housing of the example system of FIG. 5A, consistent with the present disclosure.

FIG. 5C is an exploded view illustration of a processing unit included in a second housing of the example system of FIG. 5A, consistent with the present disclosure.

FIG. 10A illustrates an exemplary method for monitoring planogram compliance on a store shelf, consistent with the present disclosure;

FIG. 18D is a flow chart of an exemplary method of confirming size of a bottle, consistent with the present disclosure.

FIG. 20 is a flow chart of an exemplary method of identifying products, consistent with the present disclosure.

FIG. 30A is diagrammatic illustration of retail shelf containing a plurality of products.

FIG. 30B is a diagrammatic illustration of a shelving unit containing a plurality of products.

FIG. 30C is a diagrammatic illustration of a shelving unit containing a plurality of products.

FIG. 38 is a diagrammatic illustration of an example configuration of different displays and shelving units, consistent with the disclosed embodiments;

FIG. 42B provides a flowchart of an exemplary process for providing quality information to a virtual store and another example GUI of the virtual store, consistent with the present disclosure.

DETAILED DESCRIPTION

Figure 1:
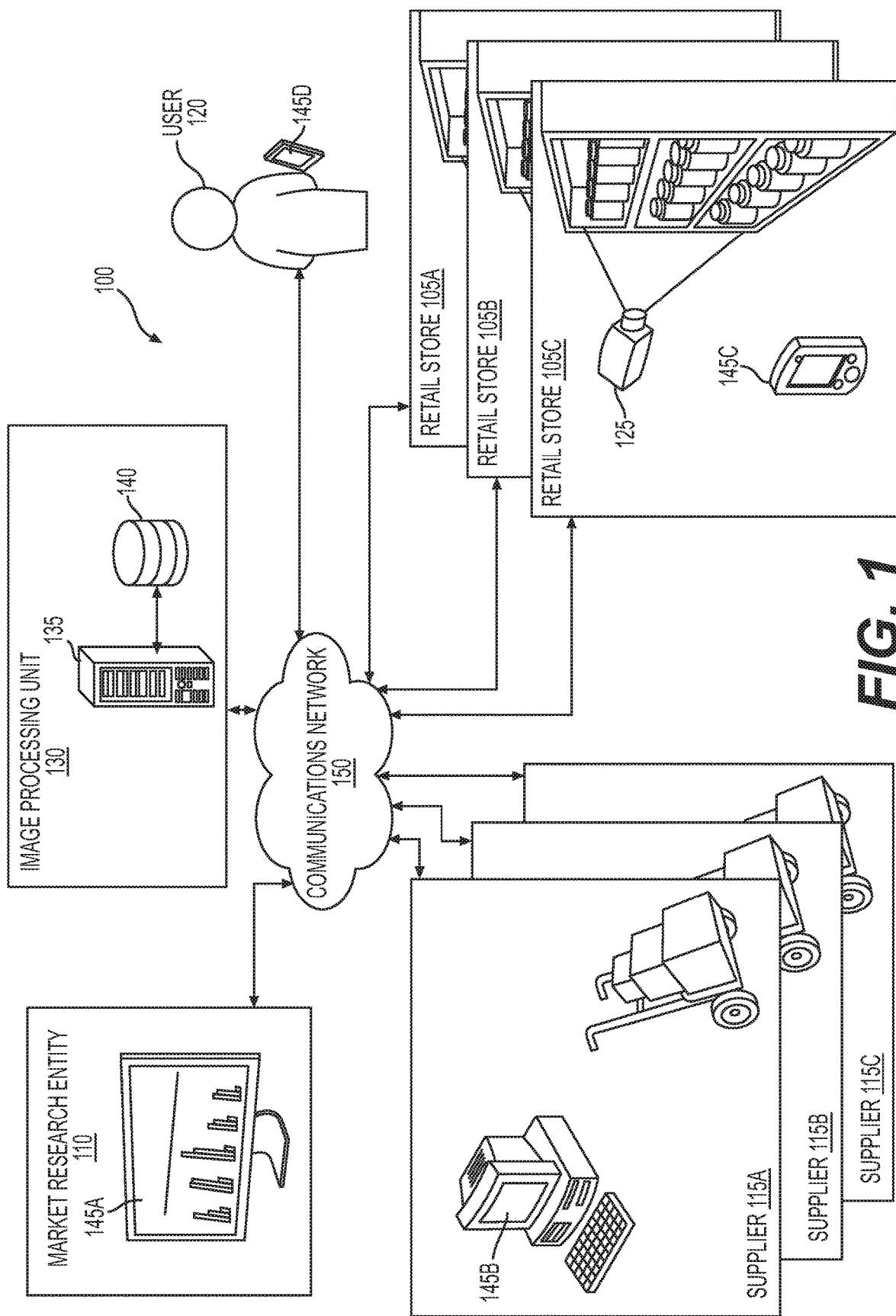
FIG. 1 is an illustration of an exemplary system for analyzing information collected from a retail store.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

The present disclosure is directed to systems and methods for processing images captured in a retail store. As used herein, the term "retail store" or simply "store" refers to an establishment offering products for sale by direct selection by customers physically or virtually shopping within the establishment. The retail store may be an establishment operated by a single retailer (e.g., supermarket) or an establishment that includes stores operated by multiple retailers (e.g., a shopping mall). Embodiments of the present disclosure include receiving an image depicting a store shelf having at least one product displayed thereon. As used herein, the term "store shelf" or simply "shelf" refers to any suitable physical structure which may be used for displaying products in a retail environment. In one embodiment the store shelf may be part of a shelving unit including a number of individual store shelves. In another embodiment, the store shelf may include a display unit having a single-level or a multi-level surfaces.

Consistent with the present disclosure, the system may process images and image data acquired by a capturing device to determine information associated with products displayed in the retail store. The term "capturing device" refers to any device configured to acquire image data representative of products displayed in the retail store. Examples of capturing devices may include, a digital camera, a time-of-flight camera, a stereo camera, an active stereo camera, a depth camera, a Lidar system, a laser scanner, CCD based devices, or any other sensor based system capable of converting received light into electric signals. The term "image data" refers to any form of data generated based on optical signals in the near-infrared, infrared, visible, and ultraviolet spectrums (or any other suitable radiation frequency range). Consistent with the present disclosure, the image data may include pixel data streams, digital images, digital video streams, data derived from captured images, and data that may be used to construct a 3D image. The image data acquired by a capturing device may be transmitted by wired or wireless transmission to a remote server. In one embodiment, the capturing device may include a stationary camera with communication layers (e.g., a dedicated camera fixed to a store shelf, a security camera, etc.). Such an embodiment is described in greater detail below with reference to FIG. 4A. In another embodiment, the capturing device may include a handheld device (e.g., a smartphone, a tablet, a mobile station, a personal digital assistant, a laptop, and more) or a wearable device (e.g., smart glasses, a smartwatch, a clip-on camera). Such an embodiment is described in greater detail below with reference to FIG. 4B. In another embodiment, the capturing device may include a robotic device with one or more cameras operated remotely or autonomously (e.g., an autonomous robotic device, a drone, a robot on a track, and more). Such an embodiment is described in greater detail below with reference to FIG. 4C.

In some embodiments, the capturing device may include one or more image sensors. The term "image sensor" refers to a device capable of detecting and converting optical signals in the near-infrared, infrared, visible, and ultraviolet spectrums into electrical signals. The electrical signals may be used to form image data (e.g., an image or a video stream) based on the detected signal. Examples of image sensors may include semiconductor charge-coupled devices (CCD), active pixel sensors in complementary metal-oxide-semiconductor (CMOS), or N-type metal-oxide-semiconductors (NMOS, Live MOS). In some cases, the image sensor may be part of a camera included in the capturing device.

Embodiments of the present disclosure further include analyzing images to detect and identify different products. As used herein, the term "detecting a product" may broadly refer to determining an existence of the product. For example, the system may determine the existence of a plurality of distinct products displayed on a store shelf. By detecting the plurality of products, the system may acquire different details relative to the plurality of products (e.g., how many products on a store shelf are associated with a same product type), but it does not necessarily gain knowledge of the type of product. In contrast, the term "identifying a product" may refer to determining a unique identifier associated with a specific type of product that allows inventory managers to uniquely refer to each product type in a product catalogue. Additionally or alternatively, the term "identifying a product" may refer to determining a unique identifier associated with a specific brand of products that allows inventory managers to uniquely refer to products, e.g., based on a specific brand in a product catalogue. Additionally or alternatively, the term "identifying a product" may refer to determining a unique identifier associated with a specific category of products that allows inventory managers to uniquely refer to products, e.g., based on a specific category in a product catalogue. In some embodiments, the identification may be made based at least in part on visual characteristics of the product (e.g., size, shape, logo, text, color, etc.). The unique identifier may include any codes that may be used to search a catalog, such as a series of digits, letters, symbols, or any combinations of digits, letters, and symbols. Consistent with the present disclosure, the terms "determining a type of a product" and "determining a product type" may also be used interchangeably in this disclosure with reference to the term "identifying a product."

Embodiments of the present disclosure further include determining at least one characteristic of the product for determining the type of the product. As used herein, the term "characteristic of the product" refers to one or more visually discernable features attributed to the product. Consistent with the present disclosure, the characteristic of the product may assist in classifying and identifying the product. For example, the characteristic of the product may be associated with the ornamental design of the product, the size of the product, the shape of the product, the colors of the product, the brand of the product, a logo or text associated with the product (e.g., on a product label), and more. In addition, embodiments of the present disclosure further include determining a confidence level associated with the determined type of the product. The term "confidence level" refers to any indication, numeric or otherwise, of a level (e.g., within a predetermined range) indicative of an amount of confidence the system has that the determined type of the product is the actual type of the product. For example, the confidence level may have a value between 1 and 10, alternatively, the confidence level may be expressed as a percentage.

In some cases, the system may compare the confidence level to a threshold. The term "threshold" as used herein denotes a reference value, a level, a point, or a range of values, for which, when the confidence level is above it (or below it depending on a particular use case), the system may follow a first course of action and, when the confidence level is below it (or above it depending on a particular use case), the system may follow a second course of action. The value of the threshold may be predetermined for each type of product or may be dynamically selected based on different considerations. In one embodiment, when the confidence level associated with a certain product is below a threshold, the system may obtain contextual information to increase the confidence level. As used herein, the term "contextual information" (or "context") refers to any information having a direct or indirect relationship with a product displayed on a store shelf. In some embodiments, the system may retrieve different types of contextual information from captured image data and/or from other data sources. In some cases, contextual information may include recognized types of products adjacent to the product under examination. In other cases, contextual information may include text appearing on the product, especially where that text may be recognized (e.g., via OCR) and associated with a particular meaning. Other examples of types of contextual information may include logos appearing on the product, a location of the product in the retail store, a brand name of the product, a price of the product, product information collected from multiple retail stores, product information retrieved from a catalog associated with a retail store, etc.

Reference is now made to FIG. 1, which shows an example of a system 100 for analyzing information collected from retail stores 105 (for example, retail store 105A, retail store 105B, and retail store 105C). In one embodiment, system 100 may represent a computer-based system that may include computer system components, desktop computers, workstations, tablets, handheld computing devices, memory devices, and/or internal network(s) connecting the components. System 100 may include or be connected to various network computing resources (e.g., servers, routers, switches, network connections, storage devices, etc.) necessary to support the services provided by system 100. In one embodiment, system 100 may enable identification of products in retail stores 105 based on analysis of captured images. In another embodiment, system 100 may enable a supply of information based on analysis of captured images to a market research entity 110 and to different suppliers 115 of the identified products in retail stores 105 (for example, supplier 115A, supplier 115B, and supplier 115C). In another embodiment, system 100 may communicate with a user 120 (sometimes referred to herein as a customer, but which may include individuals associated with a retail environment other than customers, such as store employee, data collection agent, etc.) about different products in retail stores 105. In one example, system 100 may receive images of products captured by user 120. In another example, system 100 may provide to user 120 information determined based on automatic machine analysis of images captured by one or more capturing devices 125 associated with retail stores 105.

System 100 may also include an image processing unit 130 to execute the analysis of images captured by the one or more capturing devices 125. Image processing unit 130 may include a server 135 operatively connected to a database 140. Image processing unit 130 may include one or more servers connected by a communication network, a cloud platform, and so forth. Consistent with the present disclosure, image processing unit 130 may receive raw or processed data from capturing device 125 via respective communication links, and provide information to different system components using a network 150. Specifically, image processing unit 130 may use any suitable image analysis technique including, for example, object recognition, object detection, image segmentation, feature extraction, optical character recognition (OCR), object-based image analysis, shape region techniques, edge detection techniques, pixel-based detection, artificial neural networks, convolutional neural networks, etc. In addition, image processing unit 130 may use classification algorithms to distinguish between the different products in the retail store. In some embodiments, image processing unit 130 may utilize suitably trained machine learning algorithms and models to perform the product identification. Network 150 may facilitate communications and data exchange between different system components when these components are coupled to network 150 to enable output of data derived from the images captured by the one or more capturing devices 125. In some examples, the types of outputs that image processing unit 130 can generate may include identification of products, indicators of product quantity, indicators of planogram compliance, indicators of service-improvement events (e.g., a cleaning event, a restocking event, a rearrangement event, etc.), and various reports indicative of the performances of retail stores 105. Additional examples of the different outputs enabled by image processing unit 130 are described below with reference to FIGS. 11A-11E and throughout the disclosure.

Consistent with the present disclosure, network 150 may be any type of network (including infrastructure) that provides communications, exchanges information, and/or facilitates the exchange of information between the components of system 100. For example, network 150 may include or be part of the Internet, a Local Area Network, wireless network (e.g., a Wi-Fi/302.11 network), or other suitable connections. In other embodiments, one or more components of system 100 may communicate directly through dedicated communication links, such as, for example, a telephone network, an extranet, an intranet, the Internet, satellite communications, off-line communications, wireless communications, transponder communications, a local area network (LAN), a wide area network (WAN), a virtual private network (VPN), and so forth.

In one example configuration, server 135 may be a cloud server that processes images received directly (or indirectly) from one or more capturing device 125 and processes the images to detect and/or identify at least some of the plurality of products in the image based on visual characteristics of the plurality of products. The term "cloud server" refers to a computer platform that provides services via a network, such as the Internet. In this example configuration, server 135 may use virtual machines that may not correspond to individual hardware. For example, computational and/or storage capabilities may be implemented by allocating appropriate portions of desirable computation/storage power from a scalable repository, such as a data center or a distributed computing environment. In one example, server 135 may implement the methods described herein using customized hard-wired logic, one or more Application Specific Integrated Circuits (ASICs) or Field Programmable Gate Arrays (FPGAs), firmware, and/or program logic which, in combination with the computer system, cause server 135 to be a special-purpose machine.

In another example configuration, server 135 may be part of a system associated with a retail store that communicates with capturing device 125 using a wireless local area network (WLAN) and may provide similar functionality as a cloud server. In this example configuration, server 135 may communicate with an associated cloud server (not shown) and cloud database (not shown). The communications between the store server and the cloud server may be used in a quality enforcement process, for upgrading the recognition engine and the software from time to time, for extracting information from the store level to other data users, and so forth. Consistent with another embodiment, the communications between the store server and the cloud server may be discontinuous (purposely or unintentional) and the store server may be configured to operate independently from the cloud server. For example, the store server may be configured to generate a record indicative of changes in product placement that occurred when there was a limited connection (or no connection) between the store server and the cloud server, and to forward the record to the cloud server once connection is reestablished.

As depicted in FIG. 1, server 135 may be coupled to one or more physical or virtual storage devices such as database 140. Server 135 may access database 140 to detect and/or identify products. The detection may occur through analysis of features in the image using an algorithm and stored data. The identification may occur through analysis of product features in the image according to stored product models. Consistent with the present embodiment, the term "product model" refers to any type of algorithm or stored product data that a processor may access or execute to enable the identification of a particular product associated with the product model. For example, the product model may include a description of visual and contextual properties of the particular product (e.g., the shape, the size, the colors, the texture, the brand name, the price, the logo, text appearing on the particular product, the shelf associated with the particular product, adjacent products in a planogram, the location within the retail store, etc.). In some embodiments, a single product model may be used by server 135 to identify more than one type of products, such as, when two or more product models are used in combination to enable identification of a product. For example, in some cases, a first product model may be used by server 135 to identify a product category (such models may apply to multiple product types, e.g., shampoo, soft drinks, etc.) and a second product model may be used by server 135 to identify the product type, product identity, or other characteristics associated with a product. In some cases, such product models may be applied together (e.g., in series, in parallel, in a cascade fashion, in a decision tree fashion, etc.) to reach a product identification. In other embodiments, a single product model may be used by server 135 to identify a particular product type (e.g., 6-pack of 16 oz Coca-Cola Zero).

Database 140 may be included on a volatile or non-volatile, magnetic, semiconductor, tape, optical, removable, non-removable, or other type of storage device or tangible or non-transitory computer-readable medium. Database 140 may also be part of server 135 or separate from server 135. When database 140 is not part of server 135, server 135 may exchange data with database 140 via a communication link. Database 140 may include one or more memory devices that store data and instructions used to perform one or more features of the disclosed embodiments. In one embodiment, database 140 may include any suitable databases, ranging from small databases hosted on a work station to large databases distributed among data centers. Database 140 may also include any combination of one or more databases controlled by memory controller devices (e.g., server(s), etc.) or software. For example, database 140 may include document management systems, Microsoft SQL databases, SharePoint databases, Oracle™ databases, Sybase™ databases, other relational databases, or non-relational databases, such as mongo and others.

Consistent with the present disclosure, image processing unit 130 may communicate with output devices 145 to present information derived based on processing of image data acquired by capturing devices 125. The term "output device" is intended to include all possible types of devices capable of outputting information from server 135 to users or other computer systems (e.g., a display screen, a speaker, a desktop computer, a laptop computer, mobile device, tablet, a PDA, etc.), such as 145A, 145B, 145C and 145D. In one embodiment each of the different system components (i.e., retail stores 105, market research entity 110, suppliers 115, and users 120) may be associated with an output device 145, and each system component may be configured to present different information on the output device 145. In one example, server 135 may analyze acquired images including representations of shelf spaces. Based on this analysis, server 135 may compare shelf spaces associated with different products, and output device 145A may present market research entity 110 with information about the shelf spaces associated with different products. The shelf spaces may also be compared with sales data, expired products data, and more. Consistent with the present disclosure, market research entity 110 may be a part of (or may work with) supplier 115. In another example, server 135 may determine product compliance to a predetermined planogram, and output device 145B may present to supplier 115 information about the level of product compliance at one or more retail stores 105 (for example in a specific retail store 105, in a group of retail stores 105 associated with supplier 115, in all retail stores 105, and so forth). The predetermined planogram may be associated with contractual obligations and/or other preferences related to the retailer methodology for placement of products on the store shelves. In another example, server 135 may determine that a specific store shelf has a type of fault in the product placement, and output device 145C may present to a manager of retail store 105 a user-notification that may include information about a correct display location of a misplaced product, information about a store shelf associated with the misplaced product, information about a type of the misplaced product, and/or a visual depiction of the misplaced product. In another example, server 135 may identify which products are available on the shelf and output device 145D may present to user 120 an updated list of products.

The components and arrangements shown in FIG. 1 are not intended to limit the disclosed embodiments, as the system components used to implement the disclosed processes and features may vary. In one embodiment, system 100 may include multiple servers 135, and each server 135 may host a certain type of service. For example, a first server may process images received from capturing devices 125 to identify at least some of the plurality of products in the image, and a second server may determine from the identified products in retail stores 105 compliance with contractual obligations between retail stores 105 and suppliers 115. In another embodiment, system 100 may include multiple servers 135, a first type of servers 135 that may process information from specific capturing devices 125 (e.g., handheld devices of data collection agents) or from specific retail stores 105 (e.g., a server dedicated to a specific retail store 105 may be placed in or near the store). System 100 may further include a second type of servers 135 that collect and process information from the first type of servers 135.

Figure 2:
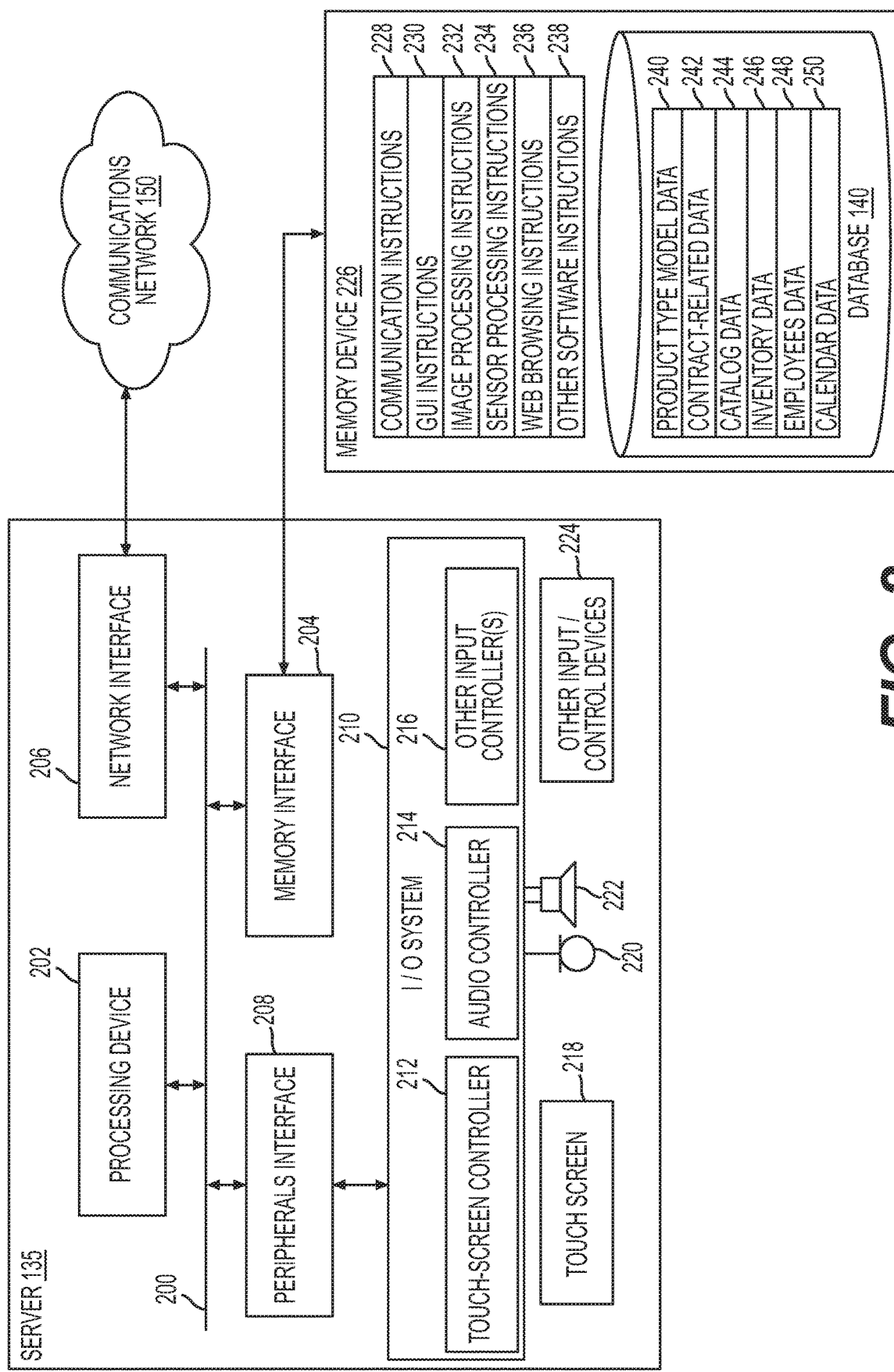
FIG. 2 is a block diagram that illustrates some of the components of an image processing system, consistent with the present disclosure.

FIG. 2 is a block diagram representative of an example configuration of server 135. In one embodiment, server 135 may include a bus 200 (or any other communication mechanism) that interconnects subsystems and components for transferring information within server 135. For example, bus 200 may interconnect a processing device 202, a memory interface 204, a network interface 206, and a peripherals interface 208 connected to an I/O system 210.

Processing device 202, shown in FIG. 2, may include at least one processor configured to execute computer programs, applications, methods, processes, or other software to execute particular instructions associated with embodiments described in the present disclosure. The term "processing device" refers to any physical device having an electric circuit that performs a logic operation. For example, processing device 202 may include one or more processors, integrated circuits, microchips, microcontrollers, microprocessors, all or part of a central processing unit (CPU), graphics processing unit (GPU), digital signal processor (DSP), field programmable gate array (FPGA), or other circuits suitable for executing instructions or performing logic operations. Processing device 202 may include at least one processor configured to perform functions of the disclosed methods such as a microprocessor manufactured by Intel™, Nvidia™, manufactured by AMD™, and so forth. Processing device 202 may include a single core or multiple core processors executing parallel processes simultaneously. In one example, processing device 202 may be a single core processor configured with virtual processing technologies. Processing device 202 may implement virtual machine technologies or other technologies to provide the ability to execute, control, run, manipulate, store, etc., multiple software processes, applications, programs, etc. In another example, processing device 202 may include a multiple-core processor arrangement (e.g., dual, quad core, etc.) configured to provide parallel processing functionalities to allow a device associated with processing device 202 to execute multiple processes simultaneously. It is appreciated that other types of processor arrangements could be implemented to provide the capabilities disclosed herein.

Consistent with the present disclosure, the methods and processes disclosed herein may be performed by server 135 as a result of processing device 202 executing one or more sequences of one or more instructions contained in a non-transitory computer-readable storage medium. As used herein, a non-transitory computer-readable storage medium refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, any other optical data storage medium, any physical medium with patterns of holes, a RAM, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within server 135, or at a remote location. Additionally, one or more computer-readable storage mediums can be utilized in implementing a computer-implemented method. The term "computer-readable storage medium" should be understood to include tangible items and exclude carrier waves and transient signals.

According to one embodiment, server 135 may include network interface 206 (which may also be any communications interface) coupled to bus 200. Network interface 206 may provide one-way or two-way data communication to a local network, such as network 150. Network interface 206 may include an integrated services digital network (ISDN)

card, cable modem, satellite modem, or a modem to provide a data communication connection to a corresponding type of telephone line. As another example, network interface 206 may include a local area network (LAN) card to provide a data communication connection to a compatible LAN. In another embodiment, network interface 206 may include an Ethernet port connected to radio frequency receivers and transmitters and/or optical (e.g., infrared) receivers and transmitters. The specific design and implementation of network interface 206 depends on the communications network(s) over which server 135 is intended to operate. As described above, server 135 may be a cloud server or a local server associated with retail store 105. In any such implementation, network interface 206 may be configured to send and receive electrical, electromagnetic, or optical signals, through wires or wirelessly, that may carry analog or digital data streams representing various types of information. In another example, the implementation of network interface 206 may be similar or identical to the implementation described below for network interface 306.

Server 135 may also include peripherals interface 208 coupled to bus 200. Peripherals interface 208 may be connected to sensors, devices, and subsystems to facilitate multiple functionalities. In one embodiment, peripherals interface 208 may be connected to I/O system 210 configured to receive signals or input from devices and provide signals or output to one or more devices that allow data to be received and/or transmitted by server 135. In one embodiment I/O system 210 may include or be associated with output device 145. For example, I/O system 210 may include a touch screen controller 212, an audio controller 214, and/or other input controller(s) 216. Touch screen controller 212 may be coupled to a touch screen 218. Touch screen 218 and touch screen controller 212 can, for example, detect contact, movement, or break thereof using any of a plurality of touch sensitivity technologies, including but not limited to capacitive, resistive, infrared, and surface acoustic wave technologies as well as other proximity sensor arrays or other elements for determining one or more points of contact with touch screen 218. Touch screen 218 may also, for example, be used to implement virtual or soft buttons and/or a keyboard. In addition to or instead of touch screen 218, I/O system 210 may include a display screen (e.g., CRT, LCD, etc.), virtual reality device, augmented reality device, and so forth. Specifically, touch screen controller 212 (or display screen controller) and touch screen 218 (or any of the alternatives mentioned above) may facilitate visual output from server 135. Audio controller 214 may be coupled to a microphone 220 and a speaker 222 to facilitate voice-enabled functions, such as voice recognition, voice replication, digital recording, and telephony functions. Specifically, audio controller 214 and speaker 222 may facilitate audio output from server 135. The other input controller(s) 216 may be coupled to other input/control devices 224, such as one or more buttons, keyboards, rocker switches, thumbwheel, infrared port, USB port, image sensors, motion sensors, depth sensors, and/or a pointer device such as a computer mouse or a stylus.

In some embodiments, processing device 202 may use memory interface 204 to access data and a software product stored on a memory device 226. Memory device 226 may include operating system programs for server 135 that perform operating system functions when executed by the processing device. By way of example, the operating system programs may include Microsoft Windows™, Unix™, Linux™, Apple™ operating systems, personal digital assistant (PDA) type operating systems such as Apple iOS, Google Android, Blackberry OS, or other types of operating systems.

Memory device 226 may also store communication instructions 228 to facilitate communicating with one or more additional devices (e.g., capturing device 125), one or more computers (e.g., output devices 145A-145D) and/or one or more servers. Memory device 226 may include graphical user interface instructions 230 to facilitate graphic user interface processing; image processing instructions 232 to facilitate image data processing-related processes and functions; sensor processing instructions 234 to facilitate sensor-related processing and functions; web browsing instructions 236 to facilitate web browsing-related processes and functions; and other software instructions 238 to facilitate other processes and functions. Each of the above identified instructions and applications may correspond to a set of instructions for performing one or more functions described above. These instructions need not be implemented as separate software programs, procedures, or modules. Memory device 226 may include additional instructions or fewer instructions. Furthermore, various functions of server 135 may be implemented in hardware and/or in software, including in one or more signal processing and/or application specific integrated circuits. For example, server 135 may execute an image processing algorithm to identify in received images one or more products and/or obstacles, such as shopping carts, people, and more.

In one embodiment, memory device 226 may store database 140. Database 140 may include product type model data 240 (e.g., an image representation, a list of features, a model obtained by training machine learning algorithm using training examples, an artificial neural network, and more) that may be used to identify products in received images; contract-related data 242 (e.g., planograms, promotions data, etc.) that may be used to determine if the placement of products on the store shelves and/or the promotion execution are consistent with obligations of retail store 105; catalog data 244 (e.g., retail store chain's catalog, retail store's master file, etc.) that may be used to check if all product types that should be offered in retail store 105 are in fact in the store, if the correct price is displayed next to an identified product, etc.; inventory data 246 that may be used to determine if additional products should be ordered from suppliers 115; employee data 248 (e.g., attendance data, records of training provided, evaluation and other performance-related communications, productivity information, etc.) that may be used to assign specific employees to certain tasks; and calendar data 250 (e.g., holidays, national days, international events, etc.) that may be used to determine if a possible change in a product model is associated with a certain event. In other embodiments of the disclosure, database 140 may store additional types of data or fewer types of data. Furthermore, various types of data may be stored in one or more memory devices other than memory device 226.

The components and arrangements shown in FIG. 2 are not intended to limit the disclosed embodiments. As will be appreciated by a person skilled in the art having the benefit of this disclosure, numerous variations and/or modifications may be made to the depicted configuration of server 135. For example, not all components may be essential for the operation of server 135 in all cases. Any component may be located in any appropriate part of server 135, and the components may be rearranged into a variety of configurations while providing the functionality of the disclosed embodiments. For example, some servers may not include some of the elements shown in I/O system 215.

Figure 3:
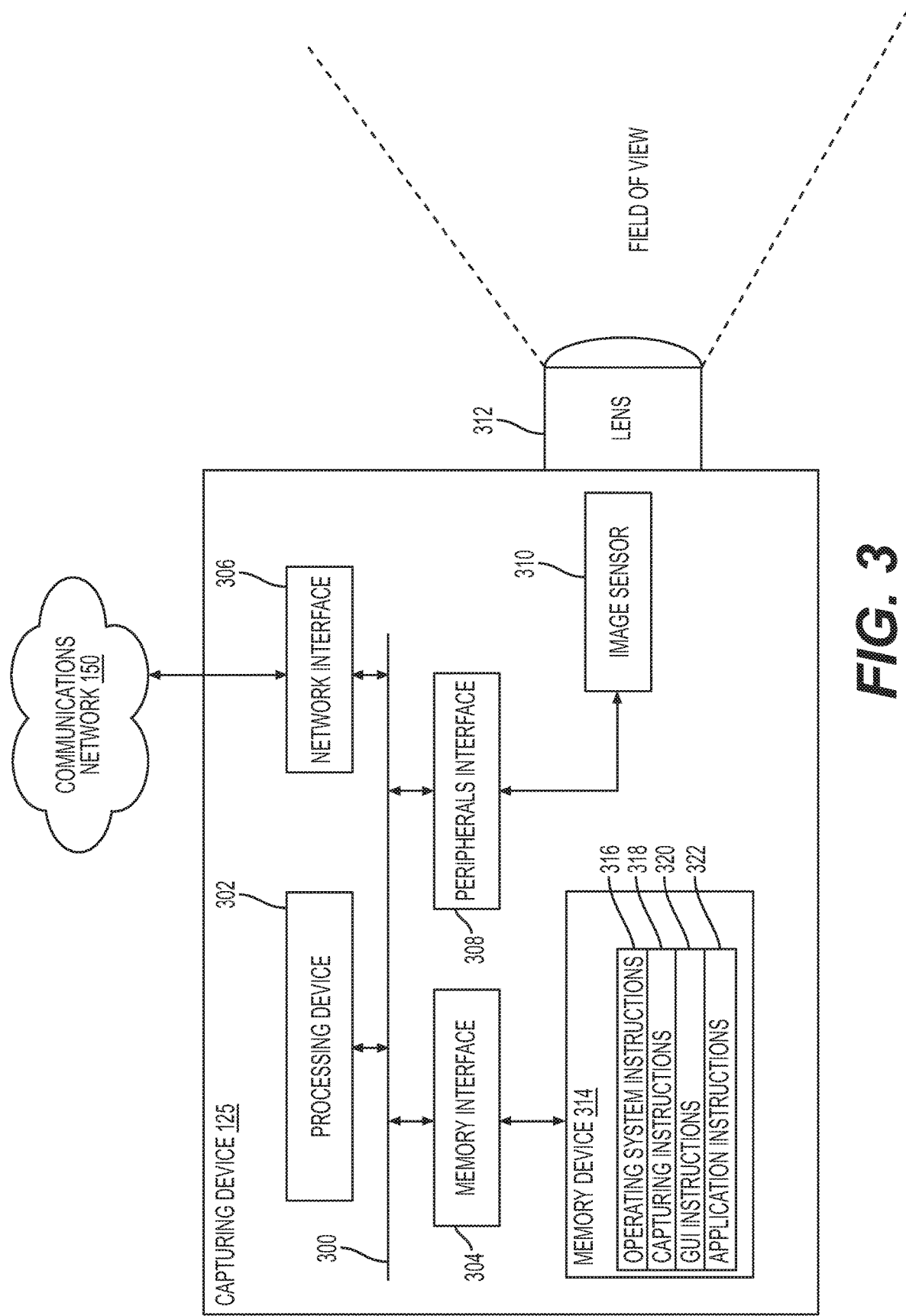
FIG. 3 is a block diagram that illustrates an exemplary embodiment of a capturing device, consistent with the present disclosure.

FIG. 3 is a block diagram representation of an example configuration of capturing device 125. In one embodiment, capturing device 125 may include a processing device 302, a memory interface 304, a network interface 306, and a peripherals interface 308 connected to image sensor 310. These components can be separated or can be integrated in one or more integrated circuits. The various components in capturing device 125 can be coupled by one or more communication buses or signal lines (e.g., bus 300). Different aspects of the functionalities of the various components in capturing device 125 may be understood from the description above regarding components of server 135 having similar functionality.

According to one embodiment, network interface 306 may be used to facilitate communication with server 135. Network interface 306 may be an Ethernet port connected to radio frequency receivers and transmitters and/or optical receivers and transmitters. The specific design and implementation of network interface 306 depends on the communications network(s) over which capturing device 125 is intended to operate. For example, in some embodiments, capturing device 125 may include a network interface 306 designed to operate over a GSM network, a GPRS network, an EDGE network, a Wi-Fi or WiMax network, a Bluetooth® network, etc. In another example, the implementation of network interface 306 may be similar or identical to the implementation described above for network interface 206.

In the example illustrated in FIG. 3, peripherals interface 308 of capturing device 125 may be connected to at least one image sensor 310 associated with at least one lens 312 for capturing image data in an associated field of view. In some configurations, capturing device 125 may include a plurality of image sensors associated with a plurality of lenses 312. In other configurations, image sensor 310 may be part of a camera included in capturing device 125. According to some embodiments, peripherals interface 308 may also be connected to other sensors (not shown), such as a motion sensor, a light sensor, infrared sensor, sound sensor, a proximity sensor, a temperature sensor, a biometric sensor, or other sensing devices to facilitate related functionalities. In addition, a positioning sensor may also be integrated with, or connected to, capturing device 125. For example, such positioning sensor may be implemented using one of the following technologies: Global Positioning System (GPS), GLObal NAvigation Satellite System (GLONASS), Galileo global navigation system, BeiDou navigation system, other Global Navigation Satellite Systems (GNSS), Indian Regional Navigation Satellite System (IRNSS), Local Positioning Systems (LPS), Real-Time Location Systems (RTLS), Indoor Positioning System (IPS), Wi-Fi based positioning systems, cellular triangulation, and so forth. For example, the positioning sensor be built into mobile capturing device 125, such as smartphone devices. In another example, position software may allow mobile capturing devices to use an internal or external positioning sensors (e.g., connecting via a serial port or Bluetooth).

Consistent with the present disclosure, capturing device 125 may include digital components that collect data from image sensor 310, transform it into an image, and store the image on a memory device 314 and/or transmit the image using network interface 306. In one embodiment, capturing device 125 may be fixedly mountable to a store shelf or to other objects in the retail store (such as walls, ceilings, floors, refrigerators, checkout stations, displays, dispensers, rods which may be connected to other objects in the retail store, and so forth). In one embodiment, capturing device 125 may be split into at least two housings such that only image sensor 310 and lens 312 may be visible on the store shelf, and the rest of the digital components may be located in a separate housing. An example of this type of capturing device is described below with reference to FIGS. 5-7.

Consistent with the present disclosure, capturing device 125 may use memory interface 304 to access memory device 314. Memory device 314 may include high-speed, random access memory and/or non-volatile memory such as one or more magnetic disk storage devices, one or more optical storage devices, and/or flash memory (e.g., NAND, NOR) to store captured image data. Memory device 314 may store operating system instructions 316, such as DARWIN, RTXC, LINUX, iOS, UNIX, LINUX, OS X, WINDOWS, or an embedded operating system such as VXWorkS. Operating system 316 can include instructions for handling basic system services and for performing hardware dependent tasks. In some implementations, operating system 316 may include a kernel (e.g., UNIX kernel, LINUX kernel, etc.). In addition, memory device 314 may store capturing instructions 318 to facilitate processes and functions related to image sensor 310; graphical user interface instructions 320 that enables a user associated with capturing device 125 to control the capturing device and/or to acquire images of an area-of-interest in a retail establishment; and application instructions 322 to facilitate a process for monitoring compliance of product placement or other processes.

The components and arrangements shown in FIG. 3 are not intended to limit the disclosed embodiments. As will be appreciated by a person skilled in the art having the benefit of this disclosure, numerous variations and/or modifications may be made to the depicted configuration of capturing device 125. For example, not all components are essential for the operation of capturing device 125 in all cases. Any component may be located in any appropriate part of capturing device 125, and the components may be rearranged into a variety of configurations while providing the functionality of the disclosed embodiments. For example, some capturing devices may not have lenses, and other capturing devices may include an external memory device instead of memory device 314.

Figure 4C:
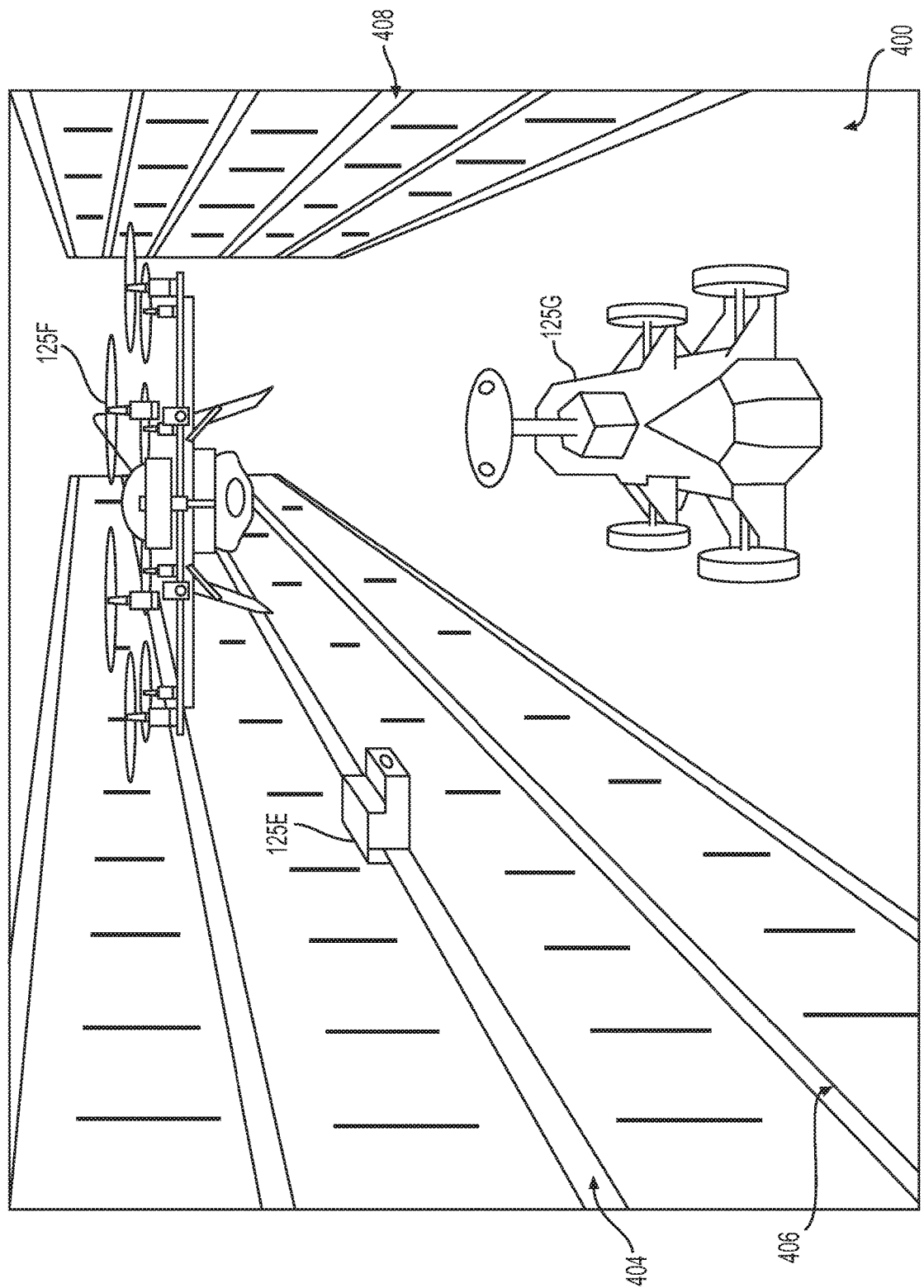
FIG. 4C is a schematic illustration of another example configuration for capturing image data in a retail store, consistent with the present disclosure.

FIGS. 4A-4C illustrate example configurations for capturing image data in retail store 105 according to disclosed embodiments. FIG. 4A illustrates how an aisle 400 of retail store 105 may be imaged using a plurality of capturing devices 125 fixedly connected to store shelves. FIG. 4B illustrates how aisle 400 of retail store 105 may be imaged using a handheld communication device. FIG. 4C illustrates how aisle 400 of retail store 105 may be imaged by robotic devices equipped with cameras.

With reference to FIG. 4A and consistent with the present disclosure, retail store 105 may include a plurality of capturing devices 125 fixedly mounted (for example, to store shelves, walls, ceilings, floors, refrigerators, checkout stations, displays, dispensers, rods which may be connected to other objects in the retail store, and so forth) and configured to collect image data. As depicted, one side of an aisle 400 may include a plurality of capturing devices 125 (e.g., 125A, 125B, and 125C) fixedly mounted thereon and directed such that they may capture images of an opposing side of aisle 400. The plurality of capturing devices 125 may be connected to an associated mobile power source (e.g., one or more batteries), to an external power supply (e.g., a power grid), obtain electrical power from a wireless power transmission system, and so forth. As depicted in FIG. 4A, the plurality of capturing devices 125 may be placed at different heights and at least their vertical fields of view may be adjustable. Generally, both sides of aisle 400 may include capturing devices 125 in order to cover both sides of aisle 400.

Differing numbers of capturing devices 125 may be used to cover shelving unit 402. In addition, there may be an overlap region in the horizontal field of views of some of capturing devices 125. For example, the horizontal fields of view of capturing devices (e.g., adjacent capturing devices) may at least partially overlap with one another. In another example, one capturing device may have a lower field of view than the field of view of a second capturing device, and the two capturing devices may have at least partially overlapping fields of view. According to one embodiment, each capturing device 125 may be equipped with network interface 306 for communicating with server 135. In one embodiment, the plurality of capturing devices 125 in retail store 105 may be connected to server 135 via a single WLAN. Network interface 306 may transmit information associated with a plurality of images captured by the plurality of capturing devices 125 for analysis purposes. In one example, server 135 may determine an existence of an occlusion event (such as, by a person, by store equipment, such as a ladder, cart, etc.) and may provide a notification to resolve the occlusion event. In another example, server 135 may determine if a disparity exists between at least one contractual obligation and product placement as determined based on automatic analysis of the plurality of images. The transmitted information may include raw images, cropped images, processed image data, data about products identified in the images, and so forth. Network interface 306 may also transmit information identifying the location of the plurality capturing devices 125 in retail store 105.

With reference to FIG. 4B and consistent with the present disclosure, server 135 may receive image data captured by users 120. In a first embodiment, server 135 may receive image data acquired by store employees. In one implementation, a handheld device of a store employee (e.g., capturing device 125D) may display a real-time video stream captured by the image sensor of the handheld device. The real-time video stream may be augmented with markings identifying to the store employee an area-of-interest that needs manual capturing of images. One of the situations in which manual image capture may be desirable may occur where the area-of-interest is outside the fields of view of a plurality of cameras fixedly connected to store shelves in aisle 400. In other situations, manual capturing of images of an area-of-interest may be desirable when a current set of acquired images is out of date (e.g., obsolete in at least one respect) or of poor quality (e.g., lacking focus, obstacles, lesser resolution, lack of light, etc.). Additional details of this embodiment are described in Applicant's International Patent Application No. PCT/IB2018/001107, which is incorporated herein by reference.

In a second embodiment, server 135 may receive image data acquired by crowd sourcing. In one exemplary implementation, server 135 may provide a request to a detected mobile device for an updated image of the area-of-interest in aisle 400. The request may include an incentive (e.g., $2 discount) to user 120 for acquiring the image. In response to the request, user 120 may acquire and transmit an up-to-date image of the area-of-interest. After receiving the image from user 120, server 135 may transmit the accepted incentive or agreed upon reward to user 120. The incentive may comprise a text notification and a redeemable coupon. In some embodiments, the incentive may include a redeemable coupon for a product associated with the area-of-interest. Server 135 may generate image-related data based on aggregation of data from images received from crowd sourcing and from images received from a plurality of cameras fixedly connected to store shelves. Additional details of this embodiment are described in Applicant's International Patent Application No. PCT/IB2017/000919, which is incorporated herein by reference.

With reference to FIG. 4C and consistent with the present disclosure, server 135 may receive image data captured by robotic devices with cameras traversing in aisle 400. The present disclosure is not limited to the type of robotic devices used to capture images of retail store 105. In some embodiments, the robotic devices may include a robot on a track (e.g., a Cartesian robot configured to move along an edge of a shelf or in parallel to a shelf, such as capturing device 125E), a drone (e.g., capturing device 125F), and/or a robot that may move on the floor of the retail store (e.g., a wheeled robot such as capturing device 125G, a legged robot, a snake-like robot, etc.). The robotic devices may be controlled by server 135 and may be operated remotely or autonomously. In one example, server 135 may instruct capturing device 125E to perform periodic scans at times when no customers or other obstructions are identified in aisle 400. Specifically, capturing device 125E may be configured to move along store shelf 404 and to capture images of products placed on store shelf 404, products placed on store shelf 406, or products located on shelves opposite store shelf (e.g., store shelf 408). In another example, server 135 may instruct capturing device 125F to perform a scan of all the area of retail store 105 before the opening hour. In another example, server 135 may instruct capturing device 125G to capture a specific area-of-interest, similar as described above with reference to receiving images acquired by the store employees. In some embodiments, robotic capturing devices (such as 125F and 125G) may include an internal processing unit that may allow them to navigate autonomously within retail store 105. For example, the robotic capturing devices may use input from sensors (e.g., image sensors, depth sensors, proximity sensors, etc.), to avoid collision with objects or people, and to complete the scan of the desired area of retail store 105.

As discussed above with reference to FIG. 4A, the image data representative of products displayed on store shelves may be acquired by a plurality of stationary capturing devices 125 fixedly mounted in the retail store. One advantage of having stationary image capturing devices spread throughout retail store 105 is the potential for acquiring product images from set locations and on an ongoing basis such that up-to-date product status may be determined for products throughout a retail store at any desired periodicity (e.g., in contrast to a moving camera system that may acquire product images more infrequently). However, there may be certain challenges in this approach. The distances and angles of the image capturing devices relative to the captured products should be selected such as to enable adequate product identification, especially when considered in view of image sensor resolution and/or optics specifications. For example, a capturing device placed on the ceiling of retail store 105 may have sufficient resolutions and optics to enable identification of large products (e.g., a pack of toilet paper), but may be insufficient for identifying smaller products (e.g., deodorant packages). The image capturing devices should not occupy shelf space that is reserved for products for sale. The image capturing devices should not be positioned in places where there is a likelihood that their fields of view will be regularly blocked by different objects.

The image capturing devices should be able to function for long periods of time with minimum maintenance. For example, a requirement for frequent replacement of batteries may render certain image acquisition systems cumbersome to use, especially where many image acquisition devices are in use throughout multiple locations in a retail store and across multiple retail stores. The image capturing devices should also include processing capabilities and transmission capabilities for providing real time or near real time image data about products. The disclosed image acquisition systems address these challenges.

FIG. 5A illustrates an example of a system 500 for acquiring images of products in retail store 105. Throughout the disclosure, capturing device 125 may refer to a system, such as system 500 shown in FIG. 5A. As shown, system 500 may include a first housing 502 configured for location on a retail shelving unit (e.g., as illustrated in FIG. 5B), and a second housing 504 configured for location on the retail shelving unit separate from first housing 502. The first and the second housing may be configured for mounting on the retail shelving unit in any suitable way (e.g., screws, bolts, clamps, adhesives, magnets, mechanical means, chemical means, etc.). In some embodiments, first housing 502 may include an image capture device 506 (e.g., a camera module that may include image sensor 310) and second housing 504 may include at least one processor (e.g., processing device 302) configured to control image capture device 506 and also to control a network interface (e.g., network interface 306) for communicating with a remote server (e.g., server 135).

System 500 may also include a data conduit 508 extending between first housing 502 and second housing 504. Data conduit 508 may be configured to enable transfer of control signals from the at least one processor to image capture device 506 and to enable collection of image data acquired by image capture device 506 for transmission by the network interface. Consistent with the present disclosure, the term "data conduit" may refer to a communications channel that may include either a physical transmission medium such as a wire or a logical connection over a multiplexed medium such as a radio channel In some embodiments, data conduit 508 may be used for conveying image data from image capture device 506 to at least one processor located in second housing 504. Consistent with one implementation of system 500, data conduit 508 may include flexible printed circuits and may have a length of at least about 5 cm, at least about 10 cm, at least about 15 cm, etc. The length of data conduit 508 may be adjustable to enable placement of first housing 502 separately from second housing 504. For example, in some embodiments, data conduit may be retractable within second housing 504 such that the length of data conduit exposed between first housing 502 and second housing 504 may be selectively adjusted.

In one embodiment, the length of data conduit 508 may enable first housing 502 to be mounted on a first side of a horizontal store shelf facing the aisle (e.g., store shelf 510 illustrated in FIG. 5B) and second housing 504 to be mounted on a second side of store shelf 510 that faces the direction of the ground (e.g., an underside of a store shelf). In this embodiment, data conduit 508 may be configured to bend around an edge of store shelf 510 or otherwise adhere/follow contours of the shelving unit. For example, a first portion of data conduit 508 may be configured for location on the first side of store shelf 510 (e.g., a side facing an opposing retail shelving unit across an aisle) and a second portion of data conduit 508 may be configured for location on a second side of store shelf 510 (e.g., an underside of the shelf, which in some cases may be orthogonal to the first side). The second portion of data conduit 508 may be longer than the first portion of data conduit 508. Consistent with another embodiment, data conduit 508 may be configured for location within an envelope of a store shelf. For example, the envelope may include the outer boundaries of a channel located within a store shelf, a region on an underside of an L-shaped store shelf, a region between two store shelves, etc. Consistent with another implementation of system 500 discussed below, data conduit 508 may include a virtual conduit associated with a wireless communications link between first housing 502 and second housing 504.

FIG. 5B illustrates an exemplary configuration for mounting first housing 502 on store shelf 510. Consistent with the present disclosure, first housing 502 may be placed on store shelf 510, next to or embedded in a plastic cover that may be used for displaying prices. Alternatively, first housing 502 may be placed or mounted on any other location in retail store 105. For example, first housing 502 may be placed or mounted on the walls, on the ceiling, on refrigerator units, on display units, and more. The location and/or orientation of first housing 502 may be selected such that a field of view of image capture device 506 may cover at least a portion of an opposing retail shelving unit. Consistent with the present disclosure, image capture device 506 may have a view angle of between 50 and 80 degrees, about 62 degrees, about 67 degrees, or about 75 degrees. Consistent with the present disclosure, image capture device 506 may include an image sensor having sufficient image resolution to enable detection of text associated with labels on an opposing retail shelving unit. In one embodiment, the image sensor may include m*n pixels. For example, image capture device 506 may have an 8 MP image sensor that includes an array of 3280*2464 pixels. Each pixel may include at least one photo-voltaic cell that converts the photons of the incident light to an electric signal. The electrical signal may be converted to digital data by an A/D converter and processed by the image processor (ISP). In one embodiment, the image sensor of image capture device 506 may be associated with a pixel size of between $1.1 \times 1.1$ um$^2$ and $1.7 \times 1.7$ um$^2$, for example, $1.4 \times 1.4$ um$^2$.

Figure 6A:
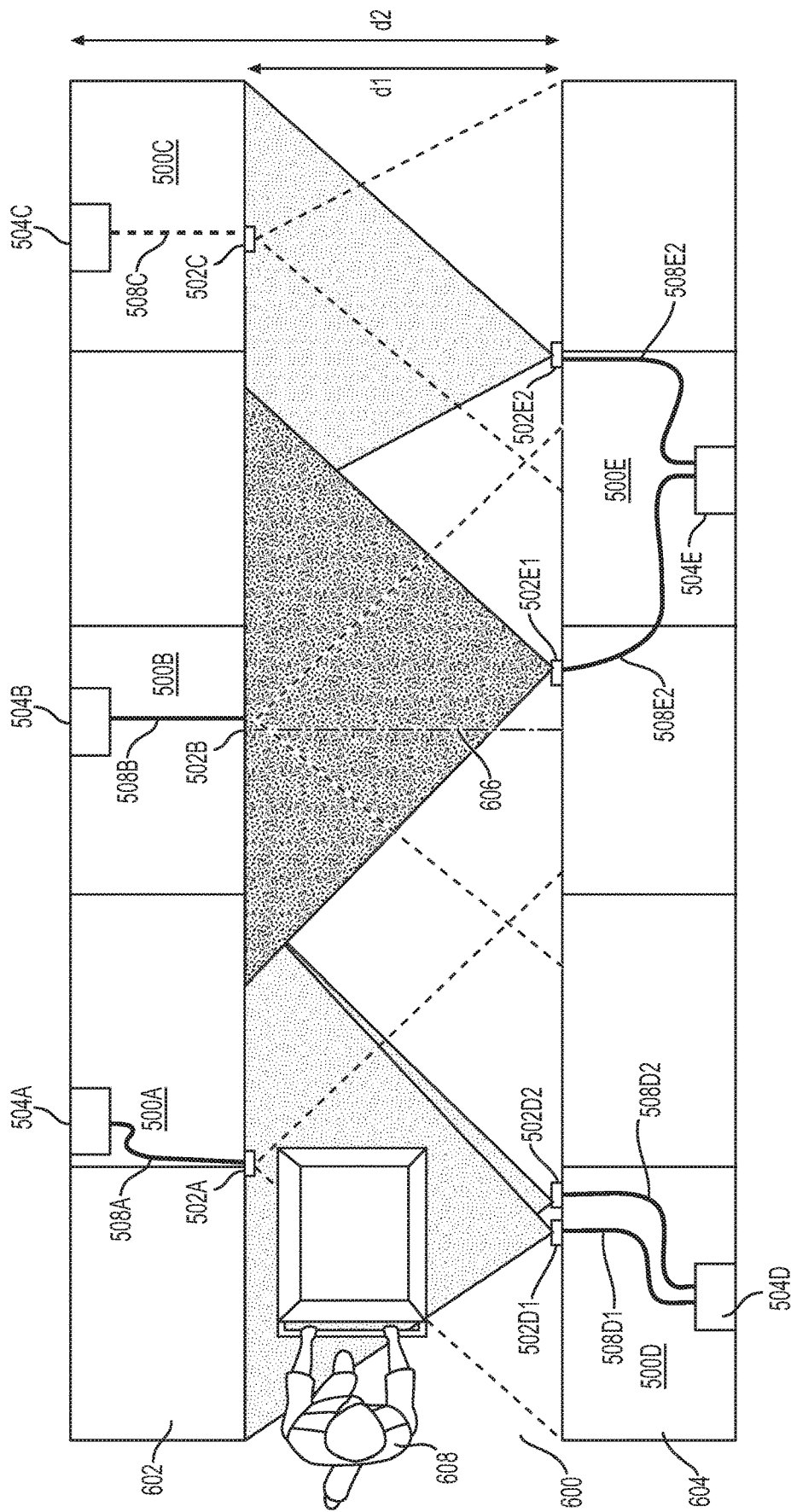
FIG. 6A is a top view representation of an aisle in a retail store with multiple image acquisition systems deployed thereon for acquiring images of products, consistent with the present disclosure.

Consistent with the present disclosure, image capture device 506 may be associated with a lens (e.g., lens 312) having a fixed focal length selected according to a distance expected to be encountered between retail shelving units on opposite sides of an aisle (e.g., distance d1 shown in FIG. 6A) and/or according to a distance expected to be encountered between a side of a shelving unit facing the aisle on one side of an aisle and a side of a shelving unit facing away of the aisle on the other side of the aisle (e.g., distance d2 shown in FIG. 6A). The focal length may also be based on any other expected distance between the image acquisition device and products to be imaged. As used herein, the term "focal length" refers to the distance from the optical center of the lens to a point where objects located at the point are substantially brought into focus. In contrast to zoom lenses, in fixed lenses the focus is not adjustable. The focus is typically set at the time of lens design and remains fixed. In one embodiment, the focal length of lens 312 may be selected based on the distance between two sides of aisles in the retail store (e.g., distance d1, distance d2, and so forth). In some embodiments, image capture device 506 may include a lens with a fixed focal length having a fixed value between 2.5 mm and 4.5 mm, such as about 3.1 mm, about 3.4 mm, about 3.7 mm. For example, when distance d1 between two opposing retail shelving units is about 2 meters, the focal length of the lens may be about 3.6 mm. Unless indicated otherwise, the term "about" with regards to a numeric value is defined as a variance of up to 5% with respect to the stated value. Of course, image capture devices having non-fixed focal lengths may also be used depending on the requirements of certain imaging environments, the power and space resources available, etc.

FIG. 5C illustrates an exploded view of second housing 504. In some embodiments, the network interface located in second housing 504 (e.g., network interface 306) may be configured to transmit to server 135 information associated with a plurality of images captured by image capture device 506. For example, the transmitted information may be used to determine if a disparity exists between at least one contractual obligation (e.g. planogram) and product placement. In one example, the network interface may support transmission speeds of 0.5 Mb/s, 1 Mb/s, 5 Mb/s, or more. Consistent with the present disclosure, the network interface may allow different modes of operations to be selected, such as: high-speed, slope-control, or standby. In high-speed mode, associated output drivers may have fast output rise and fall times to support high-speed bus rates; in slope-control, the electromagnetic interference may be reduced and the slope (i.e., the change of voltage per unit of time) may be proportional to the current output; and in standby mode, the transmitter may be switched off and the receiver may operate at a lower current.

Figure 6B:
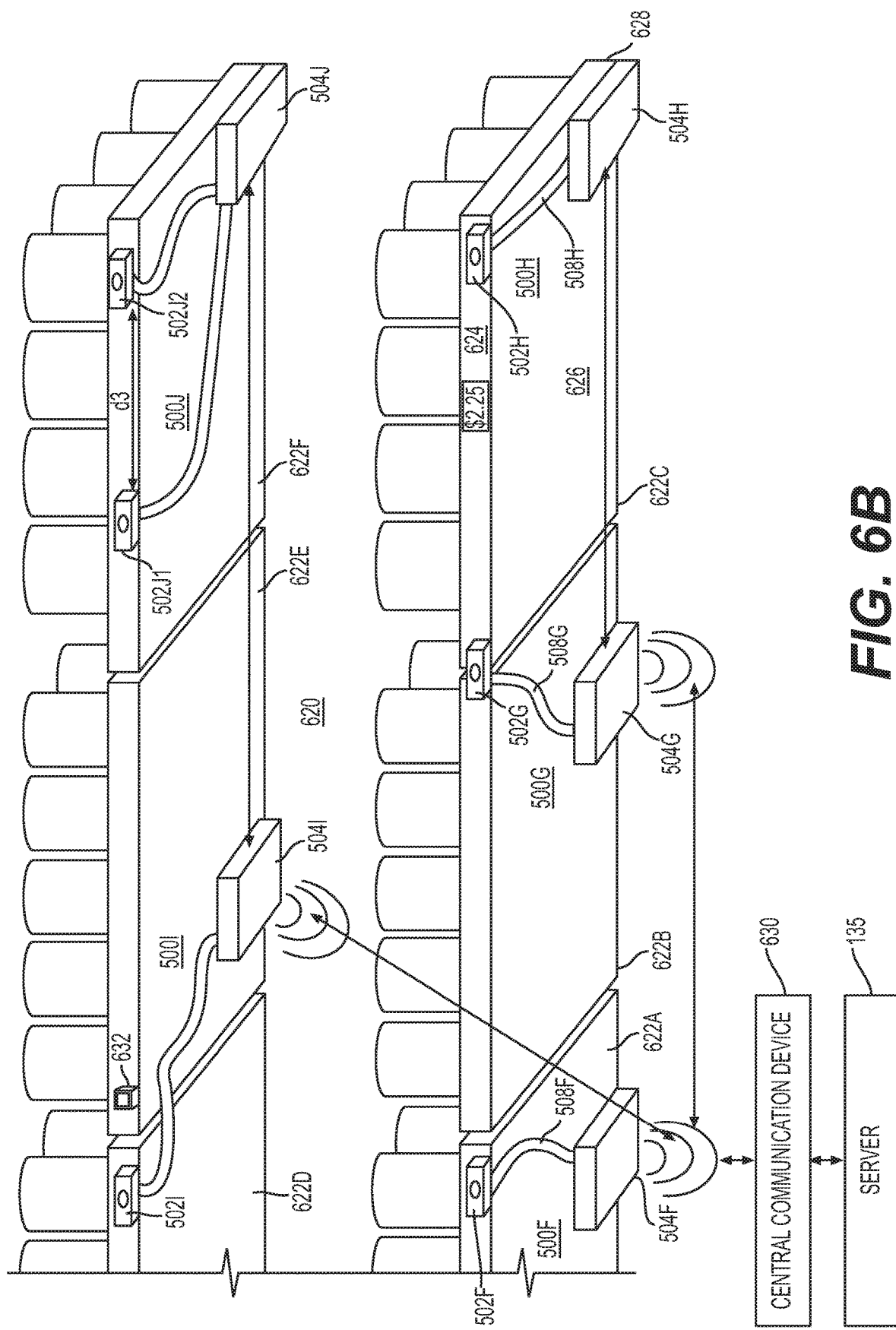
FIG. 6B is a perspective view representation of part of a retail shelving unit with multiple image acquisition systems deployed thereon for acquiring images of products, consistent with the present disclosure.

Consistent with the present disclosure, second housing 504 may include a power port 512 for conveying energy from a power source to first housing 502. In one embodiment, second housing 504 may include a section for at least one mobile power source 514 (e.g., in the depicted configuration the section is configured to house four batteries). The at least one mobile power source may provide sufficient power to enable image capture device 506 to acquire more than 1,000 pictures, more than 5,000 pictures, more than 10,000 pictures, or more than 15,000 pictures, and to transmit them to server 135. In one embodiment, mobile power source 514 located in a single second housing 504 may power two or more image capture devices 506 mounted on the store shelf. For example, as depicted in FIGS. 6A and 6B, a single second housing 504 may be connected to a plurality of first housings 502 with a plurality of image capture devices 506 covering different (overlapping or non-overlapping) fields of view. Accordingly, the two or more image capture devices 506 may be powered by a single mobile power source 514 and/or the data captured by two or more image capture devices 506 may be processed to generate a panoramic image by a single processing device located in second housing 504. In addition to mobile power source 514 or as an alternative to mobile power source 514, second housing 504 may also be connected to an external power source. For example, second housing 504 may be mounted to a store shelf and connected to an electric power grid. In this example, power port 512 may be connected to the store shelf through a wire for providing electrical power to image capture device 506. In another example, a retail shelving unit or retail store 105 may include a wireless power transmission system, and power port 512 may be connected to a device configured to obtain electrical power from the wireless power transmission system. In addition, as discussed below, system 500 may use power management policies to reduce the power consumption. For example, system 500 may use selective image capturing and/or selective transmission of images to reduce the power consumption or conserve power.

FIG. 6A illustrates a schematic diagram of a top view of aisle 600 in retail store 105 with multiple image acquisition systems 500 (e.g., 500A, 500B, 500C, 500D, and 500E) deployed thereon for acquiring images of products. Aisle 600 may include a first retail shelving unit 602 and a second retail shelving unit 604 that opposes first retail shelving unit 602. In some embodiments, different numbers of systems 500 may be mounted on opposing retail shelving units. For example, system 500A (including first housing 502A, second housing 504A, and data conduit 508A), system 500B (including first housing 502B second housing 504B, and data conduit 508B), and system 500C (including first housing 502C, second housing 504C, and data conduit 508C) may be mounted on first retail shelving unit 602; and system 500D (including first housing 502D1, first housing 502D2, second housing 504D, and data conduits 508D1 and 508D2) and system 500E (including first housing 502E1, first housing 502E2, second housing 504E, and data conduits 508E1 and 508E2) may be mounted on second retail shelving unit 604. Consistent with the present disclosure, image capture device 506 may be configured relative to first housing 502 such that an optical axis of image capture device 506 is directed toward an opposing retail shelving unit when first housing 502 is fixedly mounted on a retail shelving unit. For example, optical axis 606 of the image capture device associated with first housing 502B may be directed towards second retail shelving unit 604 when first housing 502B is fixedly mounted on first retail shelving unit 602. A single retail shelving unit may hold a number of systems 500 that include a plurality of image capturing devices. Each of the image capturing devices may be associated with a different field of view directed toward the opposing retail shelving unit. Different vantage points of differently located image capture devices may enable image acquisition relative to different sections of a retail shelf. For example, at least some of the plurality of image capturing devices may be fixedly mounted on shelves at different heights. Examples of such a deployment are illustrated in FIGS. 4A and 6B.

As shown in FIG. 6A each first housing 502 may be associated with a data conduit 508 that enables exchanging of information (e.g., image data, control signals, etc.) between the at least one processor located in second housing 504 and image capture device 506 located in first housing 502. In some embodiments, data conduit 508 may include a wired connection that supports data-transfer and may be used to power image capture device 506 (e.g., data conduit 508A, data conduit 508B, data conduit 508D1, data conduit 508D2, data conduit 508E1, and data conduit 508E2). Consistent with these embodiments, data conduit 508 may comply with a wired standard such as USB, Micro-USB, HDMI, Micro-HDMI, Firewire, Apple, etc. In other embodiments, data conduit 508 may be a wireless connection, such as a dedicated communications channel between the at least one processor located in second housing 504 and image capture device 506 located in first housing 502 (e.g., data conduit 508C). In one example, the communications channel may be established by two Near Field Communication (NFC) transceivers. In other examples, first housing 502 and second housing 504 may include interface circuits that comply with other short-range wireless standards such as Bluetooth, WiFi, ZigBee, etc.

In some embodiments of the disclosure, the at least one processor of system 500 may cause at least one image capture device 506 to periodically capture images of products located on an opposing retail shelving unit (e.g., images of products located on a shelf across an aisle from the shelf on which first housing 502 is mounted). The term "periodically capturing images" includes capturing an image or images at predetermined time intervals (e.g., every minute, every 30 minutes, every 150 minutes, every 300 minutes, etc.), capturing video, capturing an image every time a status request is received, and/or capturing an image subsequent to receiving input from an additional sensor, for example, an associated proximity sensor. Images may also be captured based on various other triggers or in response to various other detected events. In some embodiments, system 500 may receive an output signal from at least one sensor located on an opposing retail shelving unit. For example, system 500B may receive output signals from a sensing system located on second retail shelving unit 604. The output signals may be indicative of a sensed lifting of a product from second retail shelving unit 604 or a sensed positioning of a product on second retail shelving unit 604. In response to receiving the output signal from the at least one sensor located on second retail shelving unit 604, system 500B may cause image capture device 506 to capture one or more images of second retail shelving unit 604. Additional details on a sensing system, including the at least one sensor that generates output signals indicative of a sensed lifting of a product from an opposing retail shelving unit, is discussed below with reference to FIGS. 8-10.

Consistent with embodiments of the disclosure, system 500 may detect an object 608 in a selected area between first retail shelving unit 602 and second retail shelving unit 604. Such detection may be based on the output of one or more dedicated sensors (e.g., motion detectors, etc.) and/or may be based on image analysis of one or more images acquired by an image acquisition device. Such images, for example, may include a representation of a person or other object recognizable through various image analysis techniques (e.g., trained neural networks, Fourier transform analysis, edge detection, filters, face recognition, etc.). The selected area may be associated with distance d1 between first retail shelving unit 602 and second retail shelving unit 604. The selected area may be within the field of view of image capture device 506 or an area where the object causes an occlusion of a region of interest (such as a shelf, a portion of a shelf being monitored, and more). Upon detecting object 608, system 500 may cause image capture device 506 to forgo image acquisition while object 608 is within the selected area. In one example, object 608 may be an individual, such as a customer or a store employee. In another example, detected object 608 may be an inanimate object, such as a cart, box, carton, one or more products, cleaning robots, etc. In the example illustrated in FIG. 6A, system 500A may detect that object 608 has entered into its associated field of view (e.g., using a proximity sensor) and may instruct image capturing device 506 to forgo image acquisition. In alternative embodiments, system 500 may analyze a plurality of images acquired by image capture device 506 and identify at least one of the plurality of images that includes a representation of object 608. Thereafter, system 500 may avoid transmission of at least part of the at least one identified image and/or information based on the at least one identified image to server 135.

As shown in FIG. 6A, the at least one processor contained in a second housing 504 may control a plurality of image capture devices 506 contained in a plurality of first housings 502 (e.g., systems 500D and 500E). Controlling image capturing device 506 may include instructing image capturing device 506 to capture an image and/or transmit captured images to a remote server (e.g., server 135). In some cases, each of the plurality of image capture devices 506 may have a field of view that at least partially overlaps with a field of view of at least one other image capture device 506 from among plurality of image capture devices 506. In one embodiment, the plurality of image capture devices 506 may be configured for location on one or more horizontal shelves and may be directed to substantially different areas of the opposing first retail shelving unit. In this embodiment, the at least one processor may control the plurality of image capture devices such that each of the plurality of image capture devices may capture an image at a different time. For example, system 500E may have a second housing 504E with at least one processor that may instruct a first image capturing device contained in first housing 502E1 to capture an image at a first time and may instruct a second image capturing device contained in first housing 502E2 to capture an image at a second time which differs from the first time. Capturing images in different times (or forwarding them to the at least one processor at different times) may assist in processing the images and writing the images in the memory associated with the at least one processor.

FIG. 6B illustrates a perspective view assembly diagram depicting a portion of a retail shelving unit 620 with multiple systems 500 (e.g., 500F, 500G, 500H, 500I, and 500J) deployed thereon for acquiring images of products. Retail shelving unit 620 may include horizontal shelves at different heights. For example, horizontal shelves 622A, 622B, and 622C are located below horizontal shelves 622D, 622E, and 622F. In some embodiments, a different number of systems 500 may be mounted on shelves at different heights. For example, system 500F (including first housing 502F and second housing 504F), system 500G (including first housing 502G and second housing 504G), and system 500H (including first housing 502H and second housing 504H) may be mounted on horizontal shelves associated with a first height; and system 500I (including first housing 502I, second housing 504I, and a projector 632) and system 500J (including first housing 502J1, first housing 502J2, and second housing 504J) may be mounted on horizontal shelves associated with a second height. In some embodiments, retail shelving unit 620 may include a horizontal shelf with at least one designated place (not shown) for mounting a housing of image capturing device 506. The at least one designated place may be associated with connectors such that first housing 502 may be fixedly mounted on a side of horizontal shelf 622 facing an opposing retail shelving unit using the connectors.

Consistent with the present disclosure, system 500 may be mounted on a retail shelving unit that includes at least two adjacent horizontal shelves (e.g., shelves 622A and 622B) forming a substantially continuous surface for product placement. The store shelves may include standard store shelves or customized store shelves. A length of each store shelf 622 may be at least 50 cm, less than 200 cm, or between 75 cm to 175 cm. In one embodiment, first housing 502 may be fixedly mounted on the retail shelving unit in a slit between two adjacent horizontal shelves. For example, first housing 502G may be fixedly mounted on retail shelving unit 620 in a slit between horizontal shelf 622B and horizontal shelf 622C. In another embodiment, first housing 502 may be fixedly mounted on a first shelf and second housing 504 may be fixedly mounted on a second shelf. For example, first housing 502I may be mounted on horizontal shelf 622D and second housing 504I may be mounted on horizontal shelf 622E. In another embodiment, first housing 502 may be fixedly mounted on a retail shelving unit on a first side of a horizontal shelf facing the opposing retail shelving unit and second housing 504 may be fixedly mounted on retail shelving unit 620 on a second side of the horizontal shelf orthogonal to the first side. For example, first housing 502H may mounted on a first side 624 of horizontal shelf 622C next to a label and second housing 504H may be mounted on a second side 626 of horizontal shelf 622C that faces down (e.g., towards the ground or towards a lower shelf). In another embodiment, second housing 504 may be mounted closer to the back of the horizontal shelf than to the front of the horizontal shelf. For example, second housing 504H may be fixedly mounted on horizontal shelf 622C on second side 626 closer to third side 628 of the horizontal shelf 622C than to first side 624. Third side 628 may be parallel to first side 624. As mentioned above, data conduit 508 (e.g., data conduit 508H) may have an adjustable or selectable length for extending between first housing 502 and second housing 504. In one embodiment, when first housing 502H is fixedly mounted on first side 624, the length of data conduit 508H may enable second housing 604H to be fixedly mounted on second side 626 closer to third side 628 than to first side 624.

As mentioned above, at least one processor contained in a single second housing 504 may control a plurality of image capture devices 506 contained in a plurality of first housings 502 (e.g., system 500J). In some embodiments, the plurality of image capture devices 506 may be configured for location on a single horizontal shelf and may be directed to substantially the same area of the opposing first retail shelving unit (e.g., system 500D in FIG. 6A). In these embodiments, the image data acquired by the first image capture device and the second image capture device may enable a calculation of depth information (e.g., based on image parallax information) associated with at least one product positioned on an opposing retail shelving unit. For example, system 500J may have single second housing 504J with at least one processor that may control a first image capturing device contained in first housing 502J1 and a second image capturing device contained in first housing 502J2. The distance d3 between the first image capture device contained in first housing 502J1 and the second image capture device contained in first housing 502J2 may be selected based on the distance between retail shelving unit 620 and the opposing retail shelving unit (e.g., similar to d1 and/or d2). For example, distance d3 may be at least 5 cm, at least 10 cm, at least 15 cm, less than 40 cm, less than 30 cm, between about 5 cm to about 20 cm, or between about 10 cm to about 15 cm. In another example, d3 may be a function of d1 and/or d2, a linear function of d1 and/or d2, a function of $d1*\log(d1)$ and/or $d2*\log(d2)$ such as $a1*d1*\log(d1)$ for some constant a1, and so forth. The data from the first image capturing device contained in first housing 502J1 and the second image capturing device contained in first housing 502J2 may be used to estimate the number of products on a store shelf of retail shelving unit 602. In related embodiments, system 500 may control a projector (e.g., projector 632) and image capture device 506 that are configured for location on a single store shelf or on two separate store shelves. For example, projector 632 may be mounted on horizontal shelf 622E and image capture device 506I may be mounted on horizontal shelf 622D. The image data acquired by image capture device 506 (e.g., included in first housing 502I) may include reflections of light patterns projected from projector 632 on the at least one product and/or the opposing retail shelving unit and may enable a calculation of depth information associated with at least one product positioned on the opposing retail shelving unit. The distance between projector 632 and the image capture device contained in first housing 502I may be selected based on the distance between retail shelving unit 620 and the opposing retail shelving unit (e.g., similar to d1 and/or d2). For example, the distance between the projector and the image capture device may be at least 5 cm, at least 10 cm, at least 15 cm, less than 40 cm, less than 30 cm, between about 5 cm to about 20 cm, or between about 10 cm to about 15 cm. In another example, the distance between the projector and the image capture device may be a function of d1 and/or d2, a linear function of d1 and/or d2, a function of $d1*\log(d1)$ and/or $d2*\log(d2)$ such as $a1*d1*\log(d1)$ for some constant a1, and so forth.

Consistent with the present disclosure, a central communication device 630 may be located in retail store 105 and may be configured to communicate with server 135 (e.g., via an Internet connection). The central communication device may also communicate with a plurality of systems 500 (for example, less than ten, ten, eleven, twelve, more than twelve, and so forth). In some cases, at least one of the plurality of systems 500 may be located in proximity to central communication device 630. In the illustrated example, system 500F may be located in proximity to central communication device 630. In some embodiments, at least some of systems 500 may communicate directly with at least one other system 500. The communications between some of the plurality of systems 500 may happen via a wired connection, such as the communications between system 500J and system 500I and the communications between system 500H and system 500G. Additionally or alternatively, the communications between some of the plurality of systems 500 may occur via a wireless connection, such as the communications between system 500G and system 500F and the communications between system 500I and system 500F. In some examples, at least one system 500 may be configured to transmit captured image data (or information derived from the captured image data) to central communication device 630 via at least two mediating systems 500, at least three mediating systems 500, at least four mediating systems 500, or more. For example, system 500J may convey captured image data to central communication device 630 via system 500I and system 500F.

Consistent with the present disclosure, two (or more) systems 500 may share information to improve image acquisition. For example, system 500J may be configured to receive from a neighboring system 500I information associated with an event that system 500I had identified, and control image capture device 506 based on the received information. For example, system 500J may forgo image acquisition based on an indication from system 500I that an object has entered or is about to enter its field of view. Systems 500I and 500J may have overlapping fields of view or non-overlapping fields of view. In addition, system 500J may also receive (from system 500I) information that originates from central communication device 630 and control image capture device 506 based on the received information. For example, system 500I may receive instructions from central communication device 630 to capture an image when supplier 115 inquiries about a specific product that is placed in a retail unit opposing system 500I. In some embodiments, a plurality of systems 500 may communicate with central communication device 630. In order to reduce or avoid network congestion, each system 500 may identify an available transmission time slot. Thereafter, each system 500 may determine a default time slot for future transmissions based on the identified transmission time slot.

Figure 6C:
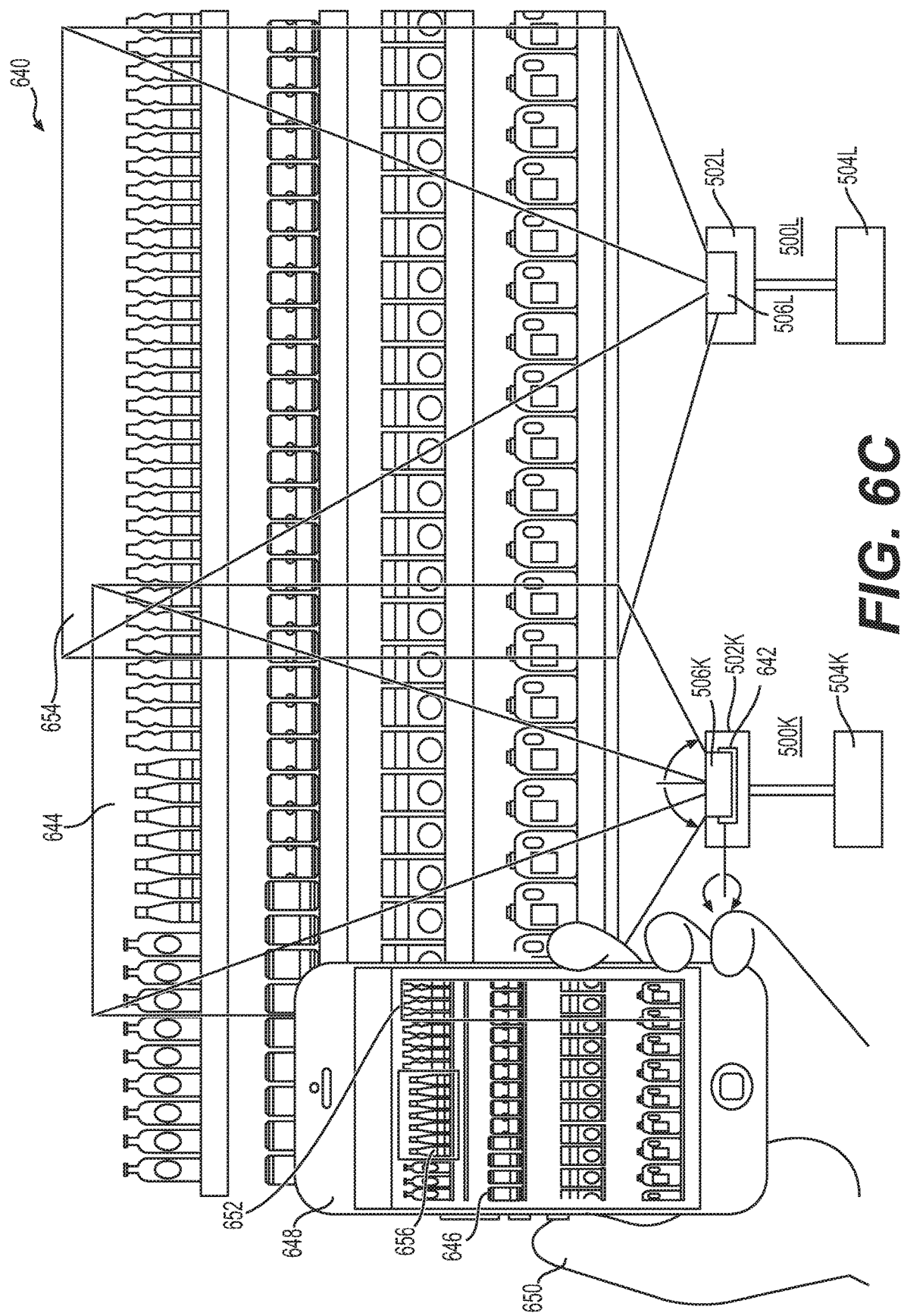
FIG. 6C provides a diagrammatic representation of how the exemplary disclosed image acquisition systems may be positioned relative to retail shelving to acquire product images, consistent with the present disclosure.

FIG. 6C provides a diagrammatic representation of a retail shelving unit 640 being captured by multiple systems 500 (e.g., system 500K and system 500L) deployed on an opposing retail shelving unit (not shown). FIG. 6C illustrates embodiments associated with the process of installing systems 500 in retail store 105. To facilitate the installation of system 500, each first housing 502 (e.g., first housing 502K) may include an adjustment mechanism 642 for setting a field of view 644 of image capture device 506K such that the field of view 644 will at least partially encompass products placed both on a bottom shelf of retail shelving unit 640 and on a top shelf of retail shelving unit 640. For example, adjustment mechanism 642 may enable setting the position of image capture device 506K relative to first housing 502K. Adjustment mechanism 642 may have at least two degrees of freedom to separately adjust manually (or automatically) the vertical field of view and the horizontal field of view of image capture device 506K. In one embodiment, the angle of image capture device 506K may be measured using position sensors associated with adjustment mechanism 642, and the measured orientation may be used to determine if image capture device 506K is positioned in the right direction. In one example, the output of the position sensors may be displayed on a handheld device of an employee installing image capturing device 506K. Such an arrangement may provide the employee/installer with real time visual feedback representative of the field of view of an image acquisition device being installed.

In addition to adjustment mechanism 642, first housing 502 may include a first physical adapter (not shown) configured to operate with multiple types of image capture device 506 and a second physical adapter (not shown) configured to operate with multiple types of lenses. During installation, the first physical adapter may be used to connect a suitable image capture device 506 to system 500 according to the level of recognition requested (e.g., detecting a barcode from products, detecting text and price from labels, detecting different categories of products, etc.). Similarly, during installation, the second physical adapter may be used to associate a suitable lens to image capture device 506 according to the physical conditions at the store (e.g., the distance between the aisles, the horizontal field of view required from image capture device 506, and/or the vertical field of view required from image capture device 506). The second physical adapter provides the employee/installer the ability to select the focal length of lens 312 during installation according to the distance between retail shelving units on opposite sides of an aisle (e.g., distance d1 and/or distance d2 shown in FIG. 6A). In some embodiments, adjustment mechanism 642 may include a locking mechanism to reduce the likelihood of unintentional changes in the field of view of image capture device 506. Additionally or alternatively, the at least one processor contained in second housing 504 may detect changes in the field of view of image capture device 506 and issue a warning when a change is detected, when a change larger than a selected threshold is detected, when a change is detected for a duration longer than a selected threshold, and so forth.

In addition to adjustment mechanism 642 and the different physical adapters, system 500 may modify the image data acquired by image capture device 506 based on at least one attribute associated with opposing retail shelving unit 640. Consistent with the present disclosure, the at least one attribute associated with retail shelving unit 640 may include a lighting condition, the dimensions of opposing retail shelving unit 640, the size of products displayed on opposing retail shelving unit 640, the type of labels used on opposing retail shelving unit 640, and more. In some embodiments, the attribute may be determined, based on analysis of one or more acquired images, by at least one processor contained in second housing 504. Alternatively, the attribute may be automatically sensed and conveyed to the at least one processor contained in second housing 504. In one example, the at least one processor may change the brightness of captured images based on the detected light conditions. In another example, the at least one processor may modify the image data by cropping the image such that it will include only the products on retail shelving unit (e.g., not to include the floor or the ceiling), only area of the shelving unit relevant to a selected task (such as planogram compliance check), and so forth.

Consistent with the present disclosure, during installation, system 500 may enable real-time display 646 of field of view 644 on a handheld device 648 of a user 650 installing image capturing device 506K. In one embodiment, real-time display 646 of field of view 644 may include augmented markings 652 indicating a location of a field of view 654 of an adjacent image capture device 506L. In another embodiment, real-time display 646 of field of view 644 may include augmented markings 656 indicating a region of interest in opposing retail shelving unit 640. The region of interest may be determined based on a planogram, identified product type, and/or part of retail shelving unit 640. For example, the region of interest may include products with a greater likelihood of planogram incompliance. In addition, system 500K may analyze acquired images to determine if field of view 644 includes the area that image capturing device 506K is supposed to monitor (for example, from labels on opposing retail shelving unit 640, products on opposing retail shelving unit 640, images captured from other image capturing devices that may capture other parts of opposing retail shelving unit 640 or capture the same part of opposing retail shelving unit 640 but in a lower resolution or at a lower frequency, and so forth). In additional embodiments, system 500 may further comprise an indoor location sensor which may help determine if the system 500 is positioned at the right location in retail store 105.

In some embodiments, an anti-theft device may be located in at least one of first housing 502 and second housing 504. For example, the anti-theft device may include a specific RF label or a pin-tag radio-frequency identification device, which may be the same or similar to a type of anti-theft device that is used by retail store 105 in which system 500 is located. The RF label or the pin-tag may be incorporated within the body of first housing 502 and second housing 504 and may not be visible. In another example, the anti-theft device may include a motion sensor whose output may be used to trigger an alarm in the case of motion or disturbance, in case of motion that is above a selected threshold, and so forth.

Figure 7A:
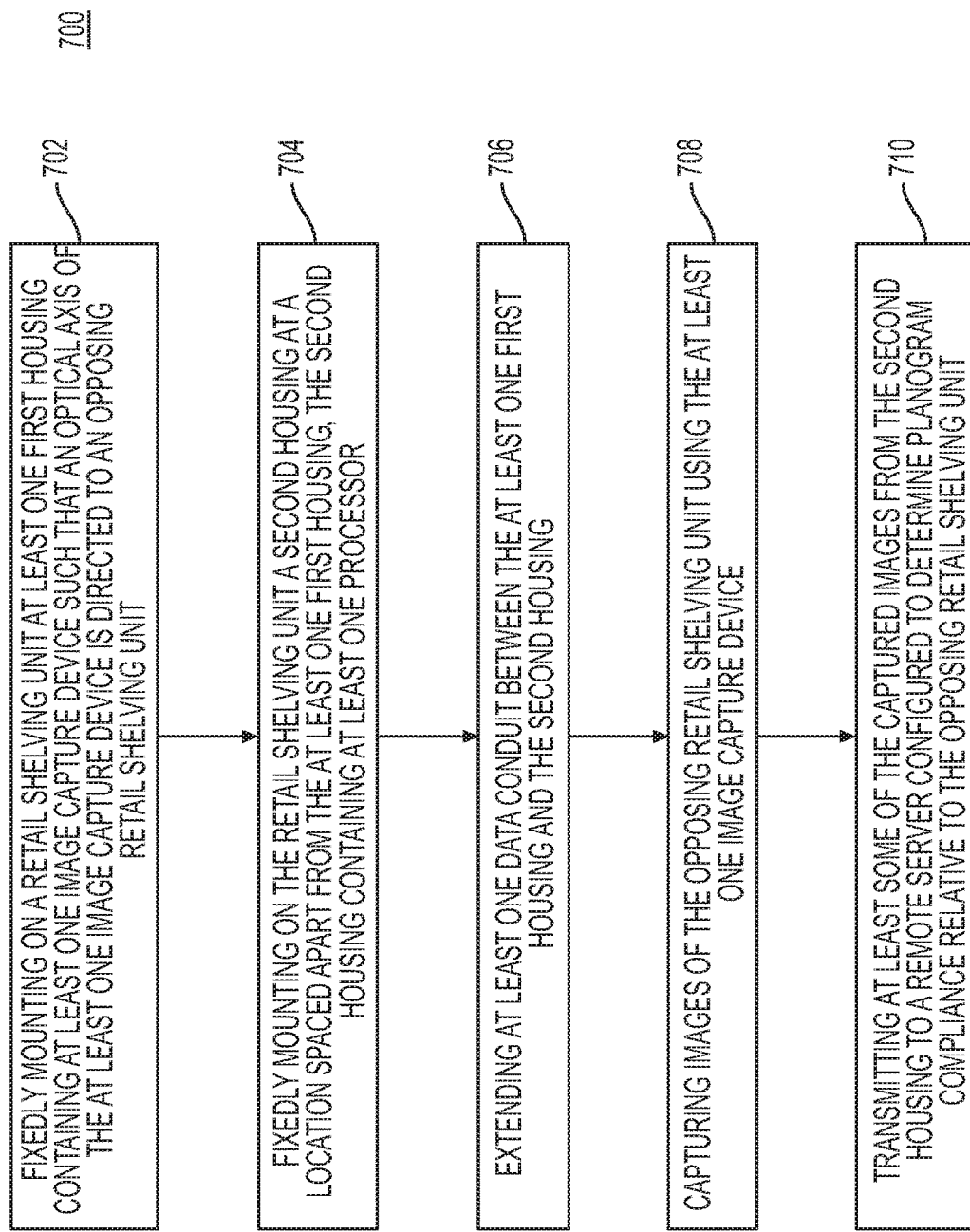
FIG. 7A provides a flowchart of an exemplary method for acquiring images of products in retail store, consistent with the present disclosure.

FIG. 7A includes a flowchart representing an exemplary method 700 for acquiring images of products in retail store 105 in accordance with example embodiments of the present disclosure. For purposes of illustration, in the following description, reference is made to certain components of system 500 as deployed in the configuration depicted in FIG. 6A. It will be appreciated, however, that other implementations are possible and that other configurations may be utilized to implement the exemplary method. It will also be readily appreciated that the illustrated method can be altered to modify the order of steps, delete steps, or further include additional steps.

At step 702, the method includes fixedly mounting on first retail shelving unit 602 at least one first housing 502 containing at least one image capture device 506 such that an optical axis (e.g., optical axis 606) of at least one image capture device 506 is directed to second retail shelving unit 604. In one embodiment, fixedly mounting first housing 502 on first retail shelving unit 602 may include placing first housing 502 on a side of store shelf 622 facing second retail shelving unit 604. In another embodiment, fixedly mounting first housing 502 on retail shelving unit 602 may include placing first housing 502 in a slit between two adjacent horizontal shelves. In some embodiments, the method may further include fixedly mounting on first retail shelving unit 602 at least one projector (such as projector 632) such that light patterns projected by the at least one projector are directed to second retail shelving unit 604. In one embodiment, the method may include mounting the at least one projector to first retail shelving unit 602 at a selected distance to first housing 502 with image capture device 506. In one embodiment, the selected distance may be at least 5 cm, at least 10 cm, at least 15 cm, less than 40 cm, less than 30 cm, between about 5 cm to about 20 cm, or between about 10 cm to about 15 cm. In one embodiment, the selected distance may be calculated according to a distance between to first retail shelving unit 602 and second retail shelving unit 604, such as d1 and/or d2, for example selecting the distance to be a function of d1 and/or d2, a linear function of d1 and/or d2, a function of d1*log(d1) and/or d2*log(d2) such as a1*d1*log(d1) for some constant a1 , and so forth.

At step 704, the method includes fixedly mounting on first retail shelving unit 602 second housing 504 at a location spaced apart from the at least one first housing 502, second housing 504 may include at least one processor (e.g., processing device 302). In one embodiment, fixedly mounting second housing 504 on the retail shelving unit may include placing second housing 504 on a different side of store shelf 622 than the side first housing 502 is mounted on.

At step 706, the method includes extending at least one data conduit 508 between at least one first housing 502 and second housing 504. In one embodiment, extending at least one data conduit 508 between at least one first housing 502 and second housing 504 may include adjusting the length of data conduit 508 to enable first housing 502 to be mounted separately from second housing 504. At step 708, the method includes capturing images of second retail shelving unit 604 using at least one image capture device 506 contained in at least one first housing 502 (e.g., first housing 502A, first housing 502B, or first housing 502C). In one embodiment, the method further includes periodically capturing images of products located on second retail shelving unit 604. In another embodiment the method includes capturing images of second retail shelving unit 604 after receiving a trigger from at least one additional sensor in communication with system 500 (wireless or wired).

At step 710, the method includes transmitting at least some of the captured images from second housing 504 to a remote server (e.g., server 135) configured to determine planogram compliance relative to second retail shelving unit 604. In some embodiments, determining planogram compliance relative to second retail shelving unit 604 may include determining at least one characteristic of planogram compliance based on detected differences between the at least one planogram and the actual placement of the plurality of product types on second retail shelving unit 604. Consistent with the present disclosure, the characteristic of planogram compliance may include at least one of: product facing, product placement, planogram compatibility, price correlation, promotion execution, product homogeneity, restocking rate, and planogram compliance of adjacent products.

Figure 7B:
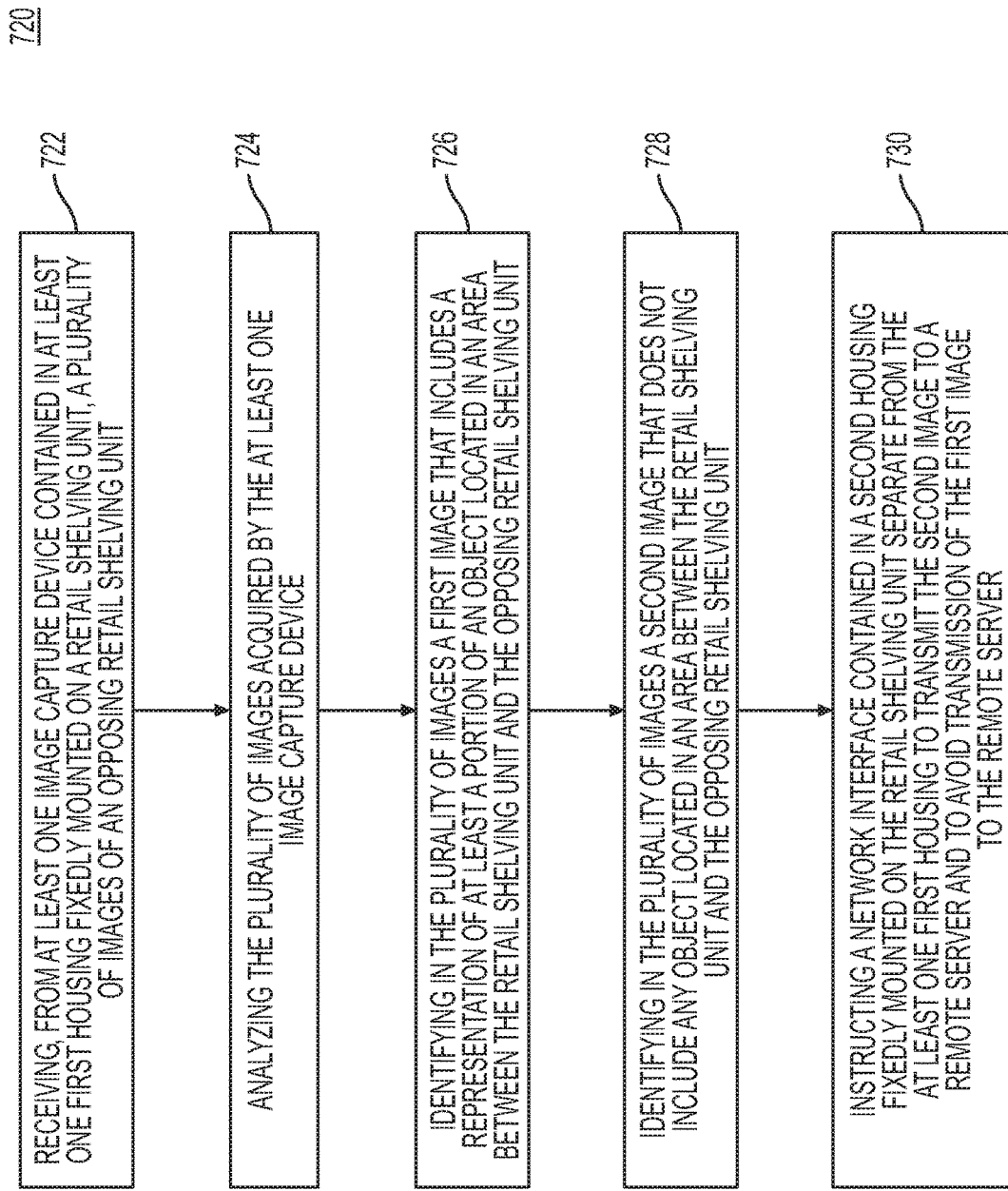
FIG. 7B provides a flowchart of a method for acquiring images of products in retail store, consistent with the present disclosure.

FIG. 7B provides a flowchart representing an exemplary method 720 for acquiring images of products in retail store 105, in accordance with example embodiments of the present disclosure. For purposes of illustration, in the following description, reference is made to certain components of system 500 as deployed in the configuration depicted in FIG. 6A. It will be appreciated, however, that other implementations are possible and that other configurations may be utilized to implement the exemplary method. It will also be readily appreciated that the illustrated method can be altered to modify the order of steps, delete steps, or further include additional steps.

At step 722, at least one processor contained in a second housing may receive from at least one image capture device contained in at least one first housing fixedly mounted on a retail shelving unit a plurality of images of an opposing retail shelving unit. For example, at least one processor contained in second housing 504A may receive from at least one image capture device 506 contained in first housing 502A (fixedly mounted on first retail shelving unit 602) a plurality of images of second retail shelving unit 604. The plurality of images may be captured and collected during a period of time (e.g., a minute, an hour, six hours, a day, a week, or more).

At step 724, the at least one processor contained in the second housing may analyze the plurality of images acquired by the at least one image capture device. In one embodiment, at least one processor contained in second housing 504A may use any suitable image analysis technique (for example, object recognition, object detection, image segmentation, feature extraction, optical character recognition (OCR), object-based image analysis, shape region techniques, edge detection techniques, pixel-based detection, artificial neural networks, convolutional neural networks, etc.) to identify objects in the plurality of images. In one example, the at least one processor contained in second housing 504A may determine the number of products located in second retail shelving unit 604. In another example, the at least one processor contained in second housing 504A may detect one or more objects in an area between first retail shelving unit 602 and second retail shelving unit 604.

At step 726, the at least one processor contained in the second housing may identify in the plurality of images a first image that includes a representation of at least a portion of an object located in an area between the retail shelving unit and the opposing retail shelving unit. In step 728, the at least one processor contained in the second housing may identify in the plurality of images a second image that does not include any object located in an area between the retail shelving unit and the opposing retail shelving unit. In one example, the object in the first image may be an individual, such as a customer or a store employee. In another example, the object in the first image may be an inanimate object, such as carts, boxes, products, etc.

At step 730, the at least one processor contained in the second housing may instruct a network interface contained in the second housing, fixedly mounted on the retail shelving unit separate from the at least one first housing, to transmit the second image to a remote server and to avoid transmission of the first image to the remote server. In addition, the at least one processor may issue a notification when an object blocks the field of view of the image capturing device for more than a predefined period of time (e.g., at least 30 minutes, at least 75 minutes, at least 150 minutes).

Embodiments of the present disclosure may automatically assess compliance of one or more store shelves with a planogram. For example, embodiments of the present disclosure may use signals from one or more sensors to determine placement of one or more products on store shelves. The disclosed embodiments may also use one or more sensors to determine empty spaces on the store shelves. The placements and empty spaces may be automatically assessed against a digitally encoded planogram. A planogram refers to any data structure or specification that defines at least one product characteristic relative to a display structure associated with a retail environment (such as store shelf or area of one or more shelves). Such product characteristics may include, among other things, quantities of products with respect to areas of the shelves, product configurations or product shapes with respect to areas of the shelves, product arrangements with respect to areas of the shelves, product density with respect to areas of the shelves, product combinations with respect to areas of the shelves, etc. Although described with reference to store shelves, embodiments of the present disclosure may also be applied to end caps or other displays; bins, shelves, or other organizers associated with a refrigerator or freezer units; or any other display structure associated with a retail environment.

The embodiments disclosed herein may use any sensors configured to detect one or more parameters associated with products (or a lack thereof). For example, embodiments may use one or more of pressure sensors, weight sensors, light sensors, resistive sensors, capacitive sensors, inductive sensors, vacuum pressure sensors, high pressure sensors, conductive pressure sensors, infrared sensors, photo-resistor sensors, photo-transistor sensors, photo-diodes sensors, ultrasonic sensors, or the like. Some embodiments may use a plurality of different kinds of sensors, for example, associated with the same or overlapping areas of the shelves and/or associated with different areas of the shelves. Some embodiments may use a plurality of sensors configured to be placed adjacent a store shelf, configured for location on the store shelf, configured to be attached to, or configured to be integrated with the store shelf. In some cases, at least part of the plurality of sensors may be configured to be placed next to a surface of a store shelf configured to hold products. For example, the at least part of the plurality of sensors may be configured to be placed relative to a part of a store shelf such that the at least part of the plurality of sensors may be positioned between the part of a store shelf and products placed on the part of the shelf. In another embodiment, the at least part of the plurality of sensors may be configured to be placed above and/or within and/or under the part of the shelf.

In one example, the plurality of sensors may include light detectors configured to be located such that a product placed on the part of the shelf may block at least some of the ambient light from reaching the light detectors. The data received from the light detectors may be analyzed to detect a product or to identify a product based on the shape of a product placed on the part of the shelf. In one example, the system may identify the product placed above the light detectors based on data received from the light detectors that may be indicative of at least part of the ambient light being blocked from reaching the light detectors. Further, the data received from the light detectors may be analyzed to detect vacant spaces on the store shelf. For example, the system may detect vacant spaces on the store shelf based on the received data that may be indicative of no product being placed on a part of the shelf. In another example, the plurality of sensors may include pressure sensors configured to be located such that a product placed on the part of the shelf may apply detectable pressure on the pressure sensors. Further, the data received from the pressure sensors may be analyzed to detect a product or to identify a product based on the shape of a product placed on the part of the shelf. In one example, the system may identify the product placed above the pressure sensors based on data received from the pressure sensors being indicative of pressure being applied on the pressure sensors. In addition, the data from the pressure sensors may be analyzed to detect vacant spaces on the store shelf, for example based on the readings being indicative of no product being placed on a part of the shelf, for example, when the pressure readings are below a selected threshold. Consistent with the present disclosure, inputs from different types of sensors (such as pressure sensors, light detectors, etc.) may be combined and analyzed together, for example to detect products placed on a store shelf, to identify shapes of products placed on a store shelf, to identify types of products placed on a store shelf, to identify vacant spaces on a store shelf, and so forth.

Figure 8A:
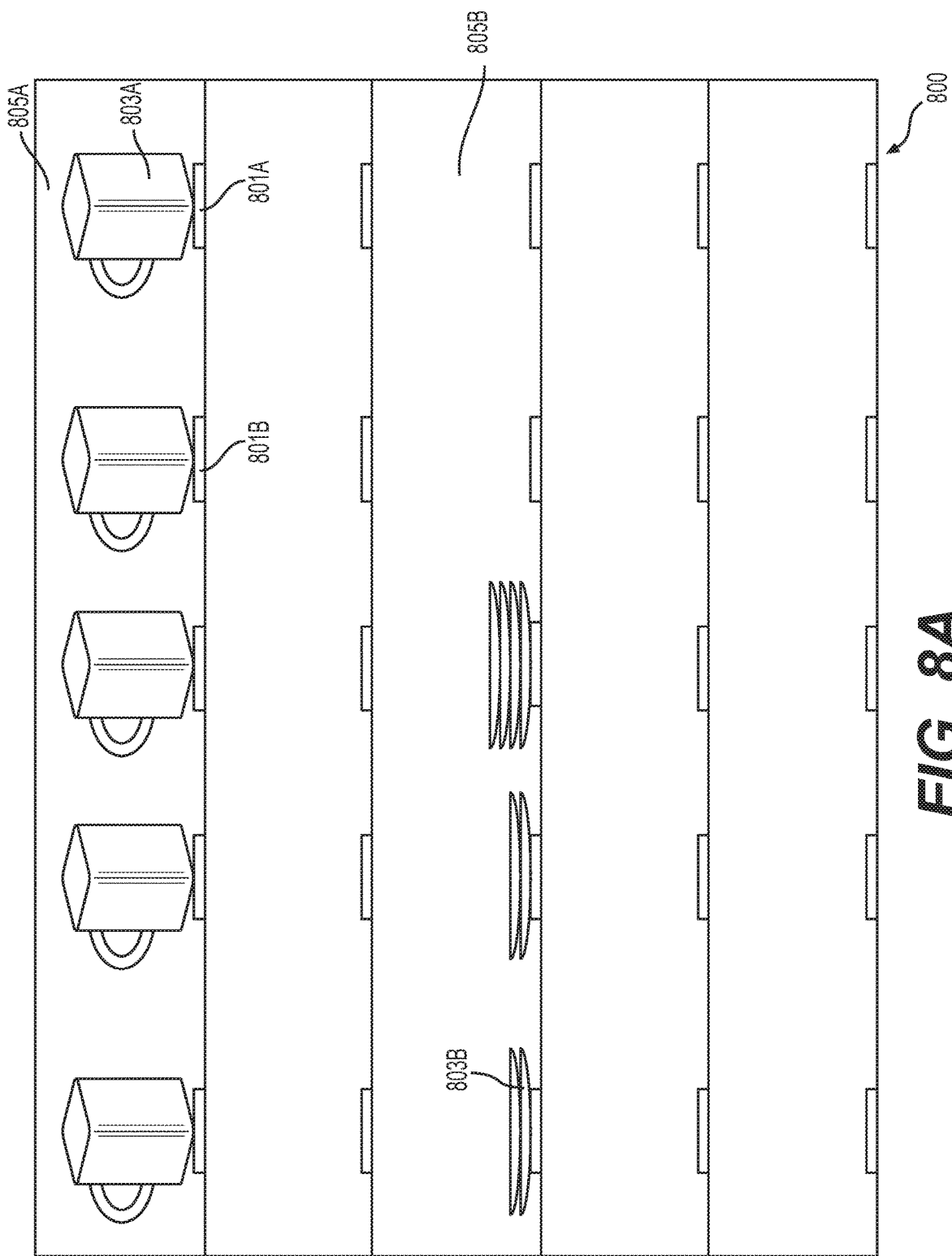
FIG. 8A is a schematic illustration of an example configuration for detecting products and empty spaces on a store shelf, consistent with the present disclosure.

With reference to FIG. 8A and consistent with the present disclosure, a store shelf 800 may include a plurality of detection elements, e.g., detection elements 801A and 801B. In the example of FIG. 8A, detection elements 801A and 801B may comprise pressure sensors and/or other type of sensors for measuring one or more parameters (such as resistance, capacitance, or the like) based on physical contact (or lack thereof) with products, e.g., product 803A and product 803B. Additionally or alternatively, detection elements configured to measure one or more parameters (such as current induction, magnetic induction, visual or other electromagnetic reflectance, visual or other electromagnetic emittance, or the like) may be included to detect products based on physical proximity (or lack thereof) to products. Consistent with the present disclosure, the plurality of detection elements may be configured for location on shelf 800. The plurality of detection elements may be configured to detect placement of products when the products are placed above at least part of the plurality of detection elements. Some embodiments of the disclosure, however, may be performed when at least some of the detection elements may be located next to shelf 800 (e.g., for magnetometers or the like), across from shelf 800 (e.g., for image sensors or other light sensors, light detection and ranging (LIDAR) sensors, radio detection and ranging (RADAR) sensors, or the like), above shelf 800 (e.g., for acoustic sensors or the like), below shelf 800 (e.g., for pressure sensors or the like), or any other appropriate spatial arrangement. Although depicted as standalone units in the example of FIG. 8A, the plurality of detection elements may form part of a fabric (e.g., a smart fabric or the like), and the fabric may be positioned on a shelf to take measurements. For example, two or more detection elements may be integrated together into a single structure (e.g., disposed within a common housing, integrated together within a fabric or mat, etc.). In some examples, detection elements (such as detection elements 801A and 801B) may be placed adjacent to (or placed on) store shelves as described above. Some examples of detection elements may include pressure sensors and/or light detectors configured to be placed above and/or within and/or under a store shelf as described above.

Detection elements associated with shelf 800 may be associated with different areas of shelf 800. For example, detection elements 801A and 801B are associated with area 805A while other detection elements are associated with area 805B. Although depicted as rows, areas 805A and 805B may comprise any areas of shelf 800, whether contiguous (e.g., a square, a rectangular, or other regular or irregular shape) or not (e.g., a plurality of rectangles or other regular and/or irregular shapes). Such areas may also include horizontal regions between shelves (as shown in FIG. 8A) or may include vertical regions that include area of multiple different shelves (e.g., columnar regions spanning over several different horizontally arranged shelves). In some examples, the areas may be part of a single plane. In some examples, each area may be part of a different plane. In some examples, a single area may be part of a single plane or be divided across multiple planes.

One or more processors (e.g., processing device 202) configured to communicate with the detection elements (e.g., detection elements 801A and 801B) may detect first signals associated with a first area (e.g., areas 805A and/or 805B) and second signals associated with a second area. In some embodiments, the first area may, in part, overlap with the second area. For example, one or more detection elements may be associated with the first area as well as the second area and/or one or more detection elements of a first type may be associated with the first area while one or more detection elements of a second type may be associated with the second area overlapping, at least in part, the first area. In other embodiments, the first area and the second area may be spatially separate from each other.

The one or more processors may, using the first and second signals, determine that one or more products have been placed in the first area while the second area includes at least one empty area. For example, if the detection elements include pressure sensors, the first signals may include weight signals that match profiles of particular products (such as the mugs or plates depicted in the example of FIG. 8A), and the second signals may include weight signals indicative of the absence of products (e.g., by being equal to or within a threshold of a default value such as atmospheric pressure or the like). The disclosed weight signals may be representative of actual weight values associated with a particular product type or, alternatively, may be associated with a relative weight value sufficient to identify the product and/or to identify the presence of a product. In some cases, the weight signal may be suitable for verifying the presence of a product regardless of whether the signal is also sufficient for product identification. In another example, if the detection elements include light detectors (as described above), the first signals may include light signals that match profiles of particular products (such as the mugs or plates depicted in the example of FIG. 8A), and the second signals may include light signals indicative of the absence of products (e.g., by being equal to or within a threshold of a default value such as values corresponding to ambient light or the like). For example, the first light signals may be indicative of ambient light being blocked by particular products, while the second light signals may be indicative of no product blocking the ambient light. The disclosed light signals may be representative of actual light patterns associated with a particular product type or, alternatively, may be associated with light patterns sufficient to identify the product and/or to identify the presence of a product.

The one or more processors may similarly process signals from other types of sensors. For example, if the detection elements include resistive or inductive sensors, the first signals may include resistances, voltages, and/or currents that match profiles of particular products (such as the mugs or plates depicted in the example of FIG. 8A or elements associated with the products, such as tags, etc.), and the second signals may include resistances, voltages, and/or currents indicative of the absence of products (e.g., by being equal to or within a threshold of a default value such as atmospheric resistance, a default voltage, a default current, corresponding to ambient light, or the like). In another example, if the detection elements include acoustics, LIDAR, RADAR, or other reflective sensors, the first signals may include patterns of returning waves (whether sound, visible light, infrared light, radio, or the like) that match profiles of particular products (such as the mugs or plates depicted in the example of FIG. 8A), and the second signals may include patterns of returning waves (whether sound, visible light, infrared light, radio, or the like) indicative of the absence of products (e.g., by being equal to or within a threshold of a pattern associated with an empty shelf or the like).

Any of the profile matching described above may include direct matching of a subject to a threshold. For example, direct matching may include testing one or more measured values against the profile value(s) within a margin of error; mapping a received pattern onto a profile pattern with a residual having a maximum, minimum, integral, or the like within the margin of error; performing an autocorrelation, Fourier transform, convolution, or other operation on received measurements or a received pattern and comparing the resultant values or function against the profile within a margin of error; or the like. Additionally or alternatively, profile matching may include fuzzy matching between measured values and/or patterns and a database of profiles such that a profile with a highest level of confidence according to the fuzzy search. Moreover, as depicted in the example of FIG. 8A, products, such as product 803B, may be stacked and thus associated with a different profile when stacked than when standalone.

Any of the profile matching described above may include use of one or more machine learning techniques. For example, one or more artificial neural networks, random forest models, or other models trained on measurements annotated with product identifiers may process the measurements from the detection elements and identify products therefrom. In such embodiments, the one or more models may use additional or alternative input, such as images of the shelf (e.g., from capturing devices 125 of FIGS. 4A-4C explained above) or the like.

Based on detected products and/or empty spaces, determined using the first signals and second signals, the one or more processors may determine one or more aspects of planogram compliance. For example, the one or more processors may identify products and their locations on the shelves, determine quantities of products within particular areas (e.g., identifying stacked or clustered products), identify facing directions associated with the products (e.g., whether a product is outward facing, inward facing, askew, or the like), or the like. Identification of the products may include identifying a product type (e.g., a bottle of soda, a loaf of broad, a notepad, or the like) and/or a product brand (e.g., a Coca-Cola® bottle instead of a Sprite® bottle, a Starbucks® coffee tumbler instead of a Tervis® coffee tumbler, or the like). Product facing direction and/or orientation, for example, may be determined based on a detected orientation of an asymmetric shape of a product base using pressure sensitive pads, detected density of products, etc. For example, the product facing may be determined based on locations of detected product bases relative to certain areas of a shelf (e.g., along a front edge of a shelf), etc. Product facing may also be determined using image sensors, light sensors, or any other sensor suitable for detecting product orientation.

The one or more processors may generate one or more indicators of the one or more aspects of planogram compliance. For example, an indicator may comprise a data packet, a data file, or any other data structure indicating any variations from a planogram, e.g., with respect to product placement such as encoding intended coordinates of a product and actual coordinates on the shelf, with respect to product facing direction and/or orientation such as encoding indicators of locations that have products not facing a correct direction and/or in an undesired orientation, or the like.

In addition to or as an alternative to determining planogram compliance, the one or more processors may detect a change in measurements from one or more detection elements. Such measurement changes may trigger a response. For example, a change of a first type may trigger capture of at least one image of the shelf (e.g., using capturing devices 125 of FIGS. 4A-4C explained above) while a detected change of a second type may cause the at least one processor to forgo such capture. A first type of change may, for example, indicate the moving of a product from one location on the shelf to another location such that planogram compliance may be implicated. In such cases, it may be desired to capture an image of the product rearrangement in order to assess or reassess product planogram compliance. In another example, a first type of change may indicate the removal of a product from the shelf, e.g., by an employee due to damage, by a customer to purchase, or the like. On the other hand, a second type of change may, for example, indicate the removal and replacement of a product to the same (within a margin of error) location on the shelf, e.g., by a customer to inspect the item. In cases where products are removed from a shelf, but then replaced on the shelf (e.g., within a particular time window), the system may forgo a new image capture, especially if the replaced product is detected in a location similar to or the same as its recent, original position.

Figure 8B:
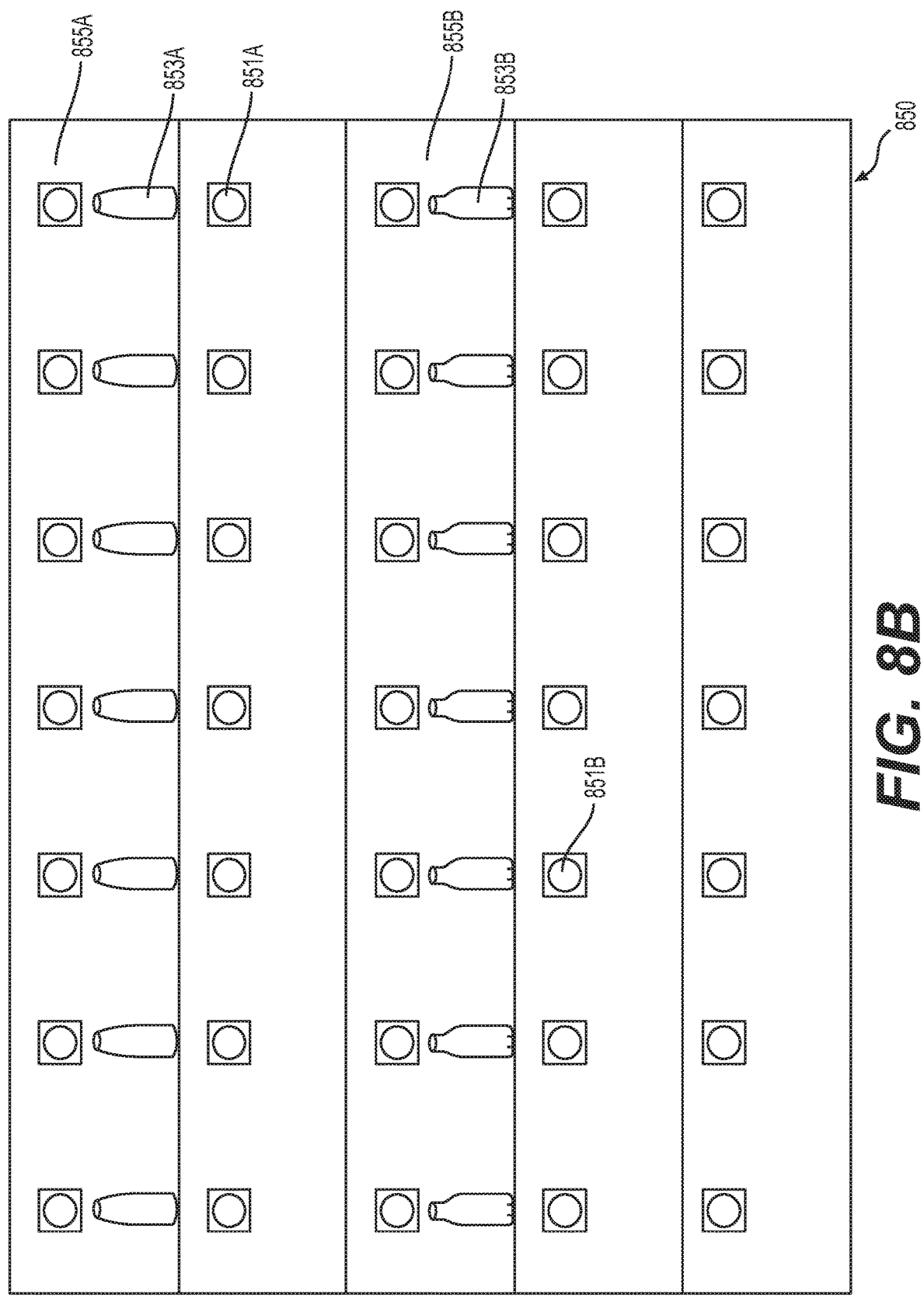
FIG. 8B is a schematic illustration of another example configuration for detecting products and empty spaces on a store shelf, consistent with the present disclosure.

With reference to FIG. 8B and consistent with the present disclosure, a store shelf 850 may include a plurality of detection elements, e.g., detection elements 851A and 851B. In the example of FIG. 8B, detection elements 851A and 851B may comprise light sensors and/or other sensors measuring one or more parameters (such as visual or other electromagnetic reflectance, visual or other electromagnetic emittance, or the like) based on electromagnetic waves from products, e.g., product 853A and product 853B. Additionally or alternatively, as explained above with respect to FIG. 8B, detection elements 851A and 851B may comprise pressure sensors, other sensors measuring one or more parameters (such as resistance, capacitance, or the like) based on physical contact (or lack thereof) with the products, and/or other sensors that measure one or more parameters (such as current induction, magnetic induction, visual or other electromagnetic reflectance, visual or other electromagnetic emittance, or the like) based on physical proximity (or lack thereof) to products.

Moreover, although depicted as located on shelf 850, some detection elements may be located next to shelf 850 (e.g., for magnetometers or the like), across from shelf 850 (e.g., for image sensors or other light sensors, light detection and ranging (LIDAR) sensors, radio detection and ranging (RADAR) sensors, or the like), above shelf 850 (e.g., for acoustic sensors or the like), below shelf 850 (e.g., for pressure sensors, light detectors, or the like), or any other appropriate spatial arrangement. Further, although depicted as standalone in the example of FIG. 8B, the plurality of detection elements may form part of a fabric (e.g., a smart fabric or the like), and the fabric may be positioned on a shelf to take measurements.

Detection elements associated with shelf 850 may be associated with different areas of shelf 850, e.g., area 855A, area 855B, or the like. Although depicted as rows, areas 855A and 855B may comprise any areas of shelf 850, whether contiguous (e.g., a square, a rectangular, or other regular or irregular shape) or not (e.g., a plurality of rectangles or other regular and/or irregular shapes).

One or more processors (e.g., processing device 202) in communication with the detection elements (e.g., detection elements 851A and 851B) may detect first signals associated with a first area and second signals associated with a second area. Any of the processing of the first and second signals described above with respect to FIG. 8A may similarly be performed for the configuration of FIG. 8B.

In both FIGS. 8A and 8B, the detection elements may be integral to the shelf, part of a fabric or other surface configured for positioning on the shelf, or the like. Power and/or data cables may form part of the shelf, the fabric, the surface, or be otherwise connected to the detection elements. Additionally or alternatively, as depicted in FIGS. 8A and 8B, individual sensors may be positioned on the shelf. For example, the power and/or data cables may be positioned under the shelf and connected through the shelf to the detection elements. In another example, power and/or data may be transmitted wirelessly to the detection elements (e.g., to wireless network interface controllers forming part of the detection elements). In yet another example, the detection elements may include internal power sources (such as batteries or fuel cells).

Figure 9:
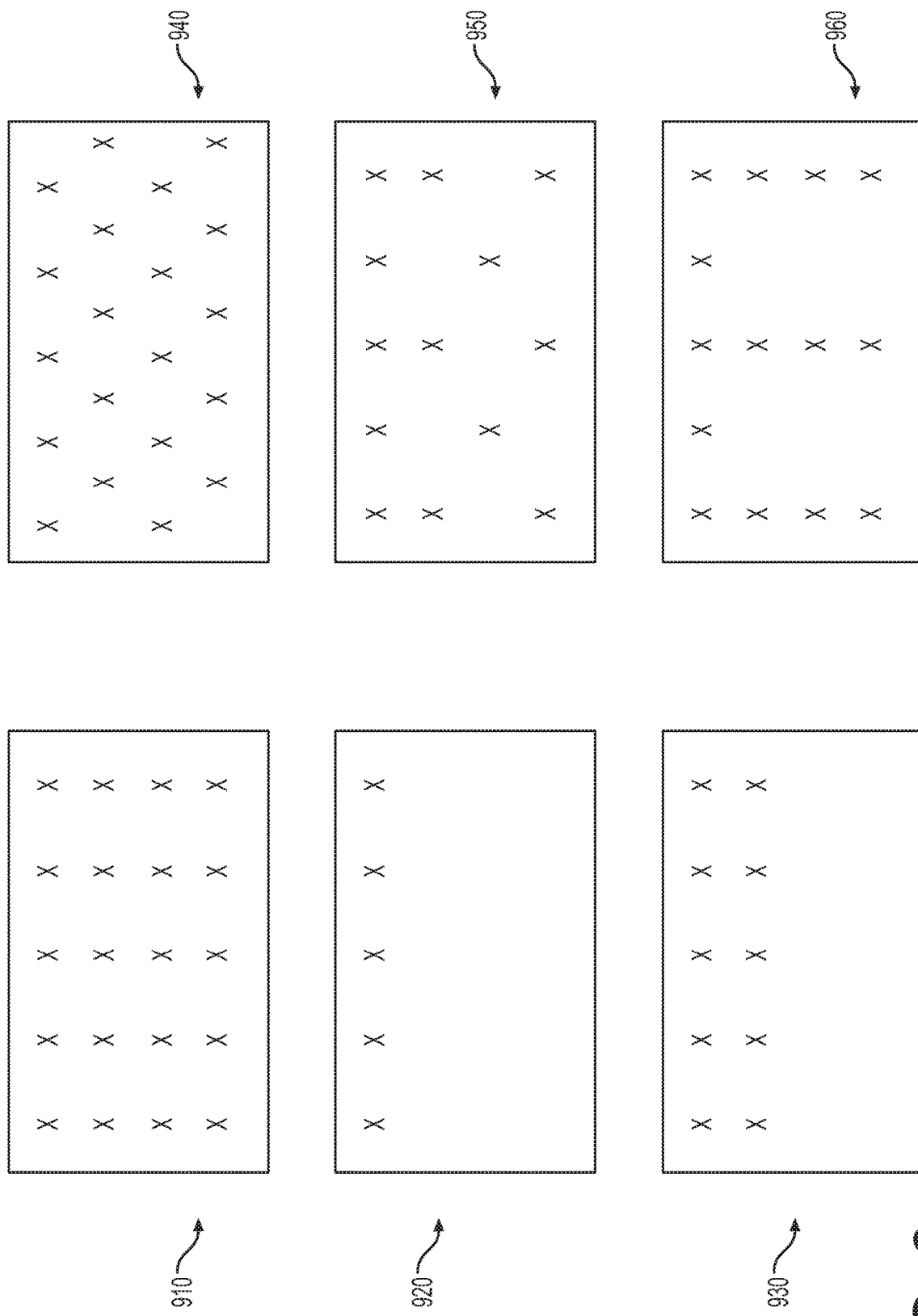
FIG. 9 is a schematic illustration of example configurations for detection elements on store shelves, consistent with the present disclosure.

With reference to FIG. 9 and consistent with the present disclosure, the detection elements described above with reference to FIGS. 8A and 8B may be arranged on rows of the shelf in any appropriate configuration. All of the arrangements of FIG. 9 are shown as a top-down view of a row (e.g., area 805A, area 805B, area 855A, area 855B, or the like) on the shelf. For example, arrangements 910 and 940 are both uniform distributions of detection elements within a row. However, arrangement 910 is also uniform throughout the depth of the row while arrangement 940 is staggered. Both arrangements may provide signals that represent products on the shelf in accordance with spatially uniform measurement locations. As further shown in FIG. 9, arrangements 920, 930, 950, and 960 cluster detection elements near the front (e.g., a facing portion) of the row. Arrangement 920 includes detection elements at a front portion while arrangement 930 includes defection elements in a larger portion of the front of the shelf. Such arrangements may save power and processing cycles by having fewer detection elements on a back portion of the shelf. Arrangements 950 and 960 include some detection elements in a back portion of the shelf but these elements are arranged less dense than detection elements in the front. Such arrangements may allow for detections in the back of the shelf (e.g., a need to restock products, a disruption to products in the back by a customer or employee, or the like) while still using less power and fewer processing cycles than arrangements 910 and 940. And, such arrangements may include a higher density of detection elements in regions of the shelf (e.g., a front edge of the shelf) where product turnover rates may be higher than in other regions (e.g., at areas deeper into a shelf), and/or in regions of the shelf where planogram compliance is especially important.

FIG. 10A is a flow chart, illustrating an exemplary method 1000 for monitoring planogram compliance on a store shelf, in accordance with the presently disclosed subject matter. It is contemplated that method 1000 may be used with any of the detection element arrays discussed above with reference to, for example, FIGS. 8A, 8B and 9. The order and arrangement of steps in method 1000 is provided for purposes of illustration. As will be appreciated from this disclosure, modifications may be made to process 1000, for example, adding, combining, removing, and/or rearranging one or more steps of process 1000.

Method 1000 may include a step 1005 of receiving first signals from a first subset of detection elements (e.g., detection elements 801A and 801B of FIG. 8A) from among the plurality of detection elements after one or more of a plurality of products (e.g., products 803A and 803B) are placed on at least one area of the store shelf associated with the first subset of detection elements. As explained above with respect to FIGS. 8A and 8B, the plurality of detection elements may be embedded into a fabric configured to be positioned on the store shelf. Additionally or alternatively, the plurality of detection elements may be configured to be integrated with the store shelf. For example, an array of pressure sensitive elements (or any other type of detector) may be fabricated as part of the store shelf. In some examples, the plurality of detection elements may be configured to placed adjacent to (or located on) store shelves, as described above.

As described above with respect to arrangements 910 and 940 of FIG. 9, the plurality of detection elements may be substantially uniformly distributed across the store shelf. Alternatively, as described above with respect to arrangements 920, 930, 950, and 960 of FIG. 9, the plurality of detection elements may be distributed relative to the store shelf such that a first area of the store shelf has a higher density of detection elements than a second area of the store shelf. For example, the first area may comprise a front portion of the shelf, and the second area may comprise a back portion of the shelf.

In some embodiments, such as those including pressure sensors or other contact sensors as depicted in the example of FIG. 8A, step 1005 may include receiving the first signals from the first subset of detection elements as the plurality of products are placed above the first subset of detection elements. In some embodiments where the plurality of detection elements includes pressure detectors, the first signals may be indicative of pressure levels detected by pressure detectors corresponding to the first subset of detection elements after one or more of the plurality of products are placed on the at least one area of the store shelf associated with the first subset of detection elements. For example, the first signals may be indicative of pressure levels detected by pressure detectors corresponding to the first subset of detection elements after stocking at least one additional product above a product previously positioned on the shelf, removal of a product from the shelf, or the like. In other embodiments where the plurality of detection elements includes light detectors, the first signals may be indicative of light measurements made with respect to one or more of the plurality of products placed on the at least one area of the store shelf associated with the first subset of detection elements. Specifically, the first signals may be indicative of at least part of the ambient light being blocked from reaching the light detectors by the one or more of the plurality of products.

In embodiments including proximity sensors as depicted in the example of FIG. 8B, step 1005 may include receiving the first signals from the first subset of detection elements as the plurality of products are placed below the first subset of detection elements. In embodiments where the plurality of detection elements include proximity detectors, the first signals may be indicative of proximity measurements made with respect to one or more of the plurality of products placed on the at least one area of the store shelf associated with the first subset of detection elements.

Method 1000 may include step 1010 of using the first signals to identify at least one pattern associated with a product type of the plurality of products. For example, any of the pattern matching techniques described above with respect to FIGS. 8A and 8B may be used for identification. A pattern associated with a product type may include a pattern (e.g., a continuous ring, a discontinuous ring of a certain number of points, a certain shape, etc.) associated with a base of a single product. The pattern associated with a product type may also be formed by a group of products. For example, a six pack of soda cans may be associated with a pattern including a 2×3 array of continuous rings associated with the six cans of that product type. Additionally, a grouping of two liter bottles may form a detectable pattern including an array (whether uniform, irregular, or random) of discontinuous rings of pressure points, where the rings have a diameter associated with a particular 2-liter product. Various other types of patterns may also be detected (e.g., patterns associated with different product types arranged adjacent to one another, patterns associated with solid shapes (such as a rectangle of a boxed product), etc.). In another example, an artificial neural network configured to recognize product types may be used to analyze the signals received by step 1005 (such as signals from pressure sensors, from light detectors, from contact sensors, and so forth) to determine product types associated with products placed on an area of a shelf (such as an area of a shelf associated with the first subset of detection elements). In yet another example, a machine learning algorithm trained using training examples to recognize product types may be used to analyze the signals received by step 1005 (such as signals from pressure sensors, from light detectors, from contact sensors, and so forth) to determine product types associated with products placed on an area of a shelf (such as an area of a shelf associated with the first subset of detection elements).

In some embodiments, step 1010 may further include accessing a memory storing data (e.g., memory device 226 of FIG. 2 and/or memory device 314 of FIG. 3A) associated with patterns of different types of products. In such embodiments, step 1010 may include using the first signals to identify at least one product of a first type using a first pattern (or a first product model) and at least one product of a second type using a second pattern (or a second product model). For example, the first type may include one brand (such as Coca-Cola® or Folgers®) while the second type may include another brand (such as Pepsi® or Maxwell House®). In this example, a size, shape, point spacing, weight, resistance or other property of the first brand may be different from that of the second brand such that the detection elements may differentiate the brands. Such characteristics may also be used to differentiate like-branded, but different products from one another (e.g., a 12-ounce can of Coca Cola, versus a 16 oz bottle of Coca Cola, versus a 2-liter bottle of Coca Cola). For example, a soda may have a base detectable by a pressure sensitive pad as a continuous ring. Further, the can of soda may be associated with a first weight signal having a value recognizable as associated with such a product. A 16 ounce bottle of soda may be associated with a base having four or five pressure points, which a pressure sensitive pad may detect as arranged in a pattern associated with a diameter typical of such a product. The 16 ounce bottle of soda may also be associated with a second weight signal having a value higher than the weight signal associated with the 12 ounce can of soda. Further still, a 2 liter bottle of soda may be associated with a base having a ring, four or five pressure points, etc. that a pressure sensitive pad may detect as arranged in a pattern associated with a diameter typical of such a product. The 2 liter bottle of soda may be associated with a weight signal having a value higher than the weight signal associated with the 12 ounce can of soda and 16 ounce bottle of soda.

In the example of FIG. 8B, the different bottoms of product 853A and product 853B may be used to differentiate the products from each other. For example, detection elements such as pressure sensitive pads may be used to detect a product base shape and size (e.g., ring, pattern of points, asymmetric shape, base dimensions, etc.). Such a base shape and size may be used (optionally, together with one or more weight signals) to identify a particular product. The signals may also be used to identify and/or distinguish product types from one another. For example, a first type may include one category of product (such as soda cans) while a second type may include a different category of product (such as notepads). In another example, detection elements such as light detectors may be used to detect a product based on a pattern of light readings indicative of a product blocking at least part of the ambient light from reaching the light detectors. Such pattern of light readings may be used to identify product type and/or product category and/or product shape. For example, products of a first type may block a first subset of light frequencies of the ambient light from reaching the light detectors, while products of a second type may block a second subset of light frequencies of the ambient light from reaching the light detectors (the first subset and second subset may differ). In this case the type of the products may be determined based on the light frequencies reaching the light detectors. In another example, products of a first type may have a first shape of shades and therefore may block ambient light from reaching light detectors arranged in one shape, while products of a second type may have a second shape of shades and therefore may block ambient light from reaching light detectors arranged in another shape. In this case the type of the products may be determined based on the shape of blocked ambient light. Any of the pattern matching techniques described above may be used for the identification.

Additionally or alternatively, step 1010 may include using the at least one pattern to determine a number of products placed on the at least one area of the store shelf associated with the first subset of detection elements. For example, any of the pattern matching techniques described above may be used to identify the presence of one or more product types and then to determine the number of products of each product type (e.g., by detecting a number of similarly sized and shaped product bases and optionally by detecting weight signals associated with each detected base). In another example, an artificial neural network configured to determine the number of products of selected product types may be used to analyze the signals received by step 1005 (such as signals from pressure sensors, from light detectors, from contact sensors, and so forth) to determine the number of products of selected product types placed on an area of a shelf (such as an area of a shelf associated with the first subset of detection elements). In yet another example, a machine learning algorithm trained using training examples to determine the number of products of selected product types may be used to analyze the signals received by step 1005 (such as signals from pressure sensors, from light detectors, from contact sensors, and so forth) to determine the number of products of selected product types placed on an area of a shelf (such as an area of a shelf associated with the first subset of detection elements). Additionally or alternatively, step 1010 may include extrapolating from a stored pattern associated with a single product (or type of product) to determine the number of products matching the first signals. In such embodiments, step 1010 may further include determining, for example based on product dimension data stored in a memory, a number of additional products that can be placed on the at least one area of the store shelf associated with the second subset of detection elements. For example, step 1010 may include extrapolating based on stored dimensions of each product and stored dimensions of the shelf area to determine an area and/or volume available for additional products. Step 1010 may further include extrapolation of the number of additional products based on the stored dimensions of each product and determined available area and/or volume.

Method 1000 may include step 1015 of receiving second signals from a second subset of detection elements (e.g., detection elements 851A and 851B of FIG. 8B) from among the plurality of detection elements, the second signals being indicative of no products being placed on at least one area of the store shelf associated with the second subset of detection elements. Using this information, method 1000 may include step 1020 of using the second signals to determine at least one empty space on the store shelf. For example, any of the pattern matching techniques described above may be used to determine that the second signals include default values or other values indicative of a lack of product in certain areas associated with a retail store shelf. A default value may be include, for example, a pressure signal associated with an un-loaded pressure sensor or pressure sensitive mat, indicating that no product is located in a certain region of a shelf. In another example, a default value may include signals from light detectors corresponding to ambient light, indicating that no product is located in a certain region of a shelf.

Method 1000 may include step 1025 of determining, based on the at least one pattern associated with a detected product and the at least one empty space, at least one aspect of planogram compliance. As explained above with respect to FIGS. 8A and 8B, the aspect of planogram compliance may include the presence or absence of particular products (or brands), locations of products on the shelves, quantities of products within particular areas (e.g., identifying stacked or clustered products), facing directions associated with the products (e.g., whether a product is outward facing, inward facing, askew, or the like), or the like. A planogram compliance determination may be made, for example, by determining a number of empty spaces on a shelf and determining a location of the empty spaces on a shelf. The planogram determination may also include determining weight signal magnitudes associated with detected products at the various detected non-empty locations. This information may be used by the one or more processors in determining whether a product facing specification has been satisfied (e.g., whether a front edge of a shelf has a suitable number of products or suitable density of products), whether a specified stacking density has been achieved (e.g., by determining a pattern of detected products and weight signals of the detected products to determine how many products are stacked at each location), whether a product density specification has been achieved (e.g., by determining a ratio of empty locations to product-present locations), whether products of a selected product type are located in a selected area of the shelf, whether all products located in a selected area of the shelf are of a selected product type, whether a selected number of products (or a selected number of products of a selected product type) are located in a selected area of the shelf, whether products located in a selected area of a shelf are positioned in a selected orientation, or whether any other aspect of one or more planograms has been achieved.

For example, the at least one aspect may include product homogeneity, and step 1025 may further include counting occurrences where a product of the second type is placed on an area of the store shelf associated with the first type of product. For example, by accessing a memory including base patterns (or any other type of pattern associated with product types, such as product models), the at least one processor may detect different products and product types. A product of a first type may be recognized based on a first pattern, and product of a second type may be recognized based on a second, different pattern (optionally also based on weight signal information to aid in differentiating between products). Such information may be used, for example, to monitor whether a certain region of a shelf includes an appropriate or intended product or product type. Such information may also be useful in determining whether products or product types have been mixed (e.g., product homogeneity). Regarding planogram compliance, detection of different products and their relative locations on a shelf may aid in determining whether a product homogeneity value, ratio, etc. has been achieved. For example, the at least one processor may count occurrences where a product of a second type is placed on an area of the store shelf associated with a product of a first type.

Additionally or alternatively, the at least one aspect of planogram compliance may include a restocking rate, and step 1025 may further include determining the restocking rate based on a sensed rate at which products are added to the at least one area of the store shelf associated with the second subset of detection elements. Restocking rate may be determined, for example, by monitoring a rate at which detection element signals change as products are added to a shelf (e.g., when areas of a pressure sensitive pad change from a default value to a product-present value).

Additionally or alternatively, the at least one aspect of planogram compliance may include product facing, and step 1025 may further include determining the product facing based on a number of products determined to be placed on a selected area of the store shelf at a front of the store shelf. Such product facing may be determined by determining a number of products along a certain length of a front edge of a store shelf and determining whether the number of products complies with, for example, a specified density of products, a specified number of products, and so forth.

Step 1025 may further include transmitting an indicator of the at least one aspect of planogram compliance to a remote server. For example, as explained above with respect to FIGS. 8A and 8B, the indicator may comprise a data packet, a data file, or any other data structure indicating any variations from a planogram, e.g., with respect to product (or brand) placement, product facing direction, or the like. The remote server may include one or more computers associated with a retail store (e.g., so planogram compliance may be determined on a local basis within a particular store), one or more computers associated with a retail store evaluation body (e.g., so planogram compliance may be determined across a plurality of retail stores), one or more computers associated with a product manufacturer, one or more computers associated with a supplier (such as supplier 115), one or more computers associated with a market research entity (such as market research entity 110), etc.

Method 1000 may further include additional steps. For example, method 1000 may include identifying a change in at least one characteristic associated with one or more of the first signals (e.g., signals from a first group or type of detection elements), and in response to the identified change, triggering an acquisition of at least one image of the store shelf. The acquisition may be implemented by activating one or more of capturing devices 125 of FIGS. 4A-4C, as explained above. For example, the change in at least one characteristic associated with one or more of the first signals may be indicative of removal of at least one product from a location associated with the at least one area of the store shelf associated with the first subset of detection elements. Accordingly, method 1000 may include triggering the acquisition to determine whether restocking, reorganizing, or other intervention is required, e.g., to improve planogram compliance. Thus, method 1000 may include identifying a change in at least one characteristic associated with one or more of the first signals; and in response to the identified change, trigger a product-related task for an employee of the retail store.

Additionally or alternatively, method 1000 may be combined with method 1050 of FIG. 10B, described below, such that step 1055 is performed any time after step 1005.

Figure 10B:
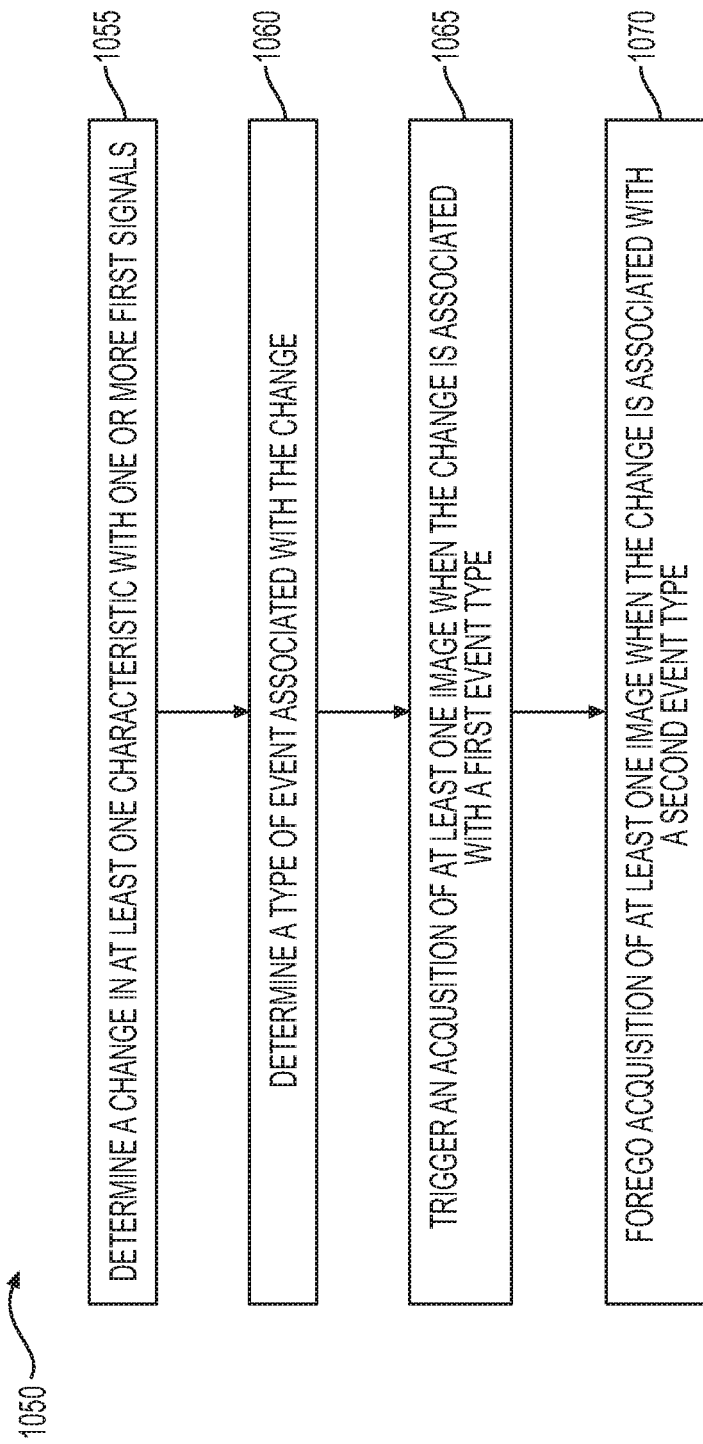
FIG. 10B is illustrates an exemplary method for triggering image acquisition based on product events on a store shelf, consistent with the present disclosure.

FIG. 10B is a flow chart, illustrating an exemplary method 1050 for triggering image capture of a store shelf, in accordance with the presently disclosed subject matter. It is contemplated that method 1050 may be used in conjunction with any of the detection element arrays discussed above with reference to, for example, FIGS. 8A, 8B and 9. The order and arrangement of steps in method 1050 is provided for purposes of illustration. As will be appreciated from this disclosure, modifications may be made to process 1050, for example, adding, combining, removing, and/or rearranging one or more steps of process 1050.

Method 1050 may include a step 1055 of determining a change in at least one characteristic associated with one or more first signals. For example, the first signals may have been captured as part of method 1000 of FIG. 10A, described above. For example, the first signals may include pressure readings when the plurality of detection elements includes pressure sensors, contact information when the plurality of detection elements includes contact sensors, light readings when the plurality of detection elements includes light detectors (for example, from light detectors configured to be placed adjacent to (or located on) a surface of a store shelf configured to hold products, as described above), and so forth.

Method 1050 may include step 1060 of using the first signals to identify at least one pattern associated with a product type of the plurality of products. For example, any of the pattern matching techniques described above with respect to FIGS. 8A, 8B, and step 1010 may be used for identification.

Method 1050 may include step 1065 of determining a type of event associated with the change. For example, a type of event may include a product removal, a product placement, movement of a product, or the like.

Method 1050 may include step 1070 of triggering an acquisition of at least one image of the store shelf when the change is associated with a first event type. For example, a first event type may include removal of a product, moving of a product, or the like, such that the first event type may trigger a product-related task for an employee of the retail store depending on analysis of the at least one image. The acquisition may be implemented by activating one or more of capturing devices 125 of FIGS. 4A-4C, as explained above. In some examples, the triggered acquisition may include an activation of at least one projector (such as projector 632). In some examples, the triggered acquisition may include acquisition of color images, depth images, stereo images, active stereo images, time of flight images, LIDAR images, RADAR images, and so forth.

Method 1050 may include a step (not shown) of forgoing the acquisition of at least one image of the store shelf when the change is associated with a second event type. For example, a second event type may include replacement of a removed product by a customer, stocking of a shelf by an employee, or the like. As another example, a second event type may include removal, placement, or movement of a product that is detected within a margin of error of the detection elements and/or detected within a threshold (e.g., removal of only one or two products; movement of a product by less than 5 cm, 20 cm, or the like; moving of a facing direction by less than 10 degrees; or the like), such that no image acquisition is required.

Figure 11A:
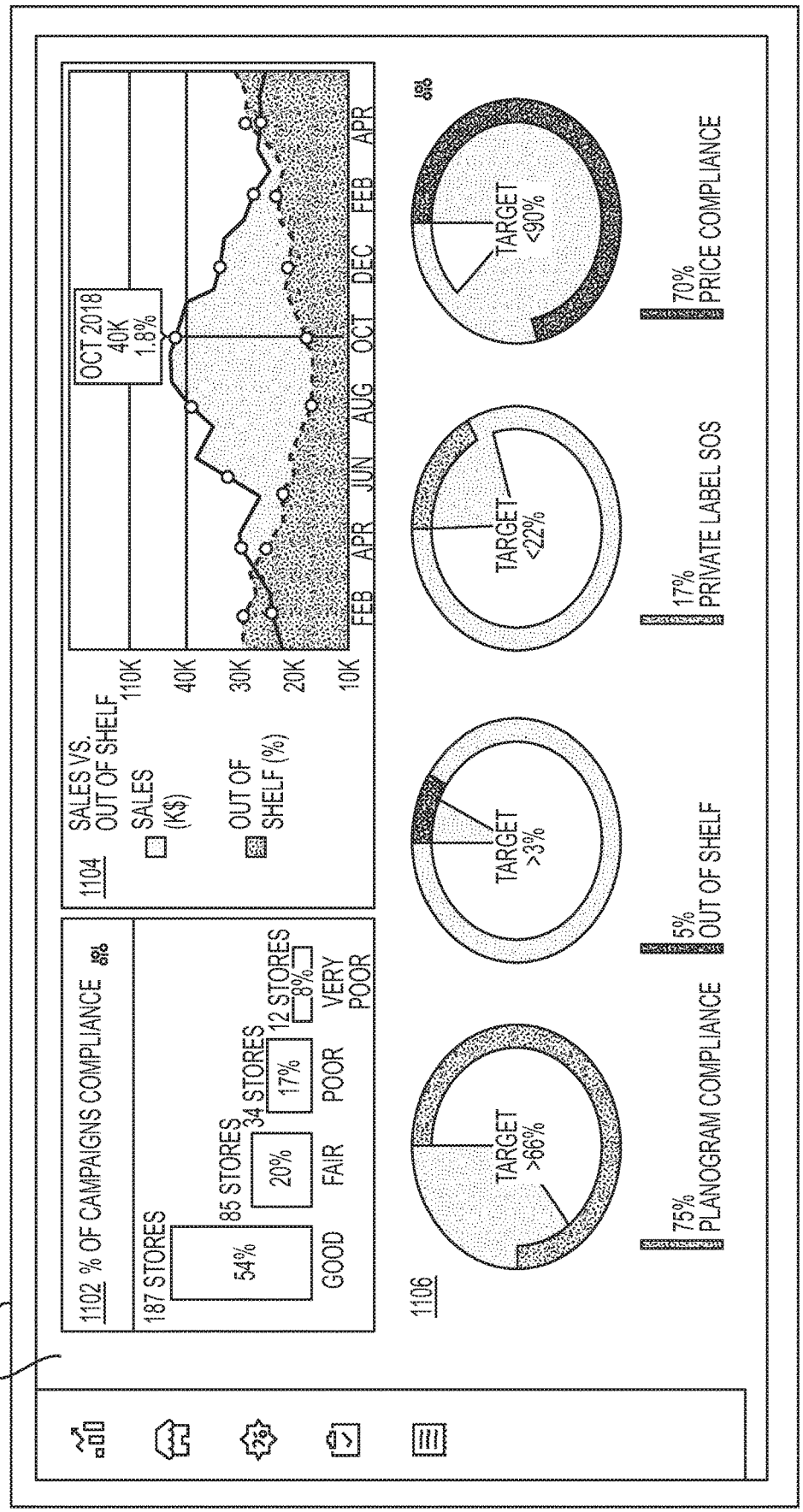
FIG. 11A is a schematic illustration of an example output for a market research entity associated with the retail store, consistent with the present disclosure.
Figure 11B:
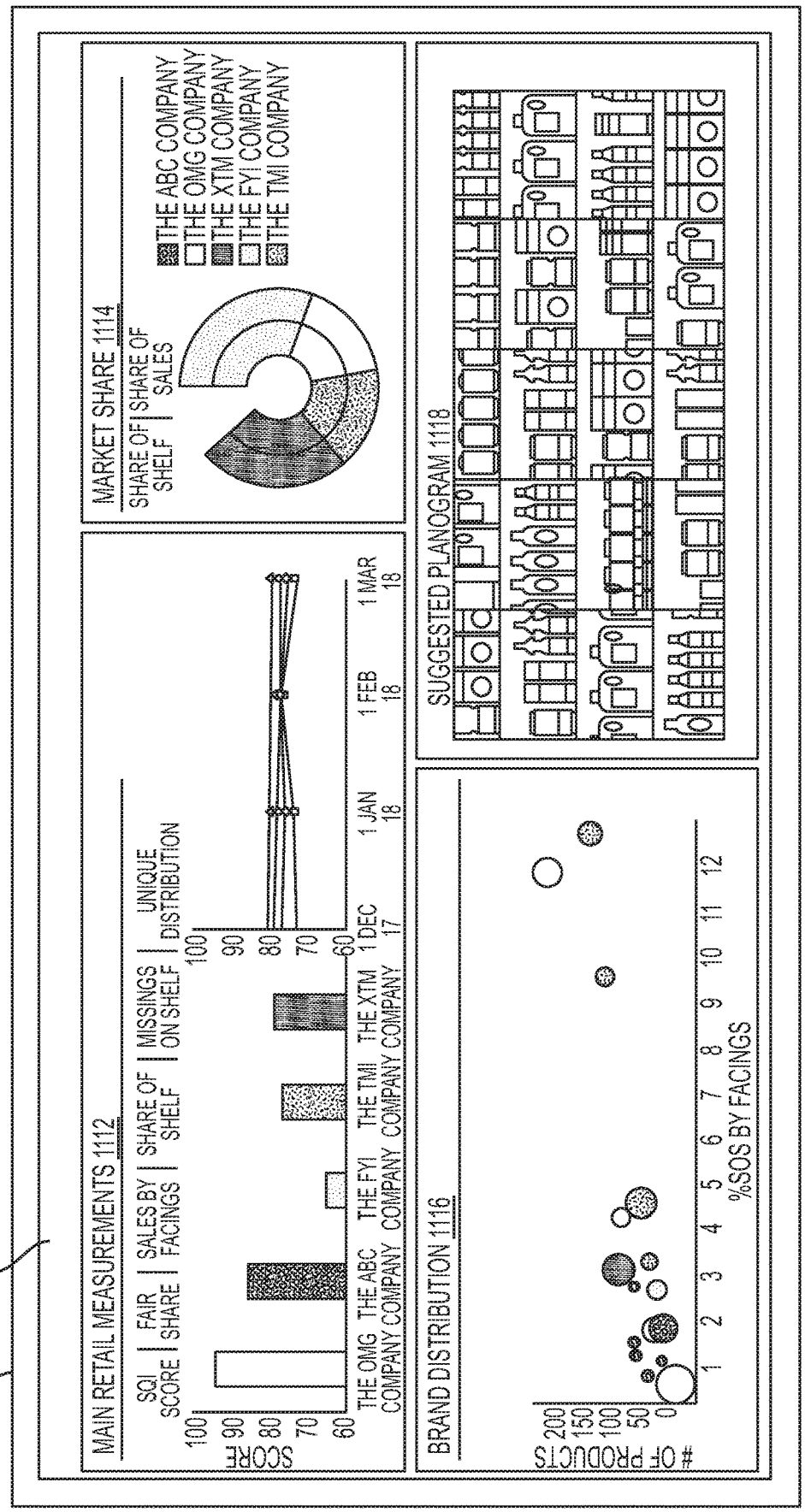
FIG. 11B is a schematic illustration of an example output for a supplier of the retail store, consistent with the present disclosure.
Figure 11C:
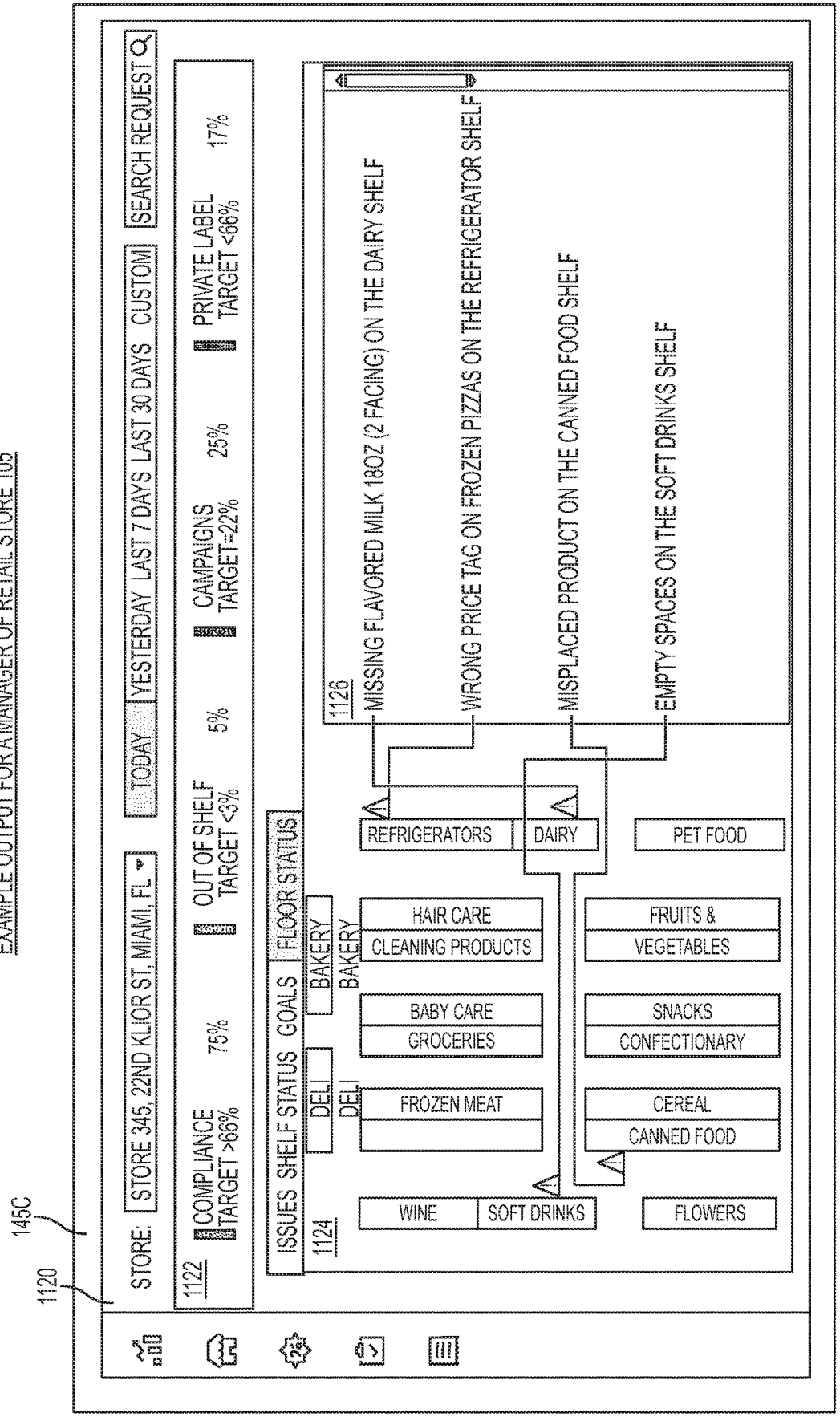
FIG. 11C is a schematic illustration of an example output for a manager of the retail store, consistent with the present disclosure.
Figure 11D:
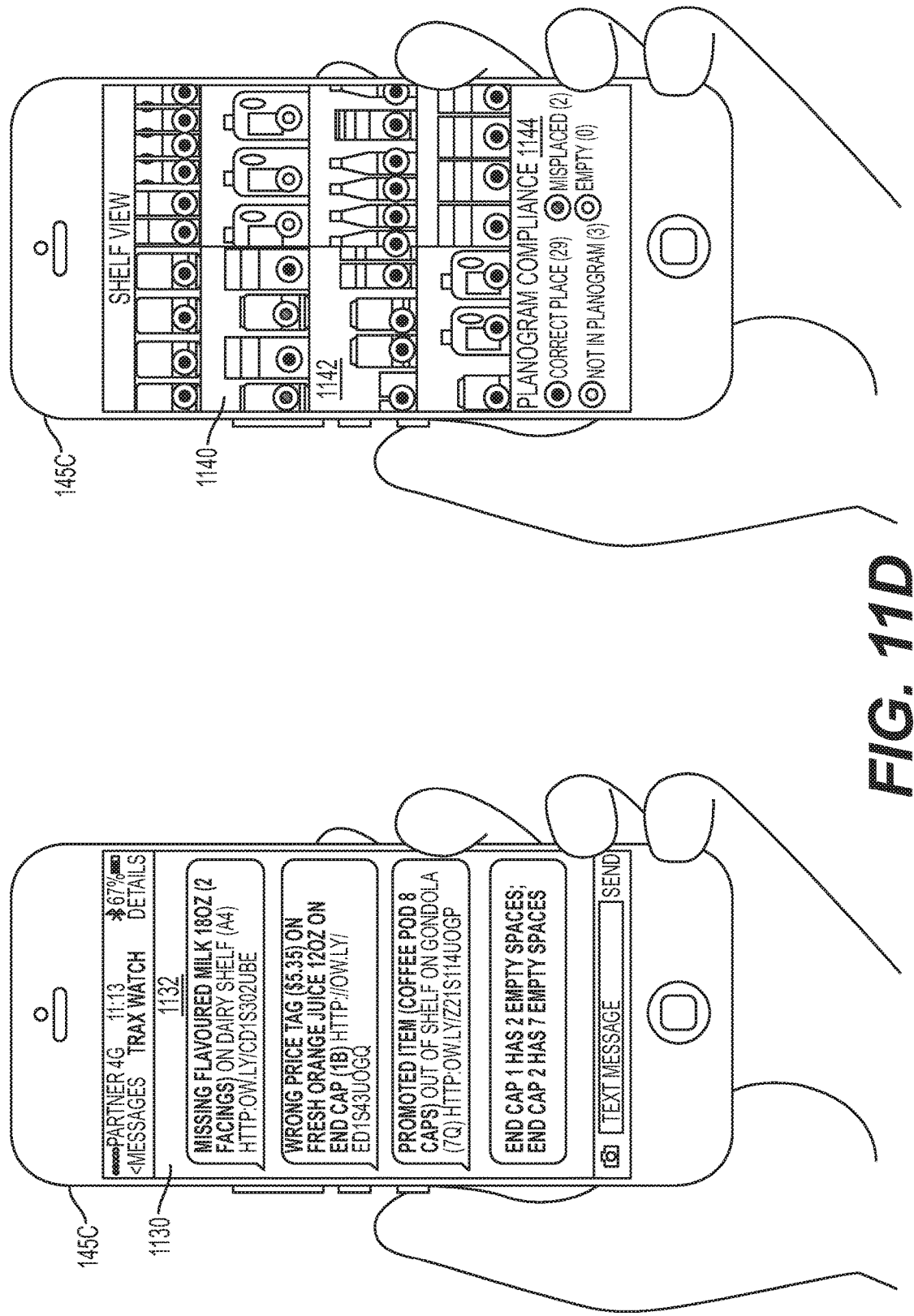
FIG. 11D is a schematic illustration of two examples outputs for an employee of the retail store, consistent with the present disclosure.
Figure 11E:
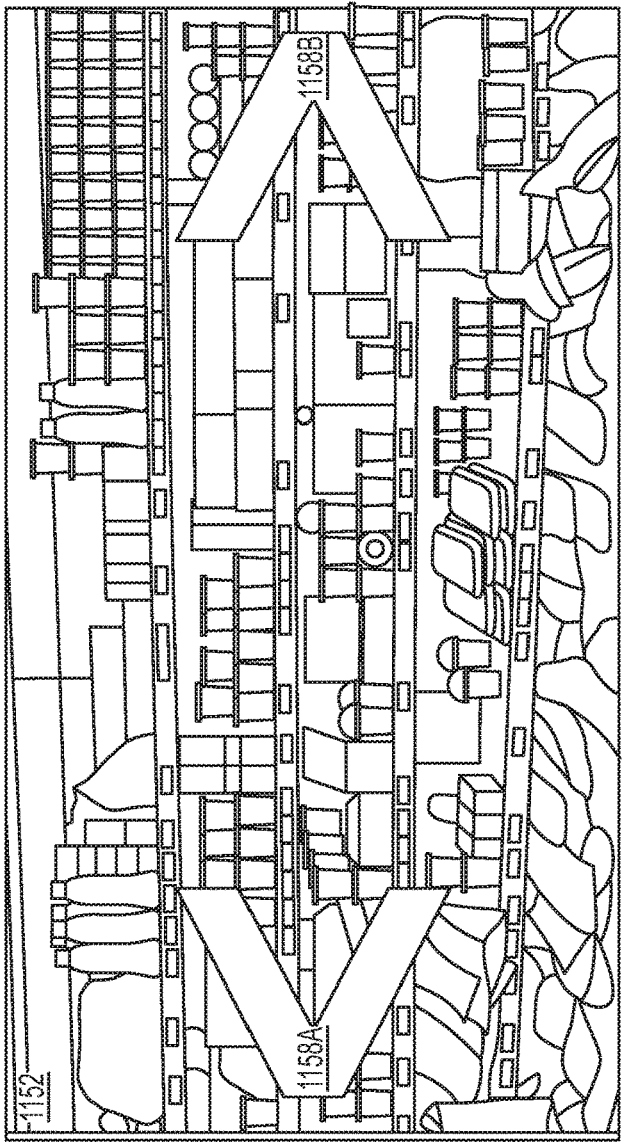
FIG. 11E is a schematic illustration of an example output for an online customer of the retail store, consistent with the present disclosure.

FIGS. 11A-11E illustrate example outputs based on data automatically derived from machine processing and analysis of images captured in retail store 105 according to disclosed embodiments. FIG. 11A illustrates an optional output for market research entity 110. FIG. 11B illustrates an optional output for supplier 115. FIGS. 11C and 11D illustrate optional outputs for employees of retail store 105. And FIG. 11E illustrates optional outputs for user 120.

FIG. 11A illustrates an example graphical user interface (GUI) 500 for output device 145A, representative of a GUI that may be used by market research entity 110. Consistent with the present disclosure, market research entity 110 may assist supplier 115 and other stakeholders in identifying emerging trends, launching new products, and/or developing merchandising and distribution plans across a large number of retail stores 105. By doing so, market research entity 110 may assist supplier 115 in growing product presence and maximizing or increasing new product sales. As mentioned above, market research entity 110 may be separated from or part of supplier 115. To successfully launch a new product, supplier 115 may use information about what really happens in retail store 105. For example, supplier 115 may want to monitor how marketing plans are being executed and to learn what other competitors are doing relative to certain products or product types. Embodiments of the present disclosure may allow market research entity 110 and suppliers 115 to continuously monitor product-related activities at retail stores 105 (e.g., using system 100 to generate various metrics or information based on automated analysis of actual, timely images acquired from the retail stores). For example, in some embodiments, market research entity 110 may track how quickly or at what rate new products are introduced to retail store shelves, identify new products introduced by various entities, assess a supplier's brand presence across different retail stores 105, among many other potential metrics.

In some embodiments, server 135 may provide market research entity 110 with information including shelf organization, analysis of skew productivity trends, and various reports aggregating information on products appearing across large numbers of retail stores 105. For example, as shown in FIG. 11A, GUI 1100 may include a first display area 1102 for showing a percentage of promotion campaign compliance in different retail stores 105. GUI 1100 may also include a second display area 1104 showing a graph illustrating sales of a certain product relative to the percentage of out of shelf. GUI 1100 may also include a third display area 1106 showing actual measurements of different factors relative to target goals (e.g., planogram compliance, restocking rate, price compliance, and other metrics). The provided information may enable market research entity 110 to give supplier 115 informed shelving recommendations and fine-tune promotional strategies according to in-store marketing trends, to provide store managers with a comparison of store performances in comparison to a group of retail stores 105 or industry wide performances, and so forth.

FIG. 11B illustrates an example GUI 1110 for output device 145B used by supplier 115. Consistent with the present disclosure, server 135 may use data derived from images captured in a plurality of retail stores 105 to recommend a planogram, which often determines sales success of different products. Using various analytics and planogram productivity measures, server 135 may help supplier 115 to determine an effective planogram with assurances that most if not all retail stores 105 can execute the plan. For example, the determined planogram may increase the probability that inventory is available for each retail store 105 and may be designed to decrease costs or to keep costs within a budget (such as inventory costs, restocking costs, shelf space costs, etc.). Server 135 may also provide pricing recommendations based on the goals of supplier 115 and other factors. In other words, server 135 may help supplier 115 understand how much room to reserve for different products and how to make them available for favorable sales and profit impact (for example, by choosing the size of the shelf dedicated to a selected product, the location of the shelf, the height of the shelf, the neighboring products, and so forth). In addition, server 135 may monitor near real-time data from retail stores 105 to determine or confirm that retail stores 105 are compliant with the determined planogram of supplier 115. As used herein, the term "near real-time data," in the context of this disclosure, refers to data acquired or generated, etc., based on sensor readings and other inputs (such as data from image sensors, audio sensors, pressure sensors, checkout stations, etc.) from retail store 105 received by system 100 within a predefined period of time (such as time periods having durations of less than a second, less than a minute, less than an hour, less than a day, less than a week, etc.).

In some embodiments, server 135 may generate reports that summarize performance of the current assortment and the planogram compliance. These reports may advise supplier 115 of the category and the item performance based on individual SKU, sub segments of the category, vendor, and region. In addition, server 135 may provide suggestions or information upon which decisions may be made regarding how or when to remove markdowns and when to replace underperforming products. For example, as shown in FIG. 11B, GUI 1110 may include a first display area 1112 for showing different scores of supplier 115 relative to scores associated with its competitors. GUI 1110 may also include a second display area 1114 showing the market share of each competitor. GUI 1110 may also include a third display area 1116 showing retail measurements and distribution of brands. GUI 1110 may also include a fourth display area 1118 showing a suggested planogram. The provided information may help supplier 115 to select preferred planograms based on projected or observed profitability, etc., and to ensure that retail stores 105 are following the determined planogram.

FIGS. 11C and 11D illustrate example GUIs for output devices 145C, which may be used by employees of retail store 105. FIG. 11C depicts a GUI 1120 for a manager of retail store 105 designed for a desktop computer, and FIG. 11D depicts GUI 1130 and 1140 for store staff designed for a handheld device. In-store execution is one of the challenges retail stores 105 have in creating a positive customer experience. Typical in-store execution may involve dealing with ongoing service events, such as a cleaning event, a restocking event, a rearrangement event, and more. In some embodiments, system 100 may improve in-store execution by providing adequate visibility to ensure that the right products are located at preferred locations on the shelf. For example, using near real-time data (e.g., captured images of store shelves) server 135 may generate customized online reports. Store managers and regional managers, as well as other stakeholders, may access custom dashboards and online reports to see how in-store conditions (such as, planogram compliance, promotion compliance, price compliance, etc.) are affecting sales. This way, system 100 may enable managers of retail stores 105 to stay on top of burning issues across the floor and assign employees to address issues that may negatively impact the customer experience.

In some embodiments, server 135 may cause real-time automated alerts when products are out of shelf (or near out of shelf), when pricing is inaccurate, when intended promotions are absent, and/or when there are issues with planogram compliance, among others. In the example shown in FIG. 11C, GUI 1120 may include a first display area 1122 for showing the average scores (for certain metrics) of a specific retail store 105 over a selected period of time. GUI 1120 may also include a second display area 1124 for showing a map of the specific retail store 105 with real-time indications of selected in-store execution events that require attention, and a third display area 1126 for showing a list of the selected in-store execution events that require attention. In another example, shown in FIG. 11D, GUI 1130 may include a first display area 1132 for showing a list of notifications or text messages indicating selected in-store execution events that require attention. The notifications or text messages may include a link to an image (or the image itself) of the specific aisle with the in-store execution event. In another example, shown in FIG. 11D, GUI 1140 may include a first display area 1142 for showing a display of a video stream captured by output device 145C (e.g., a real-time display or a near real-time display) with augmented markings indicting a status of planogram compliance for each product (e.g., correct place, misplaced, not in planogram, empty, and so forth). GUI 1140 may also include a second display area 1144 for showing a summary of the planogram compliance for all the products identified in the video stream captured by output device 145C. Consistent with the present disclosure, server 135 may generate within minutes actionable tasks to improve store execution. These tasks may help employees of retail store 105 to quickly address situations that can negatively impact revenue and customer experience in the retail store 105.

FIG. 11E illustrates an example GUI 1150 for output device 145D used by an online customer of retail store 105. Traditional online shopping systems present online customers with a list of products. Products selected for purchase may be placed into a virtual shopping cart until the customers complete their virtual shopping trip. Virtual shopping carts may be examined at any time, and their contents can be edited or deleted. However, common problems of traditional online shopping systems arise when the list of products on the website does not correspond with the actual products on the shelf. For example, an online customer may order a favorite cookie brand without knowing that the cookie brand is out-of-stock. Consistent with some embodiments, system 100 may use image data acquired by capturing devices 125 to provide the online customer with a near real-time display of the retail store and a list of the actual products on the shelf based on near real-time data. In one embodiment, server 135 may select images without occlusions in the field of view (e.g., without other customers, carts, etc.) for the near real-time display. In one embodiment, server 135 may blur or erase depictions of customers and other people from the near real-time display. As used herein, the term "near real-time display," in the context of this disclosure, refers to image data captured in retail store 105 that was obtained by system 100 within a predefined period of time (such as less than a second, less than a minute, less than about 30 minutes, less than an hour, less than 3 hours, or less than 12 hours) from the time the image data was captured.

Consistent with the present disclosure, the near real-time display of retail store 105 may be presented to the online customer in a manner enabling easy virtual navigation in retail store 105. For example, as shown in FIG. 11E, GUI 1150 may include a first display area 1152 for showing the near real-time display and a second display area 1154 for showing a product list including products identified in the near real-time display. In some embodiments, first display area 1152 may include different GUI features (e.g., tabs 1156) associated with different locations or departments of retail store 105. By selecting each of the GUI features, the online customer can virtually jump to different locations or departments in retail store 105. For example, upon selecting the "bakery" tab, GUI 1150 may present a near real-time display of the bakery of retail store 105. In addition, first display area 1152 may include one or more navigational features (e.g., arrows 1158A and 1158B) for enabling the online customer to virtually move within a selected department and/or virtually walk through retail store 105. Server 135 may be configured to update the near real-time display and the product list upon determining that the online customer wants to virtually move within retail store 105. For example, after identifying a selection of arrow 1158B, server 135 may present a different section of the dairy department and may update the product list accordingly. In another example, server 135 may update the near-real time display and the product list in response to new captured images and new information received from retail store 105. Using GUI 1150, the online customer may have the closest shopping experience without actually being in retail store 105. For example, an online customer can visit the vegetable department and decide not to buy tomatoes after seeing that they are not ripe enough.

Figure 12:
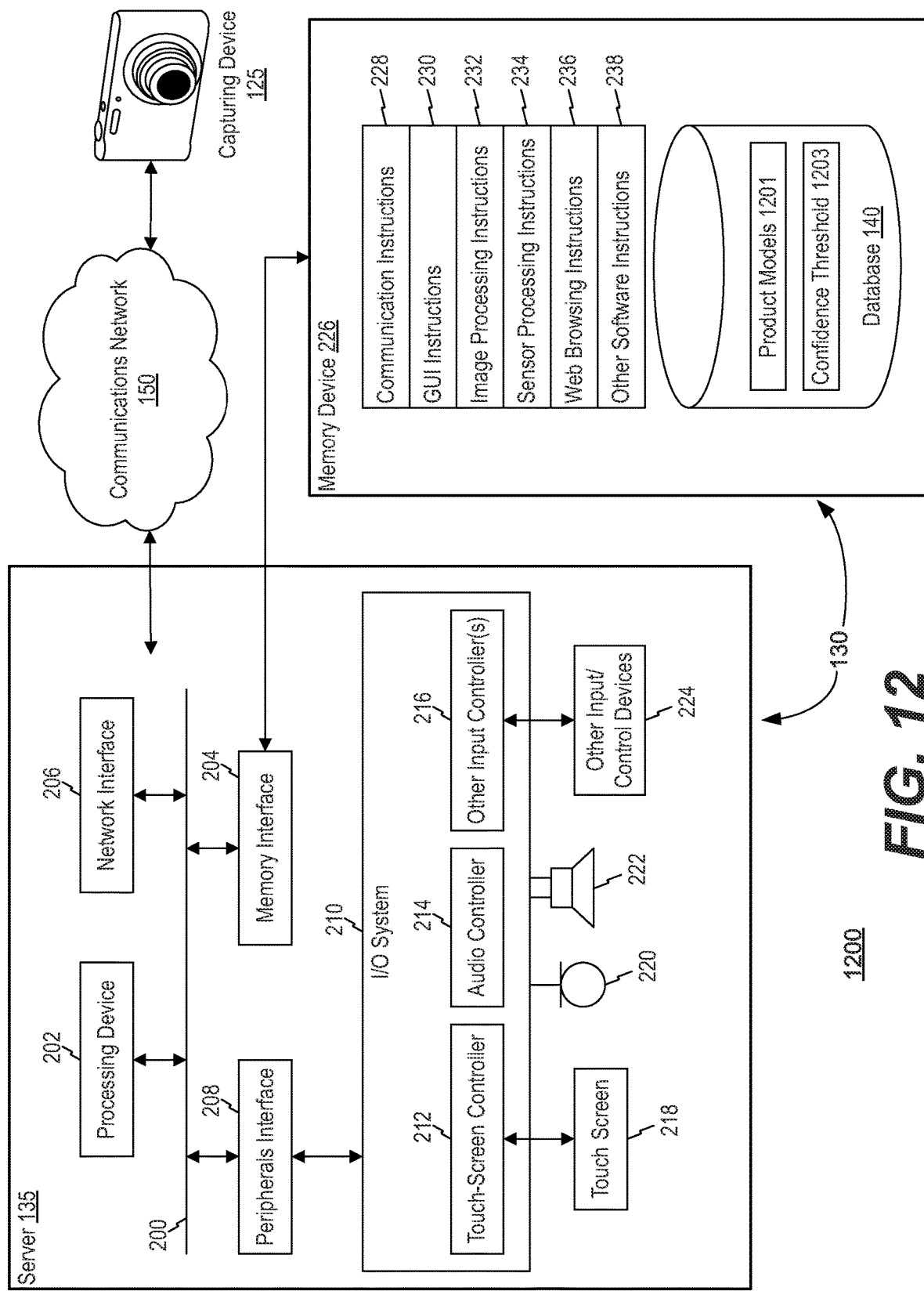
FIG. 12 is a block diagram that illustrates exemplary components of an image processing system, consistent with the present disclosure.

The present disclosure relates to a system for processing images captured in a retail store. According to the present disclosure, the system may include at least one processor. While the present disclosure provides examples of the system, it should be noted that aspects of the disclosure in their broadest sense, are not limited to a system for processing images. Rather, the system may be configured to process information collected from a retail store. System 1200, illustrated in FIG. 12, is one example of a system for processing images captured in a retail store, in accordance with the present disclosure.

System 1200 may include an image processing unit 130. Image processing unit 130 may include server 135 operatively connected to database 140. Image processing unit 130 may include one or more servers connected by network 150. The one or more servers 135 may include processing device 202, which may include one or more processors as discussed above. While the present disclosure provides examples of processors, it should be noted that aspects of the disclosure in their broadest sense, are not limited to the disclosed processors.

System 1200 may include or be connected to network 150. Network 150 may facilitate communications and data exchange between different system components, such as, server 135, when these components are coupled to network 150 to enable output of data derived from the images captured by the one or more capturing devices 125. Other devices may also be coupled to network 150.

Server 135 may include a bus (or any other communication mechanism) that interconnects subsystems and components for transferring information within server 135. For example, as shown in FIG. 12, server 135 may include bus 200. Bus 200 may interconnect processing device 202, memory interface 204, network interface 206, and peripherals interface 208 connected to I/O system 210. Processing device 202 may include at least one processor configured to execute computer programs, applications, methods, processes, or other software to execute particular instructions associated with embodiments described in the present disclosure.

Consistent with the present disclosure, the methods and processes disclosed herein may be performed by server 135 as a result of processing device 202 executing one or more sequences of one or more instructions contained in a non-transitory computer-readable storage medium. As used herein, a non-transitory computer-readable storage medium refers to any type of physical memory on which information or data readable by at least one processor can be stored.

Server 135 may also include peripherals interface 208 coupled to bus 200. Peripherals interface 208 may be connected to sensors, devices, and subsystems to facilitate multiple functionalities. In one embodiment, peripherals interface 208 may be connected to I/O system 210 configured to receive signals or input from devices and provide signals or output to one or more devices that allow data to be received and/or transmitted by server 135. In one embodiment I/O system 210 may include or be associated with output device 145. For example, I/O system 210 may include a touch screen controller 212, an audio controller 214, and/or other input controller(s) 216. Touch screen controller 212 may be coupled to a touch screen 218. Touch screen 218 and touch screen controller 212 can, for example, detect contact, movement, or break thereof using any of a plurality of touch sensitivity technologies, including but not limited to capacitive, resistive, infrared, and surface acoustic wave technologies as well as other proximity sensor arrays or other elements for determining one or more points of contact with touch screen 218. Touch screen 218 can also, for example, be used to implement virtual or soft buttons and/or a keyboard. While touch screen 218 is shown in FIG. 12, I/O system 210 may include a display screen (e.g., CRT or LCD) in place of touch screen 218. Audio controller 214 may be coupled to a microphone 220 and a speaker 222 to facilitate voice-enabled functions, such as voice recognition, voice replication, digital recording, and telephony functions. The other input controller(s) 216 may be coupled to other input/control devices 224, such as one or more buttons, rocker switches, thumb-wheel, infrared port, USB port, and/or a pointer device such as a stylus. While the present disclosure provides examples of peripherals, it should be noted that aspects of the disclosure in their broadest sense, are not limited to the disclosed peripherals.

In some embodiments, server 135 may be configured to display an image to a user using I/O system 210 (e.g., a display screen). Processing device 202 may be configured to send the image data to I/O system 210 using bus 200 and peripherals interface 208.

Figure 13A:
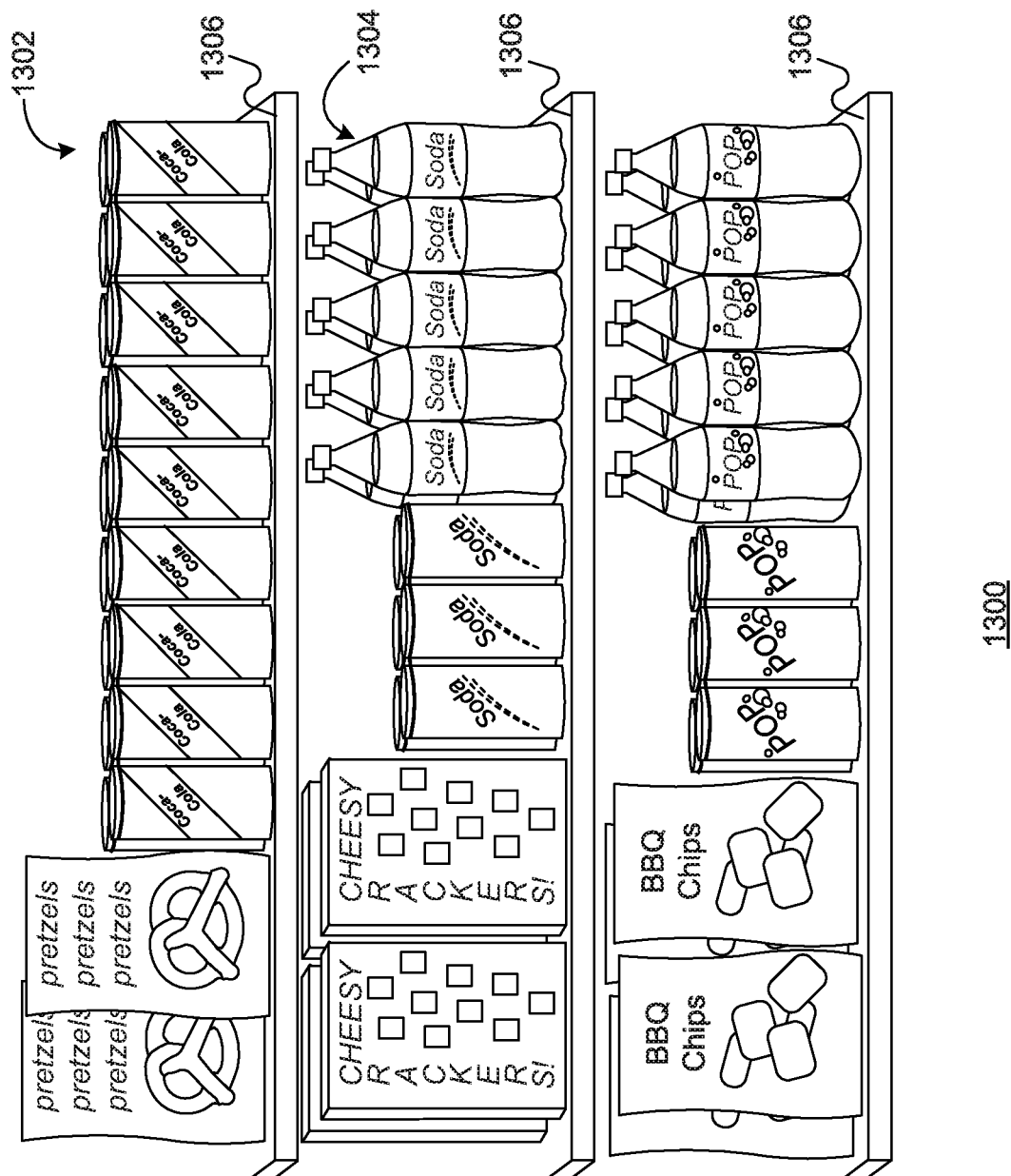
FIG. 13A is an exemplary image received by the system, consistent with the present disclosure.

In some embodiments, server 135 may be configured to interact with one or more users using I/O interface system 210, touch screen 218, microphone 220, speaker 222 and/or other input/control devices 224. From the interaction with the users, server 135 may be configured to receive input from the users. For example, a user may enter inputs by clicking on touch screen 218, by typing on a keyboard, by speaking to microphone 220, and/or inserting USB driver to a USB port. In some embodiments, the inputs may include an indication of a type of products, such as, "Coca-Cola Zero," "Head & Shoulders Shampoo," or the like. In some embodiments, the inputs may include an image that depicts products of different type displaying on one or more shelves, as illustrated in FIG. 13A; and/or an image that depicts a type of product displayed on a shelf or a part of a shelf, as described in FIG. 13B.

In one embodiment, memory device 226 may store data in database 140. Database 140 may include one or more memory devices that store data and instructions used to perform one or more features of the disclosed embodiments. In some embodiments, database 140 may be configured to store product models. The data for each product model may be stored as rows in tables or in other ways. In some embodiments, database 140 may be configured to update at least one product model. Updating a group of product models may comprise deleting or deactivating some data in the models. For example, image processing unit 130 may delete some images in the product models in database 140, and store other images for replacement. While the present disclosure provides examples of databases, it should be noted that aspects of the disclosure in their broadest sense, are not limited to the disclosed databases.

Database 140 may include product models 1201, confidence thresholds 1203, and some other data. Product models 1201 may include product type model data 240 (e.g., an image representation, a list of features, and more) that may be used to identify products in received images. In some embodiments, product models 1201 may include visual characteristics associated with a type of product (e.g., size, shape, logo, text, color, etc.). Consistent with the present disclosure, database 140 may be configured to store confidence threshold 1203, which may denote a reference value, a level, a point, or a range of values. In some embodiments, database 140 may store contextual information associated with a type of product. In other embodiments of the disclosure, database 140 may store additional types of data or fewer types of data. Furthermore, various types of data may be stored in one or more memory devices other than memory device 226. While the present disclosure provides examples of product models, it should be noted that aspects of the disclosure in their broadest sense, are not limited to the disclosed product models.

Consistent with the present disclosure, the at least one processor may be configured to access a database storing a group of product models, each product model may relate to at least one product in the retail store. The group of product models may correspond to a plurality of product types in the retail store. For example, server 135 may be configured to access database 140 directly or via network 150. In some embodiments, sever 135 may be configured to store/retrieve data stored in database 140. For example, server 135 may be configured to store/retrieve a group of product models. Consistent with the present embodiment, "product model" refers to any type of algorithm or stored product data that a processor can access or execute to enable the identification of a particular product associated with the product model. For example, the product model may include a description of visual and contextual properties of the particular product (e.g., the shape, the size, the colors, the texture, the brand name, the price, the logo, text appearing on the particular product, the shelf associated with the particular product, adjacent products in a planogram, the location within the retail store, etc.). In another example, the product model may include exemplary images of the product or products. In yet another example, the product model may include parameters of an artificial neural network configured to identify particular products. In another example, the product model may include parameters of an image convolution function. In yet another example, the product model may include support vectors that may be used by a Support Vector Machine to identify products. In another example, the product models may include parameters of a machine learning model trained by a machine learning algorithm using training examples to identify products. In some embodiments, a single product model may be used by server 135 to identify more than one product. In some embodiments, two or more product models may be used in combination to enable identification of a product. For example, a first product model may be used by server 135 to identify a product type or category (e.g., shampoo, soft drinks, etc.) (such models may apply to multiple products), while one or more other product models may enable identification of a particular product (e.g., 6-pack of 16 oz Coca-Cola Zero). In some cases, such product models may be applied together (e.g., in series, in parallel, as a cascade of classifiers, as a tree of classifiers, and/or as an ensemble of classifiers, etc.) to enable product identification.

Consistent with the present disclosure, the at least one processor may be configured to receive at least one image depicting at least part of at least one store shelf having a plurality of products of a same type displayed thereon. For example, image processing unit 130 may receive raw or processed data from capturing device 125 via respective communication links, and provide information to different system components using a network 150. In some embodiments, image processing unit 130 may receive data from an input device, such as, hard disks or CD ROM, or other forms of RAM or ROM, USB media, DVD, Blu-ray, or other optical drive media, or the like. For example, the data may include an image file (e.g., JPG, JPEG, JFIF, TIFF, PNG, BAT, BMG, or the like).

FIG. 13A is an exemplary image 1300 received by the system, consistent with the present disclosure. Image 1300 illustrates multiple shelves 1306 with many different types of product displayed thereon. A type of product may refer to identical product items, such as, "Coca-Cola Zero 330 ml," "Pepsi 2 L," "pretzels family size packet," or the like. In some aspects, a type of product may be a product category, such as, snacks, soft drinks, personal care products, foods, fruits, or the like. In some aspects, a type of product may include a product brand, such as, "Coca-Cola," "Pepsi," and the like. In some aspects, a type of product may include products having similar visual characteristics, such as, "can," "packet," "bottle." For example, a "can" type of product may include "can of Coca-Cola Zero," "can of Sprite," "can of Pepsi," and the like. A "packet" type of product may include "packet of pretzels," "packet of chips," "packet of crackers", and the like. Further, a "bottle" type of products may include "bottle of water," "bottle of soda," "bottle of Sprite," etc. In some aspects, a type of product may include products having the same content but not the same size. For example, a "Coca-Cola Zero" type of product may include "Coca-Cola Zero 330 ml," "Coca-Cola Zero 2 L," "can of Coca-Cola Zero," or the like. For example, in FIG. 13A, image 1300 illustrates three shelves 1306 with eight different types of products 1302, 1304, etc. displayed on shelves 1306. After receiving the image, server 135 may be configured to distinguish the different types of products and determine that eight different types of products are included in the image. Based on image analysis described above, server 135 may divide image 1300 into eight segmentations, each including a type of products. Based on image analysis and the group of product models, server 135 may recognize the eight types of products, such as, "Soda 330 ml," "Soda 2 L" "Cola 330 ml," "POP 2 L," "POP 330 ml," "pretzels," "Cheesy Crackers," and "BBQ chips." In some aspects, based on image analysis, server 135 may divide image 1300 into three segmentations, each including a type of product, such as for example, "packages of snacks," "cans of soft drinks," and "bottles of soft drinks."

Figure 13B:
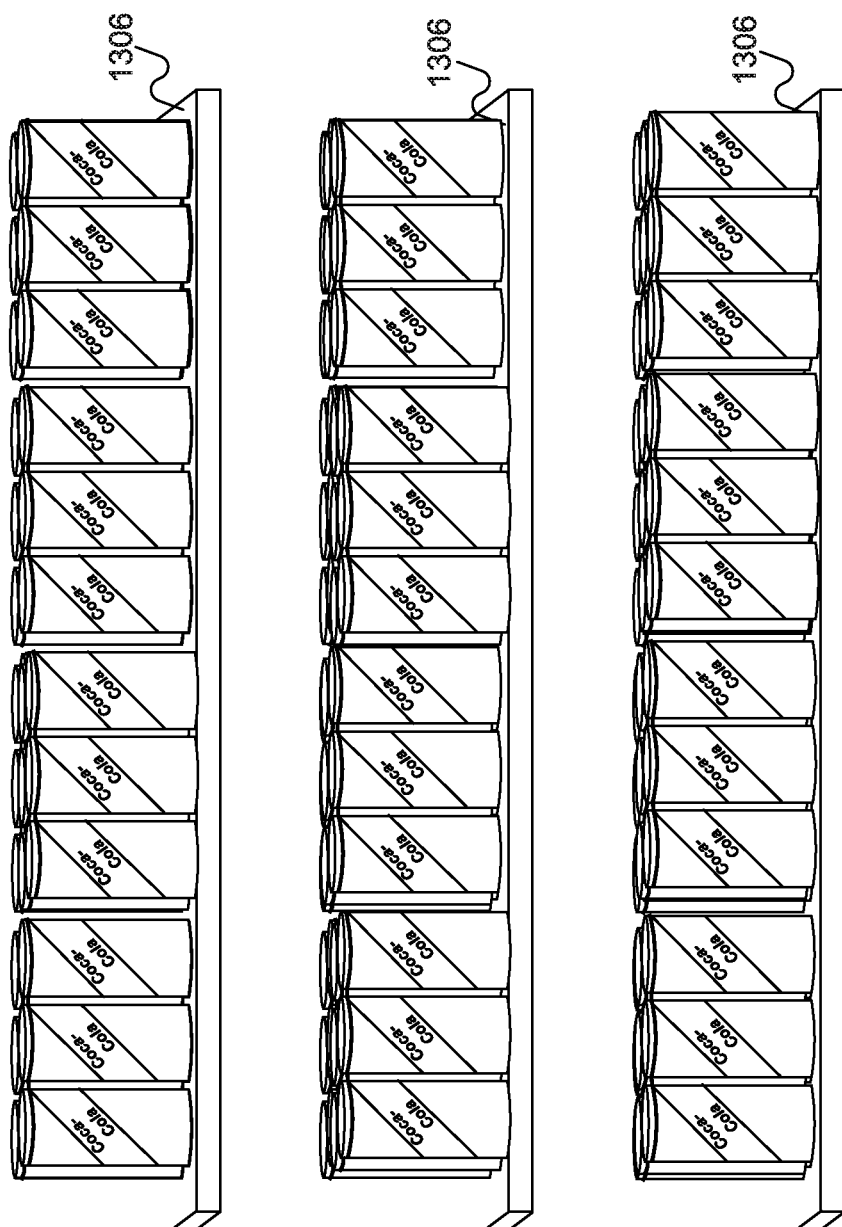
FIG. 13B is another exemplary image received by the system, consistent with the present disclosure.

FIG. 13B illustrates another exemplary image 1310 received by the system, consistent with the present disclosure. Image 1310 may illustrate a portion of multiple shelves 1306 with one type of product displayed thereon. For example, as illustrated in FIG. 13B, an image 1310 may depict a product of a same type displayed on a shelf 1306 or on a part of shelf 1306. After receiving the image, server 135 may identify only one type of product displayed on this portion of shelves 1306. For example, as illustrated in FIG. 13B, based on image analysis and the group of product models, sever 135 may recognize the type of product as "Cola 330 ml."

Consistent with the present disclosure, the at least one processor may be configured to analyze the received at least one image and determine a first candidate type of the plurality of products based on the group of product models and the image analysis. For example, image processing unit 130 may analyze an image to identify the product(s) in the image. Image processing unit 130 may use any suitable image analysis technique including, for example, object recognition, image segmentation, feature extraction, optical character recognition (OCR), object-based image analysis, shape region techniques, edge detection techniques, pixel-based detection, etc. In addition, image processing unit 130 may use classification algorithms to distinguish between the different products in the retail store. In some embodiments, image processing unit 130 may utilize suitably trained machine learning algorithms and models to perform the product identification. The algorithms may include linear regression, logistic regression, linear discriminant analysis, classification and regression trees, naïve Bayes, k-nearest neighbors, learning vector quantization, support vector machines, bagging and random forest, boosting and adaboost, artificial neural networks, convolutional neural networks, and/or deep learning algorithms, or the like. In some embodiments, image processing unit 130 may identify the product in the image based at least on visual characteristics of the product (e.g., size, shape, logo, text, color, etc.).

In some embodiments, image processing unit 130 may include a machine learning module that may be trained using supervised models. Supervised models are a type of machine learning that provides a machine learning module with training data, which pairs input data with desired output data. The training data may provide a knowledge basis for future judgment. The machine learning module may be configured to receive sets of training data, which comprises data with a "product name" tag and optionally data without a "product name" tag. For example, the training data may include Coca-Cola Zero images with "Coca-Cola Zero" tags and other images without a tag. The machine learning module may learn to identify "Coca-Cola Zero" by applying a learning algorithm to the set of training data. The machine learning module may be configured to receive sets of test data, which may be different from the training data and may have no tag or tags that may be used for measuring the accuracy of the algorithm. The machine learning module may identify the test data that contains the type of product. For example, receiving sets of test images, the machine learning module may identify the images with Coca-Cola Zero in them, and tag them as "Coca-Cola Zero." This may allow the machine learning developers to better understand the performance of the training, and thus make some adjustments accordingly.

In additional or alternative embodiments, the machine learning module may be trained using unsupervised models. Unsupervised models are a type of machine learning using untampered data which are not labeled or selected. Applying algorithms, the machine learning module identifies commonalities in the data. Based on the presence and the absence of the commonalities, the machine learning module may categorize future received data. The machine learning module may employ product models in identifying visual characteristics associated with a type of product, such as those discussed above. For example, the machine learning module may identify commonalities from the product models of a specific type of product. When a future received image has the commonalities, then the machine learning module may determine that the image contains the specific type of product. For example, the machine learning module may learn that images containing "Coca-Cola Zero" have some commonalities. When such commonalities are identified in a future received image, the machine learning module may determine that the future received image contains "Coca-Cola Zero." Further, the machine learning module may be configured to store these commonalities in database 140. While the present disclosure provides examples of image processing algorithms, it should be noted that aspects of the disclosure in their broadest sense, are not limited to the disclosed algorithms.

Consistent with the present disclosure, image processing unit 130 may determine a candidate type of product, based on the product models and the image analysis. A candidate type of product may include a type of product that image processing unit 130 suspects the image to be or contains. For example, when image processing unit 130 determined that an image has some visual characteristics of "Head & Shoulders Shampoo," such as, "signature curve bottle", "Head & Shoulders logo", "white container", "blue cap," etc., then image processing unit 130 may determine "Head & Shoulders Shampoo" to be a candidate type of product.

Consistent with the present disclosure, the at least one processor may be configured to determine a first confidence level associated with the first candidate type of the plurality of products. The term "confidence level" refers to any indication, numeric or otherwise, of a level (e.g., within a predetermined range) indicative of an amount of confidence the system has that the determined type of the product is the actual type of the product. For example, the confidence level may have a value between 1 to 10. A confidence level may indicate how likely the product in the image is the determined candidate type. In some embodiments, image processing unit 130 may store the determined confidence level in database 140. A confidence level may be used, for example, to determine whether the image processing unit 130 needs more information to ascertain the determination of the type of product. In some embodiments, image processing unit 130 may utilize suitably trained machine learning algorithms and models to perform the product identification, as described above, and the machine learning algorithms and models may output a confidence level together with the suggested product identity. In some embodiments, image processing unit 130 may utilize suitably algorithms and models to perform the product identification, as described above, and the result may include a plurality of suggested alternative product identities, where in some cases each suggested identity may be accompanied with a confidence level (for example, accompanied with a probability, and the probabilities of all the suggested alternative product identities may sum to 1). In some embodiments, image processing unit 130 may comprise an algorithm to determine a confidence level, based on the identified visual characteristics. For example, an image of the products is identified as having "white container," image processing unit 130 may assign 5 points to the confidence level for "Head & Shoulders Shampoo" being the candidate type of the products. An image of the products is identified as having "white container," and "signature curve bottle," image processing unit 130 can assign 15 points to the confidence level for "Head & Shoulders Shampoo" being the candidate type of the products, that is, 5 points for having "white container," and 10 points for having "signature curve bottle." That said, different characteristics may be assigned different point values. For example, "signature curve bottle" may have greater point value than "white container."

In some embodiments, image processing unit 130 may comprise an algorithm to determine a confidence level, based on a location of a product or a shelf in the retail store. For example, the shelf may be a part of (or the product may be located in) an aisle or a part of the retail store dedicated to a first category of products, and the confidence level may be determined based, at least in part, on the compatibility of the suggested product identity to the first category. For example, the first category may be "Fresh Products", and as a result a "Tomato" suggested product identity may be assigned a high confidence level or a high number of points may be added to the confidence level based on the compatibility to the first category, while a "Cleaning Product" suggested product identity may be assigned a low confidence level or a low (or negative) number of points may be added to the confidence level based on the incompatibility to the first category. In some embodiments, image processing unit 130 may comprise an algorithm to determine a confidence level based, at least in part, on neighboring products. For example, the product may be located on a shelf between neighboring products that are assigned the same first suggested product identity, and when the product is assigned with a second suggested identity, the confidence of the assignment of the second suggested identity may be based, at least in part, on the compatibility of the second suggested identity to the first suggested identity, for example assigning high confidence level or adding a high number of points to the confidence level in cases where the first suggested identity and the second suggested identity are identical, assigning a medium confidence level or adding a medium number of points to the confidence level in cases where the first suggested identity and the second suggested identity are of a same category or of the same brand, and assigning a low confidence level or adding a low (or negative) number of points to the confidence level in cases where the first suggested identity and the second suggested identity are incompatible.

The following exemplary algorithm illustrates how the characteristics can be used to determine a confidence level for "Head & Shoulders Shampoo" being the candidate type of the products:

1. If "white container" AND "blue cap" AND "Head & Shoulders logo" THEN confidence level=HIGH
2. If "word shampoo on the label" AND "white container" THEN confidence level=MEDIUM
3. If "white container" THEN confidence level=LOW While the present disclosure provides examples of techniques and algorithms for determining a confidence level, it should be noted that aspects of the disclosure in their broadest sense, are not limited to the disclosed techniques and algorithms.

Consistent with the present disclosure, the at least one processor may be configured to determine the first confidence level associated with the first candidate type is above or below a confidence threshold. For example, image processing unit 130 may compare the first confidence level to a confidence threshold. The term "confidence threshold" as used herein denotes a reference value, a level, a point, or a range of values, for which, when the confidence level is above it (or below it depending on a particular use case), the system may follow a first course of action and, when the confidence level is under it (or above it depending on a particular use case), the system may follow a second course of action. The value of the threshold may be predetermined for each type of product or may be dynamically selected based on different considerations. In some implementations, the confidence threshold may be selected based on parameters such as a location in the retail store, a location of the retail store, the product type, the product category, time (such as time in day, day in year, etc.), capturing parameters (such as type of camera, illumination conditions, etc.), and so forth. For example, a higher confidence threshold may be selected during stocktaking periods. In another example, a higher confidence threshold may be selected for more profitable retail stores or more profitable portions of the retail store. In some examples, a combination of factors may be taken into account when selecting the confidence threshold. For example, assume the confidence threshold is x according to location and y according to time, some examples of the selected confidence level may include average of x and y, the n-th root of the sum of the n-th power of x and the n-th power of y, a sum or a multiplication of functions of x and y, and so forth. When the confidence level associated with the first candidate type is below a confidence threshold, the at least one processor may be configured to determine a second candidate type of the plurality products using contextual information. In some aspects, image processing unit 130 may obtain contextual information to increase the confidence level. For example, when the confidence level for "Head & Shoulders Shampoo" being the candidate type of the products is 15 and a confidence threshold, 10, then image processing unit 130 may obtain contextual information. For example, when the confidence level for "Head & Shoulders Shampoo" being the candidate type of the products is LOW and a confidence threshold, MEDIUM, then image processing unit 130 may also obtain contextual information. When the confidence level associated with the first candidate type of product is above a confidence threshold, the at least one processor may store the images in the database 140. The images may be stored in the group of product models that are associated with the certain type of product. For example, when the products in the images are determined to be "Coca-Cola Zero," and the confidence level is above the threshold, then image processing unit 130 may store the images in the product models associated with "Coca-Cola Zero." In some embodiments, image processing unit 130 may update the group of product models. Updating the group of product models may comprise deleting or deactivating some data in one or more models of the group of product models. For example, image processing unit 130 may delete some images in the product models, and/or store other replacement images. Updating the group of product models may comprise deleting or deactivating a product model from the group of product models, for example by removing the product model from the group, by marking the product model as deactivated, by moving the product model from the group of product models to a repository of deactivated product models, and so forth.

The term "contextual information" refers to any information having a direct or indirect relationship with a product displayed on a store shelf. In one embodiment, image processing unit 130 may receive contextual information from capturing device 125 and/or a user device (e.g., a computing device, a laptop, a smartphone, a camera, a monitor, or the like). In some embodiments, image processing unit 130 may retrieve different types of contextual information from captured image data and/or from other data sources. In some cases, contextual information may include recognized types of products adjacent to the product under examination. In other cases, contextual information may include text appearing on the product, especially where that text may be recognized (e.g., via OCR) and associated with a particular meaning. Other examples of types of contextual information may include logos appearing on the product, a location of the product in the retail store, a brand name of the product, a price of the product, product information collected from multiple retail stores, product information retrieved from a catalog associated with a retail store, etc. While the present disclosure provides examples of contextual information, it should be noted that aspects of the disclosure in their broadest sense, are not limited to the disclosed examples.

Consistent with the present disclosure, when the first confidence level of the first candidate type is below the confidence threshold, the at least one processor may be configured to provide a visual representation of the plurality of products to a user. The at least one processor may also be configured to receive input from the user indicating a type of the plurality of products. The at least one processor may also be configured to determine a second candidate type of the plurality of products using the received input. This may increase the efficiency of recognizing new product or new package. This may also lower the inaccuracy while recognizing products in the images. For example, image processing unit 130 may determine "Biore facial cleansing" to be the second candidate type of product, based on the identification from a user, after showing the image to the user. Server 135 may provide a visual representation on an output device, using I/O system 210 and peripherals interface 208. For example, server 135 may be configured to display the image to a user using I/O system 210. As described above, processing device 202 may be configured to send the image data to I/O system 210 using bus 200 and peripherals interface 208. And, output device (e.g., a display screen) may receive the image data and display the image to a user. In some cases, server 135 may further provide a list of multiple alternative product types to select from. For example, in some cases image processing unit 130 may utilize suitably algorithms and models to perform the product identification and the result may include a plurality of suggested alternative product identities, where in some cases each suggested identity may be accompanied with a corresponding confidence level, as described above. Server 135 may select the multiple alternative product types from the suggested alternative product identities according to the corresponding confidence levels, for example by selecting all product identities that correspond to a confidence level greater than a selected threshold, selecting the product identities that correspond to the highest percentile or highest number of confidence levels, and so forth.

Server 135 may receive input from a user using I/O interface system 210 and peripherals interface 208. The user may send the input to server 135 by interacting with input/output devices 224, such as, a keyboard, and/or a mouse. The input may include an indication of a type of product, and such indication may be in the form of a selection of an option from multiple alternative product types presented to the user, in text format, audio file, and/or other representation. In some embodiments, to receive input from users, server 135 may be configured to interact with users using I/O interface system 210, touch screen 218, microphone 220, speaker 222 and/or other input/control devices 224.

Server 135 may recognize the indication of a type of product received from a user, for example by recognizing the selection made by the user from multiple alternative product types presented to the user, by recognizing the text sent by the user, and/or by recognizing the indication in the audio file. For example, server 135 may access a speech recognition module to convert the received audio file to text format. Server 135 may also access a text recognition module to recognize the indication of a type of products in the text.

Consistent with the present disclosure, the at least one processor may be configured to determine a second candidate type of the plurality of products, using contextual information. In some aspects, consistent with the present disclosure, the contextual information used to determine the second candidate type may include detected types of products adjacent the plurality of products. For example, image processing unit 130 may determine the second candidate type to be "Coca-Cola Zero," instead of "Head & Shoulders Shampoo," at least because image processing unit 130 recognizes other soft drinks that are displayed on the same shelves in the image. Consistent with the present disclosure, the contextual information used to determine the second candidate type may include text presented in proximity to the plurality of products. By way of another example, image processing unit 130 may determine the second candidate type to be "Coca-Cola Zero," at least because the text "Cola" that appears in the image (e.g. 1300 or 1310) can be recognized using OCR. As another example, image processing unit 130 may determine the second candidate type to be "Coca-Cola Zero," at least because the text "Soda" in the image can be recognized using OCR, at least because the letters "Z" and "o" in the image can be recognized using OCR, and so forth. Consistent with the present disclosure, the contextual information used to determine the second candidate type may include at least one logo appearing on the product. For example, image processing unit 130 may determine the second candidate type to be "Coca-Cola Zero," instead of "Head & Shoulders Shampoo," at least because the signature "Coca-Cola" logo on the products may be recognized. Consistent with the present disclosure, the contextual information used to determine the second candidate type may include a brand name of the plurality of products. For example, image processing unit 130 may determine the second candidate type to be "Coca-Cola Zero," instead of "Head & Shoulders Shampoo," at least because brand name "Coca-Cola" in the image (e.g. 1300) is recognized, because the shelf or the aisle is dedicated to "Coca-Cola" according to a store map, and so forth.

Consistent with the present disclosure, the contextual information used to determine the second candidate type may include a location of the plurality of products in the store. For example, the location information may include an indication of an area in a retail store (e.g., cleaning section, soft drink section, dairy product shelves, apparel section, etc.), an indication of the floor (e.g., 2nd floor), an address, a position coordinate, a coordinate of latitude and longitude, and/or an area on map, etc. By way of example, image processing unit 130 may determine the second candidate type to be "Coca-Cola Zero," instead of "Head & Shoulders Shampoo," at least because the indication of soft drink section is detected in the received location information.

Consistent with the present disclosure, the contextual information used to determine the second candidate type may include a price associated with the plurality of products. In some embodiments, image processing unit 130 may recognize the price tag and/or barcode on the products in the image. Based on the price tag and/or barcode, image processing unit 130 may determine the second candidate type of product. For example, image processing unit 130 may recognize $8 on the price tag. Based on the price information of "Coca-Cola Zero," which may be in the range of $6-10, image processing unit 130 may determine the second candidate type to be "Coca-Cola Zero," instead of "Head & Shoulders Shampoo," which may have a price range of $20-25. The price information may be entered by a user, collected from multiple retail stores, retrieved from catalogs associated with a retail store, and/or retrieved from online information using the internet.

Consistent with the present disclosure, the contextual information used to determine the second candidate type may include information from multiple stores. Such information may include logos appearing on the product, a location of the product in the retail store, a brand name of the product, a price of the product, expiration time information, product nutrition information, and/or discount information, etc. Further, such information may be derived from products in more than one store. The more than one stores used to derive the contextual information may be located in the same geographical area (city, county, state, etc.) or in different regions (different cities, counties, states, countries, etc.) For example, analyzing image data from multiple stores, the system may learn a high probability for a first product type and a second product type to be placed in proximity to each other (for example, on the same shelf, in the same aisle, etc.), and learn low probability for the first product type and a third product type to be in proximity to each other. Using this information learnt from multiple retail stores, the system may identify a product as being of the second product type rather than the third product type when the item is in proximity to a product of the first product type. In another example, analyzing images from multiple stores in the same retail chain, the system may learn that a first product type in on sale and is accompanied by a special promotion sign in the retail chain, while a second product type is not on sale and is not accompanied by such sign. Using this information learnt from other retail stores in the retail chain, the system identify an item in a retail store as being of the first product type rather than the second product type when the item is in proximity to such special promotion sign when the retail store is part of the retail chain, while identifying the item as being of the second product type when the retail store is not part of the retail chain. Consistent with the present disclosure, the contextual information used to determine the second candidate type may include information from a catalog of the retail store. A catalog as used in this disclosure may refer to a compilation of products and product information on printed medial (e.g. booklet, pamphlet, magazine, newspaper), or a similar compilation available electronically in the form of a text file, video file, audio file, or any other type of digital file that may be used to disseminate product information about the retail store. As described above, such information may include logos appearing on the product, a location of the product in the retail store, a brand name of the product, a price of the product, expiration time information, product nutrition information, and/or discount information, etc.

Consistent with the present disclosure, when the second candidate type of the plurality of products is determined, the at least one processor may determine a second confidence level associated with the determined second candidate type of plurality of products. For example, when an image of the products is identified as having "white container," "blue cap," "Biore logo," and "$50 on the price tag," then image processing unit 130 may use the one or more algorithms described above, and assign 70 points to the second confidence level for "Biore facial cleansing" being the second candidate type of the products, that is, 5 points for "white container," 5 points for "blue cap," 50 points for "Biore logo," and 10 points for "$50 on the price tag". Consistent with the present disclosure, when the second confidence level associated with the second candidate type is above the confidence threshold, then the at least one processor may initiate an action to update the group of product models stored in the database. For example, when the confidence level associated with the second candidate type of product may be determined to be above the threshold, then image processing unit 130 may initiate an action to update the product models in database 140. Consistent with the present disclosure, the at least one processor may be configured to select the action to initiate, from among a plurality of available actions, based on the determined confidence level of the second candidate type. Such actions may include providing notification to users, providing image to the users, updating the group of product models, forgoing another action, etc. For example, image processing unit 130 may send notification to the users when the confidence level is determined to be 3. For another example, image processing unit 130 may update the group of product models when the determined confidence level is determined to be 10. Consistent with the present disclosure, the action to update the group of product models may include deactivating an existing product model from group of product models, and a deactivation of the existing product model may be based on a detected a change in an appearance attribute of the plurality of products. For example, when a product has a new appearance, such as, new package, new color, festival special package, new texture, and/or new logo, etc., image processing unit 130 may deactivate the old images or information stored in the product models. When a visual characteristic is determined to be different from the characteristics stored in the product models, then image processing unit 130 may delete/deactivate the old image stored in the product models. For example, a new Biore logo is identified, and/or a new color of lid is identified, then image processing unit 130 may delete the old Biore logo images and/or deactivate the "blue lid" characteristic that are stored in the product models. Then image processing unit 130 may store the new image in "Biore facial cleansing" product model. This may increase the number of images stored in the product models, that may help analyze future received images.

Consistent with the present disclosure, the action to update the group of product models may include modifying an existing product model from a group of product models, the modification to the existing product model may be based on a detected change in an appearance attribute of the plurality of products. For example, as described above, when a product has a new appearance, image processing unit 130 may detect the change and modify the old images or information stored in the product models. For example, when a new color of lid is identified for "Biore Shampoo," then image processing unit 130 may modify the indication of the old color of lid in the product model of "Biore Shampoo" to include the new color of lid. In another example, when the existing product model comprises parameters of an artificial neural network configured to identify particular products, the modification to the existing product model may include a change to at least one of the parameters of the artificial neural network configured to identify particular products. In yet another example, when the existing product model comprises parameters of an image convolution function, the modification to the existing product model may include a change to at least one of the parameters of the image convolution function. In another example, when the existing product model comprises support vectors that may be used by a Support Vector Machine to identify products, the modification to the existing product model may include a removal of a support vector, an addition of a new support vector, a modification to at least one of the support vectors, and so forth. In yet another example, when the existing product model comprises parameters of a machine learning model trained by a machine learning algorithm using training examples to identify products, the modification to the existing product model may include a change to at least one of the parameters of the machine learning model, for example using a continuous learning scheme, using a reinforcement algorithm, and so forth. This may increase the accuracy in the product models, and may help analyze future received images.

Consistent with the present disclosure, the first candidate type and the second candidate type may be associated with the same type of product that changed an appearance attribute, and the contextual information used to determine the second candidate type may include an indication that the plurality of products are associated with a new appearance attribute. For example, the image of the products may be identified as having "white container," "blue cap," "Head & Shoulders logo," and "text Anti-Dandruff," which are all visual characteristics for "Head & Shoulders Shampoo." However, "signature curve bottle" characteristic may be missing for the identified characteristics, resulting in a confidence level below the confidence threshold. Image processing unit 130 may obtain contextual information to help determine a second candidate type of product. Using OCR and other image analysis method described above, server 135 may identify "displayed in the personal product section," "conditioner is displayed on the same shelf," and "$15 on the price tag," which again may be all characteristics for "Head & Shoulders Shampoo." Image processing unit 130 may assign 105 points to the confidence level for "Head & Shoulders Shampoo" being the candidate type of the products, that is, 5 points for having "white container," 5 points for having "blue cap," 50 points for "Head & Shoulders logo," 30 points for having "text Anti-Dandruff," 5 points for having "displayed in the personal product section," 5 points for having "conditioner is displayed on the same shelf," and 5 points for having "$15 on the price tag." The confidence level of 105 points may be above the threshold, and image processing unit 130 may store the received image to "Head & Shoulders Shampoo" product models. Continuing the example, based on the missing characteristics of "Head & Shoulders Shampoo," such as, "signature curve bottle," image processing unit 130 may generate an indication of "new package" and store the image with the indication in the product models for "Head & Shoulders Shampoo."

Consistent with the present disclosure, the action to update the group of product models may include adding a new product model to the group of product models, the new product model being representative of a previously unidentified type of products. In some aspects, image processing unit 130 may create a new product model and store the received image in the new product model. For example, a new product may be launched, and no associated product model may be stored in database. Based on the identified characteristics, image processing unit 130 may determine "new product" as a candidate type of product. Thus, image processing unit 130 may create a new product model accordingly and store the received image in the new product model. For example, "Head & Shoulders Body Wash" may be the new product that launches in the retail store, and there may be no product model associated with it. Image processing unit 130 may identify "Head & Shoulders logo," "text Body Wash," and "blue container," which may not match any products that are stored in the product models, and thus, image processing unit 130 cannot recognize "Head & Shoulders Body Wash." However, based on the contextual information, image processing unit 130 may determine the "Head & Shoulders Body Wash" to be the candidate type, and may further determine that the confidence level is above the threshold. Then, image processing unit 130 may create a product model in database 140 to store the image and the characteristics for "Head & Shoulders Body Wash." In some aspects, image processing unit 130 may create a new product model and store the received image in the new product model. For example, a new product may be launched, and no associated product model may be stored in database. Based on the identified characteristics, sever 135 may determine "new product" as a candidate type of products. Thus, sever 135 may create a new product model accordingly and store the received image in the new product model. In some aspects, based on the contextual information, image processing unit 130 may determine the "Head & Shoulders Body Wash" to be the second candidate type, and further that the second confidence level may be above the threshold. Then, image processing unit 130 may create a "Head & Shoulders Body Wash" product model in database 140 to store the image and the characteristics. Additionally or alternatively, image processing unit 130 may find a product model corresponding to the second candidate type (for example, "Head & Shoulders Body Wash") in a repository of additional product models (for example, repository of product models from other retail stores, repository of deactivated product models, external repository of product models provided by supplier 115, and so forth), and add the found product model to the group of product models in database 140.

Consistent with the present disclosure, the action to update the group of product models may include replacing an existing product model from the group of product models with at least one new product model, and the existing product model and the new product model may be associated with a same product type. For example, as described above, when a product has a new appearance, image processing unit 130 may create a new product model to store the change. For example, an Olympic Game logo may appear on a soft drink bottle, during the Olympic game. Image processing unit 130 may detect the change and create a new product model to store the images or information of the new bottle with the Olympic logo. Additionally or alternatively, image processing unit 130 may deactivate an existing product model that do not account for the Olympic Game logo. In a further example, after the Olympic Games are over, image processing unit 130 may reactivate the previously deactivated product model, for example in response to a detection of soft drink bottles without the Olympic Game logo, in response to an indication (for example in the form of a digital signal, from a calendar, etc.) that the Olympic Games are over.

Consistent with the present disclosure, a computer program product for processing images captured in a retail store embodied in a non-transitory computer-readable medium and executable by at least one processor is disclosed. The computer program product may include instructions for causing the at least one processor to execute a method for processing images captured in a retail store, in accordance with the present disclosure. For example, the computer program product may be embodied in a non-transitory computer-readable storage medium, such as, a physical memory, examples of which were described above. Further, the storage medium may include instructions executable by one of more processors of the type discussed above. Execution of the instructions may cause the one or more processors to perform a method of processing images captured in a retail store.

Figure 14:
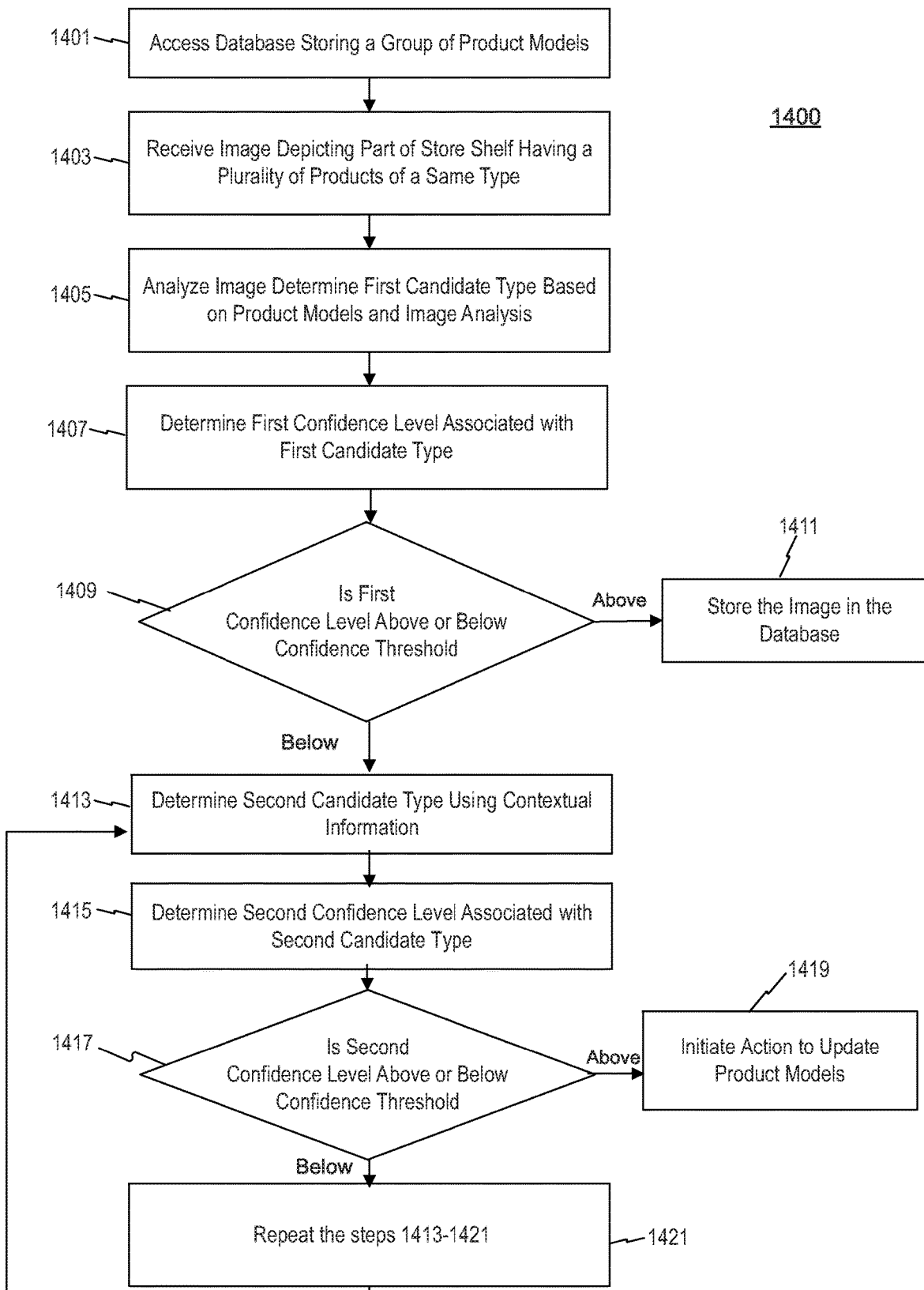
FIG. 14 is a flow chart of an exemplary method for processing images captured in a retail store, consistent with the present disclosure.

FIG. 14 is a flow chart, illustrating an exemplary method 1400 for processing images captured in a retail store, in accordance with the present disclosure. The order and arrangement of steps in method 1400 is provided for purposes of illustration. As will be appreciated from this disclosure, modifications may be made to process 1400 by, for example, adding, combining, removing, and/or rearranging one or more steps of process 1400.

In step 1401, consistent with the present disclosure, the method may include accessing a database storing a group of product models, each relating to at least one product in the retail store. For example, server 135 may be configured to access database 140 directly or via network 150. For example, "Coca-Cola Zero" product model may include the visual characteristics of "Coca-Cola Zero," such as, "black package," "black lid," "signature Coca-Cola logo," text "Zero Calorie," text "Zero Sugar," and "Coca-Cola's iconic bottle," etc. Such visual characteristics may be stored as images, text, or any other source server 135 may recognize. "Coca-Cola Zero" product model may also include contextual information, such as, "price range of $5-$10", "displayed in soft drink section," "Soda may be displayed on the same shelve," "displayed on bottom of the shelves," and/or "stored in a fridge," etc. In another example, "Head & Shoulders Shampoo" may include the visual characteristics of "Head & Shoulders Shampoo," for example, "signature curve bottle", "Head & Shoulders logo", "white container", "blue cap," text "Anti-Dandruff," etc. "Head & Shoulders Shampoo" product model may also include contextual information, such as, "price range of $15-$20", "displayed in personal product section," "conditioner may be displayed on the same shelve," "displayed on top of the shelves," and/or "stored on the second floor," etc.

In step 1403, consistent with the present disclosure, the method may include receiving at least one image depicting at least part of at least one store shelf having a plurality of products of a same type displayed thereon. For example, server 135 may receive one or more image. The image may depict a shelf with products in a retail store. For example, as described in FIG. 13A, image 1300 may depict products 1302, 1304, etc. displaying on one or more shelves 1306, and in FIG. 13B, image 1310 may depict a type of product displayed on a shelf 1306 or a part of a shelf 1306.

In step 1405, consistent with the present disclosure, the method may include analyzing the at least one image and determining a first candidate type of the plurality of products based on the group of product models and the image analysis. For example, server 135 may analyze the image and determine a candidate type of product. For example, if the image in FIG. 13A is analyzed, server 135 may distinguish eight different types of products, using classification algorithms. If the image in FIG. 13B is analyzed, server 135 may identify a specific type of product. In some embodiments, server 135 may utilize suitably trained machine learning algorithms and models to perform the product identification, as described above. In some embodiments, server 135 may identify the product in the image based at least on visual characteristics of the product. Based on the identified visual characteristics, server 135 may determine a candidate type of product. A candidate type of product is a type of product that server 135 suspects the image to be or contains. For example, when server 135 identifies some visual characteristics of "Head & Shoulders Shampoo" in the image, such as, "signature curve bottle", "Head & Shoulders logo", "white container", "blue cap," etc., then server 135 may determine "Head & Shoulders Shampoo" to be a candidate type of product.

In step 1407, consistent with the present disclosure, the method may include determining a first confidence level associated with the determined first candidate type of the plurality of products. For example, server 135 may determine a confidence level associated with the candidate type of the product. In some embodiments, server 135 may store/retrieve the confidence level in database 140. A confidence level may be used, for example, to determine whether server 135 need more information to ascertain the determination of the type of product and/or whether the machine learning module need more training data to be able to perform product identification. In some embodiments, sever 135 may access an algorithm to determine a confidence level, based on the identified visual characteristics.

In step 1409, consistent with the present disclosure, the method may include determining the first confidence level is above or below the confidence threshold. After a confidence level is determined, server 135 may compare the confidence level to a confidence threshold. The value of the threshold may be predetermined for each type of product or may be dynamically selected based on different considerations.

In step 1411, when the first confidence level associated with the first candidate type is above a confidence threshold, the method may include storing the image. For example, server 135 may store the image in the product models associated with the specific type of product in database 140. For example, when server 135 determines a confidence level of 15 for "Head & Shoulders Shampoo" being the candidate type of the products, and the confidence threshold is set to be 10, then server 135 may store the image in the "Head & Shoulders Shampoo" product models. This may increase the number of images stored in the product models, that may help analyze future received images. Additionally or alternatively to step 1411, when the first confidence level associated with the first candidate type is above a confidence threshold, the method may include actions that uses as input the information about the identification of the first candidate type in the image, such as planogram compliance check, update of store inventory information, and so forth.

In step 1413, when the first confidence level associated with the first candidate type is below a confidence threshold, the method may include determining a second candidate type of the plurality of products using contextual information. For example, only "white container" and "blue cap" are identified in the image, resulting in a low confidence level for determining "Head & Shoulders Shampoo" to be the candidate type of the products. The confidence level is below the confidence threshold, sever 135 may obtain contextual information to help determine a second candidate type of product. Using OCR and other image analysis method described above, server 135 identifies "Biore logo," and "$50 on the price tag," which are not the characteristics for "Head & Shoulders Shampoo" but rather "Biore facial cleansing." Based on the identified visual characteristics and characteristics using contextual information, server 135 may determine "Biore facial cleansing" to be the candidate type of product. As described above, consistent with the present disclosure, the contextual information used to determine second candidate type includes at least one of: text presented in proximity to the plurality of products, a location of the plurality of products in the store, a brand name of the plurality of products, a price associated with the plurality of products, at least one logo appearing on the product, information from multiple stores, and information from a catalog of the retail store.

In additional or alternative embodiments, when the confidence level associated with a certain product is below a threshold, server 135 may determine a second candidate type of products, based on the input from a user. This may increase the efficiency of recognizing new product or new package using the image processing unit 130. This may also lower the inaccuracy while recognizing products in the images. For example, server 135 may determine "Biore facial cleansing" to be the candidate type of product, based on the identification from a user, after showing the image to the user. Server 135 may provide a visual representation on an output device, using I/O system 210 and peripherals interface 208. For example, server 135 may be configured to display the image to a user using I/O system 210. As described above, processing device 202 may be configured to send the image data to I/O system 210 using bus 200 and peripherals interface 208. And, output device (e.g., a display screen) may receive the image data and display the image to a user.

Server 135 may receive input from a user using I/O interface system 210 and peripherals interface 208. The user may send the input to server 135 by interacting with input/output devices 224, such as, a keyboard, and/or a mouse. The input may include an indication of a type of product, and such indication may be in text format, audio file, and/or other representation. In some embodiments, to receive input from users, server 135 may be configured to interact with users using I/O interface system 210, touch screen 218, microphone 220, speaker 222 and/or other input/control devices 224.

Server 135 may recognize the indication of a type of product received from a user, by recognizing the text sent by the user, and/or by recognizing the indication in the audio file. For example, server 135 may access a speech recognition module to convert the received audio file to text format. Server 135 may also access a text recognition module to recognize the indication of a type of products in the text.

In step 1415, consistent with the present disclosure, the method may include determining a second confidence level associated with the determined second candidate type of the plurality of products. For example, server 135 may determine a confidence level for the second candidate type of product. Server 135 may compare the confidence level with a confidence threshold, as described above. In another aspect, the second candidate type of product may be the same as the first candidate type of product. For example, the image of the products is identified as having "white container," "blue cap," "Head & Shoulders logo," and "text Anti-Dandruff," which are all visual characteristics for "Head & Shoulders Shampoo." However, "signature curve bottle" characteristic may be missing for the identified characteristics, and thus, resulting in a confidence level below the confidence threshold. Server 135 may obtain contextual information to help determine a second candidate type of product. Using OCR and other image analysis method described above, server 135 identifies "displayed in the personal product section," "conditioner is displayed on the same shelf," and "$15 on the price tag," which again are all characteristics for "Head & Shoulders Shampoo." Server 135 can assign 105 points to the confidence level for "Head & Shoulders Shampoo" being the candidate type of the products, that is, 5 points for having "white container," 5 points for having "blue cap," 50 points for "Head & Shoulders logo," 30 points for having "text Anti-Dandruff," 5 points for having "displayed in the personal product section," 5 points for having "conditioner is displayed on the same shelf," and 5 points for having "$15 on the price tag." The confidence level of 105 points may be above the threshold, and server 135 may store the received image to "Head & Shoulders Shampoo" product models. Continuing the example, based on the missing characteristics of "Head & Shoulders Shampoo," such as, "signature curve bottle," server 135 may generate an indication of new package and store the image with the indication in the product models for "Head & Shoulders Shampoo."

In step 1417, consistent with the present disclosure, the method may include determining the second confidence level is above or below the confidence threshold. As described above, server 135 may compare the confidence level to a confidence threshold. The value of the threshold may be predetermined for each type of product or may be dynamically selected based on different considerations.

In step 1419, consistent with the present disclosure, when the second candidate level associated with the second candidate type is above the confidence threshold, the method may include initiating an action to update the group of product models. For example, when the confidence level for the second candidate type of product is above the threshold, then server 135 may initiate an action to update the product models in database 140. Consistent with the present disclosure, the method may include determining one or more actions to initiate to update the group of product models based on the determined certainty level of the second candidate type. The one or more actions may include at least one of: adding a new product model to the group of product models; replacing an existing product model from the group of product models with at least one new product model; and/or modifying a product model of the group of product models; and deactivating a product model from the group of the plurality of product models. For example, updating the group of product models may comprise deleting or deactivating some data in the models. In some aspects, server 135 may delete some images in the product models, and store the received images for replacement. For example, when a product has a new appearance, such as, new package, new color, festival special package, new texture, and/or new logo, etc., server 135 may deactivate the old images stored in the product models, and store the new image accordingly. As described above, server 135 may create a new product model and store the received image in the new product model. For example, based on the contextual information, server 135 may determine the "Head & Shoulders Body Wash" to be the second candidate type, and the confidence level associated with it is above the threshold. Then, server 135 may create a product model in database 140 to store the image for "Head & Shoulders Body Wash."

In step 1421, when the second confidence level associated with the second candidate type is below the confidence threshold, the method may include repeating steps 1413-1421. For example, when the confidence level for the second candidate type of product is below the threshold, then server 135 may initiate an action to repeat steps 1413-1421 and store the image in the database 140. In some embodiments, server 135 may create a new product model and store the received image in the new product model. For example, when the products in the image cannot be recognized, server 135 may create a product model labeled as "unknown," and store the unrecognizable images in the "unknown" product model. In some embodiments, server 135 may obtain more information to recognize the products, and determine another candidate type and repeat the process described above. Additionally or alternatively to Step 1421, when the second confidence level associated with the second candidate type is below the confidence threshold, the method may include other actions, such as providing information to a user, receiving manual input about the type of the product in the image, and so forth.

The present disclosure relates to systems and methods for identifying products in a retail store based on analysis of captured images. System 1200, illustrated in FIG. 12, is one example of a system for identifying products in a retail store based on analysis of captured images, in accordance with the present disclosure.

In accordance with the present disclosure, a system for identifying products in a retail store based on analysis of captured images is disclosed. FIG. 12 illustrates an exemplary system 1200 for identifying products in a retail store. System 1200 may include an image processing unit 130. Image processing unit 130 may include a server 135 operatively connected to a database 140. It is also contemplated that image processing unit 130 may include one or more servers connected by network 150. Consistent with the present disclosure, server 135 may be configured to access database 140 directly or via network 150. Sever 135 may be configured to store/retrieve data stored in database 140. As discussed above, server 135 may include processing device 202, which may include at least one processor. While the present disclosure provides examples of servers, databases, networks, processors, etc., it should be noted that aspects of the disclosure in their broadest sense, are not limited to the disclosed examples.

Consistent with the present disclosure, the at least one processor may be configured to access a database storing a set of product models relating to a plurality of products. For example, server 135 may be configured to store/retrieve a set or group of product models in database 140. At least one processor associated with server 135 may be able to access, read, or retrieve information including one or more product models from, for example, database 140. While the present disclosure provides examples of product models, it should be noted that aspects of the disclosure in their broadest sense, are not limited to the disclosed examples.

Consistent with the present disclosure, the at least one processor may be configured to receive at least one image depicting at least one store shelf and at least one product displayed thereon. For example, image processing unit 130 may receive raw or processed data from capturing device 125 as described above.

Consistent with the present disclosure, image processing unit 130 may analyze an image to identify the shelves in the image. For example, image processing unit 130 may identify the shelf for soft drinks, the shelf for cleaning products, the shelf for personal products, and/or the shelf for books, or the like. Image processing unit 130 may use any suitable image analysis technique including, for example, object recognition, image segmentation, feature extraction, optical character recognition (OCR), object-based image analysis, shape region techniques, edge detection techniques, pixel-based detection, etc. In some implementation, identifying the shelves in the image may comprise identifying characteristic(s) of the shelf based on image analysis. Such characteristics may include the visual characteristics of the shelf (e.g., length, width, depth, color, shape, lighting on the self, the number of partitions of a shelf, number of layers, and/or whether a glass door is in front of the self, etc.). Such characteristics may also include the location of a shelf (e.g., position within the store, height of shelf in a shelves unit, and so forth). For example, the location of the shelf may be used together with a store map or a store plan to identify the shelf. In another example, the shelf location in an aisle or an area dedicated to a specific product category (as determined, for example, by analyzing images of the aisle or the area, from a store map, and so forth) may be used to determine the identity of the type of the shelf. In some implementations, identifying the shelves in the image may be based, at least in part, on labels related to the shelves (for example, labels attached or positioned next to the shelves). For example, a label related a shelf may include text, barcode, logo, brand name, price, or the like, identifying a product type and/or a category of products, and the identification of the shelf may be based on product type and/or a category of products identified by analyzing images of the label. In some implementations, identifying the shelves in the image may be based, at least in part, on products positioned on the shelves. For example, the type of at least some products positioned on the shelf may be determined, for example by analyzing images of the products and/or by analyzing input from sensors positioned on the shelf as described above, and the type of shelf may be determined based on the determined types of the products positioned on the shelf. While the present disclosure provides exemplary characteristics of a shelf, it should be noted that aspects of the disclosure in their broadest sense, are not limited to the disclosed characteristics.

Consistent with the present disclosure, the at least one processor may be configured to select the product model subset based on a characteristic of the at least one store shelf, wherein the characteristic may include a location of the at least one store shelf in the store. For example, the shelf may be located on the "second floor," or in the "fourth aisle," etc. By way of another example, the shelf may be located in a section designated the "cleaning section" because that section may be used to store, for example, cleaning supplies. In some aspects, image processing unit 130 may identify the location information by recognizing the text on a sign or a promotion material depicted in the image. In some aspects, such characteristics may also include information of the products displayed on the shelf (e.g., the price of the products, the names of the products, the type of the products, the brand name of the products, and/or the section in the retail store, etc.). In some aspects, such characteristics may also include a type of shelf. Some examples of such types of shelves may include shelf in a refrigerator, wall shelf, end bay, corner bay, pegboard shelf, freestanding shelf, display rack, magazine shelf, stacking wire baskets, dump bins, warehouse shelf, and so forth.

Consistent with the present disclosure, image processing unit 130 may identify the shelf, based on the identified characteristic of the shelf. For example, when image processing unit 130 identifies that the shelf in the image has some characteristics, such as, "80 inches length", "4 layers," "average price of $20 on the price tag," "white shelf", "yellow price tags," etc., image processing unit 130 may determine the shelf in the image is for soft drinks. As another example, when image processing unit 130 identifies a banner on the shelf in the image that shows "Snacks Section," using, for example, OCR, image processing unit 130 may determine the shelf in the image is for snacks, such as, BBQ chips, cheesy crackers, and/or pretzels, or the like. By way of another example, when image processing unit 130 identifies that the shelf in the image has "a glass door in the front," image processing unit 130 may determine the shelf in the image is in a refrigerator and/or image processing unit 130 may further determine the shelf in the image is for dairy products. As another example, when image processing unit 130 recognizes a product (e.g., Coca-Cola Zero) on the shelve in the image, image processing unit 130 may determine the shelf is for similar products (e.g., Sprite, Fanta, and/or other soft drinks). While the present disclosure provides exemplary methods of identifying characteristics of a store shelf, it should be noted that aspects of the disclosure in their broadest sense, are not limited to the disclosed methods.

Consistent with the present disclosure, the at least one processor may be configured to select a product model subset from among the set of product models based on at least one characteristic of the at least one store shelf determined based on analysis of the received at least one image, wherein a number of product models included in the product model subset is less than a number of product models included in the set of product models. For example, image processing unit 130 may select a subset of product models from the set of product models stored in database 140. The set of product models may include the subset of product models. For example, the set of product models may include "N" number of product models. Image processing unit 130 may select a subset containing "M" number of product models from the set of product models. It is contemplated that the numerical value of M is smaller than the numerical value of N. In some implementations, a score function may be used to score the compatibility of product models to the at least one shelf, and the subset of the set of product models may be selected based on the compatibility scores of the product models. Some examples of inputs that may be used by such compatibility score may include the at least one characteristic of the at least one store shelf, type of product, category of product, brand of product, size of product, information related to the retail store that the shelf is located at, and so forth. For example, the M product models corresponding to the highest compatibility scores may be selected. In another example, all product models corresponding to compatibility score higher than a selected threshold may be selected. In some implementations, a subset of product models may be selected from a plurality of alternative subsets according to the at least one characteristic of the at least one store shelf, information related to the retail store that the shelf is located at, and so forth.

By way of example, image processing unit 130 may select a subset of product models based on the identified characteristic(s) of the shelf in the image. For example, image processing unit 130 may determine the shelf in the image is for dairy products based on the identified characteristics, such as, "a glass door in front of the shelf," and/or "text Dairy Product Section." As a result, image processing unit 130 may select a subset of product models that are associated with dairy products, such as, the product models for "milk," "butter," and/or "cheese." When the shelf in the image is identified to have the characteristics of, for example, soft drink section, image processing unit 130 may select a subset of product models that are associated with soft drinks from the set of product models in database 140.

Consistent with the present disclosure, the at least one processor may be configured to select the product model subset based on a characteristic of the at least one store shelf, wherein the characteristic is related to the position of the at least one store shelf, such as height of the at least one store shelf, position of the at least one store shelf within the retail store, and so forth. In some examples, a first subset of product models may be selected for a shelf positioned at a first height, while a second subset of product models may be selected for a shelf positioned at a second height. For example, the first height may include the lowest shelf in a shelving unit and the first subset may include product models of products targeting children, while the second height may include shelves positioned at least a threshold height above ground (for example, half meter, one meter, etc.), and the second subset may include product models of products targeting adult shoppers. In another example, a first subset of product models may be selected for a shelf located at a first area of the retail store, while a second subset of product models may be selected for a shelf located at a second area of the retail store. For example, the first area of the store may correspond to cleaning products (such as a cleaning product aisle) and the first subset may include product models of cleaning products, while the second area of the store may correspond to beverages (such as beverages aisle) and the second subset may include product models of beverages.

Consistent with the present disclosure, the at least one processor may be configured to select the product model subset based on a retail store that the at least one store shelf is located at. For example, the product model subset may be selected based on the identity of the store, based on information associated with the retail store (such as the store master file, planograms associated with the store, checkout data from the store, contracts associated with the retail store, etc.), on a retail chain associated with the retail store, on a type of the retail store, and so forth. In some examples, a first subset of product models may be selected for a shelf located at a first retail store, while a second subset of product models may be selected for a similar or identical shelf located at a second retail store. For example, the first retail store may work with a first supplier of beverages while the second retail store may work with a second supplier of beverages, and a subset of product models corresponding to beverages offered by the first supplier may be selected for a beverages shelf located in the first retail store, while a subset of product models corresponding to beverages offered by the second supplier may be selected for a beverages shelf located in the second retail store.

Consistent with the present disclosure, the at least one processor may be configured to select the product model subset based on a characteristic of the at least one store shelf, wherein the characteristic is at least one of an expected product type and a previously identified product type associated with the at least one store shelf. For example, when the shelf in the image is determined to be for displaying soft drinks (for example according to a planogram, to a store map, etc.), image processing unit 130 may select the product models that contains the expected product types, such as, "Coca-Cola Zero," "Sprite," and "Fanta," etc., to be included in the subset of product models. In another example, when products of a specific type and/or category and/or brand were previously detected on the at least one shelf, image processing unit 130 may select the product models corresponding to specific type and/or category and/or brand. In some aspects, image processing unit 130 may determine the shelf in the image to be identical or similar to a known shelf. Image processing unit 130 may select the product models that associated with the types of products displayed on the known shelf. For example, when the shelf in the image is determined to be identical or similar to another known shelf which was previously recognized as displaying product types, such as, "Coca-Cola Zero," and "Sprite," image processing unit 130 may include "Coca-Cola Zero" product model and "Sprite" product model in the subset of product models. In some examples, the location of a shelf (for example, the location of the shelf within the store, the height of the shelf) may be used to determine expected product types associated with the shelf (for example, using a store map or a database, using a planogram selected according to the location of the shelf, and so forth), the product model subset may be selected to include product models corresponding to the expected product types.

Consistent with the present disclosure, the at least one processor may be configured to select the product model subset based on a characteristic of the at least one store shelf, wherein the characteristic is a recognized product type of an additional product on the at least one store shelf adjacent the at least one product. For example, image processing unit 130 may update and/or select the subset of product models, based on a recognized product type that is adjacent to the at least one product on the shelf in the image. For example, when "Fanta" is recognized on the shelf in the image, image processing unit 130 may select the subset of product models to include product models for other soft drinks or sodas. For example, image processing unit 130 may include product models for "Sprite" and "Coca-Cola" in the subset of product models.

Consistent with the present disclosure, the at least one processor may be configured to determine whether the selected product model subset is applicable to the at least one product. For example, image processing unit 130 may determine whether the subset of product models is applicable to the at least one product in the image. For example, the selected product model subset may be used to attempt to identify the at least one product, and in response to a failure to identify the at least one product using the selected product model subset, it may be determined that the selected product model subset is not applicable to the at least one product, while in response to a successful identification of the at least one product using the selected product model subset, it may be determined that the selected product model subset is applicable to the at least one product. For example, the attempt to identify the at least one product using the selected product model subset may comprise using a product recognition algorithm configured to provide a success or failure indication. In another example, the attempt to identify the at least one product using the selected product model subset may comprise using a product recognition algorithm configured to provide product type together with a confidence level, the attempt may be considered a failure when the confidence level is below a selected threshold, and the attempt may be considered successful when the confidence level is above a selected threshold. For example, the selected threshold may be selected based on confidence levels of other products in the retail store (for example, of neighboring products), for example setting the selected threshold to be a function of the confidence levels of the other products. Some examples of such function may include an average, a median, a mode, a minimum, a minimum plus a selected positive constant value, and so forth. In some examples, image processing unit 130 may identify or attempt to identify a type of the at least one product, for example by determining a characteristic of the at least one product and/or a characteristic of the store shelf on which the product is displayed, for example using one or more techniques discussed above. For example, image processing unit 130 may determine that a store shelf is associated with displaying carbonated drinks. Image processing unit 130 may further determine whether the selected subset of product models is applicable to carbonated drinks. For example, if the selected subset of models includes product models for carbonated drinks, image processing unit 130 may determine that the selected subset of models is applicable to the at least one product on the store shelf. Conversely, when the selected subset of product models does not correspond to, for example, a characteristic of the store shelf, image processing unit 130 may determine that the selected subset of product models is not applicable to the at least one product in the image. It is contemplated that image processing unit 130 may compare the selected subset of models with one or more characteristics of the store shelf and/or one or more characteristics of the at least one product. Image processing unit 130 may determine the one or more characteristics using product recognition techniques, image analysis, shape or pattern recognition, text recognition based on labels attached to or adjacent to the store shelf or the at least one product, etc. While the present disclosure provides exemplary methods of determining applicability of product models to a product, it should be noted that aspects of the disclosure in their broadest sense, are not limited to the disclosed methods.

Consistent with the present disclosure, when the at least one processor determines that the selected product model subset is applicable to the at least one product, the at least one processor may be configured to analyze a representation of the at least one product depicted in the at least one image using the product model subset, and identify the at least one product based on the analysis of the representation of the at least one product depicted in the at least one image using the product model subset. For example, when image processing unit 130 determines the selected subset of product models is applicable to the at least one product in the image, then image processing unit 130 may analyze the image and identify the type of product in the image, using the selected subset of product models. Image processing unit 130 may use any suitable image analysis technique including, for example, object recognition, image segmentation, feature extraction, optical character recognition (OCR), object-based image analysis, shape region techniques, edge detection techniques, pixel-based detection, object recognition algorithms, machine learning algorithms, artificial neural networks, etc. In addition, image processing unit 130 may use classification algorithms to distinguish between the different products in the retail store. The subset of product models may include visual characteristics of the products and contextual information associated with the products. Image processing unit 130 may identify the product in the image based at least on visual characteristics of the product (e.g., size, texture, shape, logo, text, color, etc.). To identify the product, image processing unit 130 may also use contextual information of the product (e.g., the brand name, the price, text appearing on the particular product, the shelf associated with the particular product, adjacent products in a planogram, the location within the retail store, or the like.).

Additionally and alternatively, image processing unit 130 may include a machine learning module that may be trained using supervised models. Supervised models are a type of machine learning that provides a machine learning module with training data, which pairs input data with desired output data. The training data may provide a knowledge basis for future judgment. The machine learning module may be configured to receive sets of training data, which comprises data with a "product name" tag and data without a "product name" tag. For example, the training data comprises Coca-Cola Zero images with "Coca-Cola Zero" tags and other images without a tag. The machine learning module may learn to identify "Coca-Cola Zero" by applying a learning algorithm to the set of training data. The machine learning module may be configured to receive sets of test data, which are different from the training data and may have no tag. The machine learning module may identify the test data that contains the type of product. For example, receiving sets of test images, the machine learning module may identify the images with Coca-Cola Zero in them, and tag them as "Coca-Cola Zero." This may allow the machine learning developers to better understand the performance of the training, and thus make some adjustments accordingly.

In additional or alternative embodiments, the machine learning module may be trained using unsupervised models. Unsupervised models are a type of machine learning using data which are not labelled or selected. Applying algorithms, the machine learning module identifies commonalities in the data. Based on the presence and the absence of the commonalities, the machine learning module may categorize future received data. The machine learning module may employ product models in identifying visual characteristics associated with a type of product, such as those discussed above. For example, the machine learning module may identify commonalities from the product models of a specific type of product. When a future received image has the commonalities, then the machine learning module may determine that the image contains the specific type of product. For example, the machine learning module may learn that images contain "Coca-Cola Zero" have some commonalities. When such commonalities are identified in a future received image, the machine learning module may determine the image contains "Coca-Cola Zero." Further, the machine learning module may be configured to store these commonalities in database 140. Some examples of machine algorithms (supervised and unsupervised) may include linear regression, logistic regression, linear discriminant analysis, classification and regression trees, naïve Bayes, k-nearest neighbors, learning vector quantization, support vector machines, bagging and random forest, and/or boosting and adaboost, artificial neural networks, convolutional neural networks, or the like. While the present disclosure provides exemplary methods of machine learning, it should be noted that aspects of the disclosure in their broadest sense, are not limited to the disclosed methods.

Consistent with the present disclosure, image processing unit 130 may determine a type of product in the image, based on the subset of product models and the image analysis. A type of product is a type of product that image processing unit 130 suspects the image to be or contains. For example, by using the subset of product models, when image processing unit 130 determined that an image has some visual characteristics of "Head & Shoulders Shampoo," such as, "signature curve bottle", "Head & Shoulders logo", "white container", "blue cap," etc., then image processing unit 130 may determine "Head & Shoulders Shampoo" to be the type of product in the image.

Consistent with the present disclosure, image processing unit 130 may determine a confidence level associated with the identified product, based on the identified characteristics, for example as described above.

Consistent with the present disclosure, after a confidence level is determined, image processing unit 130 may compare the confidence level to a confidence threshold. The value of the threshold may be predetermined for each type of product or may be dynamically selected based on different considerations. When the confidence level is determined to be above the confidence threshold, then image processing unit 130 may determine that the selected subset of product model is applicable to the product in the image.

Consistent with the present disclosure, when the at least one processor determines that the selected product model subset is not applicable to the at least one product, the at least one processor may be configured to update the selected product model subset to include at least one additional product model from the stored set of product models not previously included in the selected product model subset to provide an updated product model subset. Further the at least one processor may be configured to analyze the representation of the at least one product depicted in the at least one image in comparison to the updated product model subset. The at least one processor may be also configured to identify the at least one product based on the analysis of the representation of the at least one product depicted in the at least one image in comparison to the updated product model subset. For example, when the confidence level associated with a certain product is below a selected threshold, image processing unit 130 may determine that the selected subset of product model is not applicable to the product in the image. For example, only "white container" and "blue cap" are identified in the image, resulting in a low confidence level for determining "Head & Shoulders Shampoo" to be the candidate type of the products. When the confidence level is below the confidence threshold, image processing unit 130 may obtain other subsets of product models to determine the products. The other subsets of product models may be selected based on an analysis of the image, for example, based on identified characteristics of the products in the image (e.g., "white container" and "blue cap"), based on identified text in the image (e.g., "facial cleansing"), based on logos identified in the image (e.g., a Biore logo), based on price identified in the image (e.g., "$50 on the price tag"), based on other products identified in the image, and so forth. In another example, the other subsets of product models may be selected based on digital records associated with the retail store, for example based on sales records including a new type of product. After adding additional product models in the selected subset, image processing unit 130 may identify "Biore logo," and "$50 on the price tag," which are not the characteristics for "Head & Shoulders Shampoo" but rather "Biore facial cleansing," using OCR and other image analysis method described above. Based on the identified visual characteristics and characteristics using contextual information, server 135 may recognize "Biore facial cleansing" in the images.

Consistent with the present disclosure, the action that updates the product model subset may include deactivating an existing product model from the product model subset. Additionally and alternatively, consistent with the present disclosure, the action that updates the product model subset may include replacing an existing product model from the product model subset with a new product model. For example, updating the selected subset of product models may also comprise deleting or deactivating one or more existing product models in the selected subset of product models and add in a new product model in replacement. In some cases, the existing product model and the new product model may be associated with the same type of product. For example, as part of a rebranding, packages of the products of a brand may be modified, and usually the old brand, old packages, and/or old logos may not be seen on the shelves again. In such cases, when updating the selected subset of product models, image processing unit 130 may be configured to determine to delete the existing product model, automatically or manually. In some cases, one or more visual characteristics may be added to the product package, such as, a special logo, a mark, a new color, etc. For example, an Olympic logo appears on the packages during the Olympic Games. During the Olympic game, to identify the Olympic logo, image processing unit 130 may deactivate the existing product models and add in the "Olympic Game Time" product models to replace the existing product model. The "Olympic Game Time" product models may include descriptions of the Olympic logo, images of sports player, images of medals, etc. For another example, in December, many products may have Christmas special packages, red appearance, gift-like packages, and/or Christmas features. Image processing unit 130 may deactivate the existing product models, and add in the "Christmas Time" product models, in order to better determine the products in the images. This may increase the efficiency and decrease the processing time for recognizing the type of product in the image using the selected subset of product models.

Consistent with the present disclosure, when the selected product model subset is not applicable to the at least one product, the at least one processor may be further configured to provide a visual representation of the at least one product to a user. For example, when the selected product model subset is determined to be not applicable to the at least one product, image processing unit 130 may rely on a user to recognize the product. For example, image processing unit 130 may provide an image of the at least one product to a user. Image processing unit 130 may provide a visual representation on an output device, using I/O system 210 and peripherals interface 208. For example, image processing unit 130 may be configured to display the image to a user using I/O system 210. As described above, processing device 202 may be configured to send the image data to I/O system 210 using bus 200 and peripherals interface 208. And, output device (e.g., a display screen) may receive the image data and display the image to a user. In another example, image processing unit 130 may provide information about the location of the product in the retail store to a user, requesting the user to identify the product at the specified location. While the present disclosure provides exemplary methods of providing a visual representation of the at least one product to a user, it should be noted that aspects of the disclosure in their broadest sense, are not limited to the disclosed methods.

In accordance with this disclosure, the at least one processor may be further configured to receive input from the user regarding the at least one product. For example, image processing unit 130 may receive an indication of the at least one product type from the user. Image processing unit 130 may receive input from a user using I/O interface system 210 and peripherals interface 208. The user may send the input to server 135 by interacting with input/output devices 224, such as, a keyboard, and/or a mouse. The input may include an indication of a type of product, and such indication may be in text format, audio file, and/or other representation. In some embodiments, to receive input from users, image processing unit 130 may be configured to interact with users using I/O interface system 210, touch screen 218, microphone 220, speaker 222 and/or other input/control devices 224. Server 135 may recognize the indication of a type of product received from a user, by recognizing the text sent by the user, and/or by recognizing the indication in the audio file. For example, server 135 may access a speech recognition module to convert the received audio file to text format. Server 135 may also access a text recognition module to recognize the indication of a type of products in the text. For example, image processing unit 130 may determine "Biore facial cleansing" to be product in the image, based on the identification from a user, after showing the image to the user. This may increase the efficiency of recognizing new product or new package using the image processing unit 130. This may also lower the inaccuracy while recognizing products in the images.

Consistent with this disclosure, the at least one processor may be also configured to determine that the at least one product is associated with the at least one additional product model from the stored set of product models not previously included in the selected product model subset based on the received input. Image processing unit 130 may then update the selected subset of product models and identify the at least one product in the image, based on the updated subset of product models. In some aspects, image processing unit 130 may determine that the at least one product is associated with the at least one additional product model from the stored set of product models not previously included in the selected product model subset based on the received input from the user.

Consistent with the present disclosure, the at least one processor may be further configured to initiate an action that updates the product model subset associated with the at least one store shelf upon determining that the product model subset is obsolete. For example, image processing unit 130 may determine a subset of product models to be obsolete. In some aspects, a user may input an indication that a subset of product models may be obsolete. In some aspects, image processing unit 130 may determine a subset of product models to be obsolete, based on the image analysis, at least because at least one product in the image may not be recognized. Upon a subset of product models is determined to be obsolete, image processing unit 130 may be configured to initiate an action that updates the subset of product model.

Consistent with the present disclosure, the at least one processor may be configured to determine an elapsed time since a last identification of a product on the at least one store shelf, compare the elapsed time with a threshold, and determine that the product model subset is obsolete based on a result of the comparison. For example, image processing unit 130 may determine an elapsed time since a last identification of a product on the shelf. In some aspects, image processing unit 130 may store a time stamp for each time of product recognition. Thus, image processing unit 130 may determine the elapsed time by calculating the time difference between present time and the stored time stamp. In some aspects, image processing unit 130 may access a timer, which may be configured to track the time since the last product recognition. Image processing unit 130 may compare the elapsed time with a threshold. If the elapsed time is determined to be greater than the threshold, then image processing unit 130 may determine the subset of product models to be obsolete.

Consistent with the present disclosure, the at least one processor may be configured to determine a number of product detections since a last identification of a product on the at least one store shelf, compare the determined number of product detections with a threshold, and determine that the product model subset is obsolete based on a result of the comparison. For example, image processing unit 130 may determine a number of product detections since a last identification of a product on the shelf. In some aspects, image processing unit 130 may count and track the number of product detections. In some aspects, image processing unit 130 may restart and count the number each time a product detection occurs. Image processing unit 130 may compare the number of product detection since a last identification with a threshold. If the number is determined to be greater than the threshold, then image processing unit 130 may determine the subset of product models to be obsolete.

Consistent with the present disclosure, the updated product model subset may be updated by adding a product model associated with a product brand of the at least one product. For example, when the brand of the at least one product in the image is identified, image processing unit 130 may add, to the selected subset of product models, an additional product model that may be associated with the brand of the at least one product in the image. Consistent with the present disclosure, the updated product model subset may be updated by adding a product model associated with a same logo as the at least one product. When the logo (e.g., "gluten free logo") on the at least one product in the image is identified, then image processing unit 130 may add, to the selected subset of product models, an additional product model that has the same characteristics (i.e., the same logo). Consistent with the present disclosure, the updated product model subset may be updated by adding a product model associated with a category of the at least one product. When the product category (e.g., cleaning products, soft drinks, foods, snacks, or the like) of the at least one product in the image is identified, then image processing unit 130 may add, to the selected subset of product models, an additional product model that is associated with the same category of the at least one product in the image. Consistent with the present disclosure, the action that updates the product model subset may include modifying an existing product model from the product model subset, a modification to the existing product model is based on a detected change in an appearance of the at least one product. For example, based on the detected change in the visual characteristic(s) of a product, image processing unit 130 may modify description of such characteristic(s) stored in the product model. For example, an addition of a logo (such as the Olympic logo) on a product may be recognized by analyzing the image and may cause an update to a product model corresponding to the product to account for the addition of the logo.

Consistent with the present disclosure, the at least one processor may be configured to analyze a representation of the at least one product depicted in the at least one image using the product model subset, and identify the at least one product based on the analysis of the representation of the at least one product depicted in the at least one image using the product model subset. For example, image processing unit 130 may analyze an image to identify the product(s) in the image. Image processing unit 130 may use any suitable image analysis technique including, for example, object recognition, image segmentation, feature extraction, optical character recognition (OCR), object-based image analysis, shape region techniques, edge detection techniques, pixel-based detection, object recognition algorithms, machine learning algorithms, artificial neural networks, etc. In addition, image processing unit 130 may use classification algorithms to distinguish between the different products in the retail store. For example, image processing unit 130 may utilize suitably trained machine learning algorithms and models to perform the product identification. Image processing unit 130 may identify the product in the image based at least on visual characteristics of the product (e.g., size, texture, shape, logo, text, color, etc.).

Consistent with the present disclosure, when the selected product model subset is not applicable to the at least one product, the at least one processor may be further configured to obtain contextual information associated with the at least one product, and determine that the at least one product is associated with the at least one additional product model from the stored set of product models not previously included in the selected product model subset based on the obtained contextual information. For example, when the selected subset of product models is determined to be not applicable to the at least one product in the image, image processing unit 130 may obtain contextual information associated with the at least one product. Image processing unit 130 may also update the selected subset of product models to add in an at least one additional product model. And, based on the contextual information, image processing unit 130 may determine that the at least one product is associated with the at least one additional product model not previously included in the selected subset of product models. Image processing unit 130 may then store the decision with the updated subset of product model in database 140. Image processing unit 130 may receive contextual information from capturing device 125 and/or a user device (e.g., a computing device, a laptop, a smartphone, a camera, a monitor, or the like). Image processing unit 130 may retrieve different types of contextual information from captured image data and/or from other data sources. In some cases, contextual information may include recognized types of products adjacent to the product under examination. Consistent with the present disclosure, the contextual information used to determine that the at least one product is associated with the at least one additional product model may be obtained from analyzing the plurality of images. For example, performing image analysis, image processing unit 130 may identify a banner or a sign in the images that shows "Snacks Section," using OCR. Consistent with the present disclosure, the contextual information used to determine that the at least one product is associated with the at least one additional product model may be obtained from analyzing portions of the plurality of images not depicting the at least one product. That said, the contextual information may be obtained from analyzing portions of the image that does not depict the at least one product. Image processing unit 130 may obtain contextual information from the price tag on the shelf, from the decoration on the shelf, from the text shown on the sign or banner, etc., using any image analysis techniques.

Consistent with the present disclosure, the contextual information may include at least one of: information from a catalog of the retail store, text presented in proximity to the at least one product, a category of the at least one product, a brand name of the at least one product, a price associated with the at least one product, and a logo appearing on the at least one product. For example, contextual information may include text appearing on the product, especially where that text may be recognized (e.g., via OCR) and associated with a particular meaning. Other examples of types of contextual information may include logos appearing on the product, a location of the product in the retail store, a brand name of the product, a price of the product, product information collected from multiple retail stores, product information retrieved from a catalog associated with a retail store, etc.

In some aspects, image processing unit 130 may determine the product in the image to be "Coca-Cola Zero," at least because image processing unit 130 recognized other soft drinks that are displayed on the same shelves in the image. Image processing unit 130 may determine the product in the image to be "Coca-Cola Zero," at least because the text "Cola" that appears in the image can be recognized using OCR. Image processing unit 130 may determine the type of product in the image to be "Coca-Cola Zero," at least because the text "Soda" in the image can be recognized using OCR. Image processing unit 130 may determine the type of product in the image to be "Coca-Cola Zero," at least because the signature "Coca-Cola" logo on the products is recognized. In some embodiments, contextual information may include location information. For example, the location information may include an indication of an area in a retail store (e.g., cleaning section, soft drink section, dairy product shelves, apparel section, etc.), an indication of the floor (e.g., 2nd floor), an address, a position coordinate, a coordinate of latitude and longitude, and/or an area on map. Image processing unit 130 may determine the type of product in the image to be "Coca-Cola Zero," at least because the indication of soft drink section is detected in the received location information. Image processing unit 130 may recognize the price tag and/or barcode on the products in the image, based on the price tag and/or barcode, image processing unit 130 may determine the type of product. For example, image processing unit 130 may recognize $8 on the price tag. Based on the price information of "Coca-Cola Zero," which may be in the range of $6-10, image processing unit 130 may determine the type of product to be "Coca-Cola Zero," which has a price range of $20-25. The price information may be entered by a user, collected from multiple retail stores, retrieved from catalogs associated with a retail store, and/or retrieved from online information using the internet.

Consistent with the present disclosure, image processing unit 130 may determine that the additional product model was not included in the selected subset of product models, based on the contextual information. In some embodiments, as described above, based on the contextual information, image processing unit 130 may recognize the type of product in the image and determine the type of product is not previously included in the selected subset of product models. In some embodiments, image processing unit 130 may compare the selected subset of the product models with the previously selected subset of product models. And, based on the comparison, image processing unit 130 may determine that the additional product model was not included in the selected subset of product models.

Consistent with the present disclosure, the at least one processor may be configured to identify a type of the at least one product in a confidence level above a predetermined threshold using the updated product model subset. For example, using the updated product models, server 135 may identify a type of at least one product in a confidence level that is above a selected threshold. Consistent with the present disclosure, server 135 may determine a confidence level associated with the type of the product.

Consistent with the present disclosure, server 135 may compare the confidence level to a selected threshold. In one embodiment, when the confidence level associated with a certain product is below a threshold, server 135 may obtain contextual information to increase the confidence level. In some embodiments, when the confidence level associated with a certain product is above a threshold, server 135 may store the image and the updated subset of product models in database 140. This may increase the efficiency and decrease the processing time for recognizing the type of product in the image using the updated subset of product models.

System 1200 may include or connected to network 150, described above. In some embodiments, database 140 may be configured to store product models. The data for each product model may be stored as rows in tables or in other ways. In some embodiments, database 140 may be configured to store at least one subset of product models. Database 140 may be configured to update the at least one subset of product model. Updating a subset of product models may comprise deleting or deactivating some product models in the subset. For example, image processing unit 130 may delete some images and/or algorithms in the subset of product models, and store other product models for replacement in database 140.

Consistent with the present disclosure, server 135 may be configured to display an image to a user using I/O system 210 (e.g., a display screen). Processing device 202 may be configured to send the image data to I/O system 210 using bus 200 and peripherals interface 208.

Consistent with the present disclosure, server 135 may be configured to interact with users using I/O interface system 210, touch screen 218, microphone 220, speaker 222 and/or other input/control devices 224. From the interaction with the users, server 135 may be configured to receive input from the users. For example, the users may enter inputs by clicking on touch screen 218, by typing on a keyboard, by speaking to microphone 220, and/or inserting USB driver to a USB port. Consistent with the present disclosure, the inputs may include an indication of a type of products, such as, "Coca-Cola Zero," "Head & Shoulders Shampoo," or the like. Consistent with the present disclosure, the inputs may include an image that depicts products of different type displaying on one or more shelves, as described in FIG. 13A; and/or an image that depicts a type of product displayed on a shelf or a part of a shelf, as described in FIG. 13B.

In one embodiment, memory device 226 may store data in database 140. Database 140 may include subsets of product models and some other data. Product models may include product type model data 240 (e.g., an image representation, a list of features, and more) that may be used to identify products in received images. In some embodiments, product models may include visual characteristics associated with a type of product (e.g., size, shape, logo, text, color, etc.). In some embodiments, database 140 may also store contextual information associated with a type of product. In other embodiments of the disclosure, database 140 may store additional types of data or fewer types of data. Furthermore, various types of data may be stored in one or more memory devices other than memory device 226.

Figure 15:
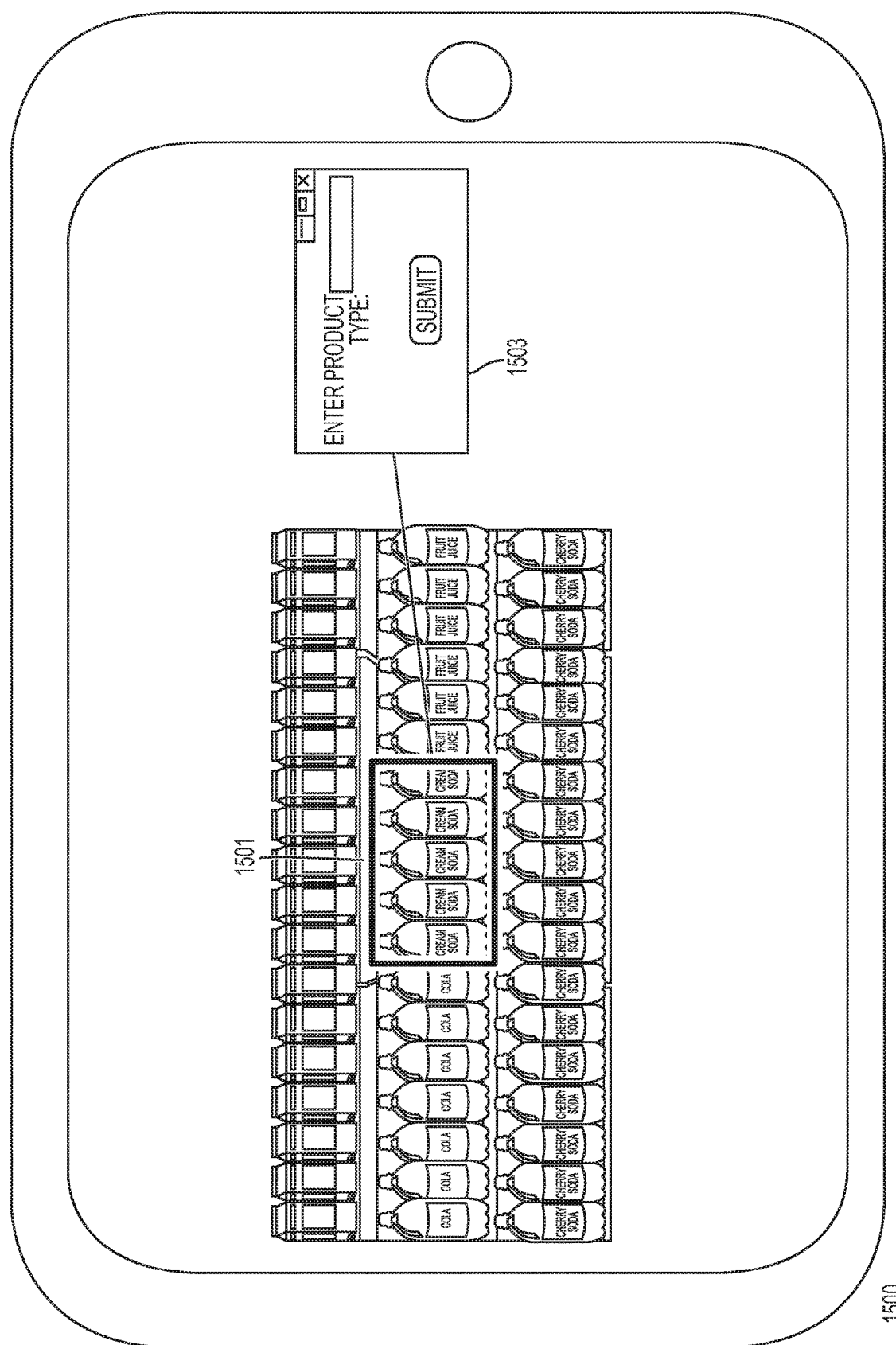
FIG. 15 depicts an exemplary user interface, consistent with the present disclosure.

FIG. 15 illustrates an example graphical user interface (GUI) for device output, consistent with the present disclosure. As described above, when the selected product model subset is determined to be not applicable to the at least one product, image processing unit 130 may rely on user input to assist in identifying or recognizing the product. Consistent with the present disclosure, server 135 may be configured to display an image to a user using I/O system 210 (e.g., a display screen). GUI may include an exemplary image 1500 received by the system and then displayed to the user. Image 1500 may depict multiple shelves with many different product types displayed thereon. Server 135 may determine that the selected subset of product models may not be applicable to image 1500, due to the inability to identify product 1501. GUI may also include box 1503, where the product type may be entered by the user. For example, by interacting with input/output devices 224, such as, a keyboard, and/or a mouse, the user may enter the product type, such as, "Sprite 1 L." In another example, the user may be presented with a number of alternative product types (for example, alternative product types identified as possible candidates by a product recognition algorithm), such as "Sprite half L", "Sprite 1 L", and "Sprite 2 L", and the user may select one of the presented alternative product types corresponding to product 1501, provide an indication that the correct product type for product 1501 is not in the presented alternative product types, or provide an indication that the product type can't be determined from image 1500 (at least by the user). Alternatively or additionally, the user may enter a product identification number or code (e.g., a stock keeping unit (SKU).) Such information supplied by the user may be entered via keypad, etc. or may be automatically entered (e.g., by scanning a QR code, etc.).

Figure 16:
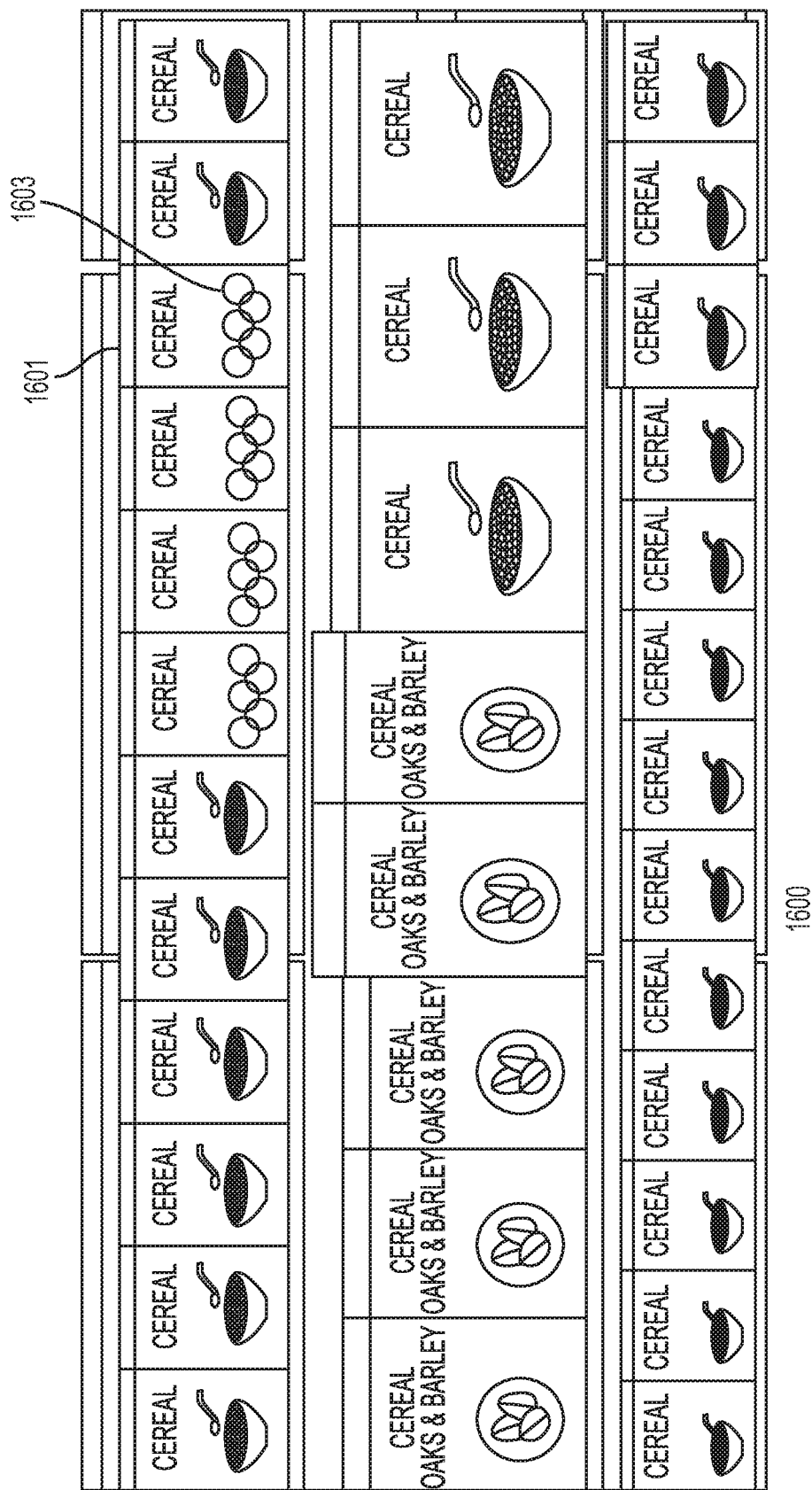
FIG. 16 depicts an exemplary image that may be used in product identification analysis, consistent with the present disclosure.

FIG. 16 represents an exemplary image received by the system, consistent with the present disclosure. The image may depict multiple shelves with many different types of product displayed thereon. Image 1600 shows three shelves with different types of products. Olympic logo 1603 appears on the packages of cereal 1601. To identify the Olympic logo, image processing unit 130 may deactivate the existing product models for cereal 1601 and add in the "Olympic" product models to replace the existing product model. The "Olympic" product models may include descriptions of the Olympic logo, images of sports player, images of medals, etc. Based on image analysis described above, image processing unit 130 may recognize Olympic logo 1603.

Figure 17:
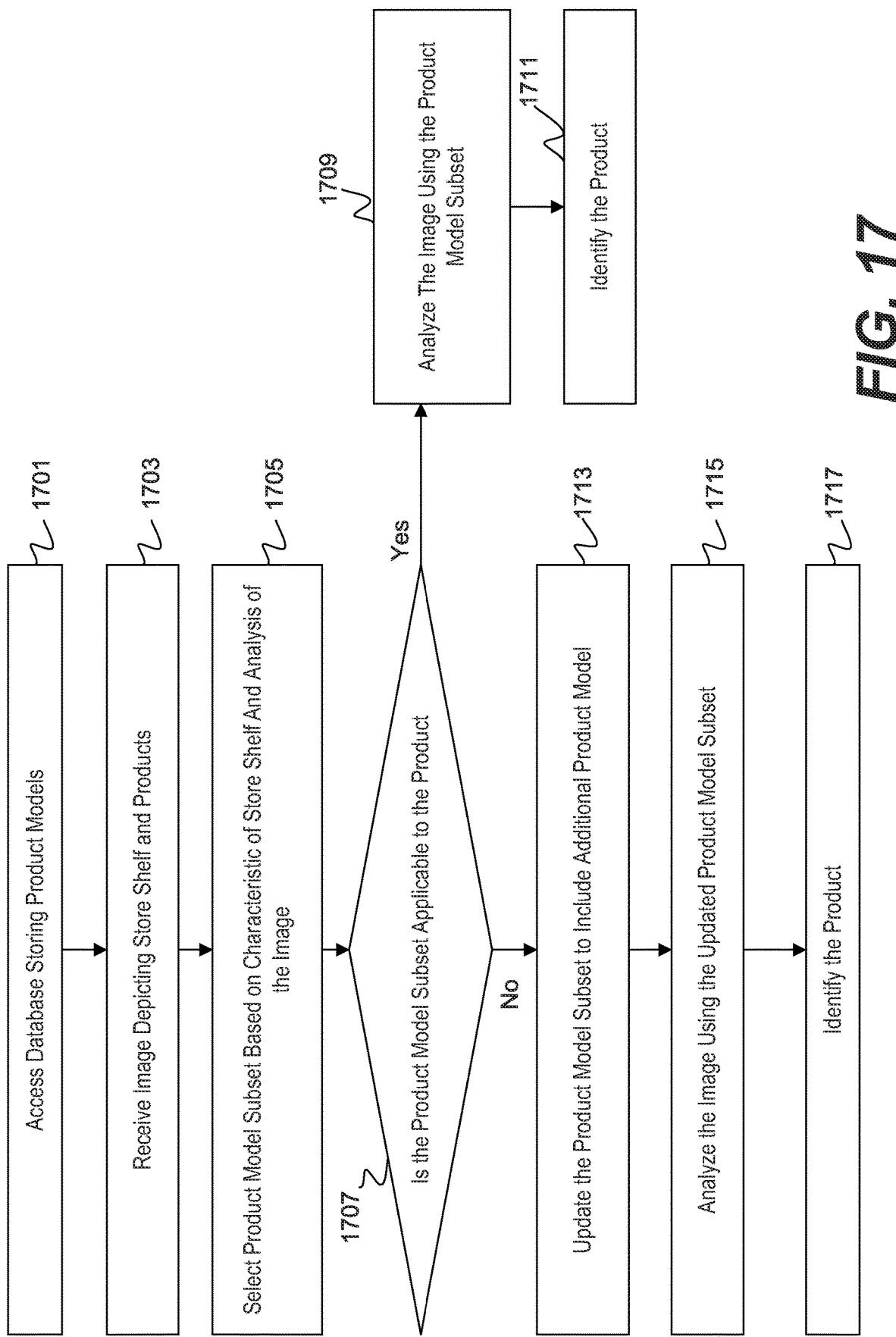
FIG. 17 is a flow chart of an exemplary method for identifying products in a retail store, consistent with the present disclosure.

FIG. 17 is a flow chart, illustrating an exemplary method 1700 for identifying products in a retail store based on image analysis of the captured images, in accordance with the present disclosure. The order and arrangement of steps in method 1700 is provided for purposes of illustration. As will be appreciated from this disclosure, modifications may be made to process 1700 by, for example, adding, combining, removing, and/or rearranging one or more steps of process 1700.

In step 1701, the method may comprise accessing a database storing a set of product models relating to a plurality of products. For example, server 135 may access product models stored in database 140. Consistent with the present disclosure, server 135 may be configured to access database 140 directly or via network 150. Accessing database 140 may comprise storing/retrieving data stored in database 140. For example, server 135 may be configured to store/retrieve a group of product models. As described above, "product model" refers to any type of algorithm or stored product data that a processor can access or execute to enable the identification of a particular product associated with the product model. For example, the product model may include a description of visual and contextual properties of the particular product (e.g., the shape, the size, the colors, the texture, the brand name, the price, the logo, text appearing on the particular product, the shelf associated with the particular product, adjacent products in a planogram, the location within the retail store, etc.). That said, "Coca-Cola Zero" product model may include the visual characteristics of "Coca-Cola Zero," for example, "black package," "black lid," "signature Coca-Cola logo," text "Zero Calorie," text "Zero Sugar," and "Coca-Cola's iconic bottle," etc. Such visual characteristics may be stored as images, text, or any other source server 135 may recognize. "Coca-Cola Zero" product model may also include contextual information, such as, "price range of $5-$10", "displayed in soft drink section," "Soda may be displayed on the same shelve," "displayed on bottom of the shelves," and/or "stored in a fridge," etc. In another example, "Head & Shoulders Shampoo" may include the visual characteristics of "Head & Shoulders Shampoo," for example, "signature curve bottle", "Head & Shoulders logo", "white container", "blue cap," text "Anti-Dandruff," etc. "Head & Shoulders Shampoo" product model may also include contextual information, such as, "price range of $15-$20", "displayed in personal product section," "conditioner may be displayed on the same shelve," "displayed on top of the shelves," and/or "stored on the second floor," etc.

In step 1703, the method may comprise receiving at least one image depicting at least one store shelf and at least one product displayed thereon. For example, server 135 may receive one or more image. The image may depict a shelf with products in a retail store. For example, as described in FIG. 16A, the image may depict products displaying on one or more shelves, and in FIG. 16B, the image may depict a type of product displayed on a shelf or a part of a shelf. Consistent with the present disclosure, server 135 may receive the image via network 150. In some embodiments, server 135 may receive the image from an input device, such as, hard disks or CD ROM, or other forms of RAM or ROM, USB media, DVD, Blu-ray, or other optical drive media, or the like. For example, the image may be in an image format (e.g., JPG, JPEG, JFIF, TIFF, PNG, BAT, BMG, or the like).

In step 1705, the method may comprise selecting a product model subset from among the set of product models based on at least one characteristic of the at least one store shelf and based on analysis of the at least one image, wherein a number of product models included in the product model subset is less than a number of product models included in the set of product models. Server 135 may select a subset of product models from the set of product models in the database 140, based on at least one characteristic of the at least one shelf in the image. Consistent with the present disclosure, server 135 may analyze an image to identify characteristic of the at least one shelf in the image. Such characteristics may include the visual characteristics of the shelf (e.g., length, width, depth, color, shape, lighting on the self, the number of partitions of a shelf, number of layers, and/or whether a glass door is in front of the self, etc.). Such characteristics may also include the location of a shelf, for example, "second floor," "forth aisle," "cleaning section," etc. In some aspects, image processing unit 130 may identify the location information by recognizing the text on a sign or a promotion material depicted in the image. In some aspects, such characteristics may also include information of the products displayed on the shelf (e.g., the price of the products, the type of the products, and/or the section in the retail store, etc.). Based on the characteristics, server 135 may determine the category of product that the shelf is for. For example, server 135 may determine the shelf for soft drinks, the shelf for cleaning products, the shelf for personal products, and/or the shelf for books, or the like. Server 135 may apply any suitable image analysis technique including, for example, object recognition, image segmentation, feature extraction, optical character recognition (OCR), object-based image analysis, shape region techniques, edge detection techniques, pixel-based detection, object recognition algorithms, machine learning algorithms, artificial neural networks, etc.

In step 1707, the method may comprise determining whether the selected product model subset is applicable to the at least one product. For example, server 135 may determine whether the selected subset of product models is applicable to the at least one product. Consistent with the present disclosure, server 135 may determine whether the subset of product models is applicable to the at least one product in the image. In some embodiments, server 135 may determine whether the subset of product models is applicable to the at least one product in the image based on product recognition and image analysis, using the selected subset of product models. For example, when the product in the image is not recognizable, then server 135 may determine that the selected subset of product models is not applicable to the at least one product in the image.

In step 1709, when the selected product model subset is determined to be applicable to the at least one product, the method may comprise analyzing a representation of the at least one product depicted in the at least one image using the product model subset. For example, when server 135 determines the selected subset of product models is applicable to the at least one product in the image, then server 135 may analyze the image and identify the type of product in the image, using the selected subset of product models. Server 135 may analyze the image and determine a type of product in the image. For example, if the image in FIG. 16A is analyzed, server 135 may distinguish eight different types of products, using classification algorithms. If the image in FIG. 16B is analyzed, server 135 may identify a specific type of product. Consistent with the present disclosure, server 135 may use any suitable image analysis technique including, for example, object recognition, image segmentation, feature extraction, optical character recognition (OCR), object-based image analysis, shape region techniques, edge detection techniques, pixel-based detection, object recognition algorithms, machine learning algorithms, artificial neural networks, etc. In some embodiments, server 135 may utilize suitably trained machine learning algorithms and models to perform the product identification, as described above.

In step 1711, the method may comprise identifying the at least one product based on the analysis of the representation of the at least one product depicted in the at least one image using the product model subset. For example, server 135 may identify the at least one product in the image, based on the image analysis, using the selected subset of product models. Analyzing the image may comprise identifying one or more characteristics of the at least one product in the image. In some embodiments, server 135 may identify the product in the image based at least on visual characteristics of the product (e.g., size, shape, logo, text, color, etc.). Based on the identified visual characteristics, server 135 may determine a type of product that server 135 suspects the image to be or contains. For example, when server 135 identifies some visual characteristics of "Head & Shoulders Shampoo" in the image, such as, "signature curve bottle", "Head & Shoulders logo", "white container", "blue cap," etc., then server 135 may determine "Head & Shoulders Shampoo" to be the type of product in the image.

In step 1713, when the selected product model subset is determined to be not applicable to the at least one product, the method may comprise updating the selected product model subset to include at least one additional product model from the stored set of product models not previously included in the selected product model subset to provide an updated product model subset. For example, when server 135 determines the selected subset of product models is not applicable to the at least one product in the image, then server 135 may update the selected subset of product models to include at least one additional product model. After updating the selected subset of product models, server 135 may analyze the image and identify the type of product in the image, using the selected subset of product models.

Updating the selected subset of product models may also comprise deleting or deactivating one or more product model in the selected subset of product models. In some embodiments, updating the selected subset of product models may comprise adding an additional product model. For example, when the brand of the at least one product in the image is identified, server 135 may add, to the selected subset of product models, an additional product model that may be associated with the brand of the at least one product in the image. When the logo (e.g., "gluten free logo") on the at least one product in the image is identified, then server 135 may add, to the selected subset of product models, an additional product model that has the same characteristics (i.e., the same logo). When the product category (e.g., cleaning products, soft drinks, foods, snacks, or the like) of the at least one product in the image is identified, then server 135 may add, to the selected subset of product models, an additional product model that is associated with the same category of the at least one product in the image. In some aspect, updating the selected subset of product models may also comprise modifying a product model in the subset of product models. For example, based on the detected change in the visual characteristic(s) of a product, server 135 may modify description of such characteristic(s) stored in the product model.

In step 1715, the method may comprise analyzing the representation of the at least one product depicted in the at least one image in comparison to the updated product model subset. For example, server 135 may analyze the image, in comparison to the updated subset of product models. As described above, server 135 may use any suitable image analysis technique to analyze the image.

In step 1717, the method may comprise identifying the at least one product based on the analysis of the representation of the at least one product depicted in the at least one image in comparison to the updated product model subset. For example, server 135 may identify the at least one product in the image, based on the image analysis, in comparison to the updated subset of product models. As described above, server 135 may identify the type of the at least one product.

Consistent with the present disclosure, the method may further comprise initiating an action that updates the product model subset associated with the at least one store shelf upon determining that the product model subset is obsolete. As described above, server 135 may determine a subset of product models to be obsolete. A user may input an indication that a subset of product models may be obsolete. Server 135 may determine a subset of product models to be obsolete, based on the image analysis, at least because at least one product in the image may not be recognized. Upon a subset of product models is determined to be obsolete, server 135 may be configured to initiate an action that updates the subset of product model.

According to the present disclosure, a system for processing images captured in a retail store and determining sizes of products displayed on a shelf may include at least one processor. By way of example, FIG. 1 illustrates system 100, which enables identification of products in retail stores 105 based on analysis of captured images.

According to the present disclosure, system 100 may use at least one visual characteristic of a product, for example, a bottle. The visual characteristics may include, for example, shape, logo, textual elements on a label, color, price, brand etc. to identify the bottle. According to the present disclosure, the product may include a carton or any container, which may be capable of storing product contents. Products may include any liquids, solids or semi-solids or any combination of any liquids, solids or semi-solids which can be stored in a container including but not limited to juice, water, soft drinks, alcoholic drinks, milk, medications, beauty products, hair products, body products, cleaning supplies, food products, beverages, energy drinks, carbonated drinks, ice creams, etc. While the present disclosure provides exemplary systems and methods for determining a size of a bottle, it should be noted that aspects of the disclosure in their broadest sense, are not limited to determining sizes of bottles. Rather the disclosed systems and methods may be used to determine the sizes of other types of containers (e.g. boxes, packets, pouches, cans, canisters, crates, cartons, packages etc.)

According to the present disclosure, system 100 may use contextual information, which may refer to any information having a direct or indirect relationship with a bottle displayed on a store shelf to identify the bottle. According to the present disclosure, the system may retrieve different types of contextual information from captured image data and/or from other data sources. In some cases, contextual information may include recognized types of products adjacent to the bottle, location of the product in the retail store, and other product information collected from multiple retail stores, product information retrieved from a catalog associated with a retail store, etc. In other cases, contextual information may also include visual characteristics of the bottle and visual characteristics of the products adjacent to the bottle. Contextual information may further include outline design of the products which may refer to the shape of the product, features of the product, relative positions of features of the product, and so forth.

According to the present disclosure, physical proportions of a bottle may be used to differentiate between bottles with similar visual characteristics. A shelf in a retail store may contain multiple types and brands of products packaged in bottles of different physical proportions. Consistent with the present disclosure, the physical proportions of the bottle may be used to classify, sort, categorize and/or identify a particular bottled product. For Example, the physical proportions of a 100 ml Pepsi® bottle and a 500 ml Coca-Cola® bottle may be very different. In another example, while other visual properties of a 1 Liter Coca-Cola® bottle and a 2 Liter Coca-Cola® may be identical or very similar, the physical proportions of the two bottles may be very different.

Capturing device 125 may capture an image of the shelf which includes multiple bottles. Image processing unit 130 may analyze the captured image to detect a representation of a bottle in the image. Physical proportions of a bottle may also be referred to as outline elements. As used in this disclosure, outline elements may refer to various portions of the bottle. Various dimensions of the outline elements for e.g. length, width, height, depth, or any other dimensions of the outline elements may be used by system 100. For example, Image processing unit 130 may further analyze the image of the bottle to determine at least one ratio of two lengths associated with two outline elements of the bottle. The determined at least one ratio may be used to determine the size of the bottle and/or type of product.

According to the present disclosure, image processing unit 130 may analyze the captured image to detect at least one store shelf. Further, the image processing unit 130 may use the detected at least one shelf to detect the bottle. For example, image processing unit 130 may detect the bottle based on the detected store shelf when the bottle is associated with the at least one store shelf. It is also contemplated that image processing unit 130 may use information associated with the shelves to detect the bottle. The information associated with the shelves may be obtained from a store map and/or a planogram and/or a store database, from an analysis of images of the shelves, and so forth. For example, the location of the shelf may be used to focus the search area for bottles to an area directly above the shelf. In another example, two or more shelves may be detected in an image, the image may be analyzed to determine that a first shelf is associated with bottles while a second shelf is not associated with bottles (for example, from labels attached to the shelves, location of the shelves, or any other technique described above), and the search for bottles may be targeted in an area directly above the first shelf rather than an area directly above the second shelf.

Outline elements of bottles as described above, may be used to differentiate between premium brand name products and/or generic store brand products. For example, outline elements of a Neutrogena® moisturizer bottle may be different from the outline elements of a store brand moisturizer bottle. Even if the visual characteristics of the Neutrogena® moisturizer bottle and the store brand moisturizer bottle may be same, they may be differentiated using the different outline elements. In another example, outline elements of bottles may be used to identify if the bottles are packaged in a group (6-pack, 12-pack, 24-pack etc.) and placed on the shelf or individually placed on a shelf. There are many examples of bottled products with similar visual characteristics for which outline elements may be an effective way to differentiate between the products based on bottle sizes, the examples herein are in no way limiting. For example, outline elements of a 6-pack of 100 ml soda are different from the outline elements of a 12 pack 100 ml soda.

Database 140 may store product data including visual characteristics, physical proportions or outline elements, lengths of outline elements and contextual information of every product displayed on a store shelf. Product data, including outline designs and/or ornamental designs of all the products in the retail store may be stored in database 140. Product data may also include, for example, product name, product identifier, product width, product height, product depth, product area, product diagonal length, product size, manufacturer brand of the product, price of the product, image of the product, etc. Product data may also include a table with ratio of the pixel dimensions of the outline elements to the physical dimensions of all the products mapped to the length, width, or any other dimensions of the outline elements of the products in the retail store. Product data may further include a table with ratios of plurality of outline elements mapped to various heights of bottles. Product data may further include a ratio of a length associated with at least one of: a bore of the bottle, an orifice of the bottle, a lip of the bottle, a collar of the bottle, and/or a length associated with at least one of a neck of the bottle, a body of the bottle, an insweep of the bottle, a heel of the bottle, and a base of the bottle. Multiple ratios using various combinations of the lengths of the outline elements may be stored in database 140. The stored outline elements may be acquired by image processing unit 130 or any component of system 100 whenever required. Database 140 may also include a table mapping size and various visual characteristics to the associated product. Database 140 may also include historic data related to size determination for every product. System 100 may use the stored information in database 140 to determine a product size and/or a product type.

Outline elements of the bottles may also be used to differentiate between bottles of varying sizes when visual characteristics of the bottles are not visibly captured in an image of a product shelf. For Example, if only half a bottle is visible and the other half may be hidden, image processing unit 130 may receive only a portion of the image data required to identify the bottle size based on the visual characteristics of the bottle. By identifying the outline elements of the bottles and comparing lengths of two outline elements of the bottle, system 100 may be able to correctly identify the size of the bottle and the type of product.

According to the present disclosure, outline elements may be used in conjunction with any of the visual characteristics previously disclosed to differentiate between product sizes identified in an image. Further, in accordance with the present disclosure, determining a confidence level associated with the determined size of the bottle.

According to the present disclosure, system 100 may compare the confidence level to a threshold. The term "threshold" as used herein denotes a reference value, a level, a point, or a range of values, for which, when the confidence level is above it (or below it depending on a particular use case), system 100 may follow a first course of action and, when the confidence level is under it (or above it depending on a particular use case), system 100 may follow a second course of action. The value of the threshold may be predetermined for each size of the bottle or may be dynamically selected based on different considerations.

According to the present disclosure, the at least one processor may be configured to execute instructions to perform a method for processing images captured in a retail store. Further, in accordance with the present disclosure, a computer program product for processing images captured in a retail store may be provided. The computer program product may be embodied in a non-transitory computer-readable medium and may executable by at least one processor to execute a method for processing images captured in a retail store. The method of processing the images may include identifying a bottle on the shelf of the retail store and determining the size of the bottle. In accordance with the present disclosure, the method may further include determining a confidence level for the determined size.

In accordance with the present disclosure, the at least one processor may be configured to receive at least one image depicting a store shelf having at least one bottle displayed thereon. According to the present disclosure, the method for processing images captured in a retail store may include receiving at least one image depicting a store shelf having at least one bottle displayed. FIG. 18B illustrates an exemplary method 1850 of determining size of a bottle, consistent with the present disclosure. Exemplary method 1850 may include a step of receiving an image depicting a store shelf (step 1852). By way of example, image processing unit 130 may receive the image from the image capturing apparatus 125, via network 150.

Figure 18A:
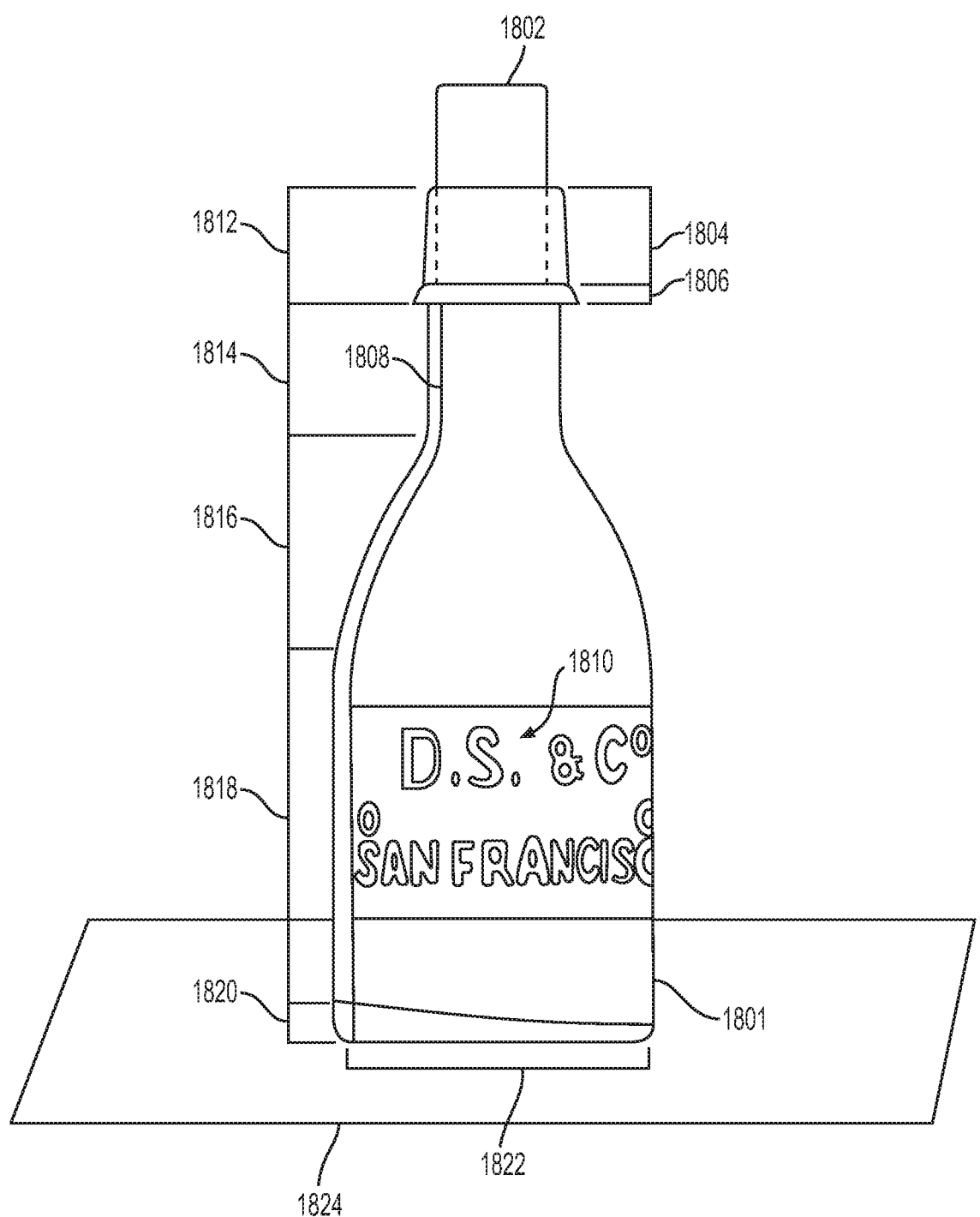
FIG. 18A illustrates an exemplary embodiment of a bottle showing exemplary outline elements, consistent with the present disclosure.
Figure 18B:
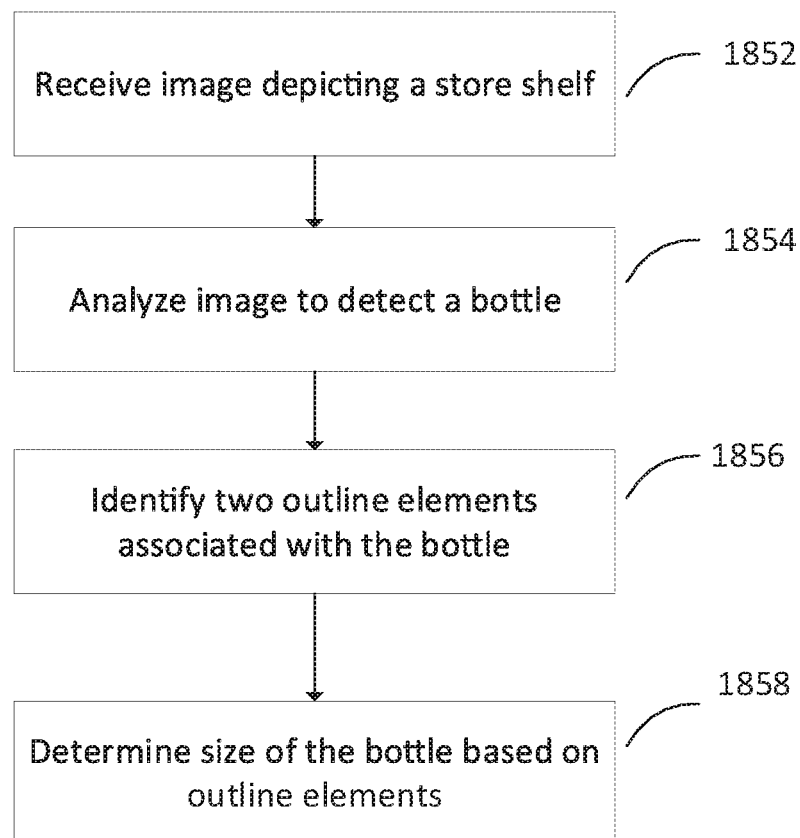
FIG. 18B is a flow chart of an exemplary method of determining size of a bottle, consistent with the present disclosure.

FIG. 18A illustrates an exemplary image 1800 that may be received by image processing unit 130. As illustrated in FIG. 18A, image 1800 may include at least one shelf 1824 and bottle 1801 positioned on shelf 1824. For example, bottle 1801 may include outline elements such as a bore or an orifice 1802 of the bottle, a lip 1804 of the bottle, a collar 1806 of the bottle, a side mold seam 1808 of the bottle, a finish 1812 of the bottle, a neck 1814 of the bottle, a shoulder 1816 of the bottle, a body 1818 of the bottle, an insweep or a heel 1820 of the bottle, and a base 1822 of the bottle. The bottle may be placed on a shelf 1824. By way of example, bottle 1801 may also include ornamental design 1810 of the bottle. Ornamental design 1810 may refer to an embossing, etching, carving, stamp, engraving, marking, or any decorative element imprinted on the outside or inside of the bottle. While the present disclosure provides examples of various physical proportions or outline elements of a bottle, it should be noted that aspects of the disclosure in their broadest sense, are not limited to the disclosed physical proportions or outline elements.

According to the present disclosure, the at least one processor may further be configured to analyze the image to detect a representation in the image of the at least one bottle which has an outline design. In accordance with the present disclosure, the method for processing images captured in a retail store may further include analyzing the image to detect a representation in the image of the at least one bottle which has an outline design. For example, outline design may refer to the shape of the bottle, to features of the bottle, relative positions of features of the bottle, and so forth. Exemplary method 1850 may include a step of analyzing the image to detect a bottle (step 1854). According to the present disclosure, the detection can at least in part be based on visual characteristics of the bottle and/or contextual information of the bottle as described previously. For example, the bottle in the image may have a distinct color and text on the label of the bottle clearly visible in the captured image which may be beneficial in detecting the bottle.

As previously discussed, in accordance with the present disclosure, outline elements may refer to various portions of the bottle. Various dimensions of the outline elements for e.g. length, width, height, depth, or any other dimensions of the outline elements may be used by system 100. According to the present disclosure, the at least one processor may further be configured to identify two or more outline elements associated with the outline design of the bottle where, each of the two or more outline elements have specific lengths. In accordance with the present disclosure, the method for processing images captured in a retail store may further include identifying two or more outline elements associated with the outline design of the bottle where, each of the two or more outline elements have specific lengths. Exemplary method 1850 further comprises of identifying two or more outline elements of specific lengths associated with the bottle (step 1856). In some examples, the two or more outline elements may be selected from a group including a bore of the bottle, an orifice of the bottle, a lip of the bottle, a collar of the bottle, a top of a bottle, a neck of the bottle, a body of the bottle, an insweep of the bottle, a heel of the bottle, a base of the bottle, a side mold seam of the bottle, a finish of the bottle, a shoulder of the bottle, and so forth. By way of example, FIG. 18A illustrates exemplary outline elements. For example, bottle 1801 may include outline elements such as a bore or an orifice 1802 of the bottle, a lip 1804 of the bottle, a collar 1806 of the bottle, a side mold seam 1808 of the bottle, a finish 1812 of the bottle, a neck 1814 of the bottle, a shoulder 1816 of the bottle, a body 1818 of the bottle, an insweep or a heel 1820 of the bottle, and a base 1822 of the bottle.

Each of the two or more selected outline elements may have a specific length. The lengths of the outline elements may be different for bottles of different products. For example, the neck 1814 of a Coca-Cola® bottle may have a different length than the neck 1814 of a Gatorade® bottle or the base 1822 of a 50 ml bottle may be smaller than the base 1822 of a 500 ml bottle. Also, the neck 1814 of a Coca-Cola® bottle may have a different length than the base 1822 of a 50 ml bottle or any combination thereof. In some embodiments, one or more images of the at least bottle may be analyzed to determine the length of the two or more selected outline elements, and/or a function of the lengths of the two or more selected elements, such as a ratio of the lengths of two lengths, a function of the ratio, a difference between two lengths, a distribution of the lengths of the two or more selected outline elements, a function or property of the distribution of the lengths of the two or more selected outline elements (such as mean, median, mode, standard deviation, variance, coefficient of variation, coefficient of dispersion, standardized moment, Fano factor, etc.), and so forth. The one or more images may be analyzed using any techniques known to one skilled in the art, such as machine learning algorithms, artificial neural networks, convolutional neural networks, and so forth.

According to the present disclosure, the at least one processor may further be configured to determine a size of the at least one bottle based on a comparison of the lengths of the two or more outline elements. In accordance with the present disclosure, the method for processing images captured in a retail store may further include determining a size of the at least one bottle based on a comparison of the lengths of the two or more outline elements. In some embodiments, the size of the at least one bottle may be determined based on the function of the lengths of the two or more selected elements determined by analyzing the one or more images of the at least one bottle, as described above. For example, the size of the at least one bottle may be determined using the length of the two or more selected outline elements, a function of the lengths of the two or more selected outline elements, such as a ratio of the lengths of two lengths, a function of the ratio, a difference between two lengths, a distribution of the lengths of the two or more selected elements, a function or property of the distribution of the lengths of the two or more selected outline elements (such as mean, median, mode, standard deviation, variance, coefficient of variation, coefficient of dispersion, standardized moment, Fano factor, etc.), and so forth. For example, the value of the function of the lengths of the two or more selected outline elements may be compared with selected one or more thresholds, and the size of the at least one bottle may be determined based on result of the comparison. In another example, the value of the function of the lengths of the two or more selected outline elements may be compared with selected ranges, and the size of the at least one bottle may be determined based on the range the value falls in. In yet another example, the size of the at least one bottle may be calculated using the function of the lengths of the two or more selected outline elements.

According to the present disclosure, image processing unit 130 may determine the product type and/or the bottle size by matching the stored outline elements to the images of products stored in database 140. For example, image processing unit 130 may compare the received image to the images of products stored in database 140. Image processing unit 130 may identify a matching image and divide the captured image of the bottle into multiple portions or outline elements, for e.g. body 1818, neck 1814, shoulder 1816, etc. based on the comparison. Image processing unit 130 may then extract additional product data including lengths of outline elements for the matching image, also stored in database 140. Image processing unit 130 may further compare the identified outline elements of the received image to the outline elements of the matching image to determine the length of the outline elements in the received image.

For example, system 100 may be configured to determine the length of neck 1814 of a Gatorade® bottle and the length of base 1822 of the Gatorade® bottle. System 100 is further configured to compare the identified lengths of the two outline elements i.e. neck 1814 and the base 1822 with the stored lengths of the neck 1814 and the base 1822 of the Gatorade® bottle. In another example, system 100 may be configured to determine the ratio of the length of neck 1814 of a Gatorade® bottle and the length of base 1822 of the Gatorade® bottle, and compare the determined ratio with some selected thresholds and/or selected values ranges, for example to determine a size of the bottle, a type of the bottle, a brand of the bottle, and so forth. While the present disclosure provides exemplary systems and methods for determining a size and a product type of a bottle, it should be noted that aspects of the disclosure in their broadest sense, are not limited to determining sizes or types of bottled products. Rather the disclosed systems and methods may be used to determine the sizes or types of other types of containers (e.g. boxes, packets, pouches, cans, etc.) or other types of products stored in containers (e.g. cereals, chips, yogurts, perfumes, shampoos, etc.)

In accordance with the present disclosure, image processing unit 130 may also use artificial neural networks to identify the outline elements. For example, in accordance with the present disclosure, image processing unit 130 may use convolutional neural networks to identify outline elements. Convolutional neural networks may be capable of identifying and combining low-level features of the product in the received image for e.g. lines, edges, colors to more abstract features for e.g. squares, circles, objects, etc. to identify a product. Once the product is identified, system 100 may identify the outline elements for e.g. body 1818, neck 1814, shoulder 1816, etc. of the identified product by comparing the image of the same product stored in database 140.

According to the present disclosure, the lengths of the outline elements and/or the function of the lengths of the outline elements may be determined using pixel data. For example, image processing unit 130 may identify multiple portions or outline elements, for e.g. body 1818, neck 1814, shoulder 1816, etc. of the received image. Image processing unit 130 may further determine pixel dimensions of each of the identified outline elements. For example, image processing unit 130 may determine height of the neck 1814 of the bottle in pixels or width of the base 1822 in pixels, etc. Image processing unit 130 may further determine height of the bottle, i.e. distance between the end-points of the bottle. Image processing unit may determine ratio of the pixel dimensions of an outline element to the height of the bottle. Image processing unit 130 may then compare the determined ratio to the product data stored in database 140 to identify the length of the outline element. In this case, product data may include a table with ratio of the pixel dimensions of the outline elements to the physical dimensions of all the products mapped to the length, width, or any other dimensions of the outline elements of the products in the retail store. For example, the height in pixels of the neck 1814 of the bottle in pixels is 200 and the height of the bottle is 152 mm, the ratio may be determined to be 200/152=1.31. Image processing unit 130 may compare the determined ratio to the ratios stored in the database to obtain the length of the neck 1814.

Exemplary method 1850 further comprises of determining a size of the at least one bottle based on a comparison of the lengths of the two outline elements (step 1858). For example, the at least one image may be analyzed to determine at least one ratio of two lengths associated with the bottle. The determined at least one ratio may be used to determine a size of the bottle. Database 140 may include a table with ratios of plurality of outline elements mapped to various heights of bottles. The different lengths associated with the outline elements may be obtained from the manufacturer when the product is stocked in the retail store. The different lengths associated with the outline elements may be input by a store employee, or may be retrieved from product data stored in database 140. The different lengths associated with the outline elements can also be input by a supplier or manufacturer of the product. In this case, the product data may include a table associating lengths associated with the outline elements with a particular brand or size of bottle which may be provided. System 100 may calculate multiple ratios of the outline elements and store them in database 140. For example, the at least one ratio may comprise a ratio of a length associated with at least one of: a bore or an orifice 1802 of the bottle, a lip 1804 of the bottle, a collar 1806 of the bottle, a side mold seam 1808 of the bottle, a finish 1812 of the bottle, a neck 1814 of the bottle, a shoulder 1816 of the bottle, a body 1818 of the bottle, an insweep or a heel 1820 of the bottle, and a base 1822 of the bottle. Multiple ratios using various combinations of the lengths of the outline elements may be stored in database 140.

According to the present disclosure, the at least one processor may further be configured to determine a size of the at least one bottle when at least 50% of the outline design of the bottle is obscured. For example, an individual or an object may obscure at least a portion of the field of view of capturing device 125. In this case, at least 50% or more than 50% of the outline design may be obscured. In this case, system 100 may use only a portion of the shelf and partial image of the bottle on that shelf to determine the size of the bottle. For example, a 500 ml Pepsi® bottle may be obscured by an obstacle. System 100 may obtain a partial image of the bottle and may use the outline elements available in the partial image to determine the size of the bottle. For example, if only the top half of the bottle is captured, system 100 may use the lengths associated with neck 1814 of the bottle and bore 1802 of the bottle to determine the size of the bottle. For example, system 100 may determine the ratio of the length of neck 1814 to bore 1802 of the bottle. System 100 may compare the obtained ratio to the product data stored in database 140. In this case, product data may include a table mapping ratio of plurality of outline elements to the size of the product. In this case, system 100 may not rely on the ornamental design 1810 or the label, logo or any other visual characteristics to determine the size of the bottle.

Figure 18C:
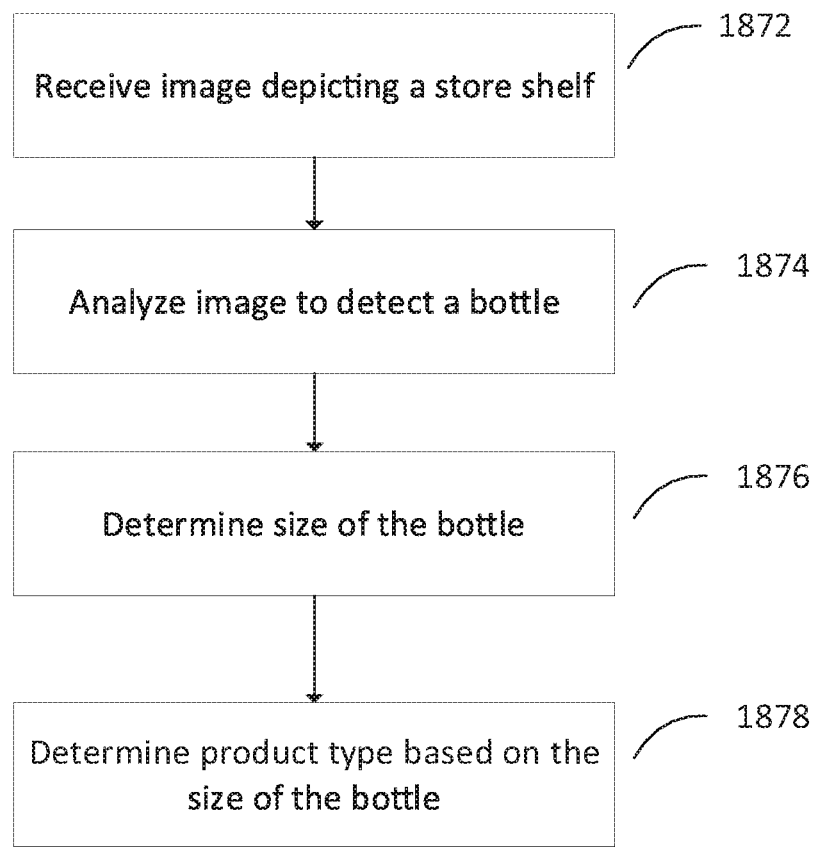
FIG. 18C is a flow chart of an exemplary method of determining product type, consistent with the present disclosure.

According to the present disclosure, the at least one processor may further be configured to determine a product type of the at least one bottle based on the determined size. In accordance with the present disclosure, the method for processing images captured in a retail store may further include determining a product type of the at least one bottle based on the determined size. Exemplary method 1870 disclosed in FIG. 18C may include a step of receiving image depicting a store shelf (step 1872); analyzing image to detect a bottle (step 1874); determining the size of the bottle (1876) and determining a product type based on the size of the bottle (step 1878). For example, if the size of a bottle may be determined by analyzing the image received from the image capturing device 125. Based on the size and the ornamental design 1810 and/or the visual characteristics or the outline elements and/or the outline design of the bottle in the image, a product type may be determined. For example, a size of 100 ml is determined for the bottle based on the image analysis or one or more of the methods discussed in accordance with the present disclosure. The image can be further analyzed to detect the visual characteristics of the bottle including but not limited to the logo, price, shape, textual elements on the label etc. For example, a Pepsi® bottle may be detected using size of the bottle obtained using one or more of the methods discussed in accordance with the present disclosure. The image capturing unit 130 may capture the unique Pepsi® logo which includes a circle divided into three sections with red white and blue colors. System 100 may compare the determined parameters with those stored in database 140 to identify the product type. In this case, database 140 may include a table mapping the size and various visual characteristics to the associated product. The visual characteristics including the logo, price, shape, textual elements on the label etc. may be stored in database 140. Based on at least the size of the bottle and additionally or alternatively using the visual characteristics of the bottle, a product type may be determined.

According to the present disclosure, the at least one processor may further be configured to determine a product type of another product displayed on the store shelf based on the determined size of the at least one bottle. In accordance with the present disclosure, the method for processing images captured in a retail store may further include determining a product type of another product depicted in the image based on the determined size of the at least one bottle. For example, a type of a product may be identified based, at least in part, on the determined size of the bottle. According to the present disclosure, system 100 may determine the size of a bottle and use this determination to access the database 140 and obtain information about the products having a direct or indirect relationship with the bottle. System 100 may determine a product type based on the placement of products of different sizes on the same shelf or adjacent shelves. In some embodiments, system 100 may use the ornamental design 1810 and/or the visual characteristics and/or the outline design of the products to determine if a correct product is placed on the correct shelf.

In accordance with the present disclosure, system 100 may also use machine learning to determine the product type based on context. System 100 may employ various machine learning techniques including decision tree learning, association rule learning, artificial neural networks, inductive logic programming, support vector machines, clustering, Bayesian networking, reinforcement learning, representation learning, similarity and metric learning, spare dictionary learning, rule-based machine learning, etc. In accordance with the present disclosure, machine learning may be used to predict context for a given product. System 100 may be able to predict which products are supposed to be placed next to or near by or on the adjacent shelf of the given product. For example, system 100 may predict, over time, that a Coca-Cola® bottle is more likely to be placed next to a Pepsi® bottle. Therefore, when system 100 identifies a Coca-Cola® bottle placed on a shelf, it may be able to predict which bottles or products may be placed next to the Coca-Cola® bottle on the same shelf. System 100 may also be able to predict products placed on any shelves adjacent to, above or below the shelf on which the Coca-Cola® bottle is placed.

According to the present disclosure, the at least one processor may further be configured to determine a product type of the at least one bottle based on the determined size of the at least one bottle and at least one of a brand associated with the at least one bottle, a logo associated with the at least one bottle, text associated with the at least one bottle, a price associated with the at least one bottle, and a shape of the at least one bottle. In accordance with the present invention, a type of a product may be identified based, at least in part, on the determined size of the bottle. In one case, the product may be the bottle. In accordance with the present invention, the product may be a different product than the bottle, but it was identified using the determined size of the bottle. In addition, the at least one image may be further analyzed to identify a brand associated with the bottle, and the identified brand may be used in the identification of the type of the product. In accordance with the present invention, the at least one image may be further analyzed to detect a logo associated with the bottle, and the detected logo may be used in the identification of the type of the product (for example by using image recognition algorithm to recognize the logo, and using the identity of the logo of the identification of the type of the product). In accordance with the present invention, the at least one image may be further analyzed to identify text associated with the bottle, and the identified text may be used in the identification of the type of the product (for example by processing the image of the text using OCR algorithm, and using the resulting textual information in the identification of the type of the product). In accordance with the present invention, the at least one image may be further analyzed to identify a price associated with the bottle, and the identified price may be used in the identification of the type of the product (for example as described below). In accordance with the present invention, the at least one image may be further analyzed to detect a label associated with the bottle, and the detected label may be used in the identification of the type of the product (for example by identifying text on the label using OCR and using the resulting textual information in the identification of the type of the product, by using price specified on the label as described below, by identifying a barcode on the label and using the identified barcode in the identification of the type of the product, and so forth). In accordance with the present invention, the at least one image may be further analyzed to identify at least one store shelf associated with the bottle, and the identified at least one store shelf may be used in the identification of the type of the product (for example, in a combination with information associated with the shelves, which in some cases may be obtain from a store map and/or a planogram and/or a store database, from an analysis of images of the shelves, and so forth). According to the present disclosure, the at least one processor may further be configured to determine a confidence level for the determined size. In accordance with the present disclosure, the method for processing images captured in a retail store may further include determining a confidence level for the determined size. FIG. 18D illustrates an exemplary method 1880 of confirming size of a bottle based on a confidence level, consistent with the present disclosure. Exemplary method 1880 may include a step of receiving image depicting a store shelf (step 1882); analyzing image to detect a bottle (step 1884); determining the size of the bottle (1886), determining a confidence level for the determined size (step 1888). In accordance with the present disclosure, the term "confidence level" refers to any indication, numeric or otherwise, of a level (e.g., within a predetermined range) indicative of an amount of confidence system 100 has that the determined size of the bottle is the actual size of the bottle. For example, the confidence level may have a value between 1 to 10. The confidence level for every size of every product may be stored in database 140.

In accordance with the present disclosure, a confidence level may be calculated using historic data related to the bottle. Historic data related to size determination for every size of every product may be stored in database 140. Confidence level may be calculated by dividing a "number of times a correct size was predicted" by a "sample size". For example, system 100 may have determined size of a Gatorade® bottle 500 times in the past one year. Out of those 500 times, correct size may have been determined 300 times. Therefore, the confidence level may be calculated as 300/500*10=6. In this case, system 100 has a confidence level of 6 that the predicted size may be the correct size. The sample size may vary for every product depending on for example, number of days a product is in the retail store, number of products sold each day, number of products sold per day, etc.

In accordance with the present disclosure, system 100 may compare the confidence level to a threshold. The term "threshold" as used herein denotes a reference value, a level, a point, or a range of values, for which, when the confidence level is above it (or below it depending on a particular use case), system 100 may follow a first course of action and, when the confidence level is under it (or above it depending on a particular use case), system 100 may follow a second course of action. The value of the threshold may be predetermined for each size of the bottle or may be dynamically selected based on different considerations. The threshold for different bottles of different sizes may be stored in database 140.

In accordance with the present disclosure, the threshold may be calculated by using the historic data of confidence levels stored in database 140. For example, threshold may be calculated by calculating a mode of the confidence levels. For example, for a 100 ml Coca-Cola® bottle the mode of the confidence levels of a 100 ml Coca-Cola® bottle may be the confidence level that occurred the most often. If the 100 ml Coca-Cola® bottle has a threshold of 7 that means, maximum times the confidence level for the 100 ml Coca-Cola® bottle was 7. In accordance with the present disclosure, the confidence level may be updated and stored in database 140 every time system 100 makes a size determination. Therefore, based on the confidence level, the threshold may also be updated. Additionally, or alternatively in accordance with the present disclosure, the confidence level and threshold for every size of every product may be predetermined. The predetermined confidence level and threshold may be input by a retail store employee, manufacturer, system administrator or any other personnel and/or stored in database 140.

According to the present disclosure, the at least one processor may further be configured to determine when the confidence level is below a threshold and analyze the image to identify another product on the store shelf which may include another outline element associated with a specific length. According to the present disclosure, the at least one processor may further be configured to determine when the confidence level is below a threshold to identify another outline element of the at least one bottle. FIG. 18D illustrates an exemplary method 1880 of confirming size of a bottle based on a confidence level, consistent with the present disclosure. Exemplary method 1880 may include a step of receiving image depicting a store shelf (step 1882); analyzing image to detect a bottle (step 1884); determining the size of the bottle (1886), determining a confidence level for the determined size (step 1888), analyzing the image to identify another product with a third outline element associated with a specific length (step 1890). According to the present disclosure, the determined confidence level may be compared to the threshold stored in database 140. If it is determined that the confidence level is below the threshold, system 100 may be configured to perform additional steps. System 100 may further be configured to analyze the image to identify another product on the store shelf. The other product may be a second product different than the at least one bottle. The second product may be the same product of same size or different size or a different product in the retail store. The second product may be the same bottle of same of different size. The second product may be a product having different visual characteristics than the bottle including but not limited to shape, logo, textual elements on a label, color, price, brand etc. The second product may be a product which is stored on the same shelf or any of the adjacent shelves which are captured in the image. System 100 may further be configured to identify a third outline element of the second product associated with a specific length. For example, a milk carton may be placed next to a Gatorade® bottle. System 100 may be configured based on the methods disclosed in the present disclosure, to identify that the product next to the Gatorade® bottle is a milk carton. System 100 may be able to identify an outline element for example base 1822 associated with the milk carton. Further, system 100 may be configured to identify the length of the base 1822 of the milk carton along with the length of the neck 1814 or the body 1818 of the Gatorade® bottle. In another example, System 100 may further be configured based on the methods disclosed in the present disclosure, to identify a three different outline element of the same Gatorade® bottle. System 100 may be able to identify neck 1817, body 1818 and/or base 1822 associated with the same Gatorade® bottle. System 100 may further be configured based on the methods disclosed in the present disclosure, to identify to identify lengths of the neck 1817, the body 1818 and/or base the 1822 associated with the same Gatorade®

According to the present disclosure, the at least one processor may further be configured to confirm the size of the bottle based on a comparison of the specific length of the other outline element of the other product and the length of one of the two outline elements of the at least one bottle. According to the present disclosure, the at least one processor may further be configured to confirm the size of the bottle based on a comparison of the specific length of the other outline element of the at least one bottle and the length of one of the two outline elements of the at least one bottle. Exemplary method 1880 may further include a step of confirming the size of the bottle based on comparison of the specific length of the third outline element of the other product or the third outline element of the at least one bottle and the length of one of the two outline elements of the at least one bottle (step 1892). Continuing the above example, system 100 may be configured to compare the length of the base 1822 of the milk carton and length of the neck 1814 or the body 1818 of the Gatorade® bottle using the lengths of the outline elements for these products stored in database 140. System 100 may also be able to determine that the length of the identified outline element (i.e. length of the base 1822) of the milk carton matches with the and length of the stored outline element (i.e. length of the base 1822) of the milk carton and that the length of the identified outline element (neck 1814 or the body 1818 of the Gatorade® bottle) match with the stored outline element (neck 1814 or the body 1818 of the Gatorade® bottle) on that shelf. System 100 may be able to make this determination using the planogram and the product data stored in database 140. Based on the determination that the identified lengths match with the stored lengths, system 100 may confirm the size of the bottle.

According to the present disclosure, continuing the above example, system 100 may be configured to compare the length of neck 1817 with the length body 1818 or length of base 1822 associated with the same Gatorade® bottle. System 100 may also be able to determine that the length of identified neck 1817 and the length of the identified body 1818 or base 1822 matches with the length of the stored neck 1817 and the length of the stored body 1818 or base 1822. System 100 may be able to make this determination using the planogram and the product data stored in database 140. Based on the determination that the identified lengths match with the stored lengths, system 100 may confirm the size of the bottle.

According to the present disclosure, the at least one processor may further be configured to analyze the image to identify a label attached to the store shelf, wherein the label may include a textual element associated with a specific length and confirm the size of the bottle based on a comparison of the specific length of the textual element of the label and the length of one of the two outline elements of the at least one bottle. According to the present disclosure, upon determination that the confidence level is below a predetermined threshold, the identification can at least in part be made based also on visual characteristics of the store shelf (e.g., logo, text, color, label, price etc.). For example, the system 100 may identify a label associated with the shelf on which the at least one bottle is placed. This label may include a textual element associated with a specific length. This textual element may be the name, type, price, unique identifier, product identification code or any other catalogable codes, such as a series of numbers, letters, symbols, or any combinations of numbers, letters, and symbols. The length of the textual element of the label is compared to the length of one of the two outline elements of the at least one bottle. Based on the result of this comparison, system 100 is able to confirm the size of the at least one bottle. For example, continuing the above example, system 100 may further analyze the label attached to the store shelf on with the Gatorade® bottle is placed. The label may disclose the price of the Gatorade® bottle or a unique identifier of the Gatorade® bottle or any textual element associated with the Gatorade® bottle. System 100 may identify that the length of the unique identifier of the label of the Gatorade® bottle is 1.2 cm. The length of textual elements may be the lengths of price, identifier, code, symbol or any other textual element. System 100 compares the identified length of the identified unique identifier of the label of the Gatorade® bottle and the length of the identified body 1818 or base 1822 matches with the length of the stored unique identifier of the label of the Gatorade® bottle and the length of the stored body 1818 or base 1822. System 100 may be able to make this determination using the planogram and the product data stored in database 140. Based on the determination that the identified lengths match with the stored lengths, system 100 may confirm the size of the bottle.

According to the present disclosure, the method for processing images captured in a retail store may further include when the confidence level is below a threshold, attempt to recognize the product type of the at least one bottle based on at least one of: a brand associated with a detected bottle, a logo associated with the detected bottle, text associated with the detected bottle, a price associated with the bottle, and a shape of the detected bottle and confirm the size of the detected bottle based on the product type. According to the present disclosure, upon determination that the confidence level is below a predetermined threshold, system 100 may recognize the type of product as previously described, based on the visual characteristics of the products including but not limited to a brand, a logo, text associated with the detected bottle, price, a unique identifier, a bar code, a QR code and a shape associated with the detected bottle. The size of the detected bottle is then determined based on the identified type of product. For example, based on the visual characteristics, system 100 detects a Coca-Cola® logo on the bottle and the textual elements of the label show that it's a 100 ml bottle. System 100 retrieves the proportions of the outline elements of a 100 ml Coca-Cola® bottle from database 140. Based on this information determined using the image capturing device 125 and image processing unit 130, system 100 confirms the size of a 100 ml Coca-Cola® bottle.

Figure 19:
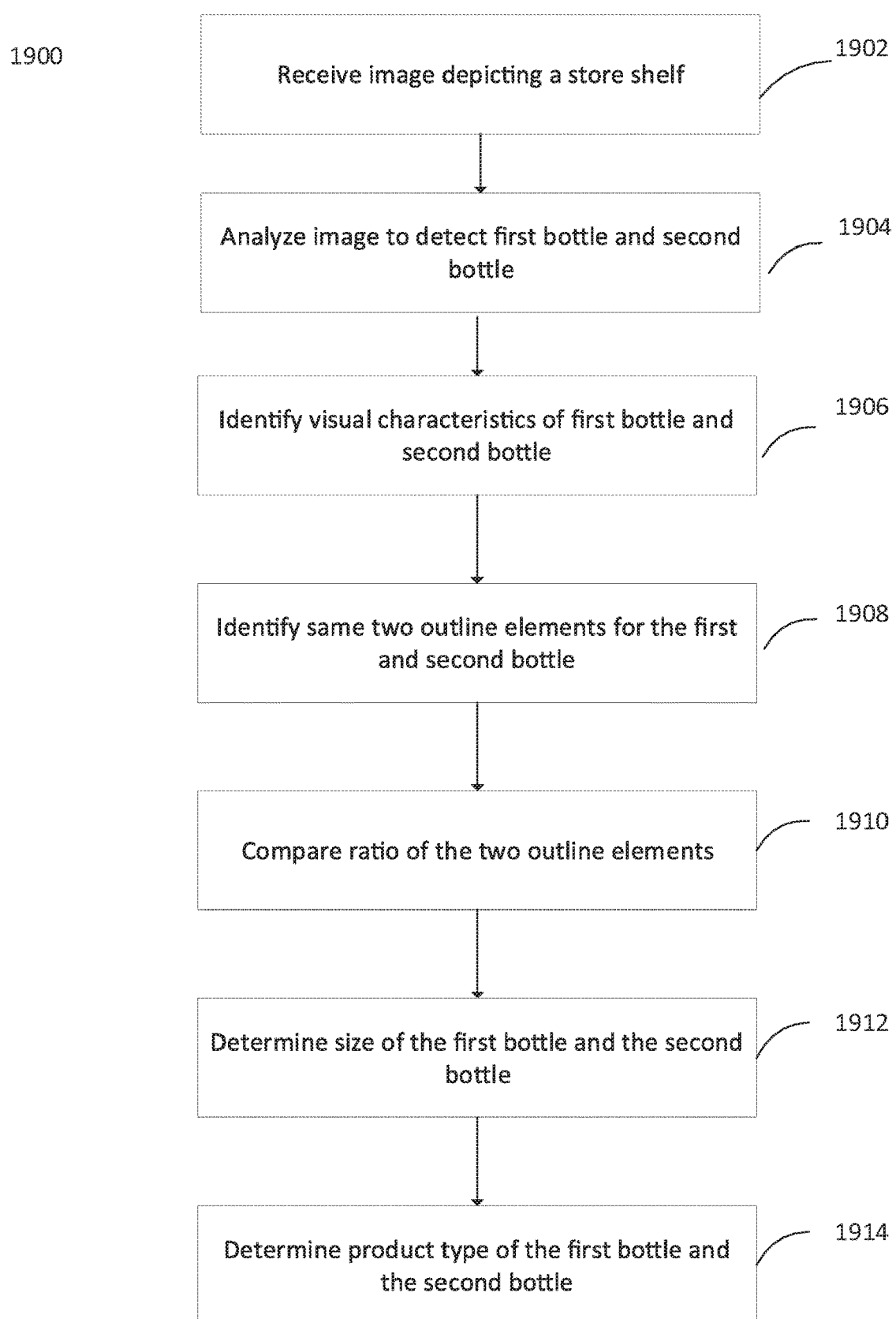
FIG. 19 is a flow chart of an exemplary method of identifying products, consistent with the present disclosure.

FIG. 19 is an illustration of an exemplary method of identifying multiple bottles, consistent with the present disclosure. According to the present disclosure, the at least one processor may further be configured to receive an image which depicts a first bottle and a second bottle located adjacent to each other. FIG. 19 illustrates an exemplary method 1900 of identifying multiple bottles, consistent with the present disclosure. Exemplary method 1900 may include a step of receiving image depicting a store shelf (step 1902), a step of analyzing the image to detect a first bottle and a second bottle (step 1904), a step of identifying visual characteristics of the first bottle and second bottle (step 1906). According to the present disclosure, the image captured by capturing device 125 may include images of multiple bottles on a shelving unit. While stocking the shelves, based on a planogram, bottles may be placed adjacent to each other based on the size, brand, price or any combination of the visual characteristics or contextual information. For example, a 6 pack may be placed adjacent to another 6 pack of different brands or a 6 pack and an individual bottle of the same brand may be placed adjacent to each other based on the planogram. The combinations in which the bottles are supposed to be shelved according to the planogram are stored in database 140. System 100 may be configured to receive an image of a shelf where two bottles are placed adjacent to each other. According to the present disclosure, the first and second bottles may be associated with a common brand, but the first and second bottles may have different sizes. For example, two Coca-Cola® bottles, are placed adjacent to each other and the first bottle may be a 100 ml bottle while the second bottle may be 500 ml bottle. According to the present disclosure, the first and second bottles may be associated with a different brand, but the first and second bottles may have same sizes. For example, A Pepsi® bottle of 100 ml may be placed next to a Coca-Cola® bottle of 100 ml. According to the present disclosure, the first and second bottles may have different pricing and same size but may be associated with a different brand. For example, a Pepsi® bottle of 100 ml priced $2 may be placed next to a Coca-Cola® bottle of 100 ml priced $2.25. According to the present disclosure, the first and second bottles may have same sizes, but may be of different product types. For example, a milk carton of 1 gallon may be placed next to a juice carton of 1 gallon. In this case, both the cartons are of different product type, but have a same size.

According to the present disclosure, the at least one processor may further be configured to use a same two outline elements for the first and second bottles to determine a first product size for the first bottle and a second product size for the second bottle differs than the first product size. FIG. 19 illustrates an exemplary method 1900 of identifying multiple bottles, consistent with the present disclosure. Exemplary method 1900 may include a step of receiving image depicting a store shelf (step 1902), a step of analyzing the image to detect a first bottle and a second bottle (step 1904), a step of identifying visual characteristics of the first bottle and second bottle (step 1906), a step of identifying same two outline elements for the first and second bottle (step 1908), a step of comparing the ratio of the two outline elements (1910), a step of determining the size of the first bottle and the second bottle (1912), a step of determining the product type of the first bottle and the second bottle and a step of determining the product type of the first bottle and the second bottle (1914).

According to the present disclosure, the product size of the first and second bottles may be determined using any two of the outline elements as discussed previously, where the first and the second bottles are located adjacent to each other. According to the present disclosure, system 100 may determine the first product size for the first bottle which is different than the second product size for the second bottle. The same two outline elements may be used to determine the product type of the first and second bottles. For example, Pepsi® bottle of 500 ml may be placed next to a Pepsi® bottle of 100 ml. System 100 may be configured to use two outline elements (e.g. the neck 1814 and the body 1820) for the Pepsi® bottle of 500 ml and the same two outline elements (e.g. the neck 1814 and the body 1820) for the Pepsi® bottle of 100 ml. System 100 may be configured to use the lengths of the outline elements to determine the size of the bottle.

According to the present disclosure, a ratio of the lengths of the two outline elements of the first bottle may be different than a ratio of the lengths of the two outline elements of the second bottle. As discussed above, same outline elements may be used to determine the product type of the first and second bottles located adjacent to each other. The lengths of the outline elements may be determined by system 100 using the image received from the image capturing device 125. The ratio of the lengths of the same two outline elements may be used to make this determination. For example, if the length of the neck 1814 of a Gatorade® bottle of 100 ml may be 0.59 inches and the length of the base 1822 of a Gatorade® bottle of 500 ml may be 2.59 inches, the ratio of these lengths is 0.59/1.59, which is equal to 0.37. Further, if the length of the neck 1814 of a Pepsi® bottle of 100 ml may be 0.86 inches and the length of the base 1822 of a Pepsi® bottle of 500 ml may be 3.46 inches, the ratio of these lengths is 0.86/3.46, which is equal to 0.24. Database 140 may store ratios of the outline elements for every bottle of every size in the retail store. System 100 may use this information to calculate ratios of multiple combinations of the outline elements. For example, system 100 may also calculate the ratio of lengths of the body 1818 or lengths of the bores 1802, etc. for same product of different sizes. The ratios may be previously calculated and stored in database 140 or may be calculated in real-time. Based on the determined ratios and the calculated ratios, the product size of the first and the second bottles may be determined. For example, system 100 may compare the above calculated ratios for the Gatorade® bottles and the Pepsi® bottles with the stored ratios of the same bottles to determine the size of the bottles. Further as discussed in the present disclosure, system 100 may use the determine sizes to identify the product types.

According to the present disclosure, at least one processor may further be configured to use different two outline elements for the first and second bottles to determine a first product size for the first bottle and a second product size for the second bottle differs than the first product size. FIG. 20 illustrates an exemplary method 1900 of identifying multiple bottles, consistent with the present disclosure. Exemplary method 1900 may include a step of receiving image depicting a store shelf (step 1922), a step of analyzing the image to detect a first bottle and a second bottle (step 1924), a step of identifying visual characteristics of the first bottle and second bottle (step 1926), a step of identifying different two outline elements for the first and second bottle (step 1928), a step of determining the size of the first bottle and the second bottle (1930), a step of determining the product type of the first bottle and the second bottle and a step of determining the product type of the first bottle and the second bottle (1932). As discussed above, outline elements may be used to determine the product type of the first and second bottles located adjacent to each other. According to the present disclosure, the two outline elements used for the first bottle may be different from the two outline elements used for the second bottle. For example, length of the neck 1814 of the first bottle and length of the base 1822 of the first bottle may be used to determine the product size for the first bottle whereas, length of the collar 1806 of the second bottle and length of the body 1818 of the second bottle is used to determine the product size for the second bottle. For example, the length of the neck 1814 of a Gatorade® bottle may be 0.59 inches and the length of the base 1822 of a Gatorade® bottle may be 2.59 inches, this information may be used to calculate the size of the Gatorade® bottle. Further, for calculating the size of the Pepsi® bottle, the length of the neck 1814 and the length of the base 1822 are not used as outline elements. Different outline elements for example, length of the collar 1806 of the Pepsi® bottle and length of the body 1818 of the Pepsi® may be used instead. Product type can be further determined based on the size of the first bottle and the second bottle in conjunction with visual characteristics of the first bottle and the second bottle. Product type may be determined based on the product size as discussed previously in the present disclosure.

According to the present disclosure, the at least one processor may further be configured to receive an image which may depict a first bottle and a second bottle that may not located adjacent to each other. For example, the second bottle may be located at exact same location on a shelf above or below the shelf on which the first bottle may be located. System 100 may be configured to use same two outline elements (for e.g. neck 1814 and body 1818) for the first and second bottles to determine a first product size for the first bottle and a second product size for the second bottle. The size of the first product may differ from the size of the second product. The ratio of the lengths of the two outline elements (for e.g. length of neck 1814 and length of body 1818) of the first bottle may be different than the ratio of the lengths of the two outline elements (for e.g. length of neck 1814 and length of body 1818) of the second bottle as discussed above. System 100 may further be configured to use different two outline elements for the first and second bottles as described above to determine a first product size for the first bottle and a second product size for the second bottle. According to the present disclosure, the at least one processor may further be configured to perform a first action associated with the first bottle upon determining that the first bottle and the second bottles may located adjacent each other, may associated with a common brand, and may have different sizes. In accordance with the present embodiments, the at least one image may be further analyzed to detect a second bottle. Furthermore, the at least one image may be further analyzed to determine a second group of at least one ratio of two lengths associated with the second bottle. Moreover, the second group of at least one ratio may be used to determine a second size of the second bottle. In some examples, a first action associated with the bottle may be performed (for example the first action may be selected based on the determined size of the bottle), and a second action associated with the second bottle (for example the second action may be selected based on the determined size of the second bottle), where the second action may differ from the first action. In other examples, a first action may be performed when the size of the first bottle is identical to the size of the second bottle, and a second action may be performed when the size of the first bottle is different than the size of the second bottle. Different sizes bottles placed next to each may indicate a misplaced product.

For example, system 100 may determine that the first bottle and the second bottle of a common may be located adjacent each other but may have varying sizes. System 100 may then initiate a first action associated with respect to the first bottle based on this determination. Consistent with the present disclosure, server 135 may generate in real time, actionable tasks to improve store execution. These tasks may help employees of retail store 105 to quickly address situations that can negatively impact revenue and customer experience in the retail store 105. According to the present disclosure, a first action may refer to server 135 causing real-time automated alerts when products may be out of shelf, when pricing may be inaccurate, when intended promotions may be absent, and/or when there may be issues with planogram compliance, among others. For example, a Coca-Cola® bottle of 100 ml may be erroneously placed in the shelf adjacent Coca-Cola® bottles of 500 ml which may result in issues with planogram compliance. In this case, a user 120 may be updated of the status of the first bottle via GUI 500 on output device 145. For example, according to the present disclosure, an action may refer to system 100 searching and/or updating the inventory associated with the first bottle. For example, a Coca-Cola® bottle of 100 ml may be erroneously placed in the shelf adjacent to Coca-Cola® bottles of 500 ml. When an image of the shelf carrying 100 ml Coca-Cola® bottles is captured, it may lead to discrepancy in the inventory as one of the 100 ml bottles may be determined to be out of place. This information may be used by system 100 to transmit an alert, for example, to user 120 via GUI 500 on output device 145 to correctly update the inventory. An alert may be transmitted to the user by sending a picture of the shelf via a text message or an email, sending a link to a web page with a picture of the product, sending a text message or an email disclosing the shelf number, sending a picture of the product via a text message or an email, etc.

According to the present disclosure, the action may also include updating the price of the bottle. For example, the price associated with a Gatorade® bottle may mistakenly be stored as $5 instead of $3. System 100 may determine a price of $5 for the Gatorade® bottle which is actually priced at $3. Based on the difference in the size of the first bottle and the second bottle, as discussed above in reference to FIGS. 19 and 20, system 100 may recognize this discrepancy and may transmit an alert, for example, to user 120 via GUI 500 on output device 145 to take a corrective action.

According to the present disclosure, an action may comprise any action consistent with this disclosure. For example, system 100 may provide information regarding the first bottle, price, size or any other visual characteristics or contextual data associated with the bottle to user 120 via GUI 500 on output device 145. Additionally or alternatively, the action may comprise storing the determined size of the bottle in memory 226 for further processing the information in accordance with other aspects of this disclosure. An action may also include updating the database every time a confidence level and/or threshold are determined according to FIG. 18D. An action may also include informing the head office of the retail chain, sending the data to different branches/locations of the retail store, place an order for adding new stock, etc.

According to the present disclosure, the at least one processor may further be configured to perform a second action associated with the second bottle, wherein the second action differs from the first action when the determined size of the second bottle differs from the determined size of the first bottle. According to the present disclosure, upon determining that the first bottle and the second bottles may be located adjacent each other, may be associated with a common brand, and may have different sizes, a second action, associated with the second bottle, different from the first action may be performed. Different sizes bottles placed next to each other may indicate a misplaced product. The actions may be substantially the same as those discussed above, however, the action performed for different bottles may be different. For example, if the first action may correspond to sending an alert to user 120 associated with the first bottle, the second action may correspond to storing the determined size of the second bottle in memory 226 for further processing the information.

According to the present disclosure, a first action may be performed when the size of the first bottle is identical to the size of the second bottle. For example, when the size of the first bottle is identical to the size of the second bottle, system 100 may use the visual characteristics and contextual data to further determine the product type as discussed above on accordance with the present disclosure. If the product type of the first bottle may be different from the second bottle, system 100 may perform a first action. The first action may include sending an alert to user 120 via GUI 500 on output device 145. For example, system 100 may detect two Coca-Cola® 100 ml bottles adjacent to each other. System 100 may further determine based on visual characteristics, for example the label or the logo or the color of the bottle, that the first bottle may be a Coke Zero® bottle and the second bottle may be a Diet Coke® bottle. This information may be communicated to user 120 to take the necessary steps. This information may additionally or alternatively be used to update the inventory, check planogram compliance, check other product related data, update confidence levels, update thresholds, etc.

According to the present disclosure, system 100 may detect bottles missing or an empty shelf space based on the received image. In response to this determination, system 100 may take any of the actions discussed above. For example, system 100 may detect that bottles are missing from a shelf. In response to this determination, system 100 may check the inventory or alert the user 120 or update the inventory database, or take any other relevant action. According to the present disclosure, system 100 may be able to determine the number of bottles missing from the shelf based on image analysis. System 100 may receive an image of the entire shelf with multiple bottles of different products placed on the shelf. System 100 may compare the received image to the image for that shelf stored in database 140. Based on this comparison, system 100 may determine if a product may be missing or out of stock and perform any of the actions discussed above.

In accordance with the present disclosure, system 100 may additionally receive an image of a shelf and products placed on the shelf with a time-stamp. System 100 may request for location data of the received image. System 100 may receive temporally separate images of the same shelf at the same location. System 100 may analyze the two temporally separated images. System 100 may also compare both the images with the stored planogram. Based on the analysis, system 100 may determine if a product may be missing or misplaced and send a notification to user 120 or perform any of the actions discussed above.

According to the present disclosure, a system for processing images captured in a retail store and differentiating between products with similar visual appearances is disclosed. The system may include at least one processor. By way of example, FIG. 1 illustrates system 100, which may include image processing unit 130, which in turn may include server 135. As discussed above, server 135 may include processing device 202, which may include at least one processor. System 100 may use price as an input for visual product recognition. Price may be used to differentiate between products with similar visual characteristics. For example, on a shelf containing heads of lettuce and heads of cabbage, the visual characteristics of the lettuce and of the cabbage may be very similar. If the lettuce is sold at a first price range and the cabbage is sold at a second price range, then determining which of the products are associated with the first price range and which of the products are associated with the second price range may be an effective way for differentiating between the lettuce and the cabbage. Price may also be used to differentiate between different tiers of products within the same category of product. For example, price may be an effective way to differentiate between premium or brand name products (e.g., a bottle of TYLENOL®) and generic or store brand products (e.g., a bottle of acetaminophen), which may appear visually similar in low resolution images. In another example, price may be an effective way to differentiate between regular produce, associated with a first price range, and organic produce, associated with a second price range. While the present disclosure provides examples of the products which may be differentiated based on price, it should be noted that aspects of the disclosure in their broadest sense, are not limited to the disclosed products.

Price may also be used to differentiate between products when characteristics of the products or contextual information relating to the products is not visibly captured in an image of a product shelf. For example, a product may be partially obscured from the view of capturing device 125 when the image is captured, the result being that system 100 receives only a portion of the image data needed to identify the product based on the characteristics of the product. By identifying a price associated with the product, system 100 may identify the product by determining that the price falls within a price range associated with a product of a specific type.

Price may be used in conjunction with any of the identifying characteristics or contextual information disclosed herein to differentiate between products identified in an image. For example, system 100 may use characteristics of products, e.g. the size and shape of the product, to differentiate between categories of products and further use the price of the products to differentiate between products within a category. For example, system 100 may receive an image of a refrigerated shelf containing orange juice cartons and milk cartons. The size and shape of the cartons may be used to differentiate between the orange juice and the milk. Once system 100 has determined which of the products are milk products, for example, prices of milk can be used to further differentiate between, for example, organic milk, pasteurized milk, and flavored milk, the organic milk being associated with a first price range, the pasteurized milk being associated with a second price range, and the flavored milk being associated with a third price range.

In some aspects, system 100 may differentiate between products based on a brand name associated with a product, a logo associated with the product, a text associated with the product, a color associated with the product, a position of the product, and so forth and further differentiate between the products based on price ranges in which the products fall. For example, continuing with the milk example, a system may determine that a subset of the milk is associated with a particular supplier, e.g., Hiland Dairy®, by detecting a logo or brand name associated therewith and further determine that there are products in four different price ranges included in the image. Those four price ranges may represent the different price ranges between, for example, skim milk, whole milk, organic milk, and chocolate milk.

According to the present disclosure, the at least one processor may be configured to perform a method for processing images captured in a retail store. By way of example, system 100 may perform a method for processing images captured in a retail store. It is also contemplated that the method, or a portion thereof, may be performed by any component of system 100 consistent with this disclosure, including, for example, the at least one processor. The method for processing images may include determining whether the product is of a first type or a second type. The disclosed method may determine the type of the product based on determining whether the price of the product falls within an associated price range.

Figure 21A:
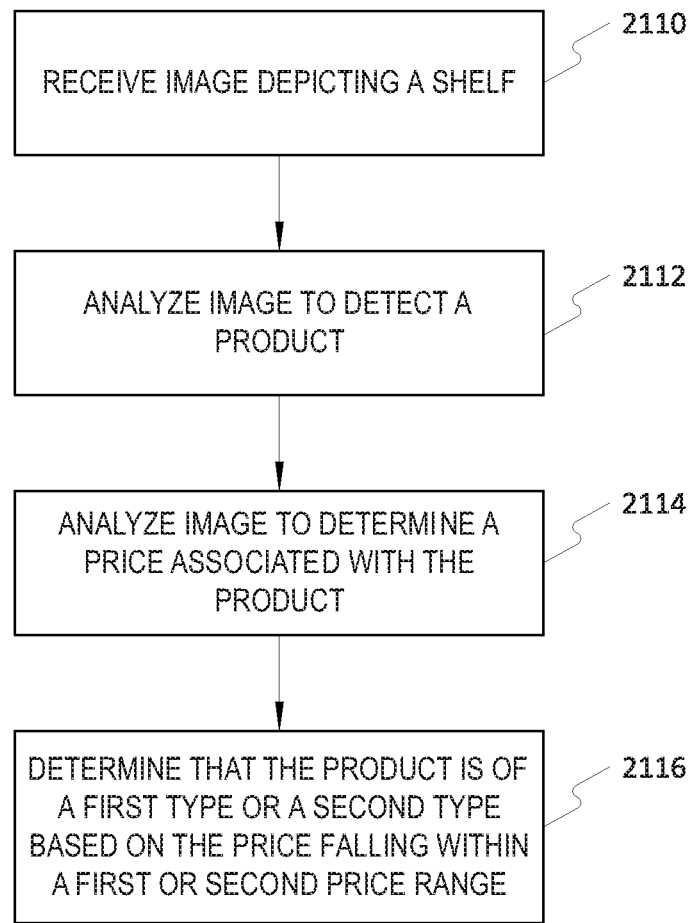
FIG. 21A is an illustration of an exemplary method of using price to determine if a product is of a first or second type, consistent with the present disclosure.

FIG. 21A illustrates an exemplary method 2100 for determining whether a product is of a first type or of a second type based on a determination that a price associated with the product falls within a first or second price range. As will be appreciated from this disclosure, method 2100 is exemplary only and modifications may be made by, for example, adding, combining, removing, and/or rearranging one or more steps of process 2100.

Figure 23:
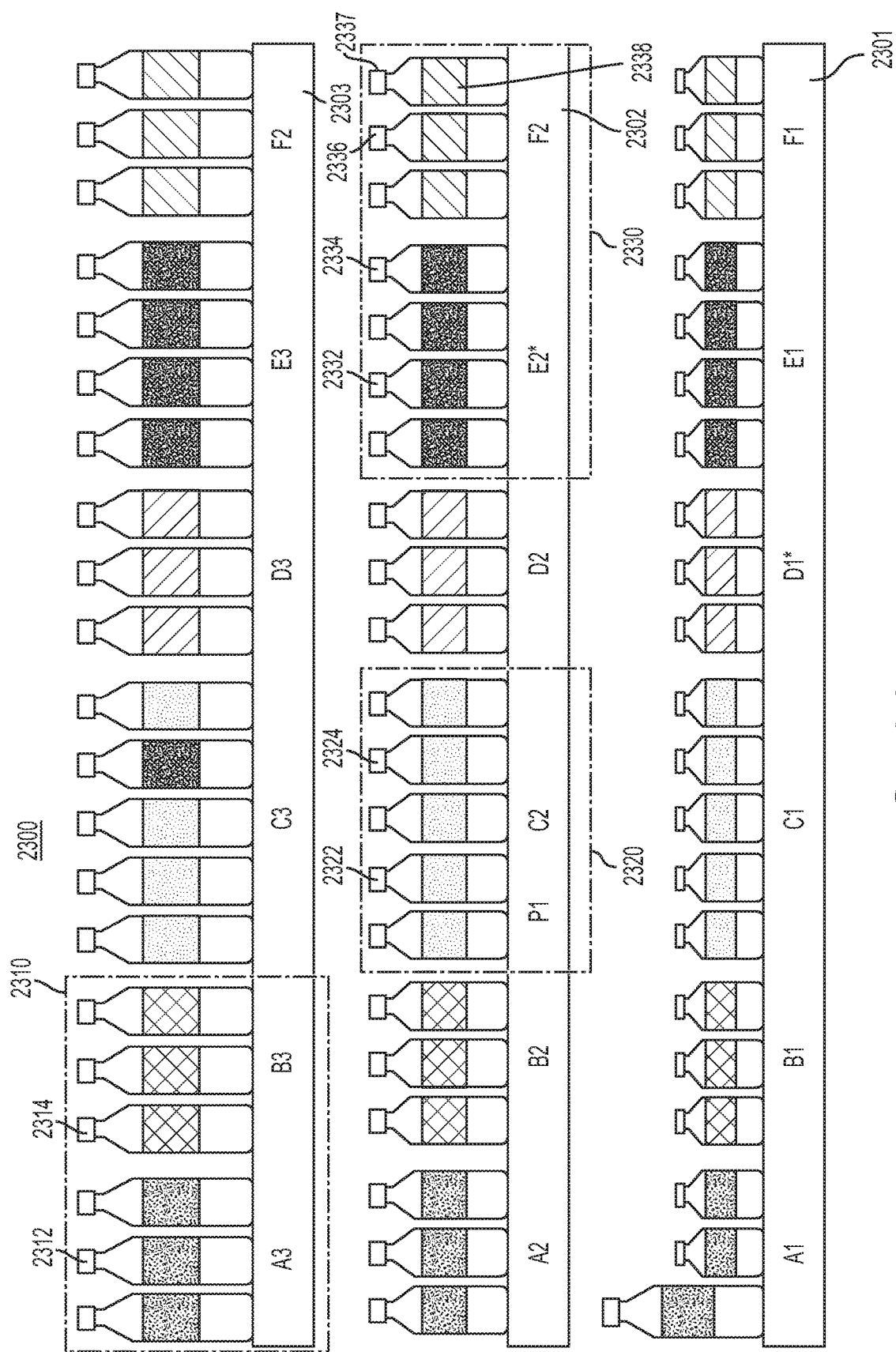
FIG. 23 is an illustration of a schematic illustration of a retail shelf containing price labels that may be used to determine a price associated with a product, consistent with the present disclosure.

According to the present disclosure the at least one processor may be configured to receive at least one image depicting a store shelf having a product displayed thereon. Further, according to the present disclosure the method for processing images captured in a retail store may include receiving at least one image depicting a store shelf having a product displayed thereon. By way of example, method 2100 may include a step of receiving an image depicting a shelf (step 2110). The at least one image may be received from capturing device 125, over network 150, or in any other manner disclosed herein. The at least one image may be received by system 100 or any component thereof configured to receive an image. As also discussed above, the image may include image data. By way of example, FIG. 23 illustrates an exemplary image 2300 that may be received by system 100 during step 2110 of method 2100. As illustrated in FIG. 23, image 2300 may include one or more shelves 2301, 2302, 2303, with one or more products 2312, 2314, 2322, 2324, 2332, etc. positioned on shelves 2301, 2302, 2303. While the present disclosure provides examples of the images captured in a retail store, it should be noted that aspects of the disclosure in their broadest sense, are not limited to the disclosed images.

In accordance with this disclosure, the at least one processor may be configured to analyze the at least one image to detect the product represented in the at least one image. Further, according to the present disclosure the method for processing images captured in a retail store may include analyzing the at least one image to detect the product represented in the at least one image. For example, method 2100 may include a step of analyzing the image to detect a product positioned on the shelf (step 2112). The product may be detected according to any method or embodiment disclosed herein. By way of example, during step 2112, system 100 may detect any of the plurality of products in image 2300, for example, product 2332. Product 2332 may be detected in image 2300 based any one or more distinctive characteristic of product 2332, for example, its color, size, shape, orientation, or other characteristic that distinguishes it from the background of the image and from surrounding products. Contextual information may also be used to detect a product. For example, system 100 may detect product 2332 by a determination that it is on shelf 2302 or that it is associated with, for example, product 2334, or that it is associated with, for example, price label E2. Further, system 110 may detect a product using one or more algorithms similar to those discussed in connection with image processing unit 130. For example, the product may be detected using object detection algorithms, using machine learning algorithms trained to detect products using training examples, using artificial neural networks configured to detect products, and so forth. While the present disclosure provides exemplary methods of detecting one or more products, it should be noted that aspects of the disclosure in their broadest sense, are not limited to the disclosed methods.

In accordance with this disclosure, the at least one processor may be configured to analyze the at least one image to determine a price associated with the detected product. Further, according to the present disclosure the method for processing images captured in a retail store may include analyzing the at least one image to determine or identify a price associated with the detected product. The price may be determined or identified by any method consistent with this disclosure. For example, the at least one image may be analyzed to detect a label associated with the product. The detected label may include one or more price labels, such as for example, A1, B1, B2, C3, etc. A label may be associated with a product based on its proximity to the product, its attachment to the product itself, and/or its attachment to a shelf associated with the product, etc. The word label as used in this disclosure should be interpreted to include any label of any shape or size and in any orientation (e.g., stickers, flags, etc.) and may be presented in any type of media (e.g., printed, electronically displayed, hand-written, etc.). Consistent with this disclosure, system 100 may detect price labels in an image by detecting common symbols (e.g., $, €, ¥, etc.) or phrases (e.g., "sale," "buy now," etc.) associated with price labels. In other embodiments, system 100 may detect a label using one or more algorithms similar to those discussed above in connection with image processing unit 130. For example, the label may be detected using object detection algorithms, using machine learning algorithms trained to detect labels using training examples, using artificial neural networks configured to detect labels, and so forth.

A detected label may be further analyzed to identify a price indicator printed on the price label (e.g., by using an OCR algorithm, using an artificial neural network configured to identify printed price indicators, and so forth). The price indicator may be any string of numerical, alphabetical, or alphanumeric characters that identifies the price of an item (e.g., "$2.49," "2 for $10," "50 cents," "Two-Dollars," etc.). The price indicator may also include, for example, promotional or temporary pricing information (e.g., "50% off," "½ Off," "Buy 1 get 2 Free," etc.). By way of example, with reference to box 2310 of FIG. 23, system 100 may detect price label A3 and price label B3 and further analyze both price label A3 and price label B3 to identify a price indicator present on each label A3, B3. In some cases, only part of the price of an item may be identified (for example, due to low resolution, poor image quality, occlusions, and so forth). For example, in a two digits price the tens digit may be identified while the units digit may be too blurred to be recognized, and the price may be identified with a partial accuracy. In another example, the cents of a price may be printed in a small font that may be unrecognizable by the system, while the full dollars may be printer in a larger font size that is recognizable, and the price may be identified with a partial accuracy. In yet another example, part of the pricing information may be occluded, and the images may depict only part of the pricing information, for example depicting "Half" and "Off" from a label saying "Half Price Off". The system may identify the depicted words or letters, and may use the identified parts to estimate the actual price. While the present disclosure provides exemplary techniques for detecting labels associated with a product, it should be noted that aspects of the disclosure in their broadest sense, are not limited to the disclosed techniques for detecting labels.

According to the present disclosure, the determination of the price associated with the detected product includes detecting a label attached to the store shelf, and the at least one processor is further configured to analyze the at least one image to recognize a price indicator on the detected label. A method for processing images according to the present disclosure may further include detecting a label attached to the product, and analyzing the at least one image to recognize a price indicator on the detected label. As an example, in FIG. 23, price labels A3, B3, C3, D3, E3, and F2 are visible on the top shelf 2303. System 100, upon receiving the image of FIG. 23, may detect, for example, price label A3 and may further detect a price indicator on price label A3. The price determined from the price indicator may then be associated with product 2312 based on, for example, product 2312 being positioned directly above price label A3. It should be appreciated that system 100 may first detect product 2312 (e.g., by performing step 2112) and then detect the price label A3 (e.g., by performing step 2114), system 100 may first detect the price label A3 (e.g., by performing step 2114) and then detect product 2312 (e.g., by performing step 2112), or system 100 may detect price label A3 and product 2312 simultaneously, for example using an artificial neural network configured to detect both products and labels. In either scenario, the end result is a determined price associated with product 2312.

In accordance with the present disclosure, the determination of the price associated with the detected product may include detecting a label attached to the product, and the at least one processor may further be configured to analyze the at least one image to recognize a price indicator on the detected label. A method for processing images according to the present disclosure may further include analyzing the at least one image to recognize a price indicator on the detected label. As an example, in FIG. 23, a price label may be detected on product label 2338, which is physically attached to product 2337. System 100 may detect a price indicator on label 2338 and associate the determined price with product 2337 based on product label 2338 being attached to product 2337. It should be appreciated that system 100 may first detect product 2337 (e.g., by performing step 2112) and then detect the price indicator on product label 2338 (e.g., by performing step 2114), system 100 may first detect the price indicator on product label 2338 (e.g., by performing step 2114) and then detect product 2337 (e.g., by performing step 2112), or system 100 may detect product 2337 and product label 2338 simultaneously, for example using an artificial neural network configured to detect both products and labels. In either scenario, the end result is a determined price associated with product 2337.

According to the present disclosure, the determination of the price associated with the detected product may include detecting a label in close proximity to the product, and the method may further comprise analyzing the at least one image to recognize a price indicator on the detected label. As an example, in FIG. 23, system may detect product 2334 on the middle shelf 2302. As illustrated in FIG. 23, product 2334 may lack a price indictor on its own label and may not be positioned directly above any shelf label. For example, product 2334 may be positioned between price label E2* and F2. In this example, system 100 may determine that product 2334 is associated with price label E2* based on product 2334 being in slightly closer proximity to price label E2* than to price label F2. In another example, system 100 may determine that product 2334 is associated with price label E2* rather than price label F2 due to a brand name or logo appearing on price label E2* and product 2334 and not appearing on price label F2. In yet another example, system 100 may determine that product 2334 is associated with price label E2* due to a brand name or logo appearing on price label F2 that differs from a second brand name or a second logo appearing on product 2334. In another example, system 100 may determine that product 2334 is associated with price label E2* rather than price label F2 due to a product size specified on price label E2* that corresponds to the size of product 2334, or due to a product size specified on price label F2 that do not match the size of product 2334. In yet another example, system 100 may determine that price label E2* corresponds to a first product category while price label F2 corresponds to a second product category (for example from an image or text appearing on the price label), and based on the category of product 2334 (for example as determined by analyzing the images) matching the first product category, system 100 may determine that product 2334 is associated with price label E2* rather than price label F2. While the present disclosure provides exemplary techniques for determining a price associated with a product, it should be noted that aspects of the disclosure in their broadest sense, are not limited to the disclosed techniques for determining prices.

In accordance with this disclosure, the at least one processor may be configured to determine that the detected product is either a first type of product or a second type of product. Further, according to the present disclosure the method for processing images captured in a retail store may include determining that the detected product is either a first type of product or a second type of product, wherein the first type of products and the second type of products may have similar visual appearances. Each of the first type of product and the second type of product may be associated with a different price range. For example, method 2100 may contain step 2116 of determining that the product is of a first type or a second type based on the price falling within a first or second price range. In some examples, the type of a detect product may be determined to be of a plurality of alternative types of products (for example, of two alternative types of products, of three alternative types of products, of four alternative types of products, of more than four alternative types of products, and so forth).

As used in this disclosure, the term "type of product" should be interpreted broadly. For example, if an image to be processed contains products from different categories, a type of product may be interpreted as a classification of the category in which the product falls. As an example, an image may contain a visual representation of a shelf in an electronics store and there may be televisions, projectors, audio systems, and other categories or products present. In that circumstance, the products may be differentiated into a first type comprised of televisions, a second type comprised of projectors, and a third type comprised of audio systems. Additionally or alternatively, in the same example, the products may be differentiated into a first category comprising video equipment, into which both televisions and projectors may fall, and a second category comprising audio equipment, into which the audio systems may fall. In another example, image 2300 may contain beverages of different types, each type representing a category of drink. For example, the first type of product may be soft drinks and the second type of product may be sports drinks.

Consistent with this disclosure, a type of product may also refer to a specific name brand of a product or otherwise may be used to differentiate between products within the same or similar categories. By way of example, image 2300 of FIG. 23 contains several different beverage products. When system 100, for example, analyzes image 2300, it may use a narrow definition of "type of product" such that it may differentiate between, for example, product 2322 and product 2324, which are within the same category (e.g., beverages) and have a similar visual appearance. As used in this disclosure two products may be deemed to have a similar visual appearance if they have similarity of one or more of shapes, sizes, colors, color schemes, text or logos on the products, etc. It is contemplated, however, that products having similar shapes may be deemed to have a similar visual appearance even if they have different sizes, colors, logos, etc. Likewise, for example, products having similar logos may be deemed to have a similar visual appearance even if they include different sizes, colors, shapes, etc.

A first type of product (represented by product 2322) may be, for example, a first brand of beverage and a second type of product (represented by product 2324) may be, for example, a second brand of beverage. For example, product 2322 may be a soda distributed by Company A and product 2324 may be a soda distributed by Company B.

Consistent with this disclosure, a first type of product and a second type of product may be associated with different ingredients. For example, the first type of product might be gluten free bread and the second type of product might be regular bread that includes gluten. As illustrated in FIG. 23, product 2336 and product 2337 are examples of two products that appear identical or similar, but that may have different ingredients. For example, product 2336 may be a strawberry sports drink distributed by Company X and may be determined to be of a first type whereas product 2337 may be a grape sports drink distributed by Company X and may be determined to be of a second type. As another example, product 2336 may be a sugar-free beverage and product 2337 may be a regular beverage, which includes sugar. Product 2336 may be determined to be associated with a price detected on price label E2 whereas product 2337 may be determined to be associated with a price detected on product label 2338.

Consistent with this disclosure, a first type of product and a second type of product may be associated with different sizes. For example, the first type of product might be a container (e.g., a bottle) containing one liter of soda, whereas the second type of product might be a bottle containing two liters of soda. Product 2340 and product 2342 of FIG. 23 provide an example of two types of products that have similar appearances except for their difference in sizes. Product 2340 may be, for example, a first type of product and product 2342 may be a second type of product. As another example, there may be packages of different sizes (volumes, weights, etc.) of the same product (e.g., cookies, sugar, salt, etc.) that system 100 may detect in image 2300. System 100 may classify the different sizes of packages as corresponding to different types of product.

It is contemplated that the scope of the term "type of product" may also be set by user 120, or may be based on any other input, to meet the needs of the user. For example, a store manager may define the term narrowly, such that it can facilitate differentiating between brand names. Alternatively the store manager may define the term broadly, such that it may facilitate grouping products by category (e.g., audio vs. video equipment, soft drinks vs. sports drinks, etc.). While the present disclosure provides exemplary product characteristics that may be used to classify products into different types of products, it should be noted that aspects of the disclosure in their broadest sense, are not limited to the disclosed characteristics or methods of classifying products into types of products.

A price range may be associated with a type of product in any manner consistent with this disclosure. It is contemplated that the price range for a type of product may be provided, for example, by user 120, or may be determined by system 100, or by some combination thereof. A price range may be stored in database 140, elsewhere in memory device 226.

In some exemplary embodiments, the price range for a type of product may be provided by input from user 120 or supplier 115. For example, user 120 or supplier 115 input of price ranges associated with various products may be received as a response to a request through output devices 145, as an initial input when setting up system 100, or in any manner consistent with this disclosure. For example, the first price range associated with the first type of product may be input by an employee or manager of a store. The employee or manager may additionally provide the second price range associated with the second type of product. As an example, an employee may provide that gluten free bread is sold at a price of $4 to $7 per loaf and that regular bread is sold at a price of $2 to $4 per loaf.

In another example, supplier 115 may provide the price range associated with a product. In this example, supplier 115 of the first type of product and the second type of product may provide a first price range for the first type of product and a second price range for the second type of product. It is also contemplated that first supplier 115A may provide a first price range for a first type of product and second supplier 115B may provide a second price range for a second type of product. Supplier 115 may provide price ranges in association with a planogram.

It is also contemplated that a price range may be associated with a type of product in response to a determination that a detected product (i.e. product detected in, for example, image 2300) does not fall within a known price range. For example, system 100 may perform all or part of method 2100 and determine that a determined price associated with a detected product is not associated with a first price range or a second price range. In response, system 100 may use the determined price associated with the detected product to establish a price range for products of that type. Additionally or alternatively, system 100 may, in response to the determination, request input of a price range to be associated with the detected product. These examples are discussed further below in relation to FIG. 21B and FIG. 22B.

A price range may also be associated with a type of product absent any input from, for example user 120 or supplier 115. For example, a system may employ any of the methods disclosed herein to analyze an image to determine that a product is of a first type (e.g., by identifying product characteristics) and further analyze the image to identify a price associated with that product (e.g., by detecting a label and detecting a price indicator on that label). As an example, step 2114 of method 2100 may be performed to determine the price associated with a known product type and the price determined in step 2114 may be stored in association with that product type. After performing this analysis a number of times, a range of prices at which a type of product was sold may be determined. This range may be stored as a first price range. This exemplary embodiment may allow for the first price range to be adjusted over time as the price at which the first type of product is sold changes over time. The same steps can be performed with respect to the second type of product.

As another example, a system may access stored transaction data to identify a range of prices at which a product of a known type has been sold to determine a price range associated with the type of product. For example, system 100 may determine a type of product by any method consistent with this disclosure, including by using identifying characteristics of the product or contextual information related to the product. System 100 may access stored transaction data, for example from memory 226 or database 140, to determine the historical sale price of the product. System 100 may determine a price range associated with the product based on the transaction history and store it in association with the product, for example in database 140.

As another example, system 100 may be configured to access catalog data 244, contract-related data 242, product-type model data 240, or other data stored in memory 226 to determine a present price for a product and to determine a price range associated with the product based on that present price. For example, system 100 may be configured to access database 140 and identify a first catalog price for a first type of product and a second catalog price for a second type of product. As used in this disclosure the term "catalog price" may refer to a price of a product determined from any of catalog data 244, contract-related data 242, product-type model data 240, or other data stored in memory 226. Based on the first and second catalog price, system 100 may be configured to determine a first and second price range. In another example, system 100 may identify a first catalog price for a first type of product at a first time and identify a second catalog price for the first type of product at a second time and determine a price range for the first type of product based on the first and second catalog price. The first and second times may refer to a time of the day, a time of the week, a time of the month, a time of the year, a season, a time of the year associated with a particular event, festival, or celebration, etc.

In some examples, system 100 may access online catalogs to determine a price range for a selected product type, for example, in similar retail stores, in the geographical area of the retail store, and so forth. In some examples, system 100 may receive information about price range for a selected product type in other retail stores, for example based on an analysis of images captured in the other retail stores to determine the price from a label associated with the product type in the other retail stores, based on transactions of sales of the selected product type in the other retail stores, and so forth.

In some embodiments, system 100 may obtain a plurality of prices for a selected product type and use the plurality of prices to calculate a price range for the selected product type. For example, the plurality of prices may be obtained from catalogs, from image analysis determining the price of the product type from labels in one or more retail stores as described above, from a database, from transactions of sales of the selected product type in one or more retail stores, and so forth. In one example, the price range may be selected to include the entire plurality of prices, for example by selecting the lowest and highest prices from the plurality of prices and using them as the boundaries defining the price range. In another example, a subset of the plurality of prices may be selected, for example by removing outliers from the plurality of prices using an outliers removal algorithm, and the price range may be selected according to the selected subset of the plurality of prices. In some examples, a distribution of the plurality of prices may be estimated, and the price range may be selected according to the distribution. For example, the estimated distribution may include a normal distribution, and the price range may be selected as a function of the distribution mean and variance or the standard deviation of the distribution, for example the price range may be selected to be a range of a selected number (for example 1, 2, 3, etc.) of standard deviations around the mean. In another example, the estimated distribution may include a histogram of the plurality of prices, and the price range may be selected to include all bins of the histogram that are above a selected threshold.

While the present disclosure provides examples of ways to determine price ranges for products, it should be noted that aspects of the disclosure in their broadest sense, are not limited to the disclosed methods of determining price ranges. It is also to be understood that there is no limit as to how broad or narrow a price range may be. For example, a price range may be a single number (e.g., a catalog price) or it may be any range of numbers. For example, a first price range may include all prices below a select first threshold price. In another example, a second price range may include all prices above a selected second threshold price. In yet another example, a third price range may include all prices between two selected prices. Additionally, a first and second price range my overlap and there may be more than a first and second price range (e.g., a third price range, a fourth price range, etc.).

A price range provided by a user, such as supplier 115 or user 120, or determined in any manner disclosed herein, may be stored in association with a type of product in, for example, product type model data 240, contract-related data 242, (e.g., in a planogram relating to the product type), catalog data 244, inventory data 246, or any other data consistent with this disclosure and may be stored in database 140, memory device 226, or any other type of storage media.

In accordance with the present disclosure, the at least one processor may be configured to determine that the detected product is of the first type of product when the determined price falls within a first price range associated with the first type of product. Further, according to the present disclosure the method for processing images captured in a retail store may include determining that the detected product is of the first type of product when the determined price falls within the first price range. For example, a determined price associated with a detected product may fall within a first price range associated with a first type of product, in which instance, the detected product may be determined to be of the first type. In one example, a price may be deemed to fall within a price range if the price is greater than or equal to the lowest price in the price range and if the price is less than or equal to the highest price in the price range. In another example, a price may be deemed to fall within a price range if the price is greater than or equal to the lowest price in the price range. In yet another example, a price may be deemed to fall within a price range if the price is less than or equal to the highest price in the price range. As an example, system 100 may determine a price associated with a product, as discussed in relation to step 2114 of method 2100, and further determine that the determined price falls within a first price range. Determining whether a determined price falls within a first price range may comprise any means for comparing a determined price with the first price range. For example, determining whether a determined price falls within a first price range may comprise the operation represented by step 2125 of process 2102 and process 2104 (FIG. 21C), which asks whether the determined price falls within a first price range. If the determined price does fall within the first price range at step 2125 ("YES"), then the product may be determined to be a product of the first type as shown by determination 2130.

As an example, product 2312 of FIG. 23 may be associated with a determined price of $3.99, as discussed in relation to step 2114. System 100 may, for example, determine that a first price range is from $2.99 to $3.99 and a second price range is from, for example, $1.99 to $2.99. Based on this information, system 100 may determine that product 2312 is of the first type because the determined price (e.g., $3.99) falls within the first price range (i.e., is greater than or equal to $2.99 and is less than or equal to $3.99).

According to the present disclosure, the at least one processor may be configured to determine that the type of the detected product is the first type of product when the determined price is greater than the first price range. Further, according to the present disclosure the method for processing images captured in a retail store may include determining that the type of the detected product is of the first type of product when the determined price is higher than the first price range. For example, the first price range associated with the first type of product may be higher than the second price range associated with the second type of product. For example, a determined price may be higher than a first price range, which may also be higher than a second price range. System 100 may determine, therefore, that the detected product associated with the determined price is of the first type of product. As an example, product 2332 of FIG. 23 may be associated with a determined price of $4.99, as discussed in relation to step 2114. System 100 may, for example, determine that the highest price range, the first price range, is a range from $2.99 to $3.99 and a second price range is a range from, for example, $1.99 to $2.99. Based on this information, system 100 may determine that product 2332 is of the first type, even though the determined price (e.g., $4.99) for product 2332 does not fall within the first price range (e.g., $2.99 to $3.99).

In accordance with the present disclosure, the at least one processor may be configured to determine that the detected product is of the second type of product when the determined price falls within a second price range associated with the second type of product. Further, according to the present disclosure the method for processing images captured in a retail store may include determining that the detected product is of the second type of product when the determined price falls within the second price range. For example, a determined price associated with a detected product may fall within a second price range associated with a second type of product, in which instance, the detected product may be determined to be of the second type. As an example, system 100 may determine a price associated with a product, as discussed in relation to step 2114 of method 2100, and further determine that the determined price falls within a second price range. Determining whether a determined price falls within a second price range may comprise any means for comparing a determined price with the second price range. Determining whether a determined price falls within a second price range may comprise substantially the same steps as determining whether a determined price falls within a first price range, as discussed above. For example, determining whether a determined price falls within a second price range may comprise the operation represented by step 2135 of process 2102 and process 2104, which asks whether the determined price falls within a second price range. If the determined price does fall within the second price range at step 2135 ("YES"), then the product may be determined to be a product of the first type as shown by determination 2140.

As an example, product 2314 of FIG. 23 may be associated with a determined price of $1.99, as discussed in relation to step 2114. System 100 may, for example, determine that a first price range is a range from $2.99 to $3.99 and a second price range is a range from, for example, $1.99 to $2.99. Based on this information, system 100 may determine that product 2314 is of the second type because the determined price (e.g., $1.99) falls within the second price range (e.g., $1.99 to $2.99).

According to the present disclosure, the at least one processor may be configured to determine that the type of the detected product is the second type of product when the determined price is less than the second price range. Further, according to the present disclosure the method for processing images captured in a retail store may include determining that the type of the detected product is of the second type of product when the determined price is lower than the second price range. For example, the first price range associated with the first type of product may be higher than the second price range associated with the second type of product. For example, a determined price may be lower than a second price range, which may also be lower than a first price range. System 100 may determine, therefore, that the detected product associated with the determined price is of the second type of product. As an example, product 2334 of FIG. 23 may be associated with a determined price of $0.99, as discussed in relation to step 2114. System 100 may, for example, determine that the highest price range, the first price range, is a range from $2.99 to $3.99 and a second price range is a range from, for example, $1.99 to $2.99. Based on this information, system 100 may determine that product 2334 is of the second type, even though the determined price for product 2334 does not fall within but is instead lower than the second price range.

Figure 21B:
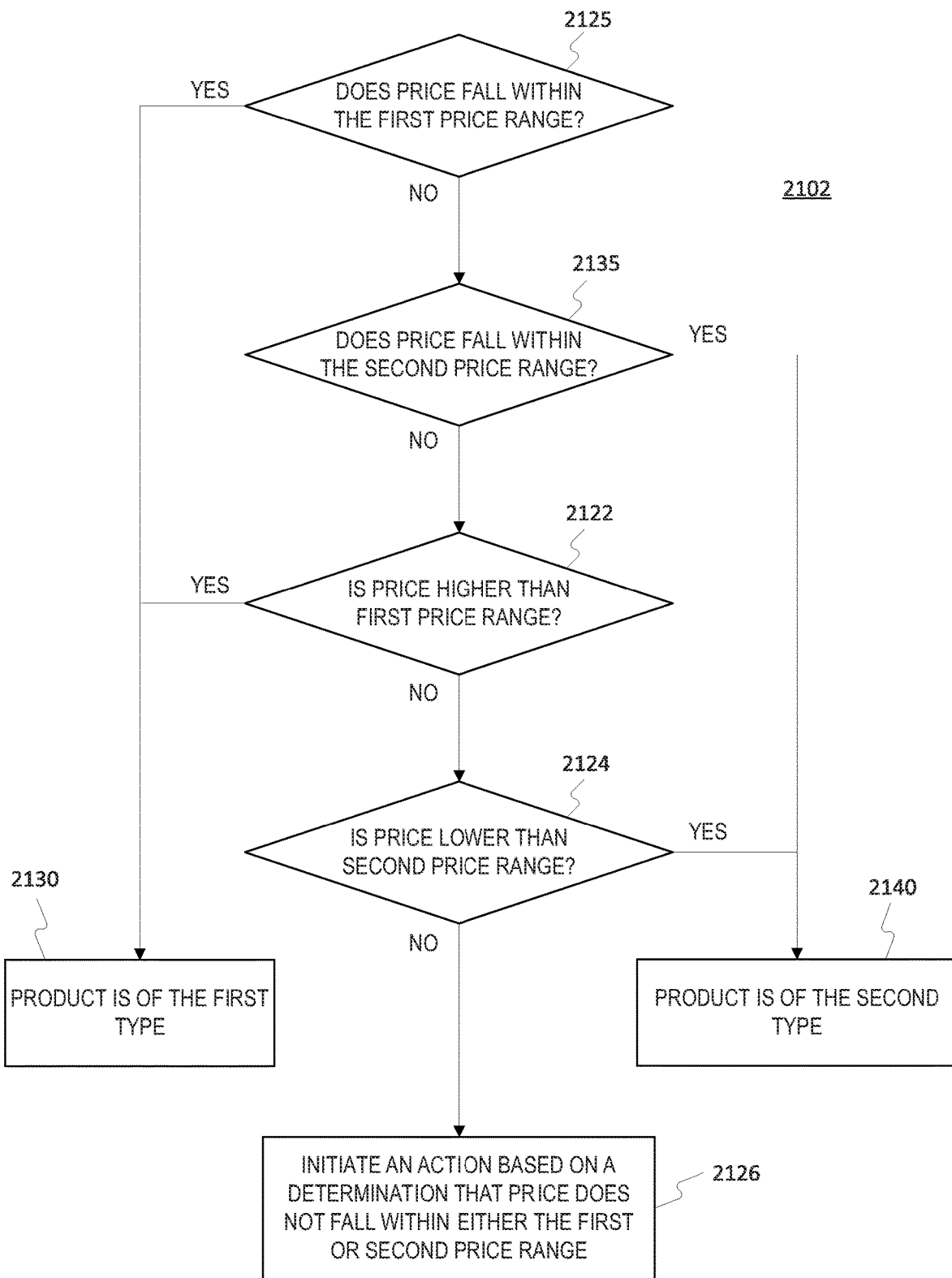
FIG. 21B is an illustration of an exemplary method for determining whether a product is of a first or second type based on a comparison of a determined price with a first a second price range, consistent with the present disclosure.
Figure 21C:
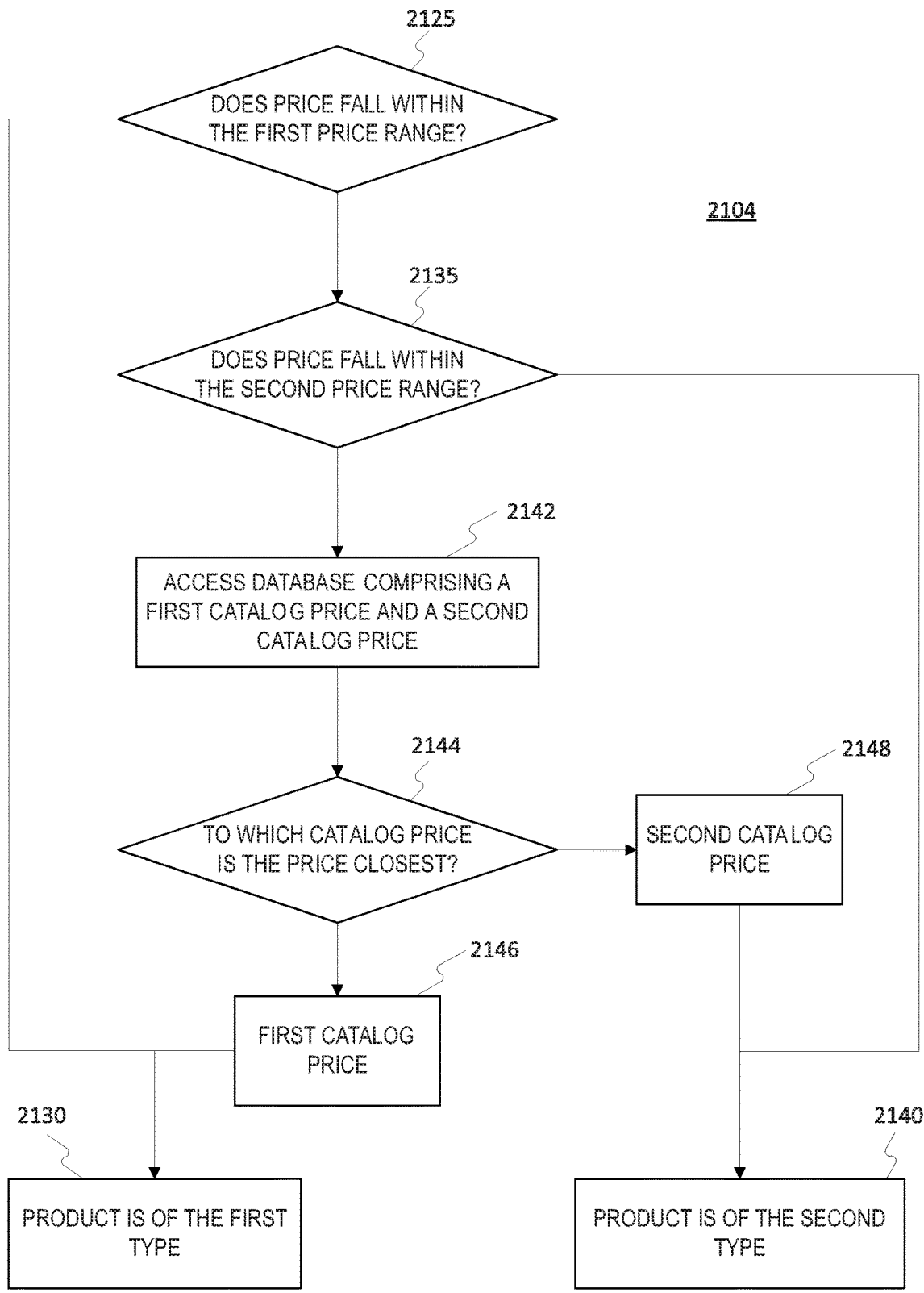
FIG. 21C is an illustration of an exemplary method for determining whether a product is of a first or second type based on a comparison of a determined price with a first and a second price range and a first and a second catalog price, consistent with the present disclosure.

It is contemplated that the at least one processor may be configured to determine that the detected product is of the first type of product when the determined price falls within a first price range associated with the first type of product; and determine that the detected product is of the second type of product when the determined price falls within a second price range associated with the second type of product. For example, system 100 may be configured such that it compares a determined price to both a first price range and a second price range. As an example, system 100 may be configured to perform step 2125 and step 2135 of process 2102 and process 2104. In step 2125, for example, system 100 may determine whether the determined price falls within a first price range. As indicated by step 2130, when a determined price does fall within a first price range, then system 100 may determine the product to be of the first type. When the determined price does not fall within the first price range, however, system 100 may determine whether the determined price falls within the second price range as illustrated at step 2135. As indicated by step 2140, when a determined price does fall within the second price range, system 100 may determine the product to be of the second type. It is contemplated that step 2125 and step 2135 may be performed in any order, the order presented in FIGS. 21A and 21B are exemplary only. It is also contemplated that step 2125 and step 2135 may be performed at substantially the same time.

It is also contemplated that step 2125 and step 2135 be performed regardless of a prior positive determination at an earlier step. For example, following the order illustrated in process 2102, system 100 may determine, by performing step 2125, that a determined price falls within a first price range. Rather than proceeding to step 2130, system 100 may proceed to step 2135 to ascertain the determined price also falls within the second price range. This may be particularly advantageous when, for example, the first price range and the second price range overlap.

According to the present disclosure, the at least one processor may be configured to determine that the type of the detected product is of the first type of product when the determined price is higher than the first price range; and determine that the type of the detected product is of the second type of product when the determined price is lower than the second price range. For example, it is contemplated that in any one image received by a system configured to perform this method, there may be multiple products detected and multiple prices determined, each determined price corresponding to one or more products, and any one price may be higher than a first price range or lower than a second price range.

For example, system 100 may perform steps 2125 and 2135 of process 2102, for example, and determine that the determined price does not fall within either the first or second price range (e.g., "NO" at step 2125 and "NO" at step 2135). Process 2102 may then proceed to step 2122 to ascertain whether the determined price is higher than the first price range. When the determined price is higher than the first price range ("YES" at step 2122) then system 100 may determine that the product may be of the first type at step 2130. When, however, the determined price is not higher than the first price range ("NO" at step 2122) then system 100 may proceed, for example, to step 2124 to ascertain whether the determined price is lower than the second price range. When the determined price is higher than the first price range ("YES" at step 2142) then the product may be determined to be of the second type at determination 2140.

According to the present disclosure, the at least one processor may be further configured to access a database including a first catalog price for a first type of product and a second catalog price for a second type of product. In accordance with this disclosure, a determined price associated with a product may be used to determine that a product is of a first type if the determined price matches a first catalog price. As an example, system 100 may access catalog data 244, for example, from database 140 or another memory device to access catalog prices for a number of products. In situations where a determined price is the same as a catalog price, system 100 may determine that the product is of the type associated with that catalog price. This manner of determining a type of a product may be used in association with or instead of the method of determining a type of a product based on its price falling within a first or second price range.

Further, in accordance with this disclosure, the determined price may be different from the first catalog price and a second catalog price. In accordance with this disclosure, in circumstances where a determined price does not match a catalog price (e.g., the determined price is different from a first catalog price and a second catalog price), a type of the product may still be determined based on its relation to the catalog prices. According to the present disclosure, the at least one processor may be configured to determine that the type of the detected product is the first type of product when the determined price is closer to a first catalog price than to a second catalog price.

System 100 may determine whether the determined price is closer to the first or second catalog price, for example, by determining differences between the determined price and one or more of the first and second catalog prices. System 100 may determine that the determined price is closer to the first catalog price if the difference of the price from the first catalog price is smaller than the difference of the price from the second catalog price. System 100 may use other methods or algorithms of determining whether the determined price is closer to the first or second catalog price. When system 100 determines that the determined price is closest to the first catalog price, at step 2146 of exemplary process 2104 (FIG. 21C), system may determine that the product may be of the first type at step 2130. Method 2100 may then proceed to step 2118. Conversely, when system 100 determines that the determined price is closest to the second catalog price, at step 2148, system 100 may determine that the product may be of the second type at step 2140. Method 2100 may then proceed to step 2118.

By way of example, system 100 may perform the exemplary process 2104 to determine whether a determined price falls within a first or second price range and how the determined price compares to a first and second catalog price. As shown in process 2104, system 100 may first determine whether a determined price falls within either a first or second price range as discussed with regard to steps 2125 and 2135 in process 2102 above. If the determined price does not fall within either the first or second price range, system 100 may, at step 2142, access database 140 to identify a first and second catalog price stored therein. System 100 may proceed at step 2144 to determine the catalog price (e.g., first or second catalog price) to which the determined price is the closest. For example, at step 2112, system 100 may determine that product 2336 of FIG. 23 is associated with a determined price of $2.50. A first price range associated with a first type of product may be $0.99 to $1.99, for example, and a second price range associated with a second type of product may be $2.99 to $3.99, for example. In this example, system 100 would determine at step 2125 and step 2135 that product 2336 is within neither the first price range nor the second price range. System 100 may the access database 140, for example, to locate a first and second catalog price. The first catalog price associated with the first type of product may be, for example, $1.50 and the second catalog price associated with the second type of product may be, for example, $2.99. In this example, system 100 would proceed to step 2144 to determine whether the determined price is closer to the first catalog price or the second catalog price and determine that the determined price ($2.50) is closer to the second catalog price ($2.99) than to the first catalog price ($1.50). Based on this determination, system 100 may determine that the detected product is of the second type, as illustrated by steps 2148 and 2140.

It is to be understood that steps 2122, 2124, 2142, and 2144 are exemplary only and are not necessary to perform method 2100 or step 2116 thereof. Additionally, the steps disclosed in process 2102 and process 2104 may be performed in any order.

In accordance with the present disclosure, the at least one processor may be configured to determine that the type of the detected product is either the first type of product or the second type of product based on at least one of: a visual appearance of the detected product, a brand associated with the detected product, a logo associated with the detected product, text associated with the detected product, and a shape of the detected product. Further, according to the present disclosure the method for processing images captured in a retail store may include determining that the type of the detected product is either the first type of product or the second type of product based on at least one of: a visual appearance of the detected product, a brand associated with the detected product, a logo associated with the detected product, text associated with the detected product, and a shape of the detected product. For example, as discussed above, a product type may be determined based on the physical characteristics of the product. As an example, system 100 may, when analyzing image 2300, differentiate between product 2314 and product 2332 based on, for example, product 2312 being of a larger size than product 2332.

It is contemplated that the method for differentiating between products based on a product's price as well as differentiating between products based on physical characteristics or contextual information may be performed for any one analysis of an image. For example, referring to FIG. 22C, system 100 may analyze an image to detect characteristics of a product at step 2230 of exemplary process 2204, and to detect contextual information relating to the product at step 2232, and use the characteristics and contextual information to determine the type of the product at step 2234. System 100 may then proceed to perform method 2100 to determine a price of the product and a type of the product based on the price. It is also contemplated that method 2100 may be performed prior to or at substantially the same time as process 2204. This may be advantageous when there are multiple similar objects that are sold at a given price range but do not have similar characteristics or when there are several objects of similar characteristics that are not sold at the same price range.

As an example, the products in box 2330 of FIG. 23 may have very similar visual and physical characteristics. Their characteristics may, for example, be distinctive enough to differentiate them from the products in box 2310, all of which may be of larger size than those in box 2330. System 100 may determine product 2314 is different from product 2332 based on this characteristic. System 100 may, however, be unable to differentiate between product 2332 and 2336 based on physical characteristics of the products. System 100 may additionally perform method 2100 to determine, for example, that product 2332 is associated with price label E2 and product 2336 is associated with price label F2. System 100 may then determine that product 2332 is of a first type and product F2 is of a second type, for example, based on their different price points.

In another example, system 100 may detect several types of basketballs, some of which are sold at a first price range and some of which are sold at a second price range. This may be sufficient, for example, to differentiate between a generic basketball and a Nike® basketball, the generic basketball being sold at the second price range, but not sufficient to differentiate between, for example, a Nike® basketball and a Wilson® basketball, both the Nike® and Wilson® basketballs being sold at the first price range. System 100 may additionally detect, for example, the distinctive Nike® logo to further differentiate between the basketballs sold at the first price range.

In accordance with the present disclosure, the at least one processor may be configured to analyze the at least one image to detect a promotion associated with the detected product. Further, according to the present disclosure the method for processing images captured in a retail store may include analyzing the at least one image to detect a promotion associated with the detected product. Analyzing an image to detect a promotion may include steps similar to those discussed above with respect to, for example, step 2114. A promotional price may be associated with a detected product in any manner consistent with this disclosure, including directly associating a promotion indicator with a product or associating a promotion indicator with a price indicator associated with a product.

For example, a detected label may include promotional price information (e.g., 50% off). The disclosed method may include associating the promotional price information with the price information of another detected label. By way of example, system 100 may detect both price label C2 and promotional label P1 within area 2320 of FIG. 23. Label C2 may contain, for example, the regular price for product 2322 and promotional label P1 may contain, for example, a sale price for product 2322. System 100 may detect both price label C2 and promotional label P1 and determine that the price associated with product 2322 is the price indicated on C2 as modified by promotional label P1. The association between price label C2 and promotional label P1 may be based on the proximity of the labels or other information on each of price label C2 and promotional label P1. As an example, suppose the original price of product 2322 is $4.00, price label C2 may contain the price indicator "$4.00" and promotional label P1 may contain the price indicator "$4.00, Now $2.99!" Based on, for example, each label being in proximity to product 2322 and each label containing some form of the text "$4.00," system may determine that promotional price "$2.99" is associated with product 2322. Continuing this example, system 100 may determine that product 2324, which is located slightly further from promotional label P1, is associated with the original price reflected in price label C2 (i.e. $4.00) based, for example, on a proximity of the price label C2 to product 2324. Proximity between labels and/or between labels and products may be determined, for example, based on a determination of a distance between the labels or between the products and labels based on analysis of the image. It is contemplated that information such as dimensions of the retail store and/or of the shelves used to display the product may be provided to system 100 or may be obtained by system 100 from database 140 to determine the distances.

In accordance with this disclosure, the at least one processor may be further configured to, based on the detected promotion, determine that the type of the detected product is the first type of product even when the identified price does not fall within the first price range. For example, a price range may encompass a promotional price, and a determined price, not based on the promotional price, may be outside of the price range even though the product is of the type represented by the price range.

It is contemplated that system 100 may determine that both the original price and the promotional price are associated with a product. For example, system 100 may determine that the price indicator of price label C2 and the price indicator of promotional label P1 are associated with product 2322. In this embodiment, system 100 may proceed with method 2100, for example, and compare both the original price and the promotional price to a first and second price range to determine whether product 2322 is of a first type of product or a second type of product.

It is further contemplated that a promotional price may be detected upon an initial analysis of a received image, as part of step 2114, or that detection of a promotional price may be the result of an additional analysis, prompted, for example, by a determination that a determined price does not fall within a first or second price range.

Figure 22A:
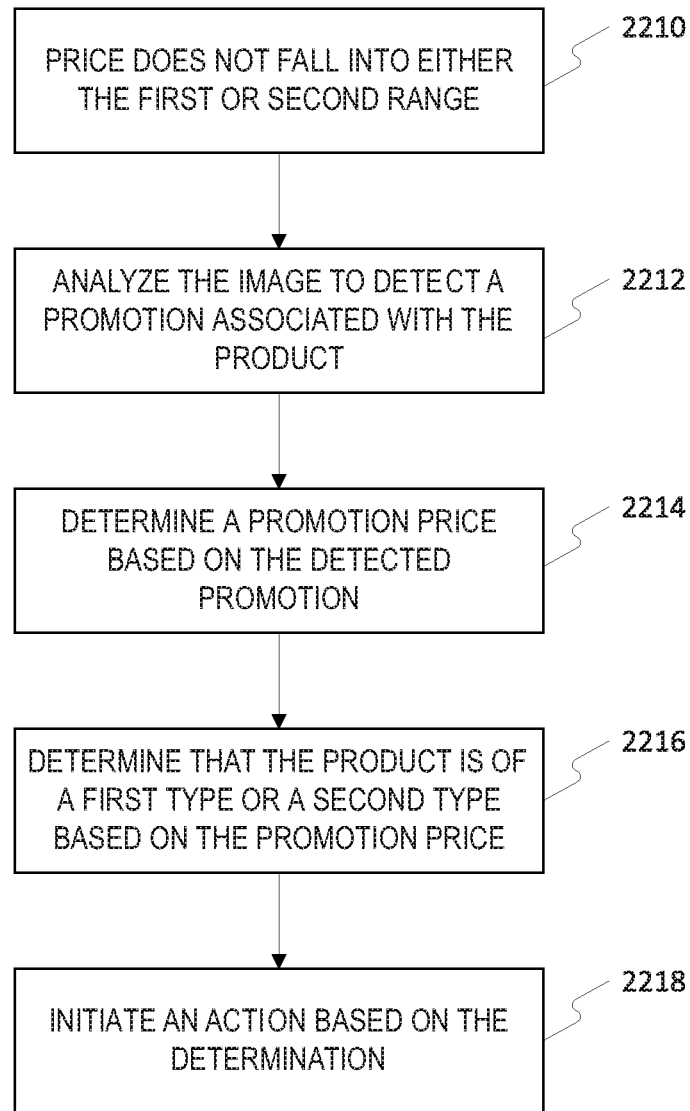
FIG. 22A in an illustration of an exemplary method of using a promotional price to determine whether a product is of a first or second type, consistent with the present disclosure.
Figure 22B:
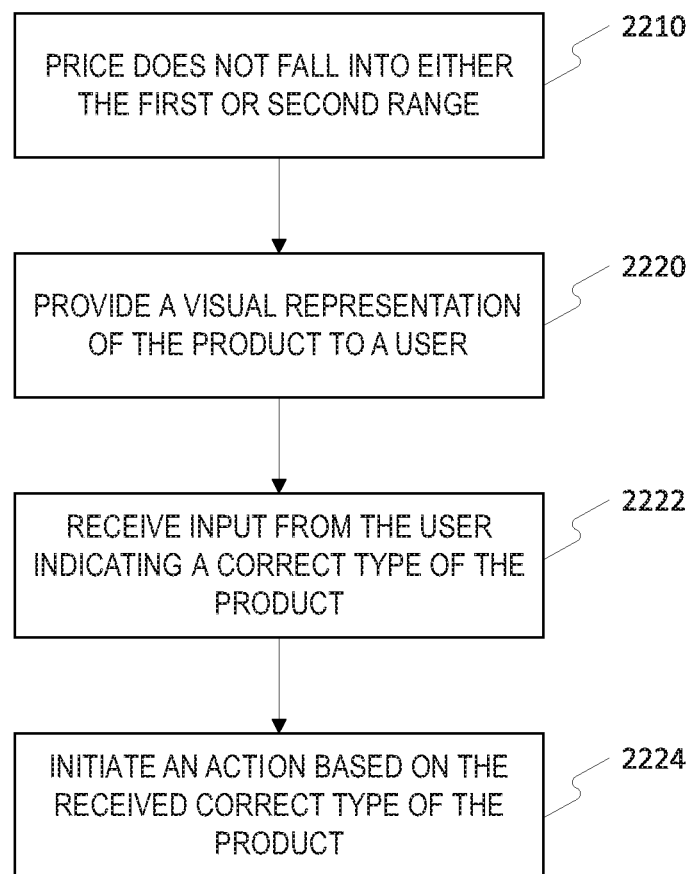
FIG. 22B is an illustration of an exemplary method for responding to a determination that a determined price does not fall within a first or second price range, consistent with the present disclosure.
Figure 22C:
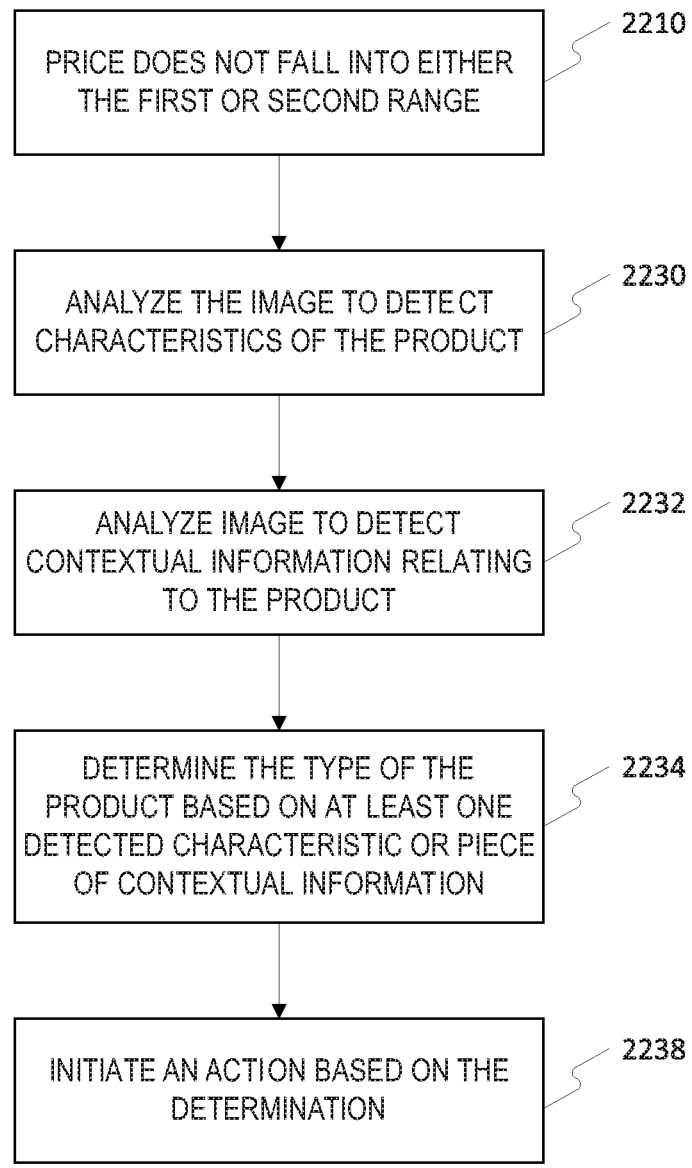
FIG. 22C is an illustration of an exemplary method for responding to a determination that a determined price does not fall within a first or second price range, consistent with the present disclosure.

FIG. 22A provides an exemplary process 2200 for determining the type of a product based on a promotional price in response to a determination that an originally determined price does not fall within a first or second price range. For example, system 100 may be configured to perform process 2200 to further analyze an image to detect a promotion at step 2212 in response to a determination that a previously determined price does not fall within a first or second price range, as represented at step 2210. A promotion may be detected, and a promotional price may be determined (at step 2214), in substantially the same manner as an initial price label, as discussed above with respect to, for example, FIG. 23 and step 2112. System 100 may compare the promotional price to the first and second price range to determine whether the product is of the first or second type. At step 2216, system 100 may perform processes substantially similar to discussed with respect to, for example, step 2116 and processes 2102 and 2104. In response to a determination that the product is either the first or second type, process 2200 may proceed to step 2218 and system 100 may initiate an action based on the determination. The action may be any action consistent with this disclosure, including those discussed, for example, with respect to step 2118.

As an example, a first price range may be between $25 and $30 a second price range may be between $15 and $20. System 100 may perform method 2100 to detect a product and determine the price associated with the product to be $50, based on, for example, a price label affixed to the product and a price indicator on the price label, as discussed above. System 100, not employing optional process 2102 in this example, may further analyze the image in accordance with step 2212 to detect a promotion indicating that the product is on sale for $25, based on, for example, a flag indicating a half-off sale in proximity to the product in accordance with step 2214. System 100 may proceed to step 2216 to determine that the product is one of the first type based on the determined price, as modified by the promotional information, falling within the first price range.

It should be understood that process 2200 may be performed even if method 2100 determines that a product is, for example, a second type of product based on a determined price falling within a second price range. Modifying the example above, system 100 may determine the price of the product to be $20 in step 2114, which is within the second price range of $15 to $20. System may then further analyze the image in step 2212 to determine that the determined price of $20 is a promotional price, based on, for example, a second price label in proximity to the product that contains the original, non-promotional price. In this example, the price determined initially may be reflecting a discount of 20% and the actual price of the product may be $25. Based on the detected promotional information, the system may determine that the product is of the first type, based on its original, non-promotional price of $25 falling within the first price range despite the promotional price of $20 falling within the second price range.

According to the present disclosure, the at least one processor may be configured to provide a visual representation of the detected product to a user. The at least one processor may be configured to perform this step when, for example, a determined price does not fall within the price ranges of a first type of product or a second type of product. Further, according to the present disclosure, the method for processing images captured in a retail store may include providing a visual representation of the detected product to a user. The method may include this step when, for example, a determined price does not fall within the price ranges of a first type of product or a second type of product.

A visual representation may be provided to a user in any manner consistent with this disclosure, such as a display on a device, an alert transmitted to a device, an email, a text message, or any other means of providing a visual representation. For example, system 100 may provide a visual representation of a product to output device 145 and the visual representation may be displayed to user 102 via a display on GUI 500. It is contemplated that a visual representation may be sent to any of, for example, market research firm 110, supplier 115, or user 120, and may be presented via any means disclosed herein, including a display on output devices 145A, 145B, 145C, 145D, and through any GUI 500 disclosed herein. While the present disclosure provides examples providing a visual representation of a product, it should be noted that aspects of the disclosure in their broadest sense, are not limited to the disclosed examples.

A visual representation of a detected product may be any identifying information relating to a product. For example, a visual representation may be an image of a product, a schematic of a product, a description of a product, a location of a product, or any other information that would facilitate identification of the product by a user. For example, system 100 may analyze image 2300 to detect product 2324 and may transmit a visual representation to, for example, output device 145A, the visual representation may comprise box 2320. In the same example, the visual representation of 2324 may comprise a description of product 2324, including any physical characteristics of product 2324 (e.g., its shape and size) and any contextual information relating to product 2324 (e.g., product 2324's proximity to price label C2, product 2324's to product 2322, product 2324's proximity to shelf 2302, etc.). While the present disclosure provides examples of the identifying information constituting visual representation, it should be noted that aspects of the disclosure in their broadest sense, are not limited to the disclosed examples of the identifying information.

A visual representation may be provided to a user in response to a determination that a product is of a first or second type. For example, system 100 may perform method 2100 and determine that a detected product is of a first type based on its determined price falling within a first price range. In response to this determination, system 100 may, for example, provide a visual representation of the product to any output device 145A, 145B, 145C. The visual representation may include any identifying information relating to the product, as described above. By way of example, the visual representation may be transmitted to supplier 115 and supplier 115 may use the visual representation to ensure that the retail store in which the product was detected is complying with, for example, a planogram provided by supplier 115 that relates to the determined product type. Such a visual representation may be generated as a response to any process or method disclosed herein, such as a successful determination in method 2100, a determination in process 2102 (e.g., determination 2130, 2140), or a determination in process 2104 (e.g., determination 2130, 2140). In addition, the visual representation may be provided to a user as an action associated with any process disclosed herein, for example, as part of the action initiated in step 2218 of process 2200 or the action initiated in step 2224 of process 2202.

Additionally, consisted with the present disclosure, a visual representation may be provided to a user as a response to a determination that a type of a product cannot be determined by a method herein. For example, in process 2102, system 100 may determine that a product does not fall within a first or second price range and that a determined price is neither higher that a first price range nor lower than a second price range. As a response, process 2102 may include step 2126 for initiating an action based on the determination that the price does not fall within either the first or second price range. It is contemplated that providing a visual representation of the product to a user may be part of the action initiated in step 2126. By way of example, FIG. 22B may provide process 2202, in which, in response to a determination that a price associated with a product does not fall within either a first or second price range (step 2210), system 100, for example, may provide a visual representation of the product to a user (step 2220). While the present disclosure provides exemplary situations in which a visual representation may be provided to a user, it should be noted that aspects of the disclosure in their broadest sense, are not limited to the disclosed situations.

According to the present disclosure, the at least one processor may further be configured to receive input from the user indicative of a correct type of the detected product. The at least one processor may be configured to perform this step when, for example, a determined price does not fall within the price ranges of a first type of product or a second type of product. Further, according to the present disclosure the method for processing images captured in a retail store may include receiving input from the user indicative of a correct type of the detected.

An input indicative of a correct type of product of a detected product may be received in any manner disclosed herein, such as by a response to a display on a device, an alert transmitted to a device, an email, a text message, or any other means of providing input. For example, user 120 may provide an input through device 145 and the input may be provided by user through a GUI 500 configured to receive an input relating to the type of device. It is contemplated that the input may be received from any of, for example, market research firm 110, supplier 115, or user 120, and may be received via any means disclosed herein, including a display on output devices 145A, 145B, 145C, 145D, and through any GUI 500 disclosed herein.

An input indicative of a correct type of product may be any input that identifies the product as being of a certain type. For example, an input may comprise a word corresponding with a type of product, a number associated with a product (e.g., a number associated with an inventory system or a SKU of the product), a phrase containing a description of a product, an image of a product of the same type, any combination of the above, or any other means for identifying a product. By way of example, user 120 may provide input relating to product 2337 and the input may comprise a word identifying a type of product to which product 2337 belongs (e.g., "soda"), a phrase describing the type of product (e.g., "product 2337 is a diet, cherry flavored soda"), or any other identifying information. It is also contemplated that the input may not directly identify the correct type of a product, by may provide additional information that may be used to correctly identify the type of a product. Continuing the example, user 120 may provide an input relating to product 2337 and the input may comprise, for example, an image of product 2336 and system 100 may use the image of 2336 to determine that product 2337 is of the same or a different type than product 2336. In another example, user 120 may provide, for example, information relating to product label 2338, which is associated with product 2337, to identify product 2337. The information may comprise an image of product label 2338, a textual description of product label 2338, or some combination of the above.

The form that an input takes may be determined by GUI 500 or otherwise determined by the method of input. For example, GUI 500 may be configured to contain a text box in which a user can input textual identifying information. GUI may also be configured to receive an image as an input. GUI 500 may also be configured with a predetermined list of product types and user input may be a selection from the list. While the present disclosure provides examples of inputs and exemplary ways of providing inputs, it should be noted that aspects of the disclosure in their broadest sense, are not limited to the disclosed examples of inputs or to the disclosed ways of providing inputs.

An input may be received in response to an action or request for input. For example, an input may be received in response to the display of a visual representation of a detected product, as described above. In this example, the visual display may include a request for user input relating to the product represented in the visual representation. A system, such as system 100, may also transmit an alert, email, text message, or other indicator of a request for user input and the input may be received in response to the request for input. The request for input may be transmitted in response to a determination that a determined price of a product does not fall within a first or second price range. For example, process 2202 may include both providing a visual representation of a detected product to a user at step 2220 and receiving input from the user indicating a correct type of the product at 2222. It is also contemplated that the input received from a user may include a correct price range associated with the product type. For example, system 100 may request a price range from user 120 or supplier 115, for example, when it detects a product but cannot determine a type of the product because a price associated with the product does not fall within a first or second price range. The received input may then be stored, as discussed above, as a price range associated with a product type and may be used in future analyses. A request for input may also be transmitted in response to a determination that a product does fall within a first or second price range. For example, as part of an action initiated in step 2218 of process 2200, system 100 may request input regarding the type of the product. In this example, system 100 may use the user input to confirm that, for example, a step of method 2100 correctly detected a product and determined the type of the product based on its price.

According to the present disclosure, the at least one processor may further be configured to initiate an action based on the received input and the identified price. The at least one processor may be configured to perform this step when, for example, a determined price does not fall within the price ranges of a first type of product or a second type of product. Further, according to the present disclosure the method for processing images captured in a retail store may include initiating an action based on the received input and the identified price. The method may include this step when, for example, a determined price does not fall within the price ranges of a first type of product or a second type of product.

An action initiated in response to a received input may be any action disclosed herein. As is clear from this disclosure, the action may depend upon the received input and other factors relating to the image processing. For example, if an input provides a correct price range for a type of product, as discussed above, the action initiated may be to update database 140, for example, with the correct information such that the correct price range may be used in future image processing. Further, if the input is an input of a correct type of product for which system 100, for example, was able to determine a price associate with the product in step 2114, the action initiated in response to the input may be to store the input product type in association with the price and to derive a price range based on the correctly identified type of product and the determined price, as described above.

According to the present disclosure, the at least one processor may be configured to perform an action including updating at least one of the first or second price ranges. Further, according to the present disclosure the method for processing images captured in a retail store may include updating at least one of the first or second price ranges. By way of example, an input from a user may be a correct price range associated with a product type or a single price associated with the product type and this information may be used to determine that either a first or second price range is incorrect and to update the incorrect price range. For example, system 100 may analyze image 2300 to detect product 2314 and determine (for example, by step 2114) that the price associated with product 2314 is $2.59. System 100 may further identify a first price range of $3.49 to $4.99, for example, and a second price range of $0.99 to $1.99. With this information, system 100 may determine that product 2314 is not of the first or the second type. System 100 may, for example, provide a visual representation of product 2314 to a user, as described above in relation to step 2220, and receive user input relating to product 2314, as described above in relation to step 2222. The input may include a correct identification of product 2314 as, for example, being of the second type. The input may or may not include a correct price range for product 2314. Based on the input, system 100 may, for example, update the second price range to include the determined price of product 2314. In this example, the second price range may be updated from $0.99 to $1.99 to, for example, $1.99 to $2.99, which includes $2.59, the determined price of product 2314. It is contemplated that system 100, for example, may automatically update the first or second price range or it may seek additional input as to which price range is incorrect and what the proper price range should be. The price range may be adjusted in any manner and by any degree. For example, in the above example, system 100 may adjust the second price range to $0.99 to $2.59, $0.99 to $2.70, $0.99 to $3.00, etc., or otherwise adjust the price range to include the determined price.

According to the present disclosure, the at least one processor may be configured to perform an action including informing the user about a mismatch between a price of the correct type of the detected product and the identified price. Further, according to the present disclosure the method for processing images captured in a retail store may include informing the user about a mismatch between a price of the correct type of the detected product and the identified price. A user may be informed of a mismatch between a determined price and a price of the correct type of the detect product by any means disclosed herein. For example, the information may be transmitted to any device, such as user device 145, and in any form, such as by email, alert, text, display on GUI 500, etc. The information pertaining to the mismatch may be transmitted and presented in substantially the same manner as the visual representation of a product, as described above in relation to step 2220. While the present disclosure provides exemplary methods of providing information regarding a mismatch, it should be noted that aspects of the disclosure in their broadest sense, are not limited to the disclosed methods.

Providing information to a user about a mismatch between a determined price and a correct price may allow the user to correct either price. For example, system 100 may have properly determined a price associated with a product at step 2114, but the determined price may not match a price of the correct type for several reasons. Such reasons may include a misplaced price label, erroneous price information on a label, etc. System 100 may have properly identified the price, the price being incorrect. The user, provided with the information about the mismatch, may then take action to correct the misplaced or mislabeled price label. Similarly, system 100, for example, may have correctly identified a price associated with a product at step 2114, but the price range saved in database 140 may be incorrect. A user provided with information about the mismatch between prices may take action to correct the price range in the database, either by directly updating the information or authorizing system 100 to update the price range.

Providing information about a mismatch between a determined price and a correct price to, for example, supplier 115 may allow supplier 115 to monitor a retail store's compliance with a planogram or other requirements of the supplier. Providing information about a mismatch between a determined price and a correct price to, for example, market research entity 110 may allow market research entity 120 to use the information in preparing various reports and other market research products. While the present disclosure provides examples of actions that may be taken in response to receiving information regarding a mismatch, it should be noted that aspects of the disclosure in their broadest sense, are not limited to the disclosed actions.

The present disclosure relates to a system for processing images captured in a retail store and automatically identifying misplaced products. The system may analyze the captured images and identify that a product has been misplaced. For example, the product may have been moved by a potential purchaser who did not return the product to its appropriate location, such as a shelf containing similar products or products of the same brand. Moreover, the system may provide a notification to a store employee when a product has been misplaced. The notification may specify an appropriate location for the misplaced product. Further, in some embodiments, the notification may include one of the captured images depicting the misplaced product in order to speed the employee's task of relocating the product to its proper location. Still further, in some embodiments, notifications of misplaced products may be selectively provided to store employees based on an urgency level of restoring the misplaced product to its proper location. For example, certain products (milk, ice cream, etc.) may spoil if they are not located in a proper storage location, such as a refrigerated area.

According to the present disclosure, the system may include at least one processor. While the present disclosure provides examples of the system, it should be noted that aspects of the disclosure in their broadest sense, are not limited to a system for processing images. Rather, the system may be configured to process information collected from a retail store. System 100, illustrated in FIG. 1 and discussed above, is one example of a system for processing images captured in a retail store and automatically identifying misplaced products, in accordance with the present disclosure.

Consistent with the present disclosure, the at least one processor may be configured to receive one or more images captured by one or more image sensors from an environment of a retail store and depicting a plurality of products displayed on at least one store shelf. For example, image processing unit 130 may receive raw or processed image data from capturing device 125, as described above. The one or more images may depict one or more environments of a retail store, such as, FIGS. 24 and 25, discussed below. In some embodiments, image sensors may include capturing device 125, digital cameras, camera modules, night vision equipment, thermal imaging devices, radar, sonar, LIDAR, or the like.

Figure 24:
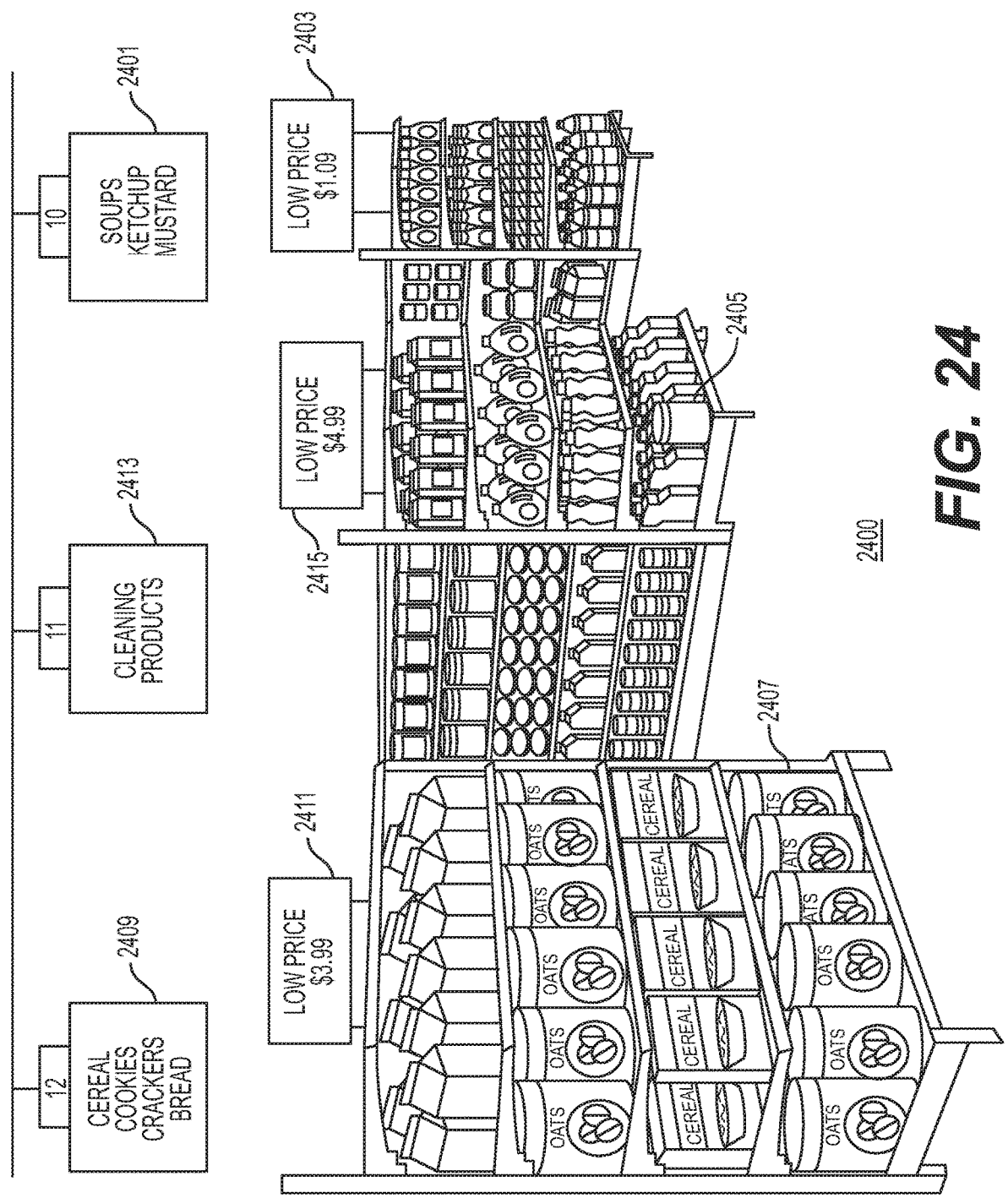
FIG. 24 is an exemplary image received by the system, consistent with the present disclosure.

FIG. 24 is an exemplary image received by the system, consistent with the present disclosure. The image may depict multiple aisles and shelves with many different types of products displayed thereon. For example, image 2400 depicts three aisles with signs 2401, 2409, and 2413; promotions 2403, 2411, and 2415. After receiving the image, server 135 may be configured to distinguish the different types of products. Based on image analysis described herein, server 135 may determine that misplaced product 2405 is not in its correct display location. Specifically, misplaced product 2405 is of product type oatmeal (identical to product type of products 2407), which has a correct display location of aisle twelve, which is the cereal, cookies, crackers, and bread section.

Consistent with the present disclosure, the at least one processor may be configured to detect in the one or more images a first product. The first product may have an associated first correct display location. For example, image processing unit 130 may analyze an image to detect the product(s) in the image, for example as described above.

Consistent with the present disclosure, the detected first product may have an associated first correct display location. For example, when "Head & Shoulders Shampoo" is detected in the image, image processing unit 130 may obtain location information associated with "Head & Shoulders Shampoo." Such location information may be stored in a "Head & Shoulders Shampoo" digital record in database 140 associated with the product type and the retail store. The location information may include an indication of a correct display location in the retail store (e.g., cleaning section, soft drink section, dairy product shelves, apparel section, etc.), an indication of the floor (e.g., 2nd floor), an indication of the aisle (e.g., 4th aisle), an indication of the shelf (e.g., the bottom shelf, the second shelf to the top, etc.), an address, a position coordinate, a coordinate of latitude and longitude, an area in a planogram, and/or an area on a map, etc. Moreover, in some cases a product type may have more than one correct display location in a retail store (for example, a shelf and a promotional display), and the digital record may include information about one or more correct display locations for the product type in the retail store.

Consistent with the present disclosure, the at least one processor may be configured to determine, based on analysis of the one or more images, that the first product is not located in the first correct display location. For example, when the one or more images contain one or more shelves, image processing unit 130 may analyze the one or more images to identify the shelves in the image, as described above. For example, image processing unit 130 may determine that the shelf is for soft drinks, the shelf is for cleaning products, the shelf is for personal products, and/or the shelf is for books, or the like. Based on the identification of the shelf, image processing unit 130 may determine the location depicted in the image. For example, when image processing unit 130 identifies that the shelf is for soft drinks, image processing unit 130 may determine a location of the shelf depicted in the image, such as, the third aisle, second floor, soft drink section, etc. In some aspects, image processing unit 130 may determine the location depicted in the one or more images by recognizing text on a sign or a promotion material depicted in the image. In some aspects, image processing unit 130 may determine the location depicted in the one or more images by analyzing the lighting in the image. For example, the lighting may be brighter in certain areas of a retail store, and the color of the light may be different from one section to another in the retail store. In some aspects, image processing unit 130 may determine the location depicted in the one or more images by analyzing the background in the one or more images. For example, some shelves may be located next to a window, some shelves may be located in a corner, some shelves may be located against a green wall, etc. In some aspects, position and/or orientation of an image sensor capturing one or more images may be known (for example, from a positioning system, from user input, etc.), possibly together with other capturing parameters, and the location of an object depicted in the one or more images may be calculated based on the position and/or orientation of the image sensor and/or the capturing parameters. For example, in 2D images, each pixel may correspond to a cone or a pyramid in the real world, and the location may be determined to be within that cone or pyramid. In another example, in a 3D camera, each pixel of a range image or each point in a point cloud may correspond directly to a position in the real world. In some aspects, image processing unit may determine the location depicted in the one or more images by recognizing the environment in the one or more images. For example, image processing unit 130 may recognize the environment to be near the cashier, by using the image analysis method described above. Image processing unit 130 may identify the cashier depicted in the one or more images, using object recognition method. In some examples, image processing unit 130 may recognize the environment to be near storage room, by recognizing the text on the sign and/or other methods described above. While the present disclosure provides examples of techniques and analysis for determining a location, it should be noted that aspects of the disclosure in their broadest sense, are not limited to the disclosed examples.

While the present disclosure provides examples of techniques and analysis for determining the location where the one or more images are captured, it should be noted that aspects of the disclosure in their broadest sense, are not limited to the disclosed examples.

Consistent with the present disclosure, the at least one processor may be configured to determine whether the first product is located in the first correct display location. Determining whether the first product is located in the first correct display location may include comparing the location depicted in the one or more images with the first correct display location. If the locations do not match, the at least one processor may determine that the first product is not located in the first correct display location. In some aspects, the correct display location may be in a backroom storage area. For example, a type of product that is expired or is not supposed to be displayed, the correct display location associated with the type of product may be "backroom storage." In some aspects, the correct display location may include more than one location within a retail store (for example, a shelf and a promotional display), and determining that the first product is located in the correct display location may include determining that the first product is located in at least one of the locations included in the correct display location.

Consistent with the present disclosure, the at least one processor may be configured to determine an indicator of a first level of urgency for returning the first product to the first correct display location. The term "level of urgency for returning the first product to the first correct display location" refers to any indication, numeric or otherwise, of a level (e.g., within a predetermined range) indicative of an urgency to remove the misplaced product to the correct location. For example, the level of urgency may have a value between 1 and 10. Image processing unit 130 may store the determined level of urgency in database 140. A level of urgency may be used, for example, to determine whether to send a notification to a user for removing the misplaced product. Image processing unit 130 may comprise an algorithm to determine a level of urgency, based on the identified characteristics. For example, the misplaced product depicted in the image is identified as "frozen food," image processing unit 130 may assign 10 points to the level of urgency for returning the product to the correct display location. When the misplaced product in the image is identified as "canned food," image processing unit 130 may assign 1 point to the level of urgency for returning the product to the correct display location. Further, different characteristics or different types of product may be assigned different point values. For example, "frozen food" may have greater point value than "canned food." While the present disclosure provides examples of characteristics, it should be noted that aspects of the disclosure in their broadest sense, are not limited to the disclosed examples. In some examples, the level of urgency may be determined according to an area of the retail store (for example, an aisle, a shelf, etc.) that the misplaced product is currently placed on. For example, the retail store may have contractual obligations with respect to a first group shelves (for example, with respect to shelves associated with a specific brand, a specific supplier, and so forth), and may have no contractual obligations or less strict contractual obligations with respect to a second group of shelves. As a result, the level of urgency may be determined to be higher when the first product is currently placed on the first group of shelves, and may be determined to be lower when the first product is currently placed on the second group of shelves. In some examples, the level of urgency may be determined according to context information (which may be obtained as described below). For example, the context information may indicate that a misplaced product is blocking a passageway in the retail store, and as a result, a higher level of urgency may be determined. In another example, the context information may indicate that a shelf associated with the product type of the first product is properly stocked, and as a result a lower level of urgency may be determined.

Consistent with the present disclosure, the at least one processor may be configured to cause an issuance of a user-notification associated with the first product. The user-notification may be issued within a first period of time from when the first product was determined not to be located in the first correct display location. For example, once the first product is determined not to be located in the first correct display location, server 135 may cause an issuance of a user-notification on an output device, for example using I/O system 210 and peripherals interface 208. Output device (e.g., a display screen, a speaker, etc.) may receive the user-notification and display the user-notification to a user. The user-notification may include a text message, audio recording, image, map, indication of the correct location (such as an image depicting the correct location, map identifying the correct location, etc.), indication of the misplaced location (such as an image depicting the misplaced location, map identifying the misplaced location, etc.), indication of the misplaced product (such as an image depicting the misplaced product, product type of the misplaced product, etc.), and/or the indicator of the level of urgency, etc. Consistent with the present disclosure, server 135 may be configured to determine a first period of time starting from when the first product was determined not to be located in the first correct display location. In some aspects, server 135 may determine a first period of time based on the level of urgency. In some aspects, server 135 may determine a first period of time based on the identified one or more characteristic of the product. For example, when "fresh food" and/or "frozen food" are identified, server 135 may determine a first period of time to be shorter than other products. Image processing unit 130 may also include a timer configured to measure a specific time interval, that may be, the determined period of time.

Consistent with the present disclosure, the at least one processor may be configured to detect in the one or more images a second product. The second product may have an associated second correct display location. For example, image processing unit 130 may detect a second product in the one or more images, based on image analysis and using the product models, as described above.

Consistent with the present disclosure, the at least one processor may be configured to determine, based on analysis of the one or more images, that the second product is not located in the second correct display location. For example, image processing unit 130 may determine that the second product is not located in the second correct display location in similar manners to the corresponding determination for the first product and the first correct display location described above. If image processing unit 130 determines that the second product is not located in the second correct display location, server 135 may generate an issuance of a user-notification that may be displayed using an output device. Server 135 may withhold the issuance and store the issuance in memory device 226.

Consistent with the present disclosure, the at least one processor may be configured to determine an indicator of a second level of urgency for returning the second product to its associated second correct display location. As described above, image processing unit 130 may execute an algorithm to determine a second level of urgency, based on the identified characteristics of the second product. Image processing unit 130 may store the determined level of urgency in database 140. A level of urgency may be used, for example, to determine a time duration before sending a notification for removing the misplaced product to the user.

Consistent with the present disclosure, after determining that the second product is not located in the second correct display location and when the second urgency level is lower than the first urgency level, the at least one processor may be configured to withhold issuance of a user-notification associated with the second product within a time duration equal to the first period of time. Consistent with the present disclosure, image processing unit 130 may be configured to compare and/or rank the first and second level of urgency for returning the product to its associated correct display location. When the second level of urgency is determined to be lower than the first level of urgency, image processing unit 130 may withhold issuance of a user-notification associated with the second product. As described above, image processing unit 130 may also include a timer configured to measure a specific time interval. Image processing unit 130 may withhold the issuance of the user-notification associated with the second product for a time duration equal to the first period of time, by using the timer. For example, when the first identified misplaced product is a "frozen food," and the second identified misplaced product is a "canned food," image processing unit 130 may determine that the second misplaced product to have a lower level of urgency for returning to the correct location than for the first misplaced product, so image processing unit 130 may withhold the issuance of the user-notification associated with the second misplaced product until the user-notification associated with the first misplaced product is sent to the output device. This may help one or more system users to prioritize which misplaced product should be return to its correct location first. In some examples, delaying the user-notification associated with the second misplaced product may allow the second misplaced product event (which may be less urgent than the first misplaced product event) to be resolved naturally, without an initiated intervention, for example by a customer picking the misplaced product for purchase, by a customer returning the misplaced product to the correct display location, by an employee picking the misplaced product, by an employee returning the misplaced product to the correct display location, and so forth. In some embodiments, user-notification associated with a second misplaced product may be permanently forgone, for example for a second misplaced product associated with a level of urgency lower than a selected threshold. In some embodiments, user-notification associated with a second misplaced product may be withheld to a more suitable time (for example, a time with lower work load, a time when more employees are in the retail store, a time when a selected employee is in the retail store, a time when less customers are within the retail store or within an area of the retail store associated with the misplaced product, and so forth). For example, the user-notification may be withheld until a suitable time arrives and/or is detected by the system. In another example, the system may predict when a more suitable time will arrive, and schedule the user-notification to the predicted time.

Consistent with the present disclosure, the at least one processor may be configured to cause an issuance of a user-notification associated with the second product within a second period of time from when the second product was determined not to be located in the second correct display location. The second period of time may be longer than the first period of time when the second level of urgency is lower than the first level of urgency. For example, as described above, if the second product is determined not to be located in the second correct display location, image processing unit 130 may cause an issuance of a user-notification in similar manners to the issuance of the corresponding user notification for the first misplaced product described above.

Consistent with the present disclosure, image processing unit 130 may be configured to determine a second period of time starting from when the second product was determined not to be located in the second correct display location. The second period of time may be determined based on the second level of urgency. For example, when the second level of urgency is lower than the first level of urgency, image processing unit 130 may determine the second period of time is longer than the first period of time. In a case where the first level of urgency is determined to be 8 and the second level of urgency is determined to be 2, and image processing unit 130 has determined the first period of time to be 30 seconds, image processing unit 130 may determine the second period of time to be 10 minutes. For example, when "canned food" is determined to be the second product that is not located in its correct display location and "fresh food" is the first product that has a greater level of urgency, image processing unit 130 may issue the user-notification associated with the "canned food" within a longer time period than the time period for "fresh food." As discussed earlier, image processing unit 130 may also include a timer configured to measure a specific time interval.

Consistent with the present disclosure, the user-notification may be included in a product-related task assigned to a store employee. The user-notification may include at least one of: information about a correct display location of a misplaced product, information about a store shelf associated with the misplaced product, information about a product type of the misplaced product, or a visual depiction of the misplaced product. For example, shown in FIG. 11D, GUI 1130 may include a first display area 1132 for showing a list of notifications or text messages indicating several in-store execution events that require attention. The execution events may include one or more task to return the misplaced product to its correct display location. The notifications may include text messages and a link to an image (or the image itself). The image may depict the misplaced product. The notifications may also include information about the correct display location of the misplaced product, such as information related to the correct display location, a map indicating the correct display location, an image of the correct display location, and so forth. For example, the notification may include text message, such as, "Please return the product below to second aisle, soft drink section, 3rd floor." The notifications may also include information about a store shelf associated with the misplaced product, such as a location of the shelf, image of the shelf, and so forth. For example, the notification may include a link to image 2400 or image 2400 itself. As shown in FIG. 24, image 2400 depicts a misplaced product 2405 in aisle eleven. Additionally or alternatively, the notification may include a text message describing the misplaced product and/or the correct display location, such as "the shelf on the end of aisle eleven contains a misplaced product," "the shelf in the cleaning product section," "the shelf under the promotion sign of $4.99," or the like. The notifications may also include product information about the product type of the misplaced product. For example, the notification may include a text message that contains "a Coca-Cola Zero is currently misplaced." In some examples, the correct display location may include multiple locations, and the notification may include information about one or more locations selected of the multiple locations (for example, based on proximity, based on need for restock associated with at least one of the multiple locations, and so forth), or may include information about all locations included in the correct display location.

In another example, shown in FIG. 11D, GUI 1140 may include a first display area 1142 for displaying a real-time video stream captured by output device 145C with real-time augmented markings indicting a status of planogram compliance for each product (e.g., correct place, misplaced, not in planogram, and empty). GUI 1140 may also include a second display area 1144 displaying a summary of the planogram compliance for all the products identified in the video stream captured by output device 145C. Consistent with the present disclosure, server 135 may rapidly generate (e.g., within seconds or minutes) actionable tasks to improve store execution. These tasks may help employees of retail store 105 to quickly address situations that can negatively impact revenue and customer experience in the retail store 105. Such tasks may include returning the one or more misplaced product to its correct display location.

Consistent with the present disclosure, the at least one processor may be configured to detect in the one or more images the second product at a time within the first period of time from when the first product was determined not to be located in the first correct display location. For example, when the first period of time is determined to be 30 seconds, image processing unit 130 may detect a second misplaced product in the 30 seconds after the first product was determined to not be located in the first correct display location.

Consistent with the present disclosure, the indicator of the first level of urgency for returning the first product to the first correct display location may be associated with a product type of the first product. For example, when "frozen yogurt" is detected and determined not to be in the first display location (e.g., the fridge), image processing unit 130 may determine the level of urgency for returning frozen yogurt to be 10, which is the greatest. In another example, when "canned tuna" is determined to be not in its correct display location, image processing unit 130 may determine the level of urgency for returning canned tuna to be 2. Accordingly, each product type may have a pre-determined level of urgency for returning the product to an appropriate shelf or storage location. Further, the pre-determined level of urgency may be stored in product models associated to the product types.

Consistent with the present disclosure, when the product type includes frozen food, the first period of time may be shorter than when the product type includes fresh produce. For example, when "frozen yogurt" is detected and determined not to be in the first display location (e.g., the fridge), because "frozen yogurt" falls in a "frozen food" product type, image processing unit 130 may determine the first period of time to be 5 minutes. In another example, when "fresh tuna" is determined to be not in the first correct display location, and because "fresh tuna" falls in a "fresh food" product type, image processing unit 130 may determine the first period of time to be 15 minutes.

Consistent with the present disclosure, when the product type includes canned goods, the first period of time may be longer than when the product type includes fresh produce. For example, when "fresh tuna" is determined to be not in the first correct display location, and because "fresh tuna" falls in a "fresh food" product type, image processing unit 130 may determine the first period of time to be 15 minutes. In another example, when "canned tuna" is determined to be not in the first correct display location, and because "canned tuna" falls in a "canned food" product type, image processing unit 130 may determine the first period of time to be 60 minutes to 240 minutes. This may help prioritize the task to return the most urgent misplaced product.

Consistent with the present disclosure, the at least one processor may be further configured to determine, based on context information derived through analysis of the one or more images, whether the first product determined not to be located in the first correct display requires repositioning. For example, the context information may indicate that the first product determined not to be located in the first correct display is located within a cart, and therefore do not requires repositioning. In another example, the context information may indicate that the first product determined not to be located in the first correct display is located within a cart, and that the cart did not move for a select threshold amount of time, and therefore the first product requires repositioning. In yet another example, the context information may indicate that the first product determined not to be located in the first correct display is held by a customer, and therefore do not requires repositioning. In another example, the context information may indicate that the first product determined not to be located in the first correct display is in a checkout area, and therefore do not requires repositioning. In yet another example, the context information may indicate that the first product determined not to be located in the first correct display is in an area dedicated for damaged or otherwise defective products, and therefore do not requires repositioning. In another example, the context information may indicate that the first product determined not to be located in the first correct display is in motion, and therefore do not requires repositioning. In some examples, the context information may be determined by analyzing the one or more images, for example using a machine learning model trained using training examples to determine contextual situations from images, using an artificial neural network configured to determine contextual situations from images, and so forth. Any other examples of determining context information and/or using context information to determine whether the first product determined not to be located in the first correct display requires repositioning may be implemented.

Consistent with the present disclosure, image processing unit 130 may be configured to determine whether the first product is located in the first correct display location. Determining whether the first product is located in the first correct display location may include comparing the location depicted in the one or more images with the first correct display location. If the locations do not match, image processing unit 130 may determine that the first product is not located in the first correct display location. For example, misplaced product 2405 may have its correct display location of "at the end of aisle 12, cereal and oatmeal section." After comparison, image processing unit 130 may determine that misplaced product 2405 is not located in its correct display location.

Consistent with the present disclosure, the at least one processor may be configured to forego causing the issuance of the user-notification after determining that the first product does not require repositioning. For example, after first determining that the first product is not located in the first correct display location and before the issuance of the user-notification associated with the first product, the first product may be removed from the original misplaced location (for example, by a customer picking the first product for purchase, by a customer returning the first product to the first correct display location, by an employee picking the first product, by an employee returning the misplaced product to the first correct display location, and so forth) or the situation of the first product may change (for example, context associated with the first product may change, for example a cart holding the first product may move). The change in the situation of the first product or the removal of the first product from the original misplaced location may be detected, for example by analyzing images of the first product or of the original misplaced location using any of the image analysis techniques described above. In response to the detected change in the situation of the first product or the detected removal of the first product from the original misplaced location, the system may determine that the first product does not require repositioning any longer, and the system may forego causing the issuance of the user-notification.

Consistent with the present disclosure, the at least one processor may be configured to determine that the first product does not require repositioning when the context information derived from analysis of the one or more images indicates that the first product is located in the hand of a person. For example, a product may be determined to be in a hand of a person, such as an employee repositioning the product and/or returning the misplaced product, a customer considering a purchase of the product, and so forth. In such cases, image processing unit 130 may be configured to determine that the product does not require repositioning. To determine whether the product is in a person's hand, image processing unit 130 may use any suitable image analysis technique. For example, a machine learning model trained using training examples to determine whether a product is held from images may be used to determine that the first product is located in the hand of a person. In another example, an artificial neural network configured to determine whether a product is held from images may be used to determine that the first product is located in the hand of a person.

In some embodiments, notifications may be provided in response to the detection of misplaced products. In order to reduce false notifications, the system may ignore temporarily misplaced products. For example, the notification may be withheld when the product is misplaced for less than selected time duration, when a person associated with the product (for example, the person placing the product) is still present, when the product is in motion, when the product is in a cart, and so forth. In some embodiments, one or more images captured from a retail store may be analyzed to identify a misplaced product, as described above. For example, a product may be detected on a store shelf, the product type of the detected product may be obtained by analyzing the one or more images, the product types associated with the store shelf may be obtained (for example, by analyzing the one or more images to identify labels attached to the store shelf that identify the product types associated with the store shelf, from a store map, from a database, and so forth), and the detected product may be identified as misplaced if the product type of the detected product is not within the product types associated with the store shelf. The images may be analyzed further to determine that a misplacement of the misplaced product is a long-term misplacement, and notification may be provided to a user based on said determination, as described above. For example, the notification provided to the user may comprise information related to a location associated with the misplaced product, information related to a store shelf associated with the misplaced product, information related to a type of the misplaced product, information related to a time duration in which the product has been misplaced, a visual depiction of the misplaced product, and so forth. In some examples, the determination that the misplacement of the misplaced product is a long-term misplacement may be based on a time duration associated with the misplaced product. For example, it may be determined that the misplacement of the misplaced product is a long-term misplacement when the product is misplaced for a time duration longer than a selected time duration, when the misplaced product is stationary for at least a selected time duration, and so forth. In some examples, the determination that the misplacement of the misplaced product is a long-term misplacement may be based on an absence of a person associated with the misplaced product from at least part of the one or more images. In some examples, the determination that the misplacement of the misplaced product is a long-term misplacement may be based on a motion of the misplaced product in the at least one image, for example, determining that the misplacement is a long-term when the product is not moving. In some examples, the determination that the misplacement of the misplaced product is a long-term misplacement may be based on a location of the misplaced product, for example, using one selected minimal time duration for one location and another minimal time duration for another location, or in another example, determining that a misplacement is a long-term when the location of the product is not in selected areas, and so forth. In some examples, the determination that the misplacement of the misplaced product is a long-term misplacement may be based on a type of the misplaced product, for example, using one selected minimal time duration for one product type and using another selected minimal time duration for another product type. In some examples, the determination that the misplacement of the misplaced product is a long-term misplacement may be based on a determination that the misplaced product is not within a cart. In one example, the minimal time duration may be determined per product type. For example, canned food may have a first minimal time duration greater then a second minimal time duration of product types that need refrigeration.

Figure 25:
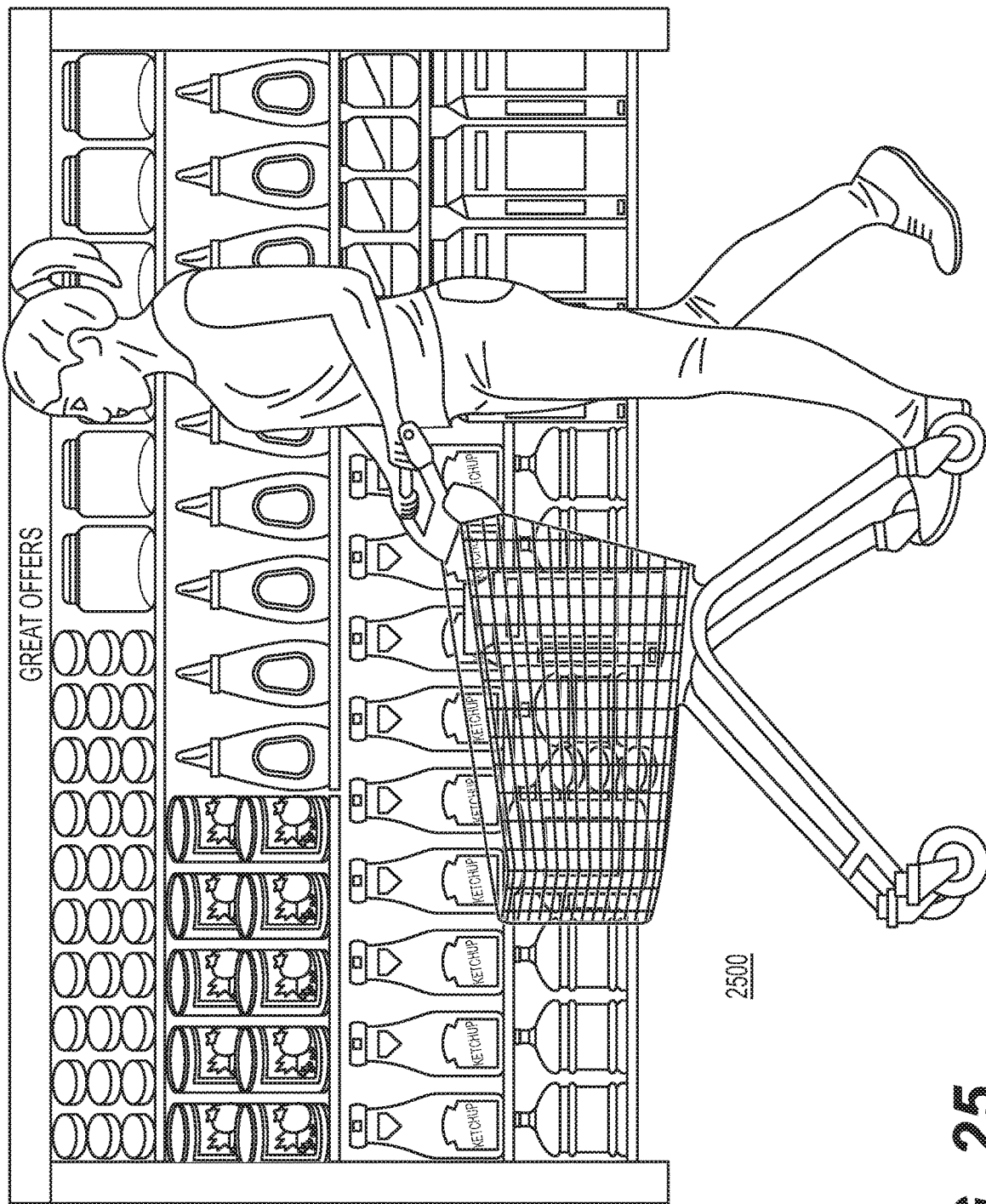
FIG. 25 is another exemplary image received by the system, consistent with the present disclosure.

FIG. 25 is another exemplary image received by the system, consistent with the present disclosure. Image 2500 may be one of a plurality of images that together depict a person moving with a cart. For example, comparing the images, server 135 may be configured to determine that both the person and the cart are moving toward the left. Further, as described below in further detail, server 135 may be configured to determine the person to be a customer based on at least one visual characteristic of the person in the images.

Consistent with the present disclosure, the at least one processor may be configured to determine that the first product does not require repositioning when the context information derived from analysis of two or more captured images indicates that the first product is moving. For example, in FIG. 25, image processing unit may recognize the moving cart in the two or more images 2500. As described above, to determine whether the product is in a moving cart and/or the direction of the motion, image processing unit 130 may use any suitable image analysis technique including, for example, motion detection algorithms, object tracking algorithms, and so forth.

Consistent with the present disclosure, the at least one processor may be configured to determine that the first product requires repositioning when the context information derived from analysis of the one or more images indicates an absence of people located in a vicinity of the first product. Additionally, the at least one processor may be configured to determine that the first product does not require repositioning when the context information derived from analysis of the one or more images indicates a presence of at least one person located in a vicinity of the first product. For example, the person may be a customer or an employee who may return the product to its correct display location. Thus, when a person is detected in the one or more images, image processing unit 130 may determine that the product does not require repositioning. As described above, image processing unit 130 may use any of the above described methods to detect a person in the one or more images.

Consistent with the present disclosure, the at least one person may be determined, based on an analysis of the one or more images, to have at least one characteristic associate with a customer. To determine whether the person is a customer, image processing unit 130 may use any suitable image analysis technique. For example, a machine learning model trained using training examples to classify a person as a customer or as a retail store employee based on images of a person may be used to determine whether the person is a customer or an employee, for example based on at least one visual characteristic depicted in the images. In another example, an artificial neural network configured to distinguish between customers and retail store employees by analyzing images of people may be used to determine whether a person is a customer or an employee, for example based on at least one visual characteristic depicted in the images. Some examples of the at least one characteristic may include wearing a retail store uniform, not wearing a uniform, moving slowly, having many products of different product types in a cart associated with the person, having many products of a single product type in a cart associated with the person, wearing an employee tag name, and so forth. Further, characteristics associated with a customer may be store in database 140.

Consistent with the present disclosure, the at least one processor may be configured to determine, after the time duration, that the second product remains in a location other than the second correct display location, and cause issuance of a user-notification associated with the second product. For example, when the employee did not perform the task of returning the misplaced product to its correct display location, image processing unit 130 may be configured to cause issuance of another user-notification. This may alert the user and remind the user to perform the task.

Consistent with the present disclosure, the at least one processor may be configured to determine the first and second correct display locations based on product types for the first and second products determined based on analysis of the one or more images. For example, when the first product, "Head & Shoulders Shampoo," is detected in the image, image processing unit 130 may obtain location information associated with "Head & Shoulders Shampoo." Such location information may be stored in the "Head & Shoulders Shampoo" digital record in database 140. For example, the first correct display location may be "personal care product section, 2nd floor, aisle four, on the bottom shelf." The second product may be "Coca-Cola Zero," which may also have a correct display location associated with it stored in database 140. Thus, the second correct display location may be "soft drink section, 3rd floor, aisle three, on top on the shelf."

Consistent with the present disclosure, the first and second correct display locations may be determined based on information including at least one of: a planogram, a store map, a database, a label associated with the at least one store shelf, other products associated with the at least one store shelf, and an aisle associated with at least one store shelf. For example, a correct display location associated to a product may be stored in the digital records in database 140, as described above. In another example, the correct display location may be represented by a pin on a graphic map and/or a string of location information "personal care section," "2nd floor," and "aisle four." Further, the correct display location may also be an address, such as "B building, 2F, personal care section, top shelf." In some aspects, the correct display location may be in a backroom storage area. In some aspects, the correct display location may be depicted in the planogram, which may contain an indication of the specific location. Such an indication may be a red circle and an arrow on the planogram.

Consistent with the present disclosure, the at least one processor may be configured to determine the first correct display location for the first product and to include in the user-notification associate with the first product an instruction for use in re-locating the first product to the associated first correct display location. For example, server 135 may cause an issuance of a user-notification on an output device, for example using I/O system 210 and peripherals interface 208. Output device (e.g., a display screen, a speaker, AR system, etc.) may receive the user-notification and display the user-notification to a user. The user-notification may include text message, audio recording, image, map, indication of the correct location, indication of the misplaced location, indication of the misplaced product, and/or the indicator of the level of urgency, etc. For example, the notification may include text instructions, such as, "please return misplaced Coca-Cola Zero from the cleaning section, third aisle, third floor to the second aisle, soft drink section, third floor within 10 minutes." The notifications may also include information about a store shelf associated with the misplaced product. For example, the notification may include a link to image 2400 or simply image 2400 itself. In some aspects, the notifications may also include a map that depicts the location of the misplaced product and its correct display location. The map may also include a determined route from the location of the misplaced product to its correct display location. Additionally or alternatively, the notification may include a text message that says "the shelf on the end of aisle eleven contains a misplaced product," "the shelf in the cleaning product section," "the shelf under the promotion sign of $4.99," or the like. The notifications may also include product information about the product type of the misplaced product. For example, the notification may include a text message that contains "a Coca-Cola Zero is currently misplaced." In some embodiments, the instructions may be provided using an Augmented Reality (AR) system, such as AR headset, AR display on a mobile device, and so forth. In the AR system, navigation guidance to the misplaced product and/or to the correct display location may be provided, for example as arrows directing the user where to go, as a path to follow, and so forth. Further, the misplaced product may be marked in the AR display, for example with a circle, an arrow, by displaying the misplaced product in a modified color scheme, and so forth.

Figure 26:
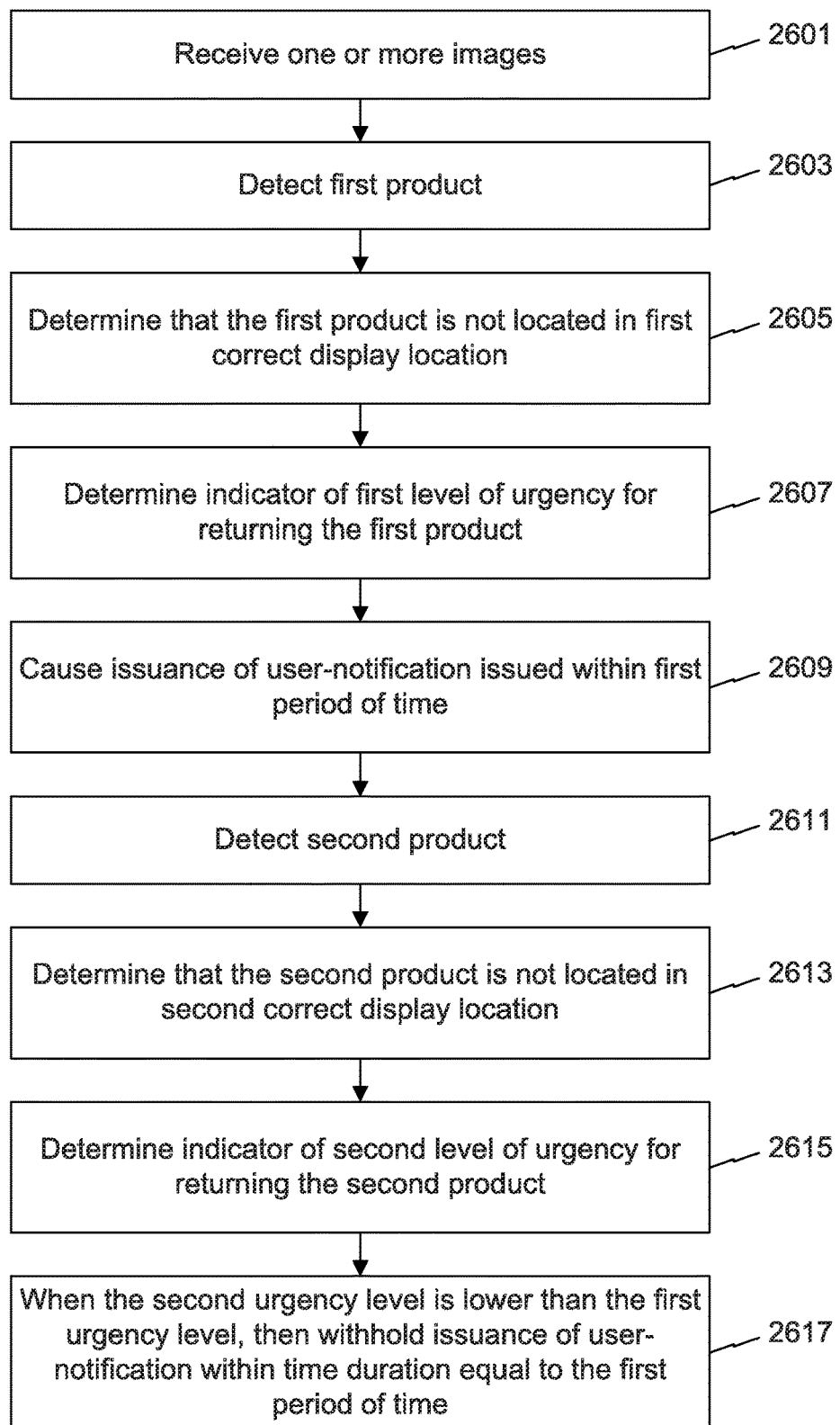
FIG. 26 is a flow chart of an exemplary method for processing images captured in a retail store and automatically identifying misplaced products, consistent with the present disclosure.

FIG. 26 is a flow chart illustrating an exemplary method 2600 for processing images captured in a retail store and automatically identifying misplaced products, in accordance with the present disclosure. The order and arrangement of steps in method 2600 is provided for purposes of illustration. As will be appreciated from this disclosure, modifications may be made to method 2600 by, for example, adding, combining, removing, and/or rearranging one or more steps of method 2600.

In step 2601, consistent with the present disclosure, method 2600 may include receiving one or more images captured by one or more image sensors from an environment of a retail store and depicting a plurality of products displayed on at least one store shelf. For example, server 135 may be configured to receive one or more images, as described above. The one or more images may depict an environment in a retail store. For example, as described above in connection with FIG. 24, the one or more images may depict aisles of shelves with different categories of products displayed thereon, and as described above in connection with FIG. 25, the one or more images may depict a customer passing by the shelves with a cart. Additionally or alternatively to step 2601, the processor may receive readings from detection elements attached to store shelves in the plurality of retail stores, as described above in relation to FIGS. 8A, 8B and 9.

In step 2603, consistent with the present disclosure, method 2600 may include detecting in the one or more images a first product. The first product may have an associated first correct display location. For example, server 135 may detect a first product in the one or more images using product models stored in database 140, as described above Additionally or alternatively to step 2603, the processor may analyze the received readings from the detection elements, alone or in combination with the image data, to determine the location of the first product and/or to identify a product type of the first product, for example as described above.

Consistent with the present disclosure, a correct display location associated to a product may be stored in the digital records in database 140, as described above.

In step 2605, consistent with the present disclosure, method 2600 may include determining, based on analysis of the one or more images, that the first product is not located in the first correct display location. For example, server 135 may be configured to determine whether the first product is located in the first correct display location, as described above.

In step 2607, consistent with the present disclosure, method 2600 may include determining an indicator of a first level of urgency for returning the first product to the associated first correct display location. Server 135 may use an algorithm for determining a level of urgency based on the identified characteristics, as described above.

In step 2609, consistent with the present disclosure, method 2600 may include causing an issuance of a user-notification associated with the first product, wherein the user-notification is issued within a first period of time from when the first product was determined not to be located in the first correct display location. For example, if the first product is determined not to be located in the first correct display location, server 135 may cause an issuance of a user-notification on an output device, as described above. Consistent with the present disclosure, server 135 may be configured to determine the first period of time, as described above.

In step 2611, consistent with the present disclosure, method 2600 may include detecting in the one or more images a second product, wherein the second product has an associated second correct display location. As described above, server 135 may detect a second product in the one or more images, based on image analysis and using the product models. Also, as described above, the detected second product may have an associated correct display location. Additionally or alternatively to step 2609, the processor may analyze the received readings from the detection elements, alone or in combination with the image data, to determine the location of the second product and/or to identify a product type of the second product, for example as described above.

In step 2613, consistent with the present disclosure, method 2600 may include determining, based on analysis of the one or more images, that the second product is not located in the second correct display location. For example, based on image analysis of the one or more images, server 135 may be configured to determine that the second product is not located in the second correct display location, as described above.

In step 2615, consistent with the present disclosure, method 2600 may include determining an indicator of a second level of urgency for returning the second product to its associated second correct display location. For example, server 135 may use an algorithm to determine a level of urgency, as described above.

In step 2617, consistent with the present disclosure, after determining that the second product is not located in the second correct display location and when the second urgency level is lower than the first urgency level, method 2600 may include withholding issuance of a user-notification associated with the second product within a time duration equal to the first period of time, as described above.

Consistent with the present disclosure, method 2600 may also include causing an issuance of a user-notification associated with the second product within a second period of time from when the second product was determined not to be located in the second correct display location. The second period of time may be longer than the first period of time when the second level of urgency is lower than the first level of urgency, for example as described above.

Consistent with the present disclosure, method 2600 may also include determining, based on context information derived through analysis of the one or more images, whether the first product determined not to be located in the first correct display requires repositioning, wherein the context information indicates at least one of: the first product is located in a hand of a person, the first product is moving, or the first product is located in a vicinity of at least one person, for example as described above.

The present disclosure relates to a system for processing images to automatically identify occlusions in a field of view of one or more cameras in retail stores. According to the present disclosure, the system may include at least one processor. While the present disclosure provides examples of the system, it should be noted that aspects of the disclosure in their broadest sense, are not limited to a system for processing images. Rather, the system may be configured to process information collected from a retail store. System 100, illustrated in FIG. 1 and described above, is one example of a system for processing images captured in a retail store and automatically identifying occlusion events, in accordance with the present disclosure.

Consistent with the present disclosure, the at least one processor may be configured to receive one or more images captured by one or more image sensors from an environment of a retail store and depicting a plurality of products displayed on at least one store shelf. For example, image processing unit 130 may receive raw or processed image data as described above.

Consistent with the present disclosure, the at least one processor may be configured to detect in the one or more images a first occlusion event, wherein the first occlusion event is associated with a first occluding object in the retail store. An "occlusion event" may occur when an occluding object blocks the view of an image capturing device (i.e., camera), when an occluding object prevents customers from seeing and/or accessing products, shelves, and/or displays, and so forth. Image processing unit 130 may detect an occlusion event and determine the object causing the occlusion. Many different types of occlusions may be identified by the disclosed systems and methods. For example, the disclosed systems and methods may identify occlusions that prevent stationary and/or moving cameras from monitoring products, shelves, and/or displays. Additionally or alternatively, for example, the disclosed systems and methods may identify occlusions and/or blockages that prevent customers from seeing and/or accessing products, shelves, and/or displays. By way of another example, the disclosed systems and methods may identify blockages that may prevent robots and/or personnel from traveling within the store.

For example, image processing unit 130 may detect an occlusion event by detecting a significant change in the brightness in the received images. As another example, image processing unit 130 may detect an occlusion event by recognizing a partially obscured product and/or a partially obscured sign. By way of another example, image processing unit 130 may recognize that a product is obscured by recognizing that a logo of the partially obscured product may not be displayed properly, the entire package of the partially obscured product may not be shown, and/or text on the partially obscured product may be cut out, etc. Image processing unit 130 may recognize that a sign is obscured by recognizing that the entire sign is not shown, and/or the text on the sign is not fully displayed, etc. In addition, image processing unit 130 may recognize the occluding object by analyzing the one or more images. Image processing unit 130 may use any suitable image analysis technique including, for example, object recognition, image segmentation, feature extraction, optical character recognition (OCR), object-based image analysis, shape region techniques, edge detection techniques, pixel-based detection, etc. In addition, image processing unit 130 may use classification algorithms to distinguish between the different objects in the retail store. In some embodiments, image processing unit 130 may utilize machine learning algorithms and models trained using training examples to detect occlusion events in images and/or to identify occluding objects from images. In some embodiments, an artificial neural network configured to detect occlusion events in images and/or to identify occluding objects from images may be used. In some embodiments, image processing unit 130 may identify the object in the image based at least on visual characteristics of the occluded object (e.g., size, shape, text, color, etc.).

It is contemplated that the disclosed system may use significant different method to identify occlusions of different types. For example, to identify occlusions of the first type (that prevent stationary and/or moving cameras from monitoring products, shelves, and/or displays) the system may use any of the following methods or other methods, as well. These may include, for example, monitoring the images to detect a (partial) disappearance of a shelf and/or display that is supposed to be in (a known location within) the field of view of the camera. In some cases, the system may further analyze input from another camera that monitors the disappearing shelf and/or display from a different angle to determine that the shelf and/or display was not physically removed. Additionally or alternatively, the disclosed system may monitor the field of view of the camera (or part of the field of view) to determine that an object entered the (part of) the field of view that monitors products, shelves and/or displays and occludes at least part of them. Additionally, the images may be analyzed to determine a type of the occluding object.

It is contemplated that to identify occlusions and/or blockages of the second type (that prevent customers from seeing or accessing products, shelves, and/or displays) the system may use any of the following methods or other methods. By way of example, the disclosed system may monitor the images to estimate position and/or size of an object, and use a rule to determine if the object is an occluding object based on the estimated position and/or size. For example, the rule may be manually programmed. Additionally or alternatively, the disclosed system may monitor the images to estimate the size of an object and the relative position of the object with respect to a product, shelf and/or display. The disclosed system may further calculate an occluded area based on the estimated size and the relative position, and may determine whether the occluded area comprises an area designed for a customer to pass through. As another example, the disclosed system may monitor the images to estimate the position and/or size of an object, estimate position and/or height of a customer depicted in the image, and determines whether the object is positioned between the customer (body part of the customer, e.g., head, eyes, hands, body, etc.) and a product, shelf and/or display. By way of yet another example, the disclosed system may analyze the movement pattern of the customers to identify irregular motion due to an object (for example, irregular walking trajectory, irregular grabbing movement, etc.), and identify an object as an occluding object based on the identified irregular motion.

It is further contemplated that to identify blockages of the third type (that prevent robots from traveling within the store) the system may use any of the following methods or other methods as well. By way of example, the disclosed system may monitor the images to determine a present of an object in a predefined area, monitor the images to determine that at least a selected amount of a passage is blocked, and/or monitor the images to determine that the open area for movement is below a selected threshold.

In some embodiments, image processing unit 130 may include a machine learning module that may be trained using supervised models. Supervised models are a type of machine learning that provides a machine learning module with training data, which pairs input data with desired output data. The training data may provide a knowledge basis for future judgment. The machine learning module may be configured to receive sets of training data, which comprises data with an "object name" tag and data with tag "no object". For example, the training data comprises images of boxes with "box" tags and other images with tag "no object". The machine learning module may learn to identify "box" by applying a learning algorithm to the set of training data. The machine learning module may be configured to receive sets of test data, which are different from the training data and may have no tag. The machine learning module may identify the test data that contains the object. For example, receiving sets of test images, the machine learning module may identify the images with a box in them, and tag them as "box." This may allow the machine learning developers to better understand the performance of the training, and thus make some adjustments accordingly.

In additional or alternative embodiments, the machine learning module may be trained using unsupervised models. Unsupervised models are a type of machine learning using untampered data which are not labelled or selected. Applying algorithms, the machine learning module identifies commonalities in the data. Based on the presence and the absence of the commonalities, the machine learning module may categorize future received data. For example, the machine learning module may identify commonalities of a ladder. When a future received image has the commonalities, the machine learning module may determine that the image contains a ladder. Image processing unit 130 may store the commonalities associated to an object in database 140.

Consistent with the present disclosure, image processing unit 130 may recognize the occluding objects in the image, based on the one or more identified characteristic. For example, when image processing unit 130 determined that an image has some characteristics of "ladder," such as, "rungs", "side rails", "foot", etc., image processing unit 130 may recognize "ladder" in the image.

Consistent with the present disclosure, the at least one processor may be configured to analyze the plurality of images to determine an indicator of a first level of urgency for resolving the first occlusion event. The term "level of urgency for resolving the first occlusion event" refers to any indication, numeric or otherwise, of a level (e.g., within a predetermined range) indicative of an urgency to resolve the occlusion event, for example by removing the occluding object that causes the occlusion event. For example, the level of urgency may have a value between 1 and 10. Image processing unit 130 may store the determined level of urgency in database 140. A level of urgency may be used, for example, to determine whether to send the users a notification for resolving the first occlusion event. Image processing unit 130 may comprise an algorithm to determine a level of urgency, at least based on the detected occluding object. For example, when the occluding object in the one or more images is identified as "human," image processing unit 130 may assign 2 points to the level of urgency for resolving the occlusion event. When the occluding object in the one or more images is identified as "ladder," image processing unit 130 may assign 5 points to the level of urgency for resolving the occlusion event, for example due to the danger might be caused by the ladder. In some examples, different types of occluding objects may be assigned different point values. While the present disclosure provides examples of occluding objects, it should be noted that aspects of the disclosure in their broadest sense, are not limited to the disclosed examples.

In addition, when the one or more images contain one or more shelves, image processing unit 130 may analyze the one or more images to identify the shelves in the image, as described above. Based on the identification of the shelves, image processing unit 130 may determine the level of urgency for resolving the occlusion event. For example, when the shelf is identified to be for high profit margin (e.g., drugs, dairy products, etc.), image processing unit 130 may determine the level of urgency to be 10. In another example, when the shelf is identified to be of fast turnover products, the level of urgency may be determined to be 8.

Consistent with the present disclosure, the at least one processor may be configured to cause issuance of a user-notification associated with the first occlusion event, wherein the user-notification is issued within a first period of time from when the first occlusion event was detected. Image processing unit 130 may compare the determined first level of urgency for resolving the first occlusion event to a selected threshold (such as a pre-determined threshold, a threshold determined according to other pending tasks, and so forth). For example, once the first level of urgency is determined to be above the selected threshold, server 135 may cause an issuance of a user-notification on an output device, for example using I/O system 210 and peripherals interface 208. Output device (e.g., a display screen, a speaker, etc.) may receive the user-notification and display the user-notification to a user. The user-notification may include text message, audio recording, image, map, indication of the occluding object (such as an image depicting the occluding object, type of the occluding object, etc.), indication of the occlusion event location (such as image depicting the occlusion event location, map identifying the occlusion event location, etc.), indication of tools required to resolve the occlusion event, and/or the indicator of the level of urgency, etc.

Consistent with the present disclosure, server 135 may be configured to determine a first period of time starting from when the first occlusion event was detected. In some aspects, server 135 may determine a first period of time based on the level of urgency. For example, the higher the level of urgency is, the shorter the first period of time may be. In some aspects, server 135 may determine a first period of time based on the identified occluding object. For example, when "ladder" is identified to be the occluding object, server 135 may determine a first period of time to be shorter than for some other occluding objects. Image processing unit 130 may also include a timer configured to measure a specific time interval, that may be, the determined period of time. The timer may be implemented in software language, a hardware timer, and so forth. The timer may be configured to receive an indication first period of time from processing device 202. The timer may be configured to count down from the time when the first occlusion event was first detected.

Consistent with the present disclosure, the at least one processor may be configured to detect in the one or more images a second occlusion event, wherein the second occlusion event is associated with a second occluding object in the retail store. As described above, image processing unit 130 may detect a second occlusion event in the one or more images, based on image analysis, for example in similar manners to the detection of the first occlusion event as described above.

Consistent with the present disclosure, the at least one processor may be configured to analyze the plurality of images to determine an indicator of a second level of urgency for resolving the second occlusion event. As described above, image processing unit 130 may comprise an algorithm to determine a second level of urgency, for example, in similar manners to the detection of the first occlusion event as described above. Image processing unit 130 may store the determined level of urgency in database 140. A level of urgency may be used, for example, to determine a time duration before sending a notification for resolving the second occlusion event to the user. A practical problem in the system described above is that products shelves and/or displays are repeatedly occluded or blocked temporary. To avoid an abundance of unnecessary notifications due to temporary occlusions and/or blockages, the system may withhold notifications due to temporary occlusions and/or blockages. In order to avoid false or unnecessary alerts, the system may withhold alerts due to temporary occlusions. For example, the system may withhold alerts based on the type of occluding object, based on the type of occlusion (occlusion to customer, camera, etc.), based on an amount of the occlusion, due to occlusions for short time periods, due to occlusions which are manned (that is, the person placing the occluding object is still in the vicinity), and so forth. Optionally, the parameters may depend on the type of product on the shelf, the location of the shelf, etc.

Consistent with the present disclosure the received images may be analyzed to identify a store shelf occlusion event, and/or to determine whether the store shelf occlusion event is temporary. Upon a determination that the store shelf occlusion event is temporary, notification to a user regarding the store shelf occlusion may be withheld. Upon a determination that the store shelf occlusion event is not temporary, notification to a user regarding the store shelf occlusion may be provided. By way of example, the notification may include information related to the store shelf, information related to a location associated with the occlusion event, information related to a type of the occlusion event, information related to an occluding object associated with the occlusion event, visual depiction of the occlusion event, a timer showing the time from the first detection of the occlusion event, and so forth.

As another example, the determination whether the store shelf occlusion event is temporary may be based on time duration associated with the occlusion event (for example, determining that the event is not temporary when the occlusion is present for at least a selected time duration), on the presence of a person associated with the occlusion event (for example, determining that the occlusion event is temporary when the person that placed the object causing the occlusion is in the vicinity of the occluding object), on a motion of an occluding object associated with the occlusion event (for example, determining that the event is temporary when the object is moving), on a location of an occluding object associated with the occlusion event (for example, in the determination process, using one threshold for one location and a second threshold for a second location), on a type of an occluding object associated with the occlusion event (for example, ignoring occlusions caused by some types of objects, and/or, in the determination process, using one threshold for one type of object and a second threshold for a second type of object), on a type associated with the store shelf (for example, in the determination process, using one threshold for one store shelf and a second threshold for a second store shelf, for example, based on the impotency and/or value of the store shelf), etc. By way of example, a temporarily occluding object may include a person (customer, employee, etc.) moving through the store and/or a cart positioned temporarily in the store. As another example, a temporarily occluding object may include an object positioned near the person that positioned it (which might indicate that the person may still move the object), for example where the person is still in the field of view or a selected part of the field of view of the camera, where the distance (in pixels or in the physical world) between the person and the object is less than a selected threshold, etc.

Consistent with the present disclosure, when the second urgency level is lower than the first urgency level, the at least one processor may be configured to withhold issuance of a user-notification associated with the second occlusion event within a time duration equal to the first period of time. In some examples, delaying the user-notification associated with the second occlusion event may allow the second occlusion event (which may be less urgent than the first occlusion event) to be resolved naturally, without an initiated intervention. Image processing unit 130 may be configured to compare and/or rank the first and second levels of urgency for resolving the occlusion events. When the second level of urgency is determined to be lower than the first level of urgency, image processing unit 130 may withhold issuance of a user-notification associated with the second occlusion event. As described above, image processing unit 130 may also include a timer configured to measure a specific time interval. Image processing unit 130 may withhold the issuance of the user-notification associated with the second occlusion event for a time duration equal to or longer than the first period of time, for example by utilizing the timer. It is also contemplated that a temporarily occlusion event may be detected based on an occlusion and/or blockage time period shorter than a selected threshold. Such thresholds may be selected based on the occluding and/or blocking object type, type of occluded product, occluded product category, occluded brand, occluded shelf, height of the occluded shelf, occluded display, occluded aisle, location within the store, the store, the retail chain, and so forth. For example, the first identified occluding object is a "ladder," and the second identified occluding object is a "human." Image processing unit 130 may determine that the second occlusion event to have a lower level of urgency than the first occlusion event, so image processing unit 130 may withhold the issuance of the user-notification associated with the second occlusion event until the user-notification associated with the first occlusion event is sent to the output device. This may help the users to prioritize which occlusion event should be resolved first. In some embodiments, user-notification associated with some second occlusion events (such as occlusion events where the identified occluding object is a "human") may be permanently forgone.

Consistent with the present disclosure, the at least one processor may be configured to cause an issuance of a user-notification associated with the second occlusion event within a second period of time from when the occlusion event was detected, wherein the second period of time is longer than the first period of time when the second level of urgency is lower than the first level of urgency. The at least one processor may issue alerts in response to occlusion (to customer, to camera, etc.) of retail store shelves. For example, as described above, once the second occlusion event is detected, image processing unit 130 may cause an issuance of a user-notification on an output device, for example using I/O system 210 and peripherals interface 208, and the output device (e.g., a display screen, a speaker, etc.) may receive the user-notification and display the user-notification to a user. The user-notification may include text message, audio recording, image, map, indication of the correct location, indication of the occlusion event location, indication of the occluding object, indication of the occluded object, and/or the indicator of the level of urgency, etc.

Consistent with the present disclosure, image processing unit 130 may be configured to determine a second period of time starting from when the second occlusion event was detected. The second period of time may be determined based on the second level of urgency. For example, when the second level of urgency is lower than the first level of urgency, image processing unit 130 may determine the second period of time to be longer than the first period of time. In a case where the first level of urgency is determined to be 8 and the second level of urgency is determined to be 2, and image processing unit 130 has determined the first period of time to be 30 seconds, image processing unit 130 may determine the second period of time to be 10 minutes.

Consistent with the present disclosure, the user-notification may be part of a product-related task assigned to a store employee and may include at least one of: information about a type of an occlusion event, information about an identify of an occluding object, information about an identify of an occluded product, information about a location associated with an occlusion event, and a visual depiction of the occlusion event. After the identification of an occlusion and/or a blockage, the system may create a task for removing the occluding and/or blocking objects, assign the task to an employee (for example, as described below in relation to FIGS. 33-35), guide the employee in the performance of the task (for example, navigating the employee to the occluding object, marking the occluding object in augmented reality (AR), guiding the employee using AR, etc.), and monitor the performance of the task. For example, shown in FIG. 11D, GUI 1130 may include a first display area 1132 for showing a list of notifications or text messages indicating several in-store execution events that require attention. The execution events may include one or more task to resolve an occlusion event. The notifications may include text messages and a link to an image (or the image itself). The image may depict the occlusion event. The notifications may also include information about the location of the occlusion event. For example, the notification may include text message, such as, "Please resolve the occlusion event at second aisle, soft drink section, 3rd floor." The notifications may also include information about a store shelf that is obscured. For example, the notification may include a link to FIG. 27 or 28 or simply FIG. 27 or 28 themselves, that depict occlusion events. Additionally or alternatively, the notification may include a text message that describes the occlusion event and/or the occluding object, such as "a ladder is blocking the view of camera number 23," "the shelf in the cleaning product section is blocked," "an employee is blocking the view of the camera on the 5th aisle," "a ladder is occluding the camera on aisle 14," or the like.

In another example, shown in FIG. 11D, GUI 1140 may include a first display area 1142 for showing a real-time display of a video stream captured by output device 145C with real-time augmented markings indicting a status of planogram compliance for each product (e.g., correct place, misplaced, not in planogram, and empty). GUI 1140 may also include a second display area 1144 for showing a summary of the planogram compliance for all the products identified in the video stream captured by output device 145C. Consistent with the present disclosure, server 135 may generate within minutes actionable tasks to improve store execution (for example, in less than a second, less than 10 seconds, less than a minute, less than 10 minutes, more than 10 minutes, and so forth). These tasks may help employees of retail store 105 to quickly address situations that can negatively impact revenue and customer experience in the retail store 105. Such tasks may include resolving the occlusion event. GUI 1140 may also display the user-notifications as described above. It is also contemplated that the disclosed systems and methods may determine that the occlusion and/or blockage was moved (for example, by a customer, by another employee, etc.) without an intervention of the employee, and cancel the task or update the task accordingly (for example, in the case the customer repositioned the occluding object so that it occlude another location in the store).

Consistent with the present disclosure, the at least one processor may be configured to detect in the one or more images the second occlusion event at a time within the first period of time from when the first occlusion event was detected. For example, when the first period of time is determined to be 30 seconds, image processing unit 130 may detect a second occlusion event in the 30 seconds after the first occlusion event was detected. This may help better allocate the resources, and help focus on the area that contains greater level of urgency and shorter period of time before causing user-notification.

Consistent with the present disclosure, the indicator of the first level of urgency for resolving the first occlusion event may be associated with an occlusion type of the first occlusion event. Occlusion type may describe the cause of the occlusion event and the seriousness of the occlusion. Three exemplary occlusion types may be as follows: First, "human caused occlusion event" type describes occlusion events that are resulted from one or more persons (e.g., a customer, an employee, etc.) Image processing unit 130 may be configured to distinguish the person in the one or more images. For example, based on image analysis, image processing unit 130 may recognize the person is an employee by identifying at least one "employee characteristic," such as, wearing a uniform, and/or wearing employee identification. Image processing unit 130 may further categorize the occlusion events into "customer caused occlusion event" and "employee caused occlusion event." As illustrated, for example, in FIG. 27, employee 2703 may cause an occlusion event, and thus, will be categorized as "human caused occlusion." Second, "object caused occlusion event" type describes occlusion events that are resulted from one or more occluding objects. As illustrated, for example, in FIG. 28, ladder 2805 and box 2803 may cause the occlusion event, and thus, will be categorized as "object caused occlusion." Third, "robot caused occlusion event" type describes occlusion events that are resulted from one or more robots (e.g., cleaning robot, product-sorting robot, and/or autonomous vehicle, etc.) When an occlusion event is detected and the occluding object is determined to be an employee, image processing unit 130 may determine the level of urgency for resolving the human caused occlusion event to be 1, which may be the lowest. In another example, when a ladder is determining to be the occluding object, the occlusion event is categorized as "object caused occlusion event" type, and image processing unit 130 may determine the level of urgency for resolving the occlusion event to be 10. In some examples, each occlusion event type may have a pre-determined level of urgency for resolving it. The pre-determined level of urgency may be stored in database 140.

Consistent with the present disclosure, when the occlusion type of the first occlusion event is a customer occlusion event, the first period of time may be shorter than when the occlusion type of the first occlusion event is an object occlusion event. For example, when a customer is detected and determined to be the occluding object, image processing unit 130 may determine the first period of time to be 5 minutes, at least because it may be more urgent to resolve such occlusion. In some aspects, the first period of time may be a random value from 0-10 minutes. In another example, when a ladder is detected and determined to be the occluding object, and because a ladder falls in "object caused occlusion event" type, image processing unit 130 may determine the first period of time to be 15 minutes. In some aspects, the first period of time may be a random value from 10-60 minutes.

Consistent with the present disclosure, when the occlusion type of the first occlusion event is a robot occlusion event, the first period of time may be longer than when the occlusion type of the first occlusion event is an object occlusion event. For example, when a robot is detected and determined to be the occluding object, and because a robot falls in "robot caused occlusion event" type, image processing unit 130 may determine the first period of time to be 120 minutes. In some aspects, the first period of time may be a random value from 61-180 minutes. Further, as described above, the period of time may be longer for "robot caused occlusion event" type than for "object caused occlusion event," at least because robots may have more predictable behaviors than other inanimate objects, and/or because objects may cause danger to the customers.

Consistent with the present disclosure, when the first occlusion event and the second occlusion event are associated with a same occlusion type, the at least one processor may be configured to determine the indicator of a second level of urgency for resolving the second occlusion event based on information determined about the second occluding object. For example, both first and second occlusion events may be determined to be associated with "human caused occlusion event" type. Image processing unit 130 may further categorize the same type of occlusion events into "customer caused occlusion event" and "employee caused occlusion event." For example, based on image analysis, image processing unit 130 may recognize the person is an employee as described above. Image processing unit 130 may further categorize the occlusion events into "customer caused occlusion event" and "employee caused occlusion event." In another example, image processing unit 130 may recognize different occluding objects (e.g., a box, a ladder, a cart, a display stand, etc.) using object recognition methods described above. Image processing unit 130 may further categorize "object caused occlusion event" type into "ladder caused occlusion event," "cart caused occlusion event," etc., based on the occluding objects. Each occlusion event associated with an occluding object may have different level of urgency for resolving the occlusion event. For example, a ladder may have a higher level of urgency than a box. Further, a customer may have a higher level of urgency than an employee. While the present disclosure provides examples of techniques and analysis for determining the occluding object and the level of urgency, it should be noted that aspects of the disclosure in their broadest sense, are not limited to the disclosed examples.

Figure 28:
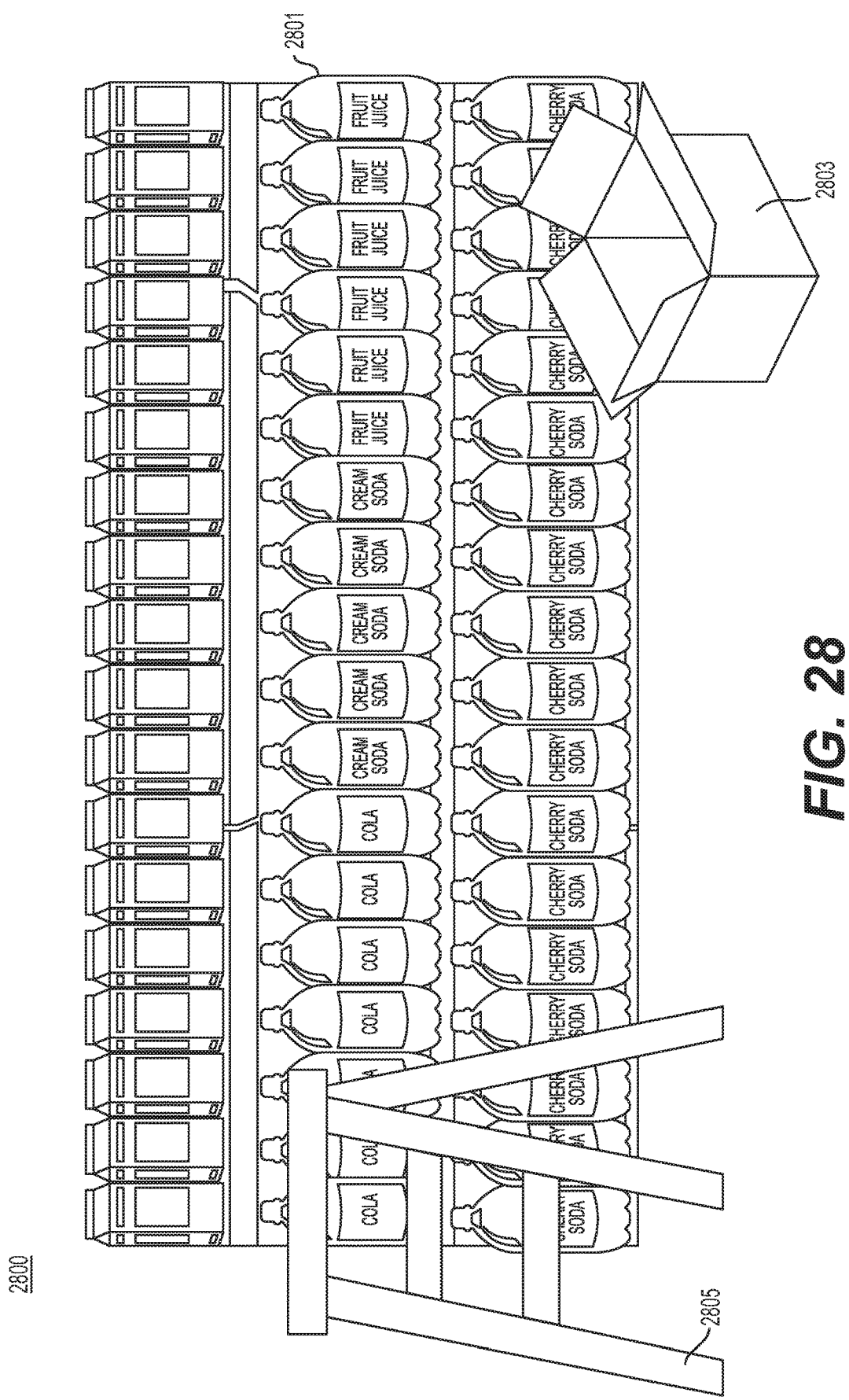
FIG. 28 is another exemplary image received by the system, consistent with the present disclosure.

Consistent with the present disclosure, the at least one processor may be further configured to determine the indicator of the first level of urgency for resolving the first occlusion event based on a type of the first occluding object and to determine the indicator of the second level of urgency for resolving the second occlusion event based on a type of the second occluding object. For example, as shown in FIG. 28, ladder 2805 may be determined to be the first occluding object and box 2803 may be determined to be the second occluding object. Image processing unit 130 may determine different levels of urgency associated with different occluding objects. For example, the level of urgency associated with ladder 2805 may be determined to be 8, and the level of urgency associated with box 2803 may be determined to be 2.

Consistent with the present disclosure, when the first and second occluding objects are persons, and when the at least one processor may be further configured to: determine the indicator of the first level of urgency for resolving the first occlusion event based on a determined identity of the first occluding object, and determine the indicator of the second level of urgency for resolving the second occlusion event based on a determined identity of the second occluding object. For example, a customer may be determined to be the first occluding object and an employee may be determined to be the second occluding object. Based on image analysis, image processing unit 130 may recognize the person is an employee as described above. Image processing unit 130 may determine different levels of urgency associated with different occluding objects. For example, an employee may be an occluding object while re-stocking shelves or determining and/or verifying the prices of one or more products on the store shelves. In contrast a customer may be an occluding object as the customer browses the products on the store shelves. Image processing unit 130 may determine different levels of urgency associated with the occluding object depending on whether the occluding object is a customer or a store employee. For example, the level of urgency associated with the customer may be determined to be 4, and the level of urgency associated with the employee may be determined to be 2.

Consistent with the present disclosure, the at least one processor may be further configured to: determine the indicator of the first level of urgency for resolving the first occlusion event based on detected motion of the first occluding object, and determine the indicator of the second level of urgency for resolving the second occlusion event based on detected motion of the second occluding object. For example, in FIG. 25, image processing unit may recognize a moving cart and a customer in two or more images 2500. As described above, to determine whether the product is in a moving cart, image processing unit 130 may use any suitable image analysis technique.

In another example, where the customer is not moving, and the cart is moving towards the right. The customer may be determined to be the first occluding object and the cart may be determined to be the second occluding object. The level of urgency associated with customer may be determined to be 8, and the level of urgency associated with the moving cart may be determined to be 2.

Consistent with the present disclosure, the at least one processor may be further configured to: determine the indicator of the first level of urgency for resolving the first occlusion event based on a determined location of the first occluding object, and determine the indicator of the second level of urgency for resolving the second occlusion event based on a determined location of the second occluding object. For example, image processing unit 130 may determine the location depicted in the one or more images as described above. Image processing unit 130 may determine the indicator of level of urgency based on the determined location of the occlusion events. Thus, for example, a level of urgency for an occlusion event near a cashier may be higher than a level of urgency for an occlusion event near a storage location, because, for example, an occlusion near the cashier may impede a smooth flow of traffic through the store.

Consistent with the present disclosure, wherein the at least one processor may be further configured to: determine the indicator of the first level of urgency for resolving the first occlusion event based on a determined lack of people in proximity to the first occluding object, and determine the indicator of the second level of urgency for resolving the second occlusion event based on an identification of people in proximity of the second occluding object. It is contemplated that occlusion events that occur without the presence of a person may be more detrimental than those that occur in the presence of a person. For example, when image processing unit 130 detects a cart with no person near it, image processing unit 130 may determine the level of urgency associated with cart to be high, to notify an employee to resolve the occlusion as soon as possible. By way of another example, when image processing unit 130 detects a cart with a person near it, image processing unit 130 may determine the level associated with the cart to be low or even 0, that may not be identified as an occlusion event. This is because, it may be expected that a person moving through the store may be accompanied by a cart in which the person may place any items and/or products for purchase. Thus, a cart with a person near it may cause a temporary occlusion until the person moves the cart and therefore may not be detrimental to the detection of objects in the store.

Consistent with the present disclosure, the at least one processor may be further configured to determine, after the time duration, that the second occluding object continues to cause the second occlusion event, and, in response, cause issuance of a user-notification associated with the second occlusion event. As discussed above, the disclosed systems and methods may withhold issuance of a user notification for a period of time depending on the urgency level. However, upon expiry of the period of time, if the occlusion event still remains and/or persists, the disclosed systems and methods may issue the user notification. By way of another example, when a user may not have performed the task of resolving an occlusion event, image processing unit 130 may be configured to cause another issuance of user-notification. This may alert the user and remind the user to perform the task.

Consistent with the present disclosure, the at least one processor may be further configured to detect in the plurality of images a change associated with the second occlusion event; determine the indicator of the second level of urgency for resolving the second occlusion event based on the change associated with the second occlusion event; and cause issuance of a user-notification associated with the second occlusion within the time duration equal to the first period of time. The disclosed systems and methods may detect a change associated with an occlusion event. For example, an occluded portion of the image may have increased and/or changed in shape or size. The disclosed systems and methods may issue a user-notification based on detection of the change in the occlusion event. For example, the occluding object may be a box of apples that are piled up neatly. If the piled apples fall on the ground, image processing unit 130 may detect that one or more apples is not at its original position, using image analysis methods described above. Thus, image processing unit 130 may determine that a change in the occlusion event happened. Based on the detected change, image processing unit 130 may determine the level of urgency associated to the box of apples to be high. Such a change may trigger image processing unit 130 to issue a user-notification to inform the users, regarding a change in the occlusion event.

Consistent with the present disclosure, the at least one processor may be further configured to determine a location of the first occlusion event and to direct an employee to the determined location. Image processing unit 130 may determine a location of an occlusion event depicted in the one or more images by recognizing the location depicted in the one or more images (for example, next to the detected occlusion event) as described above. After the location is determined, image processing unit 130 may send the location information to a user, for example using I/O system 210 and peripherals interface 208. An output device (e.g., a display screen, a speaker, AR system, etc.) may receive the information and display to the user. Such location information may be an address (e.g., second aisle, soft drink section, 3rd floor) and/or a map that shows the location.

Figure 27:
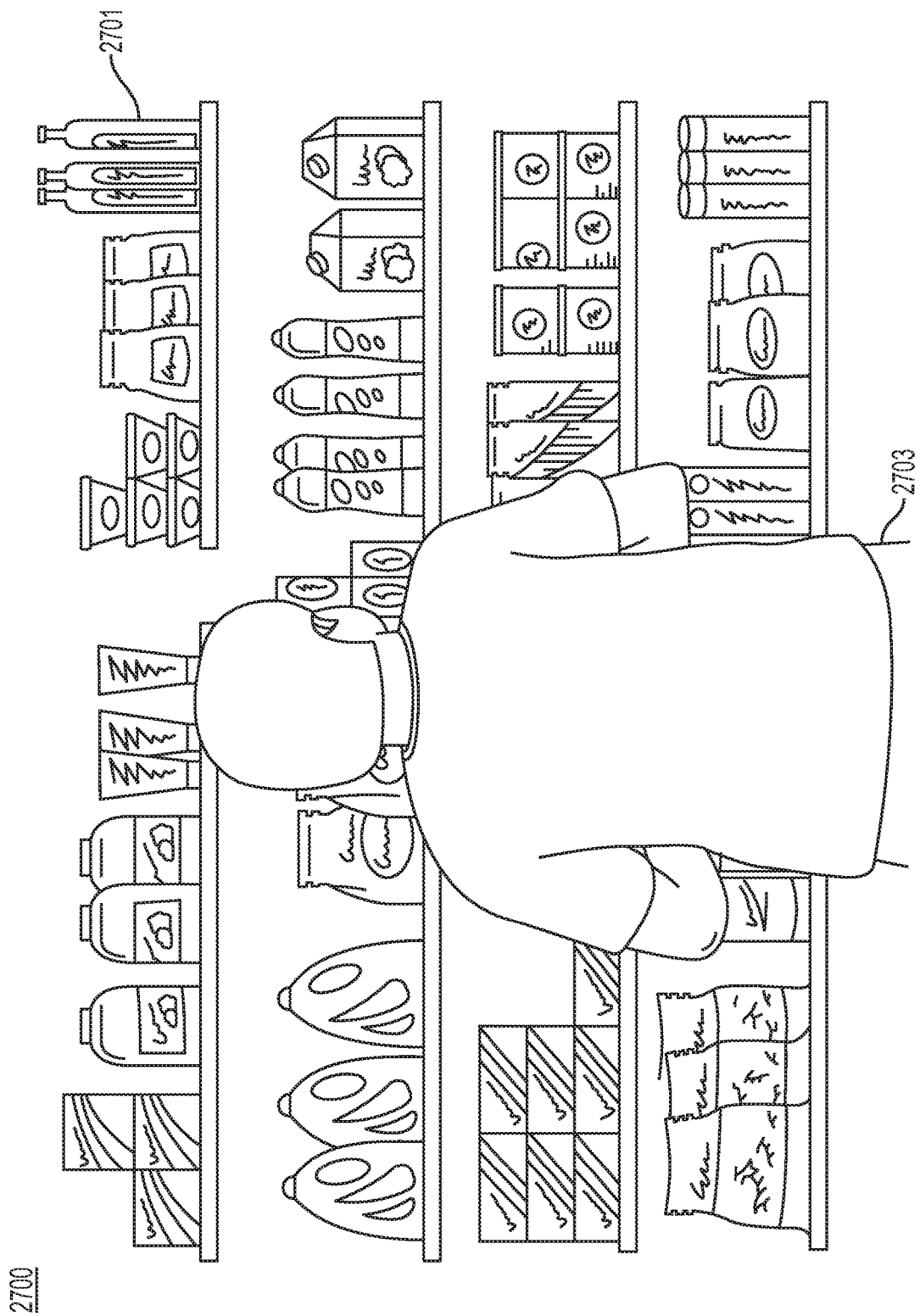
FIG. 27 is an exemplary image received by the system, consistent with the present disclosure.

FIG. 27 illustrates an exemplary image received by the system, consistent with the present disclosure. The image may depict an occlusion event. For example, in image 2700 an occlusion event may be caused by person 2703. After receiving the image, server 135 may be configured to detect an occlusion event. Based on image analysis described above, server 135 may detect the occluding object (i.e., customer 2703) that obscures at least one product 2701. Further, as described above, server 135 may be configured to determine the person to be a customer based on at least one characteristic.

FIG. 28 is another exemplary image received by the system, consistent with the present disclosure. Image 2800 may be one of many images that together depict, for example, box 2803 and ladder 2805 that may block the field of view of the capturing device that took the images. Further, products 2801 may be blocked entirely or partially by box 2803 and/or ladder 2805. Based on image analysis, server 135 may be configured to recognize box 2803 and/or ladder 2805. Additionally or alternatively, by comparing images captured in sequence, server 135 may determine that both box 2803 and ladder 2805 are not moving for a certain period of time.

Figure 29:
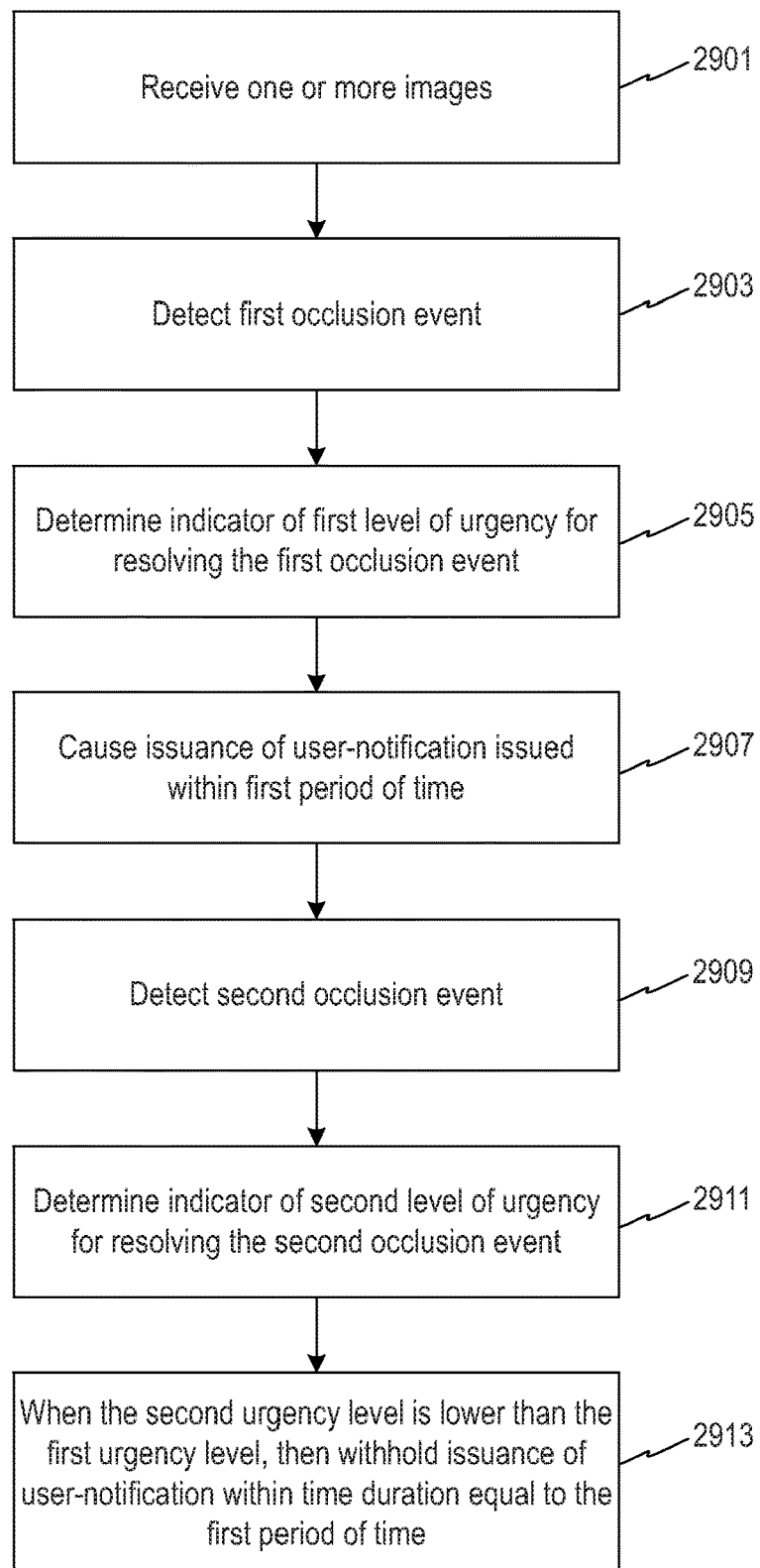
FIG. 29 is a flow chart of an exemplary method for processing images captured in a retail store and automatically identifying occlusion events, consistent with the present disclosure.

FIG. 29 is a flow chart, illustrating an exemplary method 2900 for processing images to automatically identify occlusions in a field of view of one or more cameras in retail stores, in accordance with the present disclosure. The order and arrangement of steps in method 2900 is provided for purposes of illustration. As will be appreciated from this disclosure, modifications may be made to process 2900 by, for example, adding, combining, removing, and/or rearranging one or more steps of process 2900. Consistent with the present disclosure, a computer program product for processing images captured in retail stores embodied in a non-transitory computer-readable medium and executable by at least one processor may be provided. The computer program product may include instructions for causing the at least one processor to execute a method (e.g. process 2900) for processing images to automatically identify occlusions in a field of view of one or more cameras in retail stores.

In step 2901, consistent with the present disclosure, the method may include receiving one or more images captured by one or more image sensors from an environment of a retail store and depicting a plurality of products displayed on at least one store shelf. For example, server 135 may be configured to receive one or more images depicting an environment in a retail store, as described above.

In step 2903, consistent with the present disclosure, the method may include detecting in the one or more images a first occlusion event, wherein the first occlusion event is associated with a first occluding object in the retail store. For example, server 135 may detect an occlusion event and determine and/or identify the object causing the occlusion as described above.

In step 2905, consistent with the present disclosure, the method may include analyzing the plurality of images to determine an indicator of a first level of urgency for resolving the first occlusion event. For example, server 135 may determine the level of urgency and/or the indicator of the level of urgency as described above.

In step 2907, consistent with the present disclosure, the method may include causing issuance of a user-notification associated with the first occlusion event, wherein the user-notification is issued within a first period of time from when the first occlusion event was detected. As described above, once the first level of urgency is determined not to be above a pre-determined threshold, sever 135 may cause an issuance of a user-notification as described above. Consistent with the present disclosure, server 135 may be configured to determine a first period of time starting from when the first occlusion event was detected, as described above. Server 135 may also include a timer configured to measure a specific time interval, that may be, the determined period of time.

In step 2909, consistent with the present disclosure, the method may include detecting in the one or more images a second occlusion event, wherein the second occlusion event is associated with a second occluding object in the retail store. As described above, server 135 may detect a second occlusion event in the one or more images, based on image analysis, for example in similar manners to the detection of the first occlusion event as described above.

In step 2911, consistent with the present disclosure, the method may include analyzing the plurality of images to determine an indicator of a second level of urgency for resolving the second occlusion event. For example, server 135 may determine the second level of urgency and/or the indicator of the second level of urgency as described above.

Consistent with the present disclosure, the at least one processor may be configured to determine an indicator of a second level of urgency for resolving the second occlusion event. As described above, server 135 may comprise an algorithm to determine a second level of urgency, based on the identified characteristics of the second occlusion event. Further, server 135 may store the determined level of urgency in database 140. A level of urgency may be used, for example, to determine a time duration before sending a notification for resolving the occlusion event to the user.

In step 2913, consistent with the present disclosure, when the second urgency level is lower than the first urgency level, the method may include withholding issuance of a user-notification associated with the second occlusion event within a time duration equal to the first period of time. Consistent with the present disclosure, server 135 may be configured to compare and/or rank the first and second level of urgency for resolving the occlusion events. When the second level of urgency is determined to be lower than the first level of urgency, server 135 may withhold issuance of a user-notification associated with the second occlusion event. As described above, image processing unit 130 may also include a timer configured to measure a specific time interval. Server 135 may withhold the issuance of the user-notification associated with the second occlusion event for a time duration equal to the first period of time, by utilizing the timer. For example, when the first identified occluding object is a "ladder," and the second identified occluding object is a "human," server 135 may determine that the second occlusion event to have a lower level of urgency than the first occlusion event. For example, the level of urgency for resolving the first occlusion event may be 10 and the level of urgency for resolving the second occlusion event may be 2. Further, the first period of time may be determined to be 30 seconds, that is, the user-notification associated with the first occluding object will be send within 30 seconds starting from when the first occlusion event is detected. Because the level of urgency for resolving the second occlusion event has a lower value, server 135 may withhold issuance of a user-notification associated with the second occlusion event within a time duration equal to the first period of time. In some examples, server 135 may withhold at least another 30 seconds after the second occlusion event is detected. It is contemplated that when the second level of urgency is determined to be higher than the first level of urgency, server 135 may not withhold issuance of a user-notification associated with the second occlusion event and instead may issue the user-notification immediately.

Consistent with the present disclosure, the method may also include determining the indicators of the first and second levels of urgency based on at least one of: determined types of one or more of the first and second occluding objects, determined identities of one or more of the first and second occluding objects, detected motion associated with one or more of the first and second occluding objects, determined locations of one or more of the first and second occluding objects, or identification of people in proximity to one or more of the first and second occluding objects. For example, image processing unit 130 may determine a level of urgency as described above.

Consistent with the present disclosure, the method may also include determining, after the time duration, that the second occluding object continues to cause the second occlusion event, and, in response, causing issuance of a user-notification associated with the second occlusion event. For example, when the employee did not perform the task of resolving the occlusion event, server 135 may be configured to cause another issuance of user-notification. This may alert the user and remind the user to perform the task. While the present disclosure provides examples of the situations, it should be noted that aspects of the disclosure in their broadest sense, are not limited to the disclosed examples.

In some embodiments, captured images may be analyzed to determine whether at least one additional product of a selected product type may be inserted to a store shelf, and a notification may be provided to a user based on the determination. In some examples, the determination may be based on whether a rearrangement of the plurality of products may enable the insertion of the at least one additional product on the store shelf. In some cases, the notification provided to the user may comprise a visualization of the rearrangement.

In some examples, the captured images may be analyzed to identify a plurality of spaces in between the plurality of products on the store shelves and/or on one or two sides of the plurality of products. The images may be analyzed to measure/determine the lengths of the spaces (or any other indicator of the sizes of available openings on a shelf). The determination may be based on lengths of the spaces and a length of the product (for example, as measured by analyzing the image or by accessing a catalog of products together with their measurements). The spaces in between the plurality of products on the store shelves may include horizontal spaces between products in a shelf and/or vertical spaces between shelves. For example, the sum of lengths of the spaces may be calculated and compared with the length of the product, and if the length of a product is smaller by at least a selected length (which may be zero, constant, depend on the number of products, depend on the number of spaces, etc.) from the sum of lengths, it may be determined that an additional product may be inserted. In another example, the sum of lengths of the spaces may be calculated after applying a function on the lengths of the spaces (such as subtracting from at least some of the lengths of the spaces a selected length, choosing the lower value between a selected minimal length and a function of the measured length, and so forth). Additionally, the system may determine that an additional shelf may be included when the sum of lengths of the vertical spaces between a plurality of shelves is higher than a threshold.

Consistent with the present disclosure, server 115 may access a predetermined planogram. The predetermined planogram may be associated with contractual obligations and/or other preferences related to the retailer methodology for placement of products on the store shelves. Moreover, server 115 may use the predetermined planogram and the calculated sum of lengths of the spaces to determine whether a rearrangement of the plurality of products may enable the insertion of the at least one additional product on the store shelf.

Consistent with the present disclosure, a rearrangement event may be determined. A rearrangement event may exist when one or more product arrangement conditions on at least one shelf are determined to be present, where altering at least one of the one or more of the product arrangement conditions may improve service (e.g., by product rearrangement). Consistent with the present disclosure, a product-related task may be generated. The product-related task may include directions for a human or machine to rearrange, re-orient, or otherwise manipulate a product, a plurality of products, a shelf, a plurality of shelves, a shelving unit, a plurality of shelving units, or a combination thereof such that a vacant space is reduced or eliminated.

According to the present disclosure, a system for processing images captured in a retail store is disclosed. The system may include at least one processor. By way of example, FIG. 1 illustrates a system 100, which may include image processing unit 130, which in turn may include server 135. As discussed above, server 135 may include processing device 202, which may include at least one processor. System 100 may detect vacant spaces between products on a shelf in a retail environment and determine that, by rearranging the products, additional products may fit on the shelf if the vacant spaces are reduced or eliminated. System 100 may also detect vacant spaces between products and use that information to determine, for example, whether a retail store is in compliance with a planogram or other standard for displaying a product. For example, system 100 may detect two groups of products on a shelf, each product of a first group being a different size than the products of the other group, and determine that at least one additional product of one of the groups may be displayed on a shelf if the products are rearranged. Additionally or alternatively, system 100 may detect products on one or more shelves within a shelving unit and determine that by rearranging the shelves or the products or both, at least one additional shelf may be added to the shelving unit.

Vacant spaces on retail stores may be detected by any suitable image analysis technique. For example, an image of a shelf, multiple shelves, or a shelving unit may be analyzed to detect vacant spaces between products depicted in the image. Additionally or alternatively, pressure sensors placed on shelves may be used to detect vacant spaces on a shelf. It is also contemplated that other sensing modalities (e.g., light sensors or LIDAR systems) may be used to detect vacant spaces. One or more dimensions associated with a vacant space may be determined based on analysis of one or more images and/or based on input provided by pressure sensors or other types of sensors. For example, in one embodiment, edges of product packaging may be determined and associated with product bodies. Spaces between product bodies may be interpreted as vacant spaces. Widths, depths, and/or heights associated with detected vacant spaces may be determined, for example, based on a scaling analysis, which may include, for example, comparing a recognized vacant space dimension with another dimension of known, such as a known dimension associated with a particular product package or portion of a product package. Such an analysis may be performed based solely on received image data or may be based solely on other types of received information (e.g., outputs or pressure sensitive pads, light sensors, etc.). The dimensional analysis may also be accomplished based on a combination of received information.

Detected vacant spaces may be reduced by rearranging products currently displayed on a shelf, swapping a product type for a different product type of a different size or shape, by changing the orientation of a product on a shelf, by rearranging the shelves within a shelving unit, by any combination of the above, or by any other means. The present disclosure provides examples of the products which may be detected and rearranged to reduce or eliminate vacant spaces, however, it should be noted that aspects of the disclosure in their broadest sense, are not limited to the disclosed products.

Information relating to the detected vacant spaces may be provided to users. Retail stores may use detected vacant space information to optimize the layout of the products on shelves throughout the store and to manage tasks, such as stocking or arranging shelves. Suppliers of products may use the information to determine whether a retail store is complying with guidelines for displaying products, such as guidelines provided in a planogram. Market research entities may use the detected vacant space information when compiling statistics relating to retail store efficiency, compliance, aesthetics, or other metrics. Other users may have additional uses for the information relating to detected vacant spaces.

According to the present disclosure, the at least one processor may be configured to perform a method for processing images captured in a retail store. By way of example, system 100 may perform a method for processing images captured in a retail store. It is also contemplated that the method, or a portion thereof, may be performed by any component of system 100 consistent with this disclosure, including, for example, the at least one processor. The method for processing images may include determining whether the product is of a first type or a second type. The at least one processor may determine the type of the product by any means consistent with this disclosure. For example, a type of a product may be determined based on determining whether the price of the product falls within a price range associated with products of the first type or within a price range of products of the second type. Of course, a product type may also be determined based on more than two different price ranges. In another example, a type of a product may be determined by detecting identifying characteristics of the product or contextual information related to the product.

According to the present disclosure the at least one processor may be configured to receive at least one image depicting at least part of at least one store shelf having a plurality of products displayed thereon. The at least one image received may depict at least part of a shelving unit with a plurality of store shelves having a plurality of products displayed thereon. It is contemplated that the image may represent a shelf present in a retail store and may be captured by a device located within the retail store. The at least one image may be received from capturing device 125, over network 150, or in any other manner disclosed herein. The at least one image may be received by system 100 or any component thereof configured to receive an image. The image may include image data. By way of example, an exemplary image 3020 represented in FIG. 30A or image 3010, represented in FIG. 30B, may be received by system 100. As illustrated in FIG. 30A and FIG. 30B, the image received may include, for example, a single shelf with a plurality of products, as represented by image 3020, or a plurality of shelves with a plurality of products on the shelves, as represented by image 3010. It is contemplated that the image may contain any portion of a shelf or a shelving unit, and images 3010, 3020 are exemplary only. In some examples, the received image may include only a single type of products (for example, image 3001), two types of products, three types of product, more than three types of products, and so forth. While the present disclosure provides examples of the images captured in a retail store, it should be noted that aspects of the disclosure in their broadest sense, are not limited to the disclosed images.

In some cases, the at least one processor may be configured to receive a plurality of images. Each of the plurality of images may contain a representation of an area of a shelf that is distinct from the area represented in any other of the plurality of images or each of the plurality of images may contain a representation of an area that is at least partially depicted in another of the plurality of images. For example, system 100 may receive image 3001, image 3002, and image 3003, all of which depict a portion of the shelving unit represented in image 3010. In this example, system 100 may process the images 3001, 3002, 3003, to determine that they contain the same subject matter and combine them in a manner that generates image 3010 or, system 100 may process images 3001, 3002, 3003 separately without first generating image 3010. As another example, system 100 may receive image 3010 in the first instance. It is contemplated that the plurality of images need not contain the same subject matter. For example, system 100 may receive image 3020 and image 3010.

The plurality of images may be received from the same device or from different devices. The plurality of images may also be received by any means disclosed herein. For example, referring to FIG. 4C, system 100 may receive one or more images from imaging device 125A, 125B, 125C, or any combination thereof.

The plurality of products depicted in an image may include a group of first products and a group of second products. Further, the group of first products may be associated with a first product size and the group of second products may be associated with a second product size, the second product size differing from the first product size. It is also contemplated that the first group of products and the second group of products may be of a different shape. The products depicted on the shelf may be any product capable of being displayed on a shelf. By way of example, the first group of products may be any product packaged in a first kind of box, bottle, can, cap, bag, etc., and a second group of products may be any group of products packed in a different kind of box, bottle, can, cap, bag, etc. FIG. 30B represents an example wherein a first group of products and a second group of products are depicted in image 3010. In image 3010, the first group of products is represented by the dark shading and the second group of products are represented by the light shading. As can be seen in image 3010, the first group of products is of a first size, and the second group of products is of a second size. In image 3010, each product of the first group of products and each product of the second group of products are roughly of the same height, but the products of the first group of products are noticeably wider than the products of the second group of products.

In the FIG. 30A example, the first group of products is represented by dark shading and the second group of products is represented by light shading. As can be seen in image 3020, it is also possible, for example, that the products of the first group of products may be taller than the second group of products. The products of the first group of products may be different from those of the second group of products in any manner, including height, width, depth, shape, or orientation.

In accordance with this disclosure, the at least one processor may be configured to analyze the at least one image to detect the plurality of products. The plurality of products may be detected according to any means consistent with this disclosure. For example, a product may be detected by recognition in the image data of a distinctive characteristic of the product (e.g., its size, shape, color, brand, etc.) or by contextual information relating to a product (e.g., its location on a shelf, etc.). A product may be detected using object detection algorithms, using machine learning algorithms trained to detect products using training examples, using artificial neural networks configured to detect products, and so forth. Detecting products may include first detecting a background of an image and then detecting items distinct from the background of the image. By way of example, system 100 may detect products as discussed relative to step 2112 of FIG. 21.

Consistent with this disclosure, the dimensions of products may also be determined. For example, system 100 may detect the first group of products in image 3020 and further determine that the width of each product of the first group of products is W1. The same may be true for the second group of products. System 100 may determine that each product of the second group of products has a width of W2. For example, a depth image or other kind of three dimensional images of the products may be analyzed to determine the dimensions of the products (such as width, height, depth, and so forth) from the three dimensional structure of the products depicted in the image. In another example, a two dimensional image of the products may be analyzed to determine the dimensions of the products (such as width, height, depth, and so forth), for example based on known dimensions of other objects in the image (such as shelves, labels, other products, and so forth). In yet another example, the image may be analyzed to identify the type of a product depicted in the image (as described above), and known dimensions of the product may be retrieved using the identified type of product, for example from a memory, a database, an online catalog, and so forth. In yet another example, data received from sensors positioned on retail shelves (for example, from detection elements described in relation to FIGS. 8A, 8B, and 9) may be analyzed to determine the dimensions of the products (such as width, depth, and so forth). The capability to determine dimensions of products may be used to detect and/or identify products in a first instance and for grouping products into appropriate groups. For example, system 100 may detect four objects of width W1 in image 3020 and five objects of width W2 and use this information to determine that the first four objects with width W1 are products of a first group of products and that the five objects with width W2 are products of a second group or products. While the width of an object is used as an example here, it is understood that any of a width, height, depth, or other dimension may be used to detect a product and to determine to which group it belongs.

The ability to determine the dimension of a product may also be used for determining whether another product may be displayed on a shelf or whether another shelf may be included in a shelving unit. For example, system 100 may determine a width of available vacant space and, if the width of vacant space exceeds a width of at least one product from a first group or a different product from a second group, the processor may determine that the products can be rearranged to accommodate at least one additional product of either the first or second group of products.

In accordance with this disclosure, the at least one processor may be configured to analyze the at least one image to identify that at least some of the group of first products are displayed in a nonstandard orientation. A nonstandard orientation may include any orientation that does not conform to a specified planogram or other standard for display of a product. A nonstandard orientation may also include any orientation of a product that is not shared by products of the same type. For example, a supplier of a group of products may specify in a planogram that each product of that group be displayed in a particular configuration. System 100 may detect one or more products and determine whether those products are displayed in the manner provided in the planogram. System 100 may make a determination that one or more individual products of a group of products is presented in a nonstandard orientation if there is a detected deviation from a specified planogram. Additionally or alternatively, system 100 may determine that an entire group of products is displayed in a nonstandard orientation. This may happen when, for example, a retail store receives products packed in rectangular boxes and displays them, for example, in a vertical orientation rather than in a horizontal orientation when a planogram requires display in a horizontal orientation. In this instance, the entire group of products may be determined to be displayed in a nonstandard orientation. In another example, one or more images of the products may be analyzed to determine that text depicted on at least some of the products is in a nonstandard orientation (for example, when the text comprises letters depicted in a vertical orientation), and based on the determination that the text depicted on the at least some of the products is in a nonstandard orientation, determining that the at least some of the products are displayed in a nonstandard orientation. In some examples, a product may comprise two segments of text in different orientations, and the determination regarding the product orientation may be based on an orientation of the text in the first segment, while in some cases the orientation of the text in the second segment may be ignored. For example, the determination regarding the product orientation may be based on an orientation of the text in the segment comprising larger font size, while in some cases the orientation of the text in the segment comprising the smaller font size may be ignored.

As another example, a product may be displayed in a nonstandard orientation if, for example, it has fallen over or is otherwise not in the same orientation detected for other products of the same group. FIG. 30C provides an example of image 3050 depicting this type of nonstandard orientation. By way of example, system 100 may receive image 3050 and detect the first group of products represented by the dark shade and the second group of products represented by the lighter shade. System 100 may analyze image 3050 to detect product 3055 and determine that it is displayed in a nonstandard orientation. The determination that product 3055 is in a nonstandard orientation may include detecting that the height of product 3055, as displayed, is different from that of either the first or second group of products but detecting that the width of product 3055, as displayed, matches the height of the first group of products, for example, product 3052. Based on the relation of the dimensions of the products (or based on any other criteria, such as text recognition, product color recognition, detected surface area, etc.), system 100 may determine that product 3055 is of the first type but is presently displayed in a nonstandard orientation. In another example, system 100 may determine that product 3055 is of the first group of products based on a brand name, logo, or distinctive characteristic of the product and further determine that product 3055 is in a nonstandard orientation based on, for example, the orientation of the brand name, logo, or distinctive characteristic.

Detected planogram compliance may also depend upon other product orientation variations. For example, in some cases, the processor may recognize that one or more products are rotated by an angle not in compliance with a planogram, for example by analyzing one or more images of the one or more products, by analyzing data received from sensors positioned on retail shelves (for example, from detection elements described in relation to FIGS. 8A, 8B and 9), and so forth. Such rotation, for example, may cause a front face of a product label (e.g., of a canned good item, soda bottle, etc.) to face in a direction other than normal to a longitudinal direction of the shelf. In such cases, the product labels may be obscured or difficult for a consumer to read.

According to the present disclosure, the at least one processor may be configured to identify an area of the retail store displaying products from at least one product type associated with at least one of: a product category, a brand of products, and a region of the retail store. An area of a store may include an area of any size. For example, an area of a store may be a portion of a shelf, a single shelf, a shelving unit, a display, an aisle, a row of shelves, a row of shelving units, several aisles, a department within a store, an entire store, or any other portion of a retail store. Rather than defined by size or location, an area of a store may include an area associated with a product category, a brand of product, or any other factor. For example, an area of a store may comprise an aggregate area where products from a single supplier are displayed. For example, an area of a store may comprise a shelf where milk from a particular distributor is displayed, a shelf where cheese from the same distributor is displayed, and a shelf where yogurt from the same distributor is displayed. In another example, an area of a store may include the area where milk from all distributors is displayed. In another example, an area of a store may be where oranges are displayed, where orange juice is displayed, and where canned oranges are displayed. In another example, an area of a store may be any area selected by a user of a system, such as a manager of a grocery store, who desires to identify vacant space in an area of his or her choosing. Additionally or alternatively, a store map, a planogram, labels on shelves, or other identifiers may be used to determine an area of a store to be analyzed.

In some examples, the area of the retail store may be identified by analyzing one or more images of the retail store to identify in the one or more images regions corresponding to the desired area, by analyzing a store map to identify in the one or more images regions corresponding to the desired area, and so forth. For example, the area may be identified based on the products detected in images depicting a store shelf. For example, system 100 may receive images 3010 and 3020 and determine an area of a retail store associated with each of image 3010 and 3020. As an example, based on the size and shape of the products in the first group of products depicted in image 3010, system 100 may determine that the first group of products are cereal boxes. Based on this determination, system 100 may determine that image 3010 represents an area of, for example, the breakfast-foods isle of a grocery store. A similar determination may be made, for example, if system detects a logo, brand name, or other identifying feature of a product. Contextual information identified in an image may also aid in determining an area of a retail store depicted in a received image. For example, an image may receive signage or symbols indicative of an area, such as markings on shelves, products, fixtures, structures, and so forth. System may access database 140, for example, to access data indicating where products of a certain type, category, brand, etc. are located in a retail store and use that information to determine where an area represented in an image, for example, image 3020, is located within a retail store. The area identified may be an area of any scope. For example, the area may be identified as an aisle within a store, as a certain shelf within an aisle, as a certain shelving unit within an aisle, as a certain shelf within a shelving unit, or any other unit of measure.

When a plurality of images is received, the plurality of images may be used to identify the area of the store where the products are displayed. For example, if system 100 receives image 3002 and image 3003, it may determine an area associated with image 3003 by any means disclosed herein and further determine an area of the store associated with image 3002 based on the relation between image 3002 and image 3003, which contain subject matter that partially overlap. It is also contemplated that an area of a store may be identified based on contextual information captured in the image. For example, an image received by system 100 may include a representation of an aisle indicator (e.g., "aisle 7") either in the background of the image or on shelving units and other fixtures of the retail store.

The at least one processor may be configured to identify one or more vacant spaces associated with the plurality of products on the at least one store shelf. A vacant space may be identified by any means consistent with this disclosure, including by processing an image depicting a retail store shelf, by processing data received from sensors positioned on retail shelves (for example, from detection elements described in relation to FIGS. 8A, 8B and 9), or processing data relating to a retail shelf, the data obtained by any other means. The vacant spaces may include areas between individual products, areas between a first group of products and a second group of products, areas where a product or products should be displayed but there is nothing occupying the area, areas between a product or products and a shelf, area between one or more shelves, or any other space that is not occupied by an object. A vacant space may include any detected spaces not occupied by shelving, products, fixtures, or other objects commonly found in a retail environment.

The vacant spaces may be associated with a product or a group of products based on proximity to a product or any other metric indicating a relationship between a product and a vacant space. For example, vacant space 3027 of image 3020 may be associated with the second group of products or with each of the products in the second group of products or with any of the products of the second group of products. A vacant space may be associated with more than one product or group of products. For example, vacant space 3014 of image 3010 may be associated with the first group of products or with the second group of products or both based on its location being between the first group of products and the second group of products.

The identified vacant spaces associated with the plurality of products on the at least one store shelf may include at least one of: vertical spaces between first products and a frame associated with the at least one store shelf, and vertical spaces between second products and a frame associated with the at least one store shelf. By way of example, if image 3020 depicts one shelf, the vacant space may include a vertical space between a first product and the top of the shelf (vacant space 3025) or a vertical space between a second product and the top of the shelf (vacant space 3027). Of course, it is contemplated that the identified vacant spaces associated with the plurality of products on the at least one store shelf may include at least one of: horizontal spaces between adjacent first products, horizontal spaces between adjacent second products, a horizontal space between a first and a second product, a horizontal space between a first product and a frame associated with the at least one store shelf, and a horizontal space between a second product and a frame associated with the at least one store shelf. By way of example, a vacant space may include a space between two products of the same type (e.g., vacant spaces 3024, 3026), a space between a product and an edge of a shelf (e.g., vacant space 3022), a space between two products of different types, or any combination thereof.

A vacant space may be identified directly or may be identified by identifying products and other objects. For example, with reference to FIG. 30A, to determine the total vacant space on the shelf depicted in image 3020, system 100 may first determine the width 3028 of the shelf, then subtract the width W1 of each of the products in the first group of products and the width W2 of each of the products in the second group of products. In this example, the vacant space would be the total width 3028 of the shelf, minus four times the width W1 of the products of the first group, and minus five times the width W2 of the products of the second group. Additionally or alternatively, vacant spaces may be detected directly. For example, widths or sizes of vacant spaces 3022, 3024, 3026, 3025, 3027 may be identified without first identifying the total width 3028 of the shelf or any other products. Direct identification of vacant spaces may be accomplished in substantially the same manner as detecting products, as described above. It is contemplated that, for example, individual vacant spaces may be detected or that the aggregate amount of vacant space may be detected. For example, system 100 may analyze image 3020 and detect a first horizontal vacant space 3022, a second vacant space 3024, and a third vacant space 3026 or system may analyze image 3020 and detect a total vacant space comprising the sum of the first vacant space 3022, the second vacant space 3024, and the third vacant space 3026.

The detected vacant spaces may constitute horizontally oriented spaces between product, vertical spaces between products and shelving, for example, or may have any other orientation. The vacant spaces may be identified in any manner disclosed herein. The vacant space may include a detected area between a first shelf and a second shelf, between a first shelf and another object (e.g., a product on a shelf, a ceiling, another shelving unit, a retail store fixture), between a part of the shelving unit and a second part of the shelving unit (e.g., between a shelf and a support structure of the shelving unit, between a first and second shelf), or between any other object associated with the shelving unit. By way of example, referring to FIG. 30B, if image 3010 represents a single shelving unit, an identified vacant space may be identified as the space between a product and a shelf of the shelving unit (vacant spaces 3012, 3014, 3016). A vacant space associated with a shelving unit may be identified directly or indirectly. For example, to identify vacant space 3016, system 100 may first detect the height H3 of the shelf on which the products sit and then derive vacant space 3016 by subtracting the height (not shown) of the products of the second group or system 100 may detect vacant space 3016 without first detecting height H3. As discussed, a vacant space may also be a space between components of the shelving unit. For example, if the middle shelf of the shelving unit of image 3010 were empty, the vacant space may be height H2, which is the distance between the middle and top shelf of the shelving unit.

The at least one processor may identify vacant spaces across a plurality of shelves in an area of a retail store. Vacant spaces may be identified for an area of a store by, for example, identifying vacant spaces on a first shelf, identifying vacant spaces on a second shelf, and aggregating the vacant spaces. Additionally or alternatively, vacant spaces may be identified for an area by identifying vacant spaces in a plurality of images representing the area of the store. The vacant spaces, throughout an area or in a subset of the area, may be identified by any means disclosed herein. Identifying vacant spaces across an area of a store may be useful for determining whether areas of a store are in compliance with efficiency goals, planograms, or other metrics or for determining areas where products from areas that are overstocked may be relocated. The multi-area vacant space identifications may be based on, for example, images received from multiple different cameras positioned at different locations in a retail store, data received from sensors positioned on multiple retail shelves (for example, from detection elements described in relation to FIGS. 8A, 8B and 9), and so forth.

The size of a vacant space may be determined and quantified by any suitable technique. A vacant space may be characterized by a linear measurement (e.g., inches, centimeters, etc.), a unit of area (e.g., square millimeters, square inches, etc.), or a unit of volume (e.g., cubic centimeters, cubic inches, etc.). Additionally or alternatively, a vacant space may be quantified in relation to its surroundings, for example, in relation to surrounding products (e.g., the vacant space is ⅓ the width of an adjacent product, the vacant space is 2 centimeters shorter than a first product, etc.) in relation to a shelf or shelving unit (e.g., 4% of the shelf area is vacant space, ¹⁄₁₆ of the shelf length is vacant space, etc.), in pixels, and so forth. A vacant space may also be quantified by comparison to a pre-determined metric, such as a requirement set forth in a planogram or selected by a user (e.g., the vacant space is twice as wide as required by a planogram, the vacant space is half as tall as required by a store standards). A size of a vacant space may be determined in isolation or as part of an aggregate of vacant space within a shelf, shelving unit, or area of a store. For example, vacant space 3026 may be quantified individually according to any means disclosed herein, or it may be quantified in relation to vacant spaces 3024, 3022. As an example of the latter, vacant space 3026 may be quantified as half as wide as vacant space 3022 or as one-fourth of the aggregate vacant space comprised of vacant spaces 3022, 3024, and 3026.

As noted, the at least one processor may be configured to identify vacant spaces based on input from one or more sensors. The one or more sensors may be of the same type or may be comprised of several types of sensors. A sensor may detect a vacant space directly or indirectly. For example, a sensor system may be configured such that the total width of a shelf is known and the sensor may be configured to detect the presence of and dimension of products; the vacant space may then be determined by subtracting the dimensions of the detected products from the known dimensions of the shelf. Additionally or alternatively, a sensor system may be configured to detect the absence of products, thereby directly detecting a vacant space. The sensor or sensor system may be any device capable of detecting the presence or absence of a product. The one or more sensors may include cameras positioned on shelves of a retail store. The sensors may also include pressure detectors. The input from a pressure detector or pressure detectors may be indicative of pressure levels detected by the pressure detectors when one or more products are placed on the at least one store shelf. The pressure sensors may be placed over a large area of a store shelf or each shelf may contain a single pressure sensor. Pressure sensors may take any form consistent with the present disclosure. In embodiments with several pressure sensors, vacant spaces may be identified based on a determination that a pressure sensor or a plurality of pressure sensors are detecting no pressure. For example, pressure sensors may be configured to detect the presence of a product (e.g., by transmitting a signal when a weight is detected), in which case, any pressure sensor not transmitting a signal will be associated with a vacant space. In another example, pressure sensors may be configured such that they detect the absence of a product (e.g., by transmitting a signal when no weight is detected), in which case, any pressure sensor transmitting a signal will be associated with a vacant space.

Pressure sensors may be integrated within shelves to detect the presence or absence of a product on the shelf. Additionally or alternatively, pressure sensors may be incorporated into one or more pads configured to rest on a surface of a shelf. Products placed on the pad may be detected by the incorporated sensors. One or more pressure sensors may also be associated with a rigid or semi-rigid sheet or plate of material that may be positioned on top of the one or more sensors, with the products being placed on top of the sheet or plate. This arrangement may be advantageous in that fewer sensors may be required to detect products placed on a shelf. In such cases, a number of products placed on the sheet may be determined via weight measurements associated with the sensor output and known weights of expected products to be placed on the sheets/plates.

As an example, there may be six sensors located under a rectangular plate. Four sensors may be placed at the corners of the plate, one at each corner, while two may be placed at midpoints of the two long edges of the rectangular plate, one along each edge. As products are placed on the plate, the sensors will detect the added weight and determine that products are located on the plate. If the weight of a single product is known, the total weight may be used to determine the number of products placed on the plate at any given moment in time. Further, if the dimensions of a product and of the plate are known, then the total area occupied by the products associated with the detected weight may be determined. Based on the determination, the vacant space present above the plate may be determined by subtracting the area occupied by the products from the total area of the plate. Additionally or alternatively, if less weight is detected by one of the sensors under the plate as compared to the other sensors, then it may be determined that vacant space is associated with the area above that sensor.

It is contemplated that pressure sensors may be used in conjunction with image processing, as disclosed above and throughout the disclosure, to detect vacant spaces. For example, pressure sensors may detect a plurality of products as described above and image processing may provide the dimension of the products by detecting products displayed on the shelf containing the pressure sensors. System 100 may then use the data from the pressure sensor and the data from the image processor to determine the vacant space present on the shelf.

The one or more sensors may include light detectors. The input from a light detector may be indicative of light measurements made with respect to one or more products placed on the at least one shelf. The light detector may take any form consistent with this disclosure. The light detectors may be permanently or semi-permanently affixed to a shelf, a shelving unit, structures adjacent to shelves or shelving units, positioned on, within, and/or under a shelf, or any combination thereof. The light detectors may be configured to detect vacant spaces by detecting the presence of products on a shelf or by detecting the absence of products on the shelf or a combination thereof. For example, as described above in relation to FIGS. 8A, 8B and 9, products placed on a shelf may block at least some of the ambient light from reaching light detectors positioned on, within, and/or under a shelf. Further, as described above, readings from the light detectors may be analyzed to determine positions of products on the shelf, orientation of products, dimensions of products (such as width and height), movement of products, vacant spaces on the shelf, and so forth. For example, light detectors positioned under vacant shelf space may provide readings corresponding to ambient light, while light detectors positioned under objects (such as products) may provide readings indicating that at least some of the ambient light is blocked. The readings from the light detectors may be analyzed to identify regions where the ambient light reaches the light detectors (for example, identify that the readings from the light detector are above a selected threshold), and identify these regions as vacant shelf space. The examples herein are exemplary only and it is understood that any light detector may be configured to detect vacant spaces directly or indirectly. It is contemplated that light detectors may be used alone or in combination with other means for detecting vacant spaces. For example, a light detector may be used in conjunction with pressure sensors, image processing units, or both.

In accordance with this disclosure, the at least one processor may be configured to measure a metric associated with the identified vacant spaces related to at least one product type across a plurality of shelves in the retail store. A metric associated with the identified vacant spaces may be any metric useful for identifying or comparing vacant spaces, and may be measured according to measuring criteria useful for identifying or comparing the vacant spaces. As described above, a vacant space may be quantified by, for example, a unit of measure, a comparison to other vacant spaces, a portion of a total area, or any other quantifying measurement. It is also contemplated that a vacant space may be quantified in relation to a group of products or a product type and the vacant space may be quantified by a given area, such as on a shelf-by-shelf basis or across a plurality of shelves. Measuring criteria associated with a product or product type may be any desired or realized measuring criteria and may be provided by any user or determined by system 100. For example, a supplier of a product may provide, in a planogram or otherwise, that for each product of a certain type there should be a set amount of vacant space between a first product and a second product or between a first product and a store fixture. By way of example, for the product of the first type in image 3020, a planogram may provide that the vacant space 3025 between the top of the product and the shelf above must be between, for example, two and four inches. In another example, the measuring criteria provided for the second type of product in image 3020 may dictate that each horizontal vacant space 3022, 3024, 3026 must be substantially the same size as the other horizontal vacant spaces 3022, 3024, 3026 and not more than, for example, 10% of the total space of any shelf when considered in aggregate. The metric may measure a degree of compliance with such measuring criteria. The examples are not limiting, and the measuring criteria and metric may be any measuring criteria and metric useful for monitoring a display of products.

A metric may be determined over time by establishing an average vacant space associated with a product or a desired vacant space associated with the product, or by measuring a degree of compliance with a set of measuring criteria as described above. For example, system 100 may, at a first time, determine the size of vacant space 3024 and vacant space 3026 and, at a second time, determine the size of vacant space 3024 and vacant space 3026. By aggregating the size of the vacant spaces 3024, 3026 and dividing by the number of identified vacant spaces and/or the number of instances when the vacant space was detected and/or the elapsed time at which the vacant space was detected, a metric may be measured. For example, if the vacant space 3026 was 1 inch at a first time and 0.5 inches at a second time, system 100 may determine that the average of 0.75 inches is the metric associated with the products surrounding vacant space 3026. In another example, if vacant space 3026 is 1 inch and vacant space 3024 is 1.5 inches at the same time, system 100 may determine that the average space of 1.25 inches should be the metric associated with the second group of products in image 3020. In another example, if vacant space 3026 is 1 inch and vacant space 3024 is 1.5 inches at a first time, and vacant space 3026 is 0.5 inches and vacant space 3024 is 1.25 inches at a second time, system 100 may determine that the average of 1.063 inches should be the metric associated with the second group of products. In the same example, system 100 may determine the average space at the first time, which is 1.25 inches, and the average space at the second time, which is 0.875, and determine that the metric associated with the second group of products is a range from 0.875 inches to 1.25 inches. In another example, system 100 may have a calibration means controlled by a user, such as a manager of a retail store, which instructs system 100 to store the present vacant space as the metric for group of products.

The measuring criteria and metric may be stored on a client device, on a database, or accessed over a network. For example, measuring criteria provided to a retail store by a product distributor may be stored on client device 145 or in database 140 or on another memory device not database 140.

When measuring criteria and/or a metric is quantified by a product type, the at least one product type may be associated with at least one of a product category, a brand of products, or a region of the retail store. For example, system 100 may determine a product is of a first or second type by any means disclosed herein and may associate a vacant space with products of the first or second type based on, for example, the vacant space's proximity to a product. By way of example, system 100 may received a plurality of images, each depicting a shelf or a portion of a shelf similar to image 3020 of FIG. 30A. As discussed above, system 100 may detect vacant spaces 3022, 3024, 3026 by any means disclosed herein. System 100 may also determine that the products with a width W2 are of the second type and are associated with the vacant spaces 3022, 3024, 3026. System 100 may then access measuring criteria relating to the second type of products, the measuring criteria stored, for example, in database 140, and may use the accessed measuring criteria to measure the metric.

Consistent with this disclosure, the at least one processor may be further configured to compare the measured metric with metrics associated with identified vacant spaces for the at least one product type in other retail stores. The comparison between a presently determined metric associated with identified vacant spaces and metrics associated with a product are useful for determining whether a retail store is in compliance with guidelines for presenting a product, such as guidelines provided by a planogram or those known in the industry, and for tracking the efficiency of the retail store, for example by determining whether the store may rearrange products to make more efficient use of the space in the retail store. The comparison may include comparing retail stores that deal in a type of product with other retail stores that deal in the same type of product or with comparing each retail store to an ideal or a minimal metric provided, for example, by a planogram or contractual obligation. The comparison data may be transmitted, for example, to a store manager, to a supplier of a product, or to a market research entity.

The comparison may be performed in any manner consistent with this disclosure. The output of such a comparison may be a quantified amount or a binary determination and may be a comparison of the aggregate vacant space or individual vacant spaces. For example, if a metric associated with the second group of products is a vacant space of 1.0 to 1.25 inches between each product of the second group of products, system 100 may determine that the first vacant space 3022 is 1.5 inches wide, the second vacant space 3024 is 1.0 inch wide, and the third vacant space 3026 is 0.75 inches wide. Based on the detected vacant spaces, system 100 may determine that the average vacant space is 1.08 inches and, therefore, the retail store is in compliance with the metric. Additionally or alternative, system 100 may determine that the first vacant space 3022 and the third vacant space are not in compliance with the metric, while the second vacant space is in compliance with the metric. The output of such determination may be, for example, "2 of 3 vacant spaces are not in compliance" or "the average vacant space is in compliance" or "vacant space 3022 is 0.25 inches too wide, vacant space 3026 is 0.25 inches too narrow, vacant space 3024 is in compliance" or any other display of the results of the comparison. The results of the comparison may be transmitted to a client device 145A, 145B, 145C and may be transmitted to any interested party, including supplier 115, market research entity 110, or user 120.

Consistent with this disclosure, the at least one processor may be further configured to rank a retail store based on the comparison. As an example, the metrics associated with a product type may be used to determine whether a particular retail store is in compliance with the measuring criteria. The comparison may also allow a supplier or market research entity, for example, to compare a first retail store with another retail store. By way of example, system 100 may determine vacant spaces associated with a first group of products at a first retail store and determine vacant spaces associated with the first group of products at a second retail store. System 100 may then compare the data from the first retail store with that of the second retail store and rank the stores based on the amount of vacant space determined at each store. Additionally or alternatively, system 100 may first compare each store to a metric to determine each store's compliance with the measuring criteria and then compare each store's compliance with the measuring criteria. The comparison may be any comparison disclosed herein.

The ranking may be provided as a list, for example, identifying the retail store that is closest to complying with the measuring criteria to the retail store that is furthest from compliance with the measuring criteria. Additionally or alternatively, the ranking may comprise data and representations of each retail store's compliance, displayed, for example, as a percentage or unit of measure.

Consistent with this disclosure, the at least one processor may be configured to determine that by rearranging the group of second products on the at least one store shelf to at least partially eliminate the one or more identified vacant spaces, at least one additional first product may be displayed on the at least one store shelf next to the group of first products. The determination may be based on one or more vacant spaces identified in any manner disclosed above. For example, the determination may be based on a determination that an identified vacant space or an aggregate of a plurality of identified vacant spaces are of a size equal to or larger than a dimension of a product. In another example, the determination may be based on a determination that an identified vacant space or an aggregate of a plurality of identified vacant spaces, minus the required the vacant spaces (for example, according to a planogram), are of a size equal to or larger than a dimension of a product.

It is contemplated that the vacant space may be associated with a first group of products, a second group of products, or a combination thereof and that by rearranging the first group of products, the second group of products, or a combination thereof, (for example, according to required vacant spaces, for example by a planogram) at least one additional product of the first group of products, or the second group of products, or a third group of products may be added to a shelving unit. For example, the vacant spaces may be associated with a first group of products and by rearranging the first group of products, an additional product of the second group of products may be displayed. Additionally or alternatively, the vacant spaces may be associated with a first group of products and by rearranging the first group of products, an additional product of the first group of products may be displayed. Additionally or alternatively, the vacant spaces may be associated with a first group of products and by rearranging the first group of products, an additional product of a third group of products may be displayed. The examples are not limiting and any combination of products or groups of products of any type may be rearranged to accommodate an additional product or group or products of any type.

The determination may be based on a size of a first or second product and a size of the identified vacant space. For example, a width associated with first products may be narrower than a width associated with second products, and the widths may be compared to the width of the identified vacant space. The vacant space and/or width associated with a product may be identified by any suitable technique. For example, the width associated with products may be an average width of the products, a maximal width of the products, a minimal width of the products, a function of any of the above (such as a function adding a constant, a function multiplying by a constant, etc.), and so forth. In some examples, a plurality of widths associated with products may be identified (for example by analyzing images of the products, by analyzing data received from sensors positioned on retail shelves for example from detection elements described in relation to FIGS. 8A, 8B, and 9, etc.), and the width associated with the products may be calculated using the distribution of the plurality of widths. For example, the width associated with the products may be calculated as a function of at least one of the mean of the distribution, the median of the distribution, the maximum of the distribution, the minimum of the distribution, the standard deviation of the distribution, the variance of the distribution, the coefficient of variation of the distribution, the coefficient of dispersion of the distribution, the Fano factor of the distribution, and so forth). Consistent with this disclosure, the at least one processor may be configured to determine that a first product may be added horizontally to the group of first products based on identified horizontal spaces between two or more second products. The determination that at least one additional product may be displayed on a shelf may include a determination that a first product may be added horizontally to a group of first products based on horizontal spaces identified between two or more second products being larger than the width of a product of the first type, for example, after accounting to required vacant spaces (for example according to a planogram). For example, system 100 may detect a vacant space that is wider than an average, median, minimal, or maximal width of a product and determine that, by rearranging the products to eliminate the vacant space, an additional product may be displayed on the shelf.

Consistent with this disclosure, the at least one processor may be configured to aggregate identified horizontal spaces between two or more second products and compare the aggregated spaces to the width associated with first products to identify a potential for rearrangement. When an aggregate amount of vacant space is larger than a dimension of a product, then a potential for rearrangement may be identified. The potential for rearrangement may be, for example, a determination that a first product may be added horizontally to the group of first products. For example, in image 3020, system 100 may aggregate the identified vacant spaces 3022, 3024, 3026 and determine that the aggregate width is greater than width W1 associated with the products of first group of products. Based on this determination, system 100 may then determine that by rearranging the second products to eliminate or reduce at least one of vacant spaces 3022, 3024, 3026, an additional first product may be added to shelf, as is depicted in image 3040. Additionally or alternatively, system 100 may determine that the aggregate width of vacant spaces 3022, 3024, 3026 is greater than width W2 associated with the products of the second group of products. In this circumstance, system 100 may determine that by rearranging the second products to eliminate or reduce at least one of vacant spaces 3022, 3024, 3026 either an additional product of the first type or an additional product of the second type may be added to the shelf. It is also contemplated that the determination may be based on a single identified vacant space of sufficient size to accommodate a product. For example, system 100 may determine that single vacant space is larger than width W1 of a product of the first group of products and determine that by reducing or eliminating that vacant space, an additional product of the first type may be added to a shelf.

The width associated with a product may be known by a system or may be determined by a system in any manner consistent with this disclosure. For example, if the product is identified by a logo or the type of the product is otherwise determined in any manner disclosed herein, system 100 may access database 140 to locate a width associated with that type of product, or a width of a product may be determined by system 100, for example by detecting the dimensions of a product in an image of the product, by detecting the dimensions of a plurality of products of a select product type in one or more images of the plurality of products and calculating a function of the resulting plurality of dimensions (such as average, median, maximum, minimum, etc.), by retrieving the dimensions from a database, etc.

Consistent with this disclosure, the at least one processor may be configured to determine that by rearranging the plurality of products, at least one shelf may be added to a shelving unit. The determination may be based on horizontal or vertical spaces identified by any manner disclosed herein. The determination may be based on a determination that, for example, the vertical vacant space identified on a shelving unit is sufficient to accommodate the height of an additional shelf and a product or group of products placed on the additional shelf. The height of a product or group of products may be known or may be determined by system 100 by any means disclosed herein.

The determination that an additional shelf may be added to a shelving unit may be based on a determination that additional products of the type or types presently displayed on the shelving unit may be displayed if a shelf is added or that a product not presently displayed on the shelving unit may be displayed if a shelf is added. For example, system 100 may detect vertical vacant spaces, such as vacant space 3016, and determine that while the vacant space is not sufficiently large to accommodate additional products of the first or second group, it may accommodate additional products of a third group, the products of the third group of products having a height less than that of the products of the first or second group.

Consistent with this disclosure, the at least one processor may be configured to aggregate identified vertical spaces associated with a plurality of store shelves and compare the aggregated space to an average height of the products to identify a potential for rearrangement. The product may be one presently located on the shelving unit or one from a related category or type or products. The height of the product may be known, for example, if the product is identified by a logo or the type of the product is otherwise known, system 100 may access database 140 to locate a height associated with that type of product, or a height of a product may be determined by system 100, for example by detecting the dimensions of a product. The height may be an average height, a median height, a minimum height, a maximum height, etc. The determination may be a determination that the aggregated height of the vacant spaces is larger than the height of the first product.

For example, system 100 may receive image 3010 and detect vacant spaces 3012, 3014, 3016, each existing between the top of a row of products and the bottom of an adjacent shelf. System 100 may then determine that the aggregate height of vacant spaces 3012, 3014, 3016 is more than height HP of a first product (e.g., a max height) and, based on that determination, determine that an additional shelf containing products of the first type may be added to the shelving unit, as depicted in image 3030. It is also contemplated that the determination that a shelf may be added to a shelving unit may be based on a determination that a single vacant space is large enough to accommodate an additional shelf and an additional row of products, possibly with a vertical vacant space according to a requirement from, for example, a planogram or a retail store guidelines.

Consistent with this disclosure, the at least one processor may be configured to identify that at least some products are displayed in a nonstandard orientation and determine that by rearranging the group of second products on the at least one store shelf at least one additional first product may be displayed in a standard position. The determination may be based on a determination that at least one product is displayed in a nonstandard orientation. As described above, a nonstandard orientation may include any orientation of a product that is not preferred or desired by a retail store or supplier of a product or any orientation of a product that does not match that of other products in the same group of products. By way of example, referring to FIG. 30C, system 100 may receive image 3050 and determine that product 3055 is in a nonstandard orientation based on, for example, a determination that the dimensions of product 3055 match that of product 3052 but are in a different orientation. System 100 may then detect vacant spaces 3052, 3054, 3056 and the space occupied by the product displayed in a nonstandard orientation, here space 3058. System 100 may then, for example, aggregate the vacant spaces 3052, 3054, 3056 and the space 3058 occupied by product 3055 to determine whether additional products may be displayed on the shelf. Here, the aggregate space is sufficiently wide to accommodate two additional products of the second product type and product 3055 in a standard orientation, as depicted in image 3060.

A determination that at least one additional first product may be displayed in a standard orientation may be based on a determination of vacant space that would be created if a product of nonstandard orientation is removed or displayed in a standard orientation. The additional product to be displayed may be of the same group or a different group than that of the product displayed in nonstandard orientation. For example, system 100 may detect product 3055, which belongs to the first group of products, and determine that an additional product of the first group or an additional product of the second group, or a combination thereof, may be displayed on the shelf if product 3055 is displayed in a standard orientation and vacant spaces 3052, 3054, 3056 are reduced or eliminated. In another example, system 100 may determine that a product or a plurality of products of a third group of products may be displayed on a shelf if product 3055 is displayed in standard orientation and vacant spaces 3052, 3054, 3056 are reduced or eliminated.

In accordance with this disclosure, the at least one processor may be configured to identify a plurality of possible rearrangements of the plurality of products based on the identified vacant spaces. The plurality of possible rearrangements may be determined by any means disclosed herein. By way of example, system 100 may receive image 3050 and detect vacant spaces 3052, 3054, 3056 and the space 3058 occupied by product 3055. As discussed above, one of the possible rearrangements is to place product 3055 in a standard orientation and to eliminate vacant spaces 3052, 3054, 3056 to make room for two additional products of the second type. In addition, system 100 may determine that it is possible to reduce or eliminate the vacant spaces 3052, 3054, 3056 in different ways to accommodate additional products. For example, if system 100 determines that vacant space 3052, 3054, 3056 when considered in aggregate is larger than, for example, the width W1 of the first products, then one possible rearrangement may be to leave product 3055 in a nonstandard orientation and add one addition first product. In another example, system 100 may determine that the vacant spaces 3052, 3054, 3056 when combined with the space 3058 occupied by product 3055 is wide enough to accommodate three of the second products (e.g., the aggregate space is larger than three times the width W2 of the second products), another possible rearrangement, in this instance, is to remove product 3055 and add three products from the first group of products.

The at least one processor may be configured to identify a plurality of possible rearrangements and then choose one possible rearrangement to implement or configured to report the plurality of possible rearrangements to a user. For example, system 100 may determine several possible rearrangements for a shelf or shelving unit any may transmit each of the possible rearrangements to, for example, client device 145. A user, such as supplier 115, user 120, or market research entity 145, may then use the transmitted possible rearrangements to determine which rearrangement to implement.

The at least one processor may be further configured to suggest a recommended or preferred rearrangement from the plurality of possible rearrangements. The preferred rearrangement may be, for example, the rearrangement that leaves the least vacant space on a shelf. The preferred rearrangement may also be informed by, for example, a planogram or other stored data. For example, if a first possible rearrangement is to display two additional products of a first type and a second possible rearrangement is to display one additional product of a first type and one additional product of a second type, system 100 may access stored data to determine which possible rearrangement would be preferred by, for example, supplier 115 or user 120. For example, system 100 may access database 140, locate transaction history, and determine that products of the first type sell better than those of the second type. Based on this determination, system 100 may recommend the first possible rearrangement as the preferred rearrangement, because it displays more of the first product than the second possible rearrangement. In another example, system 100 may access database 140, locate inventory data, and determine that there are more products of a second type than of the first type in storage. Based on this determination, system 100 may select the second possible rearrangement, which includes displaying more of the second product type than the first possible rearrangement, as the preferred rearrangement. Selection of a preferred rearrangement may be based on any other criteria determined by system 100 or provided by external input, for example, from a planogram or store guidelines.

The at least one processor may be configured to access product assortment rules associated with the plurality of products and determine a recommended rearrangement based on the product assortment rules. When a recommended rearrangement is determined, information may be provided to a user as part of a product-related task assigned to a store employee and may include details of the recommended rearrangement. The recommended rearrangement may be provided to a user in isolation or along with the plurality of other possible rearrangements.

The assortment rules may include any rules or guidelines for displaying a product, group of products, product type, or other category of product. The assortment rules may be provided, for example, by a supplier in a planogram or a contractual agreement with a retail store. Assortment rules may be accessed form a storage device, such as database 140, storage on client device 145, or other memory device, or accessed over a network, for example communications network 150. For example, an assortment rule may include a rule limiting the number of vacant spaces on a shelf, defining a percentage of a shelf that may be devoted to vacant space, limiting the number of products on a shelf, limiting the size of any one vacant space, limiting the aggregate vacant space on a shelf, limiting the vacant space that may be present on a shelving unit, limiting the number of products of a given type that may be displayed on a shelf, or any other rule associated with a product or with a vacant space. It is also contemplated that there may be a plurality of assortment rules associated with a product, a product type, or a vacant space.

For example, system 100 may receive, for example, image 3050 and, as discussed above, determine a plurality of possible rearrangements that may be implemented on the shelf to reduce the vacant space. System 100 may then access, for example, database 140 to locate an assortment rule associated with the first group of products or the second group of products or both. For example, an assortment rule provided by supplier 115 in a planogram and stored on database 140 may provide that a product of a first group of products may only be displayed in a standard orientation, as defined by the planogram. System 100 may then apply the assortment rule to determine that the shelf depicted in image 3050 should be rearranged by orienting product 3055 in a standard orientation. There may be a plurality of possible rearrangements of the shelf depicted in image 3050 after product 3055 is oriented in a standard position. For example, the vacant space may be reduced to accommodate two of the second products or two of the first products or one of the first products and one of the second products. System 100 may identify a second assortment rule to apply. For example, the second rule may dictate that no more than five products of the first type of product may be displayed on any one shelf, in which case, system 100 may determine that the shelf depicted in image 3050 should be rearranged such that product 3055 is oriented in a standard position and that two additional products of the second type of product may be added to the shelf, as depicted in image 3060.

A plurality of assortment rules may apply to a single shelf to eliminate vacant spaces identified on the shelf. System 100 may access a product assortment rule or a plurality of product assortment rules, for example, by accessing rules stored on database 140. System 100 may select an assortment rule to apply to the identified vacant spaces. By way of example, an assortment rule may be selected if it corresponds to one of the identified plurality of possible rearrangements, to at least one product displayed on the shelf, or to the vacant spaces identified on the shelf. An assortment rule may be selected, for example, if it would eliminate the vacant spaces. If no one assortment rule would fully eliminate the vacant spaces, system 100 may select additional assortment rules to apply until the vacant space is eliminated or reduced to the full extent possible. For example, if after selecting a first assortment rule to apply, there would be vacant space remaining on a shelf, system 100 may select a second assortment rule that is consistent with the first assortment rule and will further reduce the vacant space on the shelf. This may be repeated until all of the vacant space is eliminated, until there are no more assortment rules to apply, or until the remaining vacant space is insufficient to allow rearrangement according to the remaining assortment rules. System 100 may then recommend a rearrangement consistent with the selected assortment rule or assortment rules.

As disclosed above, vacant spaces may be determined for an area of a retail store. Consistent with this disclosure, the at least one processor may be configured to determine that by rearranging products in an area of a retail store, at least two or more additional products from at least one product type may be displayed in the area of the retail store. The determination may be base on a determination that products may be rearranged, or that a shelving unit may be rearranged, or that both products and shelving units may be rearranged. For example, system 100 may receive a plurality of images and detect a plurality of products located on a plurality of shelves across a plurality of shelving units. System 100 may then identify vacant spaces associated with each of the products, shelves, shelving units, or a combination thereof. The vacant spaces may be identified by the any means disclosed herein. System 100 may then determine that, for example, by rearranging a first group of products on a first shelf and rearranging a second group of products on a second shelf, a third group of products may be places on the first and second shelves. It is contemplated that the recommended rearrangement may comprise rearranging any portion of the area of the retail store. The recommended rearrangement may also comprise rearranging any group of products, any shelf, any group of shelves, any shelving unit, or any group of shelving units. The recommended rearrangement may also comprise rearranging a group of products or a shelf to make room for an additional product, an additional plurality of products, an additional shelf, an additional plurality of shelves, or a combination thereof.

The at least one processor may be configured to provide information to a user indicative of the identified vacant spaces. The information may be provided based on a determination that at least one shelf may be added to a shelving unit or that at least one additional product may be displayed on a shelf. Additionally or alternatively, the information may be provided based on one or more identified vacant spaces.

The information may be provided by any means disclosed herein. For example, information may be provided to a client device 145 and may be provided over communications network 150 via an alert, text-message, email, or other notification, or the information may be displayed as part of GUI 500. The information may be provided to any user, including user 120, supplier 115, or market research entity 110. It is contemplated that the information provided comprises data relating to the identified vacant spaces (e.g., the size and location of a vacant space), any determined rearrangement possibility, or any determined rearrangement event. The information provided may be tailored to the needs of the user to whom it is being provided. For example, supplier 115 may intend to use the information to monitor compliance with a planogram or other guideline and system 100 may provide only the information necessary to facilitate this function. Similarly, market research entity 110 may intend to use the information to rank retail stores or otherwise determine the efficiency of a retail store or group of retail stores and system 100 may provide only the information necessary for this purpose. Market research entity 110 or retail store 105 may use the information to monitor product sales or turn-over (e.g., correlating vacant space with a product being out-of-stock) and system 100 may provide information necessary for this monitoring.

The information may include any data obtained by system 100 relating to an image processed by image processing unit 130, such as a representation or description of the received image or any other data associated with the received image, a representation or description of the products detected in the received image or any other data relating to the detected products, data relating to the size, shape, orientation, or location of a vacant space or any other information relating to the identified vacant spaces, data relating to a determination that an additional product may be displayed if a rearrangement occurs and data relating to the rearrangement, or any other data obtained or determined by system 100. As discussed above, the information may include a recommended rearrangement, a plurality of possible rearrangements, at least one assortment rule, or any combination thereof.

In accordance with the present disclosure, the at least one processor may be configured to generate a product-related task associated with an identified potential for product rearrangement. A product-related task may be any tasks performable by an employee or automated system to achieve a reduction in the vacant space identified by the methods disclosed herein. For example, identified vacant space may be associated with a misplaced or out-of-stock product and the product-related task may comprise returning the misplaced product to the correct display. In another example, as discussed above, a product may be determined to be in a nonstandard orientation, in which case the product-related task may comprise reorienting products to their desired orientation.

In accordance with the present disclosure, the at least one processor may be configured to generate a visualization of a recommended rearrangement. The visualization may include the image received in, for example, step 3102 of method 3100. The visualization may contain a visual representation of how a shelf should be arranged. For example, system 100 may generate a visual representation of a desired arrangement of a shelf or a shelving unit, the visualization may be substantially the same as image 3030 or image 3040, for example.

Consistent with the present disclosure, the information provided to the user may be part of a product-related task assigned to a store employee and may include details of the recommended rearrangement. For example, when product assortment rules associated with a plurality of products are used to determine a recommended rearrangement, as discussed in relation to process 32A, the information provided to a user may include a product-related task assigning a store employee the task of rearranging the plurality of products. The information, in this example, may also include the assortment rule or rules that were used to develop the recommended rearrangement. The product-related task may comprise instructions on how to rearrange products, how to rearrange shelves, how to rearrange shelving units, or a combination thereof. The product-related task may be communicated as written instructions, a diagram, an image, a series of images, a combination thereof, or any other means of communicating the task.

In accordance with the present disclosure, the information provided to a user may be part of a product-related task assigned to a store employee and may include the generated visualization of the recommended rearrangement. The information provided to a user may contain any combination of a description and visualization of a product-related task. For example, when a task includes rearranging the shelf depicted in image 3050, system 100 may provide image 3060 to a user. In another example, system 100 may prove a visualization of both the present state of a shelf, as depicted in image 3050, and the desired arrangement, as depicted in image 3060. The visualization may additionally include detailed instructions as to how to arrange the products to achieve the desired arrangement.

In accordance with the present disclosure, the information provided to a user may include identification of a location of the at least one store shelf where the potential for product rearrangement exists. For example, the information may contain an indication of an area of a store in which a potential product rearrangement was detected. The location may include a description of a location, a map depicting a location, directions leading one to a particular location, or any other information that may facilitate navigation of a human or robotic system to the location.

It is contemplated that the location may be provided, possibly along with a visualization of a recommended rearrangement. For example, the location may be provided along with image 3020 when the shelf depicted in image 3020 is to be rearranged into the configuration depicted in image 3040.

Figure 31A:
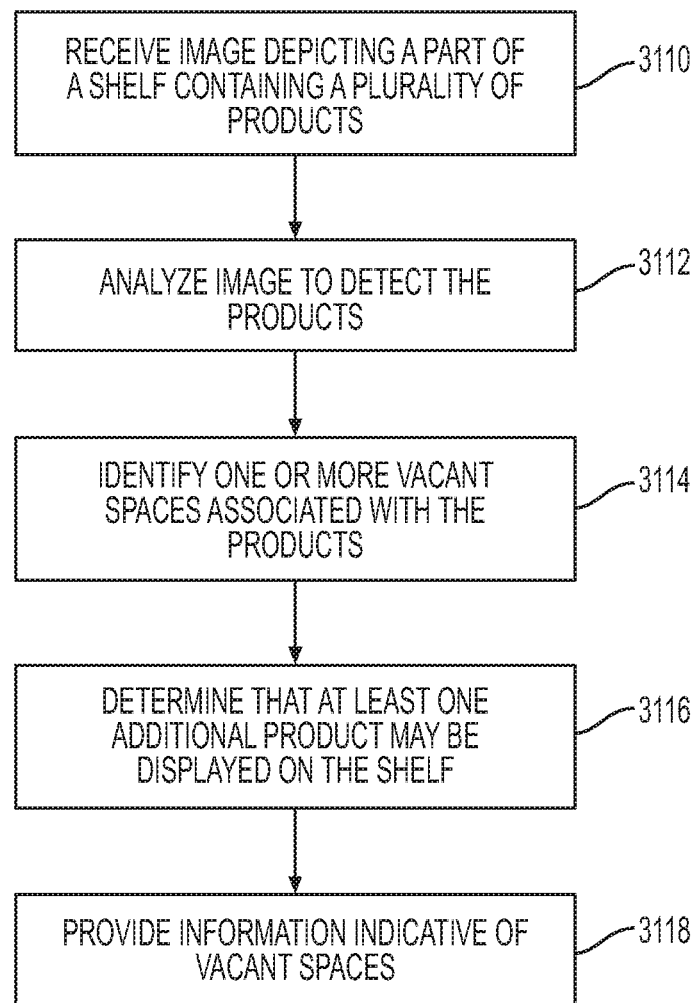
FIG. 31A is a flowchart representation of an exemplary method for determining that at least one additional product may be displayed on a shelf.
Figure 31B:
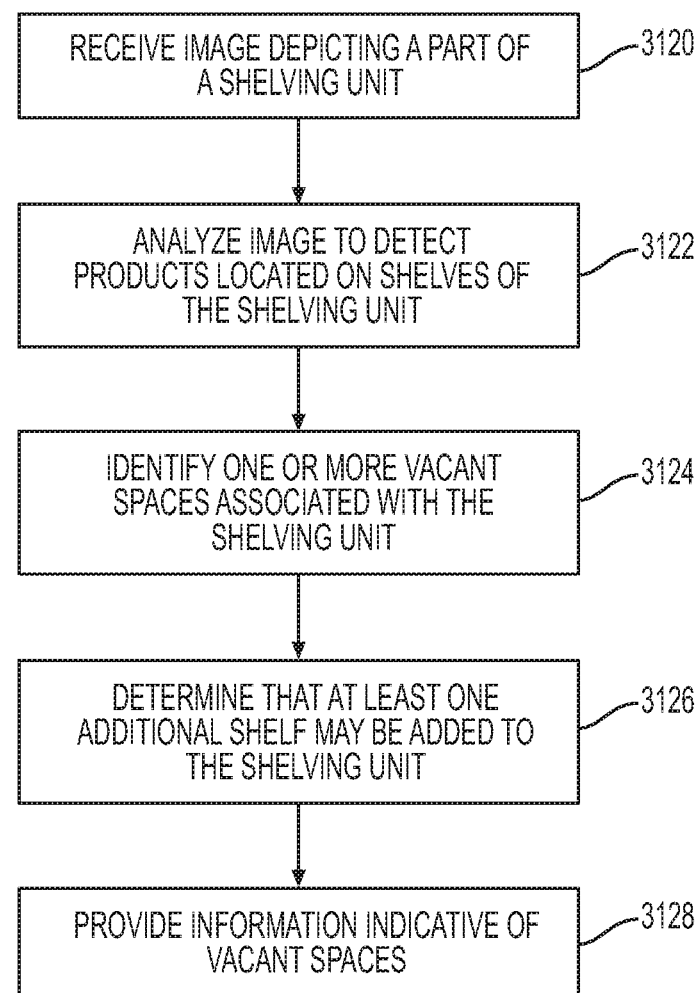
FIG. 31B is a flowchart representation of an exemplary method for determining that at least one additional shelf may be added to a shelving unit.

System 100 may detect vacant spaces and determine a recommended rearrangement according to any means disclosed herein. For example, vacant spaces may be detected and a rearrangement possibility may be determined by a method for processing images captured in a retail store. FIG. 31A provides a flowchart representative of an exemplary method 3100 for processing images captured in a retail store to detect vacant spaces and determine that at least one additional product may be displayed on a shelf based on the detected vacant spaces. Similarly, FIG. 31B provides a flowchart representation of an exemplary method 3102 for processing images captured in a retail store to detect vacant spaces and determine that at least one additional shelf may be added to a shelving unit based on the detected vacant spaces. As will be appreciated with from this disclosure, method 3100 and method 3102 are exemplary only and modifications may be made by, for example, adding, combining, removing, and/or rearranging one or more steps of any process consistent with this disclosure.

According to the present disclosure the method for processing images captured in a retail store may include receiving at least one image depicting at least part of at least one store shelf having a plurality of products displayed thereon. The image may be received by system 100 by any means disclosed herein. The image may depict any portion of a shelf or a plurality of shelves. By way of example, method 3100 may include a step 3110 of receiving an image depicting a part of a shelf, the shelf containing a plurality of products. The plurality of products may include a group of first products associated with a first product size and a group of second products associated with a second product size, the second product size differing from the first product size. The plurality of products may additionally or alternatively include a group of first products of a first type and a group of second products of a second type.

According to the present disclosure the method for processing images captured in a retail store may include receiving at least one image depicting at least part of at least one shelving unit having a plurality of products displayed thereon. The image may depict any portion of a shelving unit or a plurality of shelving units. By way of example, method 3101 may include a step 3120 for receiving at least one image depicting a part of a shelving unit.

Further, in accordance with this disclosure, the method for processing images captured in a retail store may include receiving a plurality of images. The plurality of images may depict a shelf, a shelving unit, a portion of a shelf, a portion of a shelving unit, a plurality of shelves, a plurality of shelving units, or any combination thereof.

Further, according to the present disclosure the method for processing images captured in a retail store may include analyzing the at least one image to detect the plurality of products. The image may be processed in any manner disclosed herein. For example, method 3100 may include a step 3112 for analyzing an image to detect the products depicted in the image of a portion of a shelf received at step 3110. Similarly, method 3101 may include a step 3122 for analyzing an image to detect the products located on the portion of a shelving unit depicted in the image received at step 3120.

Further, according to the present disclosure the method for processing images captured in a retail store may include identifying that at least some of the group of first products are displayed in a nonstandard orientation. This step may be performed at substantially the same time as the step for detecting products depicted in the image. This step may be performed in substantially the same manner as described above with regard to FIG. 30C.

Further, according to the present disclosure the method for processing images captured in a retail store may include identifying one or more vacant spaces associated with the plurality of products on the at least one store shelf. By way of example, method 3100 may include step 3114 for identifying one or more vacant spaces associated with products displayed on a retail shelf. In any implementation of the method, the identified vacant spaces may be horizontal, vertical, or a combination thereof and may be located between a first and second product, between a product and an object, or between two objects. For example, the vacant spaces identified in step 3114 may include horizontal vacant spaces 3022, 3024, 3026 and may be identified in substantially the same manner as discussed above in relation to FIG. 30A.

Further, according to the present disclosure the method for processing images captured in a retail store may include identifying one or more vacant spaces associated with a shelving unit. By way of example, method 3101 may include step 3124 for identifying one or more vacant spaces associated with the products displayed on a shelving unit. The vacant spaces may be vertical, horizontal, or a combination thereof. For example, the vacant spaces identified in step 3124 may include vertical vacant spaces 3012, 3014, 3016 and may be identified in substantially the same manner as discussed above in relation to FIG. 30B.

Further, the method for processing images captured in a retail store may include identifying vacant spaces across a plurality of shelves in an area of a retail store. By way of example, when a plurality of images is received, the analysis of the images may include identifying vacant spaces on each of a plurality of shelved depicted in the plurality of images. In another example, when a single image is received, it may be analyzed to detect vacant spaces on the shelf or shelving unit depicted therein and the vacant spaces identified may be associated with an area of a retail store to which the shelf or shelving unit belongs.

Further, according to the present disclosure, the method for processing images captured in a retail store may include measuring a metric associated with the identified vacant spaces for at least one product type across a plurality of shelves in the retail store. The metric may be according to any measuring criteria disclosed herein, including a total quantification of the identified vacant space, a comparison of the identified vacant space to a predetermined or input metric, or any other measuring criteria disclosed above. For example, the method for processing images captured in a retail store may include comparing the measured metric with metrics associated with identified vacant spaces for the at least one product type. As discussed above, the measuring criteria associated with the identified vacant spaces may be previously determined by system 100, provided by a user or supplier, or otherwise stored in association with the product type or product types associated with the vacant space.

Figure 32A:
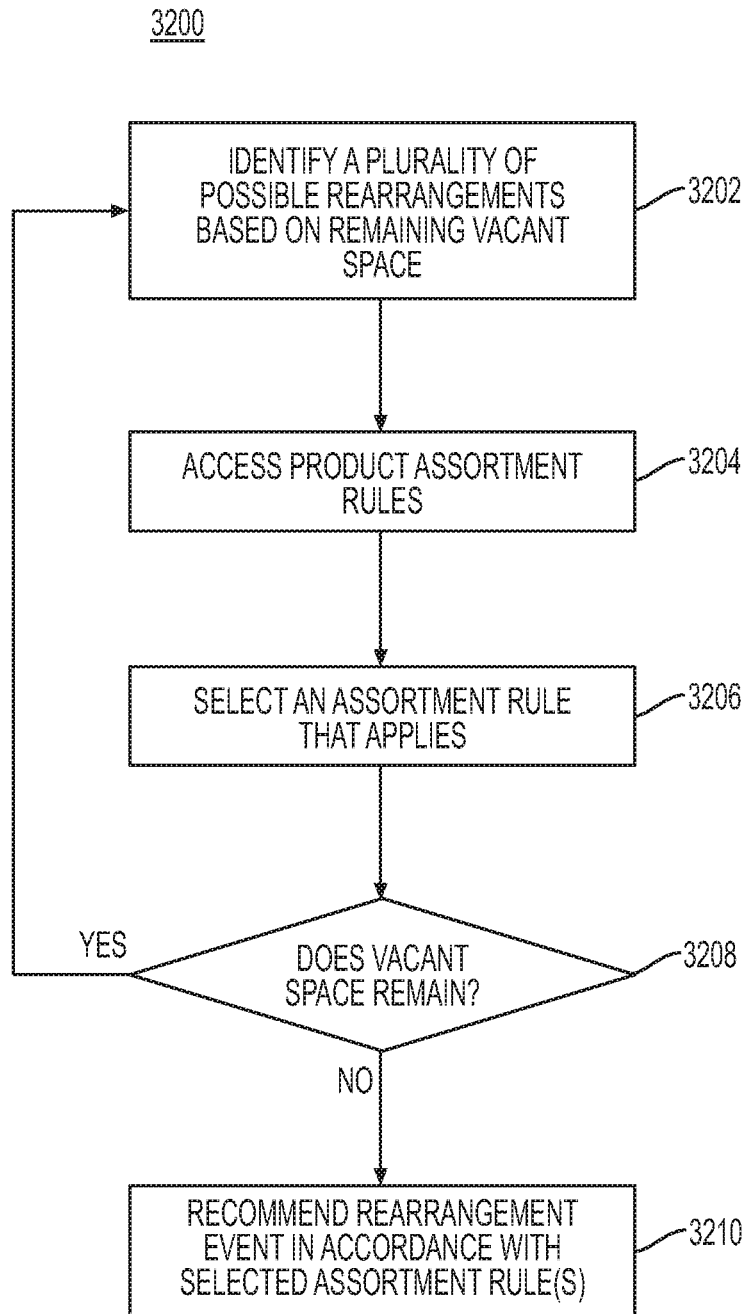
FIG. 32A is a flowchart representation of an exemplary method for recommending a rearrangement event.
Figure 32B:
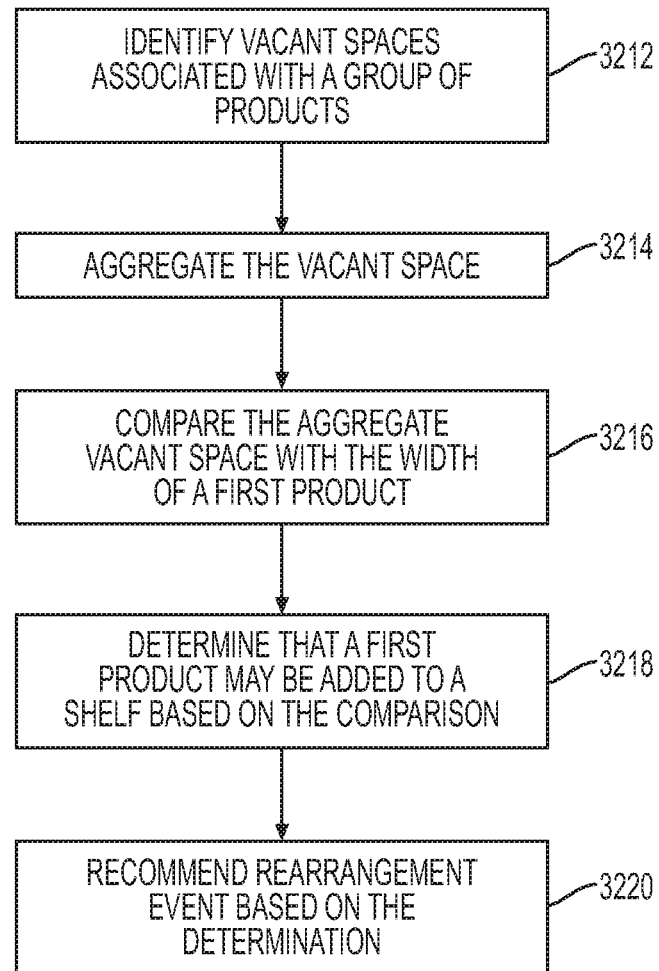
FIG. 32B is a flowchart representation of an exemplary method for recommending a rearrangement event.

Further, the method for processing images captured in a retail store may include aggregating identified horizontal spaces between two or more second products and comparing the aggregated spaces to the width associated with first products to identify a potential for rearrangement. By way of example, FIG. 32B provides a flowchart representation of an exemplary process 3201 illustrates a method for determining that an additional product may be displayed on a shelf. Process 3201 may include step 3212 for identifying vacant spaces associated with a group of products, such as a second group of products. The vacant spaces may be identified by any means disclosed herein, including those discussed in relation to step 3114. Process 3201 may include step 3214 for aggregating the vacant space associated with the second product type. Process 3201 may include step 3216 for comparing the aggregate space with the width of a product of a first type. The comparison may be any comparison disclosed herein, including a comparison of the width associated with a product of the first type with the total aggregate width of the identified vacant spaces. Process 3201 may include step 3218 for determining, based on the comparison of step 3216, that a first product may be added to a shelf. The determination may be a determination that the aggregated width of the vacant spaces, determined in step 3214, is larger than the width of the first product. Based on the determination, process 3201 may include a step 3220 for recommending a rearrangement event comprising a recommendation to rearrange the second group of products such that an addition first product may be displayed. As an example, the rearrangement event may comprise assigning a user, based on the identified potential for arrangement, a product-related task for rearranging the group of second products to add an additional first product horizontally to the group of first products. Process 3201 may be incorporated in method 3100, for example, as part of step 3114 or part of step 3116, or may be performed in isolation.

Figure 32C:
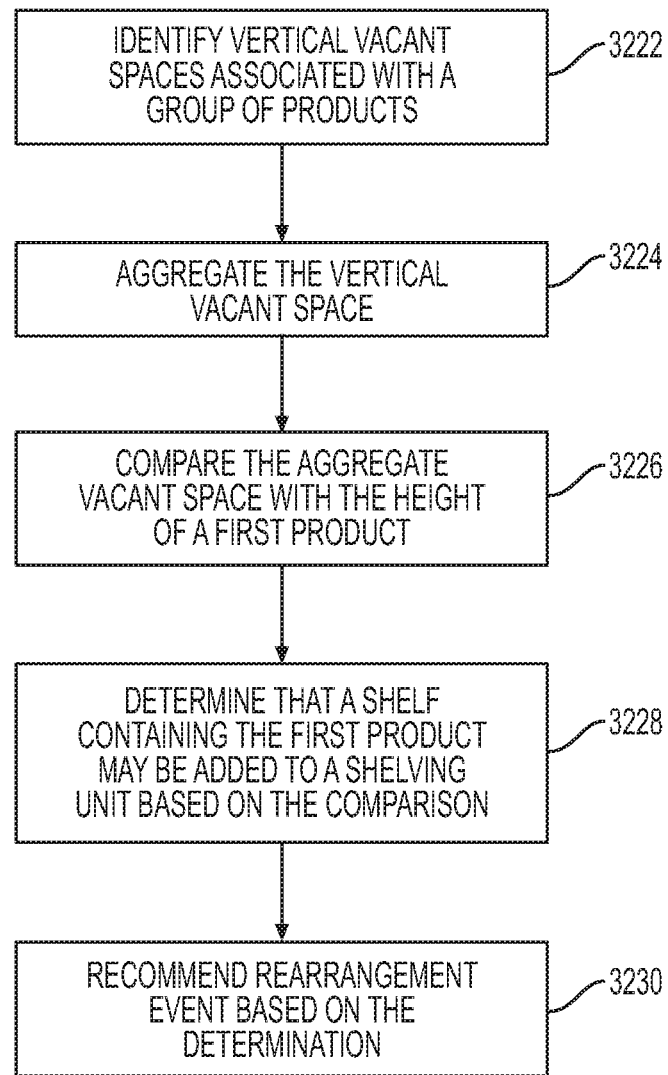
FIG. 32C is a flowchart representation of an exemplary method for recommending a rearrangement event.

Further, the method for processing images captured in a retail store may include aggregating identified vertical spaces associated with a plurality of store shelves and compare the aggregated space to an average height of the products to identify a potential for rearrangement. The potential for rearrangement may include a potential to add an additional shelf to a shelving unit, to add additional products to the shelving unit, or a combination thereof. By way of example, process 3203 (FIG. 32C) illustrates an exemplary method for determining that an additional shelf may be added to a shelving unit. Process 3203 may contain step 3222 for identifying vertical vacant spaces on a shelving unit. The vacant spaces may be identified by any means disclosed herein, including those discussed in relation to step 3124 of method 3101. Process 3203 may include step 3224 for aggregating the vertical vacant space associated with the shelving unit and step 3226 for comparing the aggregate vertical vacant space with the height of a first product. The height of the first product may be stored in system 100 or may be detected or determined by any means disclosed herein. The comparison may be performed in substantially the same manner as discussed above. Process 3203 may include step 3228 for determining, based on the comparison of step 3226, that an additional shelf and at least one product may be added to the shelving unit. Based on the determination, process 3203 may include a step 3230 for recommending a rearrangement event comprising a recommendation to rearrange the shelving unit such that addition shelves and/or additional products may be added to the shelving unit. As an example, the rearrangement event may comprise assigning a user a product-related task for rearranging the shelving unit to add the at least one shelf. Process 3203 may be incorporated into method 3101, for example, as part of step 3124 or 3126, or may be performed in isolation.

Further, the method for processing images captured in a retail store may include determining that by rearranging a group of second products on the at least one store shelf to at least partially eliminate the one or more identified vacant spaces, at least one additional first product may be displayed on the at least one store shelf next to the group of first products. The identified vacant spaces may be associated with the second group of products or the first group or products or a combination thereof. By way of example, method 3100 may include the step 3116 for determining that at least one additional product may be displayed on a shelf if the products identified in step 3112 are rearranged such that the vacant spaces identified in step 3114 are reduced or eliminated. The vacant space to be reduced or eliminated may an individual vacant space or an aggregate vacant space, such as that determined in step 3214 of process 3201. The products to be rearranged and the additional product or products to be displayed may be of the same or of different types. The determination may be performed according to any means disclosed herein, including those discussed with relation to FIG. 30A, FIG. 30B, FIG. 30C, or a combination thereof. The determination may also be based on the outcome of process 3201, or a portion thereof.

Further, the method for processing images captured in a retail store may include determining that by rearranging the plurality of products, at least one shelf may be added to a shelving unit. By way of example, method 3101 may include step 3126 for determining that at least one additional shelf may be added to a shelving unit based on a determination that the vacant spaces identified at step 3124 may be reduced or eliminated to make room for an additional shelf on the shelving unit depicted in the image received at step 3210. The vacant space to be eliminated or reduced may be an individual vacant space or an aggregate vacant space, such as that determined in step 3224 of process 3203.

Further, consistent with this disclosure, the method of processing images captures in retail stores may include identifying a plurality of possible rearrangements of the plurality of products based on the identified vacant spaces. The plurality of possible rearrangements may comprise rearrangements of products, shelves, shelving units, or a combination thereof. Each of the plurality of possible rearrangements may include a rearrangement determined by step 3116 of method 3100, step 3126 of method 3101, step 3218 of process 3201, step 3228 of process 3203, or any other rearrangement determined by any means disclosed herein.

Further, the method for processing images captured in a retail store may include accessing product assortment rules associated with the plurality of products and determining a recommended rearrangement based on the product assortment rules. By way of example, process 3200 (FIG. 32A) illustrates a method for selecting a plurality of assortment rules to recommend applying to rearrange a plurality of products. Process 3200 may include an initial step 3202 of identifying vacant space associated with a plurality of products and a plurality of possible rearrangements of products. The vacant space may be identified by any means disclosed herein, including as discussed with relation to step 3114 of method 3100 or step 3124 of method 3101. The plurality of possible rearrangements may be determined by any means disclosed herein, including by the determination of step 3116 of method 3100, step 3126 of method 3101, step 3218 of process 3201, step 3228 of process 3203, or a combination thereof. Process 3200 may include a step 3204 for accessing a product assortment rule or a plurality of product assortment rules, for example, by accessing rules stored on database 140. The assortment rules may comprise any parameter or guideline for arranging products or shelved within a retail store. Process 3200 may include a step 3206 for selecting an assortment rule to apply to the identified vacant spaces. By way of example, an assortment rule may be selected if it corresponds to one of the plurality of possible rearrangements or the identified products. The assortment rule may be selected based on any criteria, such as selecting the rule that reduces the vacant space to the greatest extent, selecting the rule that allows for the most products to be displayed, selecting a rule given priority by a user, or any other rule criteria. Process 3200 may include step 3208, which ask whether any vacant space would remain on the shelf or shelving unit if the assortment rule selected in step 3206 is applied. If vacant space would not remain after applying the assortment rule selected at step 3206 ("NO" at step 3208), then process 3200 proceeds to step 3210 for recommending to a user a rearrangement event in accordance with the selected assortment rule. If vacant space would remain after applying the assortment rule selected at step 3206 ("YES" at step 3208), then process 3200 proceeds by reverting to 3202 to identify a plurality of possible rearrangements based on the vacant space remaining after the assortment rule selected at 3206 is applied. Process 3200 may then repeat steps 3202 through 3208 until there is no vacant space remaining, until there are no assortment rules remaining, or until there the vacant space remaining is insufficient to allow application of additional assortment rules. At the end of process 3200, a recommendation is sent to a user, at step 3210, the recommendation comprising a rearrangement event recommending rearranging the plurality of products, shelves, or a combination thereof in accordance with the assortment rule or assortment rules selected at step 3206. It is, of course, possible to perform the steps of process 3200 in any order or in combination with any other process or method disclosed herein. The step of accessing assortment rules to determine a recommended rearrangement may be incorporated into other methods for determining possible rearrangements or may be performed in isolation.

Further, the method for processing images captured in a retail store may include generating a product-related task associated with an identified potential for product rearrangement. Further, the method for processing images captured in a retail store may include generating a visualization of a recommended rearrangement. For example, the product-related task may comprise a description of a preferred rearrangement of the products or shelves and a positioning of the additional products or shelves that may be added after the rearrangement. The visualization of a recommended rearrangement may include any diagram, map, description, schematic or other visual representation of a rearrangement. When multiple possible rearrangements are determined, the product-related task and visual representation of rearrangements may include a task and a representation of each possible rearrangement. The tasks or visualizations or both may be transmitted to a user by any means disclosed herein.

Further, the method for processing images captured in a retail store may include providing information to a user indicative of the identified vacant spaces. By way of example, method 3100 may include step 3118 for providing information relating to the method to a user. Similarly, method 3101 may include step 3128 for providing information relating to the method to a user. The information may include any data obtained during steps 3110 or 3120, such as a representation or description of the received image or any other data associated with the received image. The information may also include any data obtained during step 3112 or 3122, such as a representation or description of the products detected in the received image or any other data relating to the products. The information may also include data obtained during step 3114 or 3124, including data relating to the size, shape, orientation, or location of a vacant space or any other information relating to the identified vacant spaces, including an aggregate value of the vacant space as determined in step 3214 of process 3201 or step 3224 of process 3203. The information may also include any data relating to step 3116 or 3126, including any data relating to a determination that an additional product or shelf may be displayed if a rearrangement occurs and data relating to the rearrangement. As discussed above, other processes, such as process 3200, process 3201, or process 3203 may be included in method 3100 or method 3101, in which case, any data relating to processes 3200, 3201, 3203 may also be included in the information. The information may also include any product-related tasks or visualizations of recommended rearrangements generated during any of method 3100, method 3101, process 3200, process 3201, or process 3203.

Consistent with the present disclosure, a computer program product for processing images captured in retail stores embodied in a non-transitory computer-readable medium and executable by at least one processor is disclosed. The computer program product may include instructions for causing the at least one processor to execute a method consistent with the above disclosure. For example, the computer program product may be configured to perform all or a portion of method 3100, method 3101, process 3200, process 3201, process 3203, or a combination thereof.

The present disclosure provides systems and methods for automatic prioritization of shelf-oriented tasks based on processor-based image analysis of images captured by one or more cameras or image capture devices. More specifically, the present disclosure relates to systems, methods, and computer product programs for processing images captured in a retail store and automatically addressing detected conditions within the retail store. The systems, methods, and computer product programs for processing images captured in a retail store and automatically addressing detected conditions within the retail store may be implemented in system 100 for analyzing information collected from retail stores 105 discussed above. Additionally, the systems, methods, and computer product programs for processing images captured in a retail store and automatically addressing detected conditions within the retail store may utilize image processing unit 130, server 135, database 140, network 150, and processing device 202, as described above.

Figure 33:
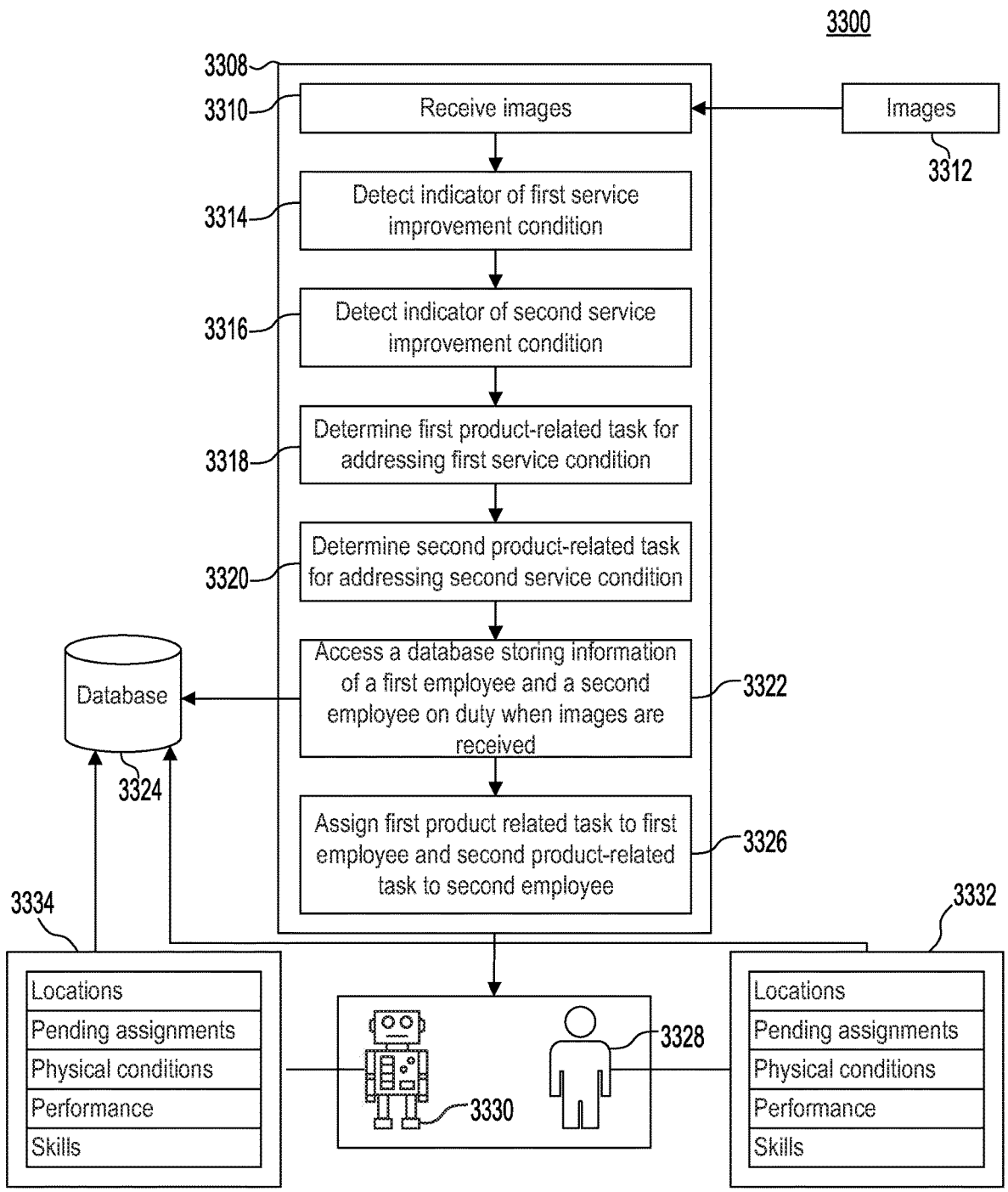
FIG. 33 illustrates an exemplary system for processing images captured in a retail store and automatically addressing detected conditions within the retail store.

FIG. 33 illustrates an exemplary system 3300 for processing images captured in a retail store and automatically addressing detected conditions within the retail store. System 3300 may include an imaging processing unit 130 (illustrated in FIG. 1) to execute the analysis of images captured by the one or more capturing devices (e.g. capturing devices 125). Image processing unit 130 may include a server 135 operatively connected to a database 140.

In some embodiments, processing device 202 included in server 135 (as described above with relation to FIG. 2) may be configured to execute a plurality of steps 3308, as will be discussed in further detail below.

In accordance with the present disclosure, a system for processing images captured in a retail store and automatically addressing detected conditions within the retail store is disclosed. The system may include at least one processor configured to receive a plurality of images captured from one or more retail stores. In some examples, the plurality of images may depict a plurality of products displayed on a plurality of store shelves. The system may process images captured in one or more retail stores and automatically address detected conditions within the one or more retail stores (e.g. retail stores 105A, 105B, 105C). The plurality of images may be captured by a user (e.g. user 120) and/or by a capturing device (e.g. capturing device 125). Processing device 202 may be configured to execute steps 3308 including step 3310 where server 135 receives a plurality of images 3312 captured from one or more retail stores. Images 3312 may depict a plurality of products displays on a plurality of store shelves.

In accordance with embodiments of the present disclosure, the at least one processor may be configured to detect in the plurality of images an indicator of a first service-improvement condition (for example, a first service-improvement condition relating to the plurality of products) and detect in the plurality of images an indicator of a second service-improvement condition (for example, a second service-improvement condition relating to the plurality of products). In some embodiments, the types of outputs that image processing unit 130 can generate may include indicators of service-improvement conditions (e.g., a cleaning event, a restocking event, a rearrangement event, an occlusion event, etc.), various reports indicative of the performances of retail stores 105, and so forth. A service-improvement condition may include any condition or state of an environment (e.g., a retail store environment) in which at least one aspect of the environment differs from a desired or specified state of the environment. According to embodiments of this disclosure, the first service-improvement condition and the second service-improvement condition each may include at least one of: a need for cleaning, a need for product restocking, a need for product rearrangement, a need for product re-orienting, a need for product recall, a need for labeling, a need for updated pricing, a promotion-related need, an identified misplaced product, and an occlusion event. In some examples, service improvement conditions may be detected by analyzing one or more images depicting the service improvement conditions and/or by analyzing readings from detection elements attached to store shelves as described above. In some examples, image data and/or readings from the detection elements may be analyzed to detect the service improvement conditions, for example using machine learning models trained using training examples to detect service improvement conditions, using an artificial neural network configured to detect service improvement conditions, and so forth. For example, a cleaning event may be detected when a spill, break, etc. appears in the plurality of images. In another example, a restocking event may be detected when a part of a shelf is determined to be empty, when an amount of products on a part of a shelf is determined to be below a threshold associated with the part of the shelf and/or with the product type of the products (for example, according to a planogram), and so forth. In yet another example, a rearrangement event may be detected when an item or items are out of planogram compliance, when products are out of or near out of shelf, when facings of a product are below a desired requirement (for example, according to a planogram), among others. In another example, a need for product re-orienting may be detected when products are detected to be in an undesired orientation, as described above. In yet another example, a need for labeling may be detected when a label is missing, when a label is inaccurate, when pricing is inaccurate, when intended promotions are absent, and so forth. In another example, a need for product recall may be detected when products of a specific product type are identified in the retail store, when there is an indication that the specific product type should not be in the retail store (for example, according to the retail store's master file, according to a recall indication received from a supplier, and so forth). In yet another example, a need for updated pricing may be detected when a price associated with a product as identified in the image data (for example, by determining price information on a label associated with the product as described above) differs from a price associated with the product in a pricing database. In another example, a promotion-related need may be detected, for example, when a promotion that is not supposed to be in the store (for example, according to promotions database) is identified in the image data (for example, as a label depicting information associated with the promotion, a stand, a discount, and so forth), when a promotion that is supposed to be in the store (for example, according to promotions database) is not identified in the image data, when details of a promotion identified in the retail store differs from the details of the promotion according to a promotions database, and so forth. In yet another example, a misplaced product and/or an occlusion event may be detected as described above. In some embodiments, indications of service improvement conditions may be received from other systems. For example, an indication of a need for product recall may be received from a retail chain system, in response to an update to the retail store's master file, and so forth. In another example, an indication of a need for updated pricing may be received in response to a change of price in a pricing database. In yet another example, an indication of a promotion-related need may be received in response to a change in promotion policy of a retail store, a retail chain, a supplier, etc., for example as recorded in a promotions database. In another example, an indication of a service improvement condition may be received from users, such as store employees, customers, and so forth. Processing device 202 may be configured to execute step 3314 to detect an indicator of a first service-improvement condition and execute step 3316 to detect an indicator of a second service-improvement condition, for example to execute step 3314 to detect an indicator of a first service-improvement condition relating to a plurality of products and execute step 3316 to detect an indicator of a second service-improvement condition relating to the plurality of products. The first service-improvement condition and the second service-improvement condition may be service improvement conditions of different types or service-improvement condition of the same type. In a non-limiting example, the first service-improvement condition may be a cleaning event while the second service-improvement condition may be a restocking event. In another non-limiting example, the first and second service-improvement events may be occlusion events.

The at least one processor may detect an indicator of a service-improvement condition using various techniques. In one example, the at least one processor may analyze images captured by cameras (e.g., capturing devices 125) to detect at least one indicator of a service-improvement condition. Captured images may be analyzed to determine product placement characteristics (e.g., rotational orientation about one or more axes, product facing orientation, product packing density, product similarity to surrounding products, etc.) in order to detect whether a product is placed on a shelf properly or as intended, whether a product complies with a specified planogram, whether undesirable or unintended empty space exists in a product area (e.g., suggesting a need for restocking), whether a product is misplaced and needs to be repositioned among like products, etc. Captured images may also be analyzed to determine the presence of spills, broken containers, soiled floors, soiled products or product areas, etc.

Such conditions may be recognized based on predetermined algorithms for monitoring characteristics of products captured in an image or for monitoring a physical status of shelves, floors, ceilings, or other physical infrastructure in an environment. In one example, edges of products, such as a certain type of canned good item, may be detected through image analysis (e.g., using pixel comparison techniques, etc.). Bounding boxes may be defined relative to areas of a captured image determined to represent each canned good product. Minor and major axes may be assigned, and an orientation of the canned good item (e.g., whether the item is standing upright or resting on its side) may be determined. Spacing between the detected products may be determined. OCR techniques or text-identification techniques may be employed relative to captured images to identify labels of products and to determine a rotational orientation of the products based on detected, exposed text. Unexpected color variation detected on a floor of an environment (e.g., through pixel comparison techniques) may indicate the presence of a spill. Multiple other algorithms may be employed for detecting indicators of service-improvement conditions expected in a particular type of environment, such as a retail environment.

Additionally or alternatively, trained machine learning systems may also be employed to identify indicators of service-improvement conditions. For example, a machine learning model may be trained based on training images of various conditions. Training the system, for example, using reward functions and predetermined conditions represented in a series of images, may enable the system to "learn" about those conditions and correctly identify such conditions in practice, even where an encountered condition does not exactly match or resemble a condition on which the system was trained.

In accordance with embodiments of the present disclosure, the at least one processor may be configured to determine a first product-related task for addressing the first service-improvement condition and determine a second product-related task for addressing the second service-improvement condition. In some embodiments, the product related tasks may be associated with the detected service-improvement conditions. For example, a cleaning task may be generated in response to a detected condition indicative of a need for cleaning; a restocking task may be generated in response to a detected condition indicating that one or more products needs restocking; a rearrangement task may be generated in response to a detected condition indicating that one or more products are misplaced, misarranged, or otherwise out of compliance with a predetermined planogram, etc.; and an occlusion removal task may be generated in response to a detected occlusion event where one or more products is blocked from view of a customer or a camera, etc. Additional non-limiting examples of product-related tasks may include cleaning, restocking shelves, restocking displays, rearranging shelves or displays according to planograms, returning misplaced product to the correct shelf or display, re-orienting products to have a desired orientation, removing products from the store (e.g. expired products, products that are no longer sold in the store, in response to a product recall, etc.), labeling, relabeling, or removing labels of products, shelves, or displays, pricing or re-pricing of products, positioning or re-positioning, removing displays, shelf units, or promotion signs, removing occlusions that prevent stationary cameras from monitoring products, shelves, or displays, removing occlusions that prevent customers from seeing and/or accessing products, shelves, or displays, removing occlusions that prevent robots from traveling within the store, assisting customers, manning positions such as a checkout station, a promotional display, etc., ordering supply (e.g. for out of stock or near out of stock products), among others.

Processing device 202 may be configured to execute step 3318 to determine a first product related task for addressing the first service-improvement condition and step 3320 to determine a second product related task for addressing the second service-improvement condition. As discussed above, the first service-improvement condition and the second service-improvement condition may be service improvement conditions of different types or service-improvement condition of the same type. Accordingly, the first product related task and the second product related task may be different product related tasks or the same product related task. In a non-limiting example, the first service-improvement condition may be a cleaning event, and the first product related task may be a cleaning task while the second service-improvement condition may be a restocking event, and the second product related task may be a restocking task.

In accordance with embodiments of the present disclosure, the at least one processor may be configured to access a database storing information indicative of a first employee and a second employee on duty during a time interval over which the plurality of images was received. Processing device 202 may be configured to execute step 3322 to access a database 3324 that stores employee information, which in some examples may include employee schedules and/or real-time updates of on-duty employees. Database 3324 may include time data associated with employees who are on-duty, and processing device 202 may use this time data to determine that at least a first employee 3328 and a second employee 3330 are on duty during the time interval over which the plurality of images was received and/or at another desired time point and/or at another desired time interval. First employee 3328 may have employee data 3332 and second employee 3330 may have employee data 3334, the employee data 3332 and 3334 may be shared with and stored in database 3324.

In accordance with embodiments of the present disclosure, the at least one processor may be configured to assign the first product-related task to the first employee and assign the second product-related task to the second employee. Processing device 202 may be configured to execute step 3326 to assign a first product related task to first employee 3328 and the second product related task to second employee 3330. Although first employee 3328 is illustrated as a human and second employee 3330 is illustrated as a robot, first employee 3328 and second employee 3330 may each be human or robot. Accordingly, both first employee 3328 and second employee 3330 may be robot concurrently or human concurrently.

In accordance with the present disclosure, when the first service-improvement condition and the second service-improvement condition include identified misplaced products, the at least one processor may be configured to assign the first product-related task to the first employee and the second product-related task to the second employee based on product categories associated with the identified misplaced products. Accordingly, product categories may be identified by analyzing the images, by the location of the shelf, using a planogram, applying a product model, etc. as described above. Processing device 202 may be configured to execute steps 3318 and 3320 to determine the first and second product related tasks, respectively. Processing device 202 may also be configured to execute step 3326 to assign the first product related task to first employee 3328 and the second product-related task to second employee 3330 based on the product categories identified with relation to the identified misplaced products. For example, some product categories may require a human employee, a robotic employee, a stronger employee, a smaller employee, etc. In some examples, first employee 3328 may have an expertise in a first product category, while second employee 3330 may not have expertise in the first product category or may have a lesser level of expertise in the first product category. Further, the first service-improvement condition may be connected to products of the first product category, while the second service-improvement condition may not be connected to products of the first product category or may have a lesser degree of connection to products of the first product category. In response, the first product-related task may be assigned to the first employee while the second product-related task may be assigned to the second employee. Some examples of service-improvement conditions connected to products of a first product category may include misplaced product of a first product category, misplaced product placed on a shelf associated with the first product category, restocking and/or rearrangement of products and/or shelf associated with the first product category, modifying or removing or placing labels associated with the first product category, changing price of products of a first product category, and so forth. The expertise of an employee in a first product category may be determined by accessing employee data (such as skills recorded in employee data 3332 and 3334), analyzing past performances of the employee in past tasks related to the first product category (for example, performances recorded in employee data 3332 and 3334), analyzing past image data to determine the past performances of the employee in past tasks related to the first product category, and so forth. In some examples, first employee 3328 may have higher physical abilities compared to second employee 3330, for example as recorded in employee data 3332 and 3334. Further, the first service-improvement condition may be connected to products of the first product category associated with heavier weight than a second product category, and the second service-improvement condition may be connected to products of the second product category. In response, the first product-related task may be assigned to the first employee while the second product-related task may be assigned to the second employee.

In accordance with embodiments of the present disclosure, when the first service-improvement condition and the second service-improvement condition are occlusion events, the at least one processor may be configured to assign the first product-related task to the first employee and the second product-related task to the second employee based on occlusion categories associated with the occlusion events. Processing device 202 may be configured to execute steps 3318 and 3320 to determine the first and second product related tasks are respective occlusion events. Processing device 202 may be configured to execute step 3326 to assign the first product related task to first employee 3328 and the second product-related task to second employee 3330 based on the occlusion categories assigned to the occlusion events. For example, some occlusion categories may require a human employee, a robotic employee, a stronger employee, a smaller employee, etc. In some examples, first employee 3328 may have higher physical abilities compared to second employee 3330, for example as recorded in employee data 3332 and 3334. Further, the first service-improvement condition may be connected to occlusion event of the first occlusions category associated with heavier weight than a second occlusions category, and the second service-improvement condition may be connected to occlusion event of the second occlusions category. In response, the first product-related task may be assigned to the first employee while the second product-related task may be assigned to the second employee.

In accordance with some embodiments of the present disclosure, when the first service-improvement condition is a need for cleaning, and the second service-improvement condition is a need for product rearrangement, the at least one processor may be configured to assign the first product-related task to a robot employee and assign the second product-related task to a human employee. Processing device 202 may be configured to execute steps 3314 and 3316 to determine the first service-improvement condition is a need for cleaning and second service-improvement condition is a need for product rearrangement. Processing device 202 may be configured to execute step 3326 to assign the first product related task to a robot employee and the second product-related task to a human employee. In some cases, such assignments may be based on the perceived capabilities of individuals available to assist. For example, a robot unit may be more efficient at removing a spill than, for example, rearranging a group of products according to a planogram—a task that may require more dexterity and problem-solving skills than may be available from certain robotic units.

According to embodiments of this disclosure, when the first employee is a robot employee, the at least one processor may be further configured to determine that the first service-improvement condition can be resolved by the robot employee, before assigning the first product-related task to the first employee. Accordingly, processing device 202 may access the capabilities (e.g. performance, skills) from the employee information 3334 via database 3324 to ensure the robot employee is capable of resolving the first service-improvement condition by completing the first product-related task. Such an approach may increase efficiency and maximize robot resources by first checking to determine if a robot unit is available that can complete a required task before assigning the task to a human employee. In accordance with the present disclosure, the at least one processor may be further configured to obtain data indicative of a current physical condition of the robot employee for determining that the first service-improvement condition can be resolved by the robot employee. Accordingly, processing device 202 may access the physical conditions (e.g. battery charge, remaining supplies, level of remaining cleaning liquid, dexterity capability, mobility range, etc.) from the employee information 3334 via database 3324 to ensure the robot employee is capable of resolving the first service-improvement condition by completing the first product-related task.

According to embodiments of this disclosure, the at least one processor may be further configured to receive location data indicative of current locations of the first employee and the second employee within the retail store, and assign the first product-related task to the first employee and the second product-related task to the second employee based on the received location data and identified locations of the first service-improvement condition and the second service-improvement condition. Accordingly, processing device 202 may access the location data from the employee information 3332, 3334 via database 3324 at step 3322 to execute step 3326 to assign the first product-related task to the first employee and the second product-related task to the second employee based on the received location data and identified locations of the first service-improvement condition and the second service-improvement condition. For example, based on a captured image indicating a service-improvement condition, the at least one processor may determine a location in an environment of the service-improvement condition (e.g., based on a known location of a camera that capture the image).

The processor may determine locations of store employees or assets, for example, based on captured image data from one or more image capture devices, based on tracked RFID tags, based on images from overhead cameras, based on GPS tracking applications, based on a database lookup, or based on any other suitable techniques for monitoring employee location within an environment. The processor may use the location information in assigning product-related tasks. For example, the processor may determine locations of the various available employees relative to the determined locations of the detected service-improvement conditions. Based on these determinations, the processor may schedule product related tasks among the available employees to reduce or eliminate inefficiencies in addressing the product related tasks. For example, the processor may determine that a first employee is closer to a first service-improvement condition than to a second service-improvement condition. As a result, the first employee may be assigned a product related task associated with the first service-improvement condition. The processor may also determine that a second employee is closer to the second service-improvement condition than to the first service improvement condition. In response, the processor may assign a product related task associated with the second service-improvement condition to the second employee. In some cases, the processor may determine that the first employee is closer than a second employee to a first detected service-improvement condition. As a result, the first employee, rather than the second employee, may be assigned a product related task to address the first service-improvement condition. Various other location based metrics may also be used in scheduling product-related tasks relative to available employees or robotic assets.

In accordance with the present disclosure, the at least one processor may be further configured to access pending assignment data indicative of product-related tasks assigned to the first employee and the second employee, and assign the first product-related task to the first employee and the second product-related task to the second employee based on at least one pending product-related task previously assigned to the first employee and at least one pending product-related task previously assigned to the second employee. Accordingly, processing device 202 may access the pending assignments data from the employee information 3332, 3334 via database 3324 at step 3322 to execute step 3326 to assign the first product-related task to the first employee and the second product-related task to the second employee. The assignments may be based on employee availability indicators, such that each product related task is assigned to the next available employee from a list of available employees. As an additional layer, employee proximity to the location of a service-improvement may also be taken in account, as described above. If there are not enough available employees to address all service-improvement conditions, the product related tasks may be scheduled based on the types of pending product related tasks assigned to an employee and/or based on the status of pending product related tasks assigned to an employee. For example, the processor may access a database to determine that a first employee has been assigned a product-related task having a shorter expected completion time than a product-related task assigned to a second employee. Based on that information, the processor may determine when each of the first and second employees is expected to become available (e.g., by accessing a database indicating when the employees were assigned the respective product-related tasks, when the employees arrived on site to the service-related conditions associated with the pending tasks, the expected completion times of the pending tasks, current status update information input by the employees during completion of the pending product-related tasks, etc.). The at least one processor may then assign new product-related tasks to employees based on an estimate of when those employees will become available after completion of their pending product-related tasks.

The processor may also pull one or more employees from their currently assigned product-related tasks and re-assign those employees to new product-related tasks. The new assignments, for example, may be made based on a determination that a new product-related task has a higher priority than a product-related task being addressed by an employee. In one example, an employee may be working on restocking canned goods on a certain shelf in response to a service-improvement condition indicating that the shelf contained fewer than a planogram-specified minimum number of products or minimum product density, etc. While the employee is restocking the shelf another service-improvement condition may be detected. The new service-improvement condition may involve a glass jar of pasta sauce that has fallen from the shelf and broken within an aisle. The processor may determine (e.g., based on a predetermined, stored hierarchy of expected service-improvement conditions) that required clean-up of the broken pasta jar is more important to complete than restocking of canned goods on a shelf. As a result, the processor may issue an instruction for the employee working on the restocking task to suspend that task and go to the aisle to complete the new task of cleaning up the broken jar of pasta sauce. Upon completion of the new clean-up task, the employee may be reassigned to complete the task of restocking the shelf.

An assignment list for each employee may be updated based on newly received service-improvement condition information. For example, as outlined in the example above, an employee may be pulled from an ongoing product-related task in order to address a higher priority task. Additionally, a list of pending product-related task assignments for an employee may be automatically ordered according to priority levels associated with the respective service improvement conditions. Thus, as new service-improvement conditions are detected, the corresponding product-related tasks need not be simply appended to the end of a task list for an employee (assuming no other employees are available or able to take on the new task). Rather, each new product-related task may be inserted into a pending assignment list for an employee based on its priority. As a result, an employee may address the highest priority tasks first before moving on to lower priority tasks.

In accordance with embodiments of the present disclosure, the at least one processor may be further configured to access employment data indicative of skill sets associated with each of the first and second employees, and assign the first product-related task to the first employee and the second product-related task to the second employee based on the skill sets of the first employee and the second employee and a type of the first service-improvement condition and a type of the second service-improvement condition. For example, processing device 202 may access skill sets data from the employee information 3332, 3334 via database 3324 at step 3322 to execute step 3326 to assign the first product-related task to the first employee and the second product-related task to the second employee based on the skill sets of the first employee the second employee, and based on the type of first service-improvement condition and the type of the second service-improvement condition. In a non-limiting example, processing device 202 may be configured to execute steps 3314 and 3316 to determine the first service-improvement condition is a need for cleaning and second service-improvement condition is a need for product rearrangement. Processing device 202 may be configured to execute step 3326 to assign the first product related task to a robot employee and the second product-related task to a human employee based on the skill sets of the respective employees.

According to embodiments of the present disclosure, the at least one processor may be further configured to access employment ranking data associated with past performances of the first employee and the second employee and assign the first product-related task to the first employee and the second product-related task to the second employee based on the employment ranking data. For example, processing device 202 may access the performance data from the employee information 3332, 3334 via database 3324 and determine an employment ranking based on the performance data at step 3322 to execute step 3326 to assign the first product-related task to the first employee and the second product-related task to the second employee based on the employment ranking data acquired from the performance data of the first employee the second employee.

According to some embodiments of this disclosure, the at least one processor may be further configured to determine prioritization of the first product-related task and the second product-related task based on urgency of the first service-improvement condition and the second service-improvement condition, and assign the first product-related task to the first employee and the second product-related task to the second employee based on the determined prioritization of the first product-related task and the second product-related task. Processing device 202 may analyze the urgency of the first service-improvement condition and the second service-improvement condition before assigning the first product related task and second product related task at step 3326. In a non-limiting example, the processing device 202 may determine the first service-improvement condition is more urgent than the second service-improvement condition and may access the location data from the employee information 3332, 3334 via database 3324 and determine the employee that is closest in proximity to the first service-improvement condition to expedite the resolution of the first product-related task. In another non-limiting example, the processing device 202 may also prioritize the service-improvement conditions based on importance of the at least two service-improvement events. In such a case, a need for cleaning near a high traffic area of the store (e.g. the cashier) may be more important than a need for cleaning in a lower-traffic area of the store (e.g. near the bathroom).

In accordance with embodiments of this disclosure, the at least one processor may be further configured to, after assigning the first product-related task to the first employee first, analyze the plurality of images to determine that there is a need for a third product-related task to resolve a third service-improvement condition. Based on the plurality of images, the at least one processor may be configured to determine that the third service-improvement condition is more urgent than the first service-improvement condition and assign the third product-related task to the first employee and inform the first employee that the third product-related task has priority over the first product-related task. Processing device 202 may analyze the urgency of the first service-improvement condition and the third service-improvement condition after assigning the first product related task at step 3326 and determine the third service-improvement condition is more urgent than the first service-improvement condition. Accordingly, the processing device 202 may assign the third product-related task to the first employee and inform the first employee that the third product-related task has priority over the first product related task. In such a case, the first product related task may be shifted into the first employee's pending assignments of the employee data 3332.

In accordance with the present disclosure, the at least one processor may be further configured to analyze the plurality of images to determine that the first service-improvement condition had been resolved prior to the arrival of the first employee and inform the first employee that the first product-related task has been cancelled. Processing device 202 may continuously analyze the plurality of images and/or to continuously receive real-time images 3312 at step 3310. Processing device 202 may determine the first service-improvement condition previously detected at step 3314 has been resolved before the first employee arrives at the first service-improvement (for example, by an action of another employee, by an action of a customer, and so forth). Processing device 202 may inform the first employee that the first product-related task has been cancelled. According to embodiments of this disclosure, the at least one processor may be further configured to: analyze the plurality of images to identify that the first product-related task has been completed by the first employee, and update a repository of product-related tasks associated with the first employee based on the identification of the completion of the first product-related task. For example, processing device 202 may update the pending assignments of the employee data 3332 to remove the first product-related task. In another example, performance records in the employee data 3332 may be updated to include the completed task. It should be noted that communications with employees (e.g., for purposes of assigning tasks, directing employees to locations of service-improvement conditions, re-assigning employees to new, higher priority tasks, cancelling tasks, etc.) may be accomplished via any suitable techniques. Such techniques may include audio instructions delivered, e.g., via a wireless earpiece; visual instruction, e.g., delivered via AR glasses, etc.; visual instructions delivered via one or more mobile devices (e.g., smartphones, tablets, etc.); machine instructions (e.g., control signals) delivered to robotic units via a wireless communication link, or any other mode of communication with employees.

According to some embodiments of this disclosure, the at least one processor may be further configured to analyze the plurality of images to automatically determine a performance quality level associated with the completion of the first product-related task; and update a performance record associated with the first employee based on the determined performance quality level. Processing device 202 may analyze the plurality of images 3312 after the first product-related task has been completed and determine a performance quality level associated with the task. The performance quality level may be determined based on the completeness of the product-related task. Non-limiting examples include: whether upon completion of a task there is a remaining need for cleaning, remaining need for product restocking, remaining need for product rearrangement, remaining need for product re-orienting, remaining need for product recall, remaining need for labeling, remaining need for updated pricing, remaining promotion-related need, remaining identified misplaced product, remaining occlusion event, lack of planogram compliance, time to completion of the task, among others. The performance quality level may be added to the performance record of the employee and the performance record in the employee data 3332 and/or 3334 may be updated with each task performed.

Figure 34:
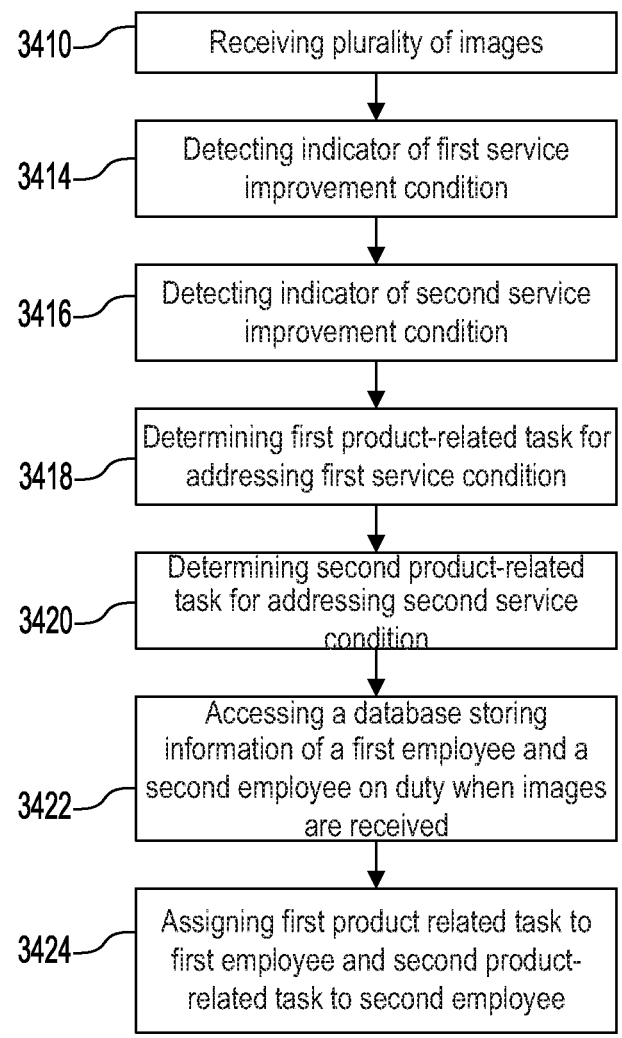
FIG. 34 illustrates an exemplary method for processing images captured in a retail store and automatically addressing detected conditions within the retail store.

FIG. 34 illustrates an exemplary method 3400 for processing images captured in a retail store and automatically addressing detected conditions within the retail store. In some embodiments, method 3400 may be executed by one or more processors (e.g. processing device 202).

In accordance with the present disclosure, a method for processing images captured in a retail store and for automatically addressing detected conditions within the retail store is provided. The method may include receiving a plurality of images depicting a plurality of products displayed on a plurality of store shelves (step 3410) and detecting in the plurality of images an indicator of a first service-improvement condition relating to the plurality of products and detecting in the plurality of images an indicator of a second service-improvement condition relating to the plurality of products (step 3414). Processing device 202 may be configured to execute step 3414 to detect an indicator of a first service-improvement condition relating to a plurality of products and step 3416 to detect an indicator of a second service-improvement condition relating to the plurality of products. The first service-improvement condition and the second service-improvement condition may be different service improvement conditions or the same service-improvement condition relating to the plurality of products. In a non-limiting example, the first service-improvement condition may be a cleaning event while the second service-improvement condition may be a restocking event. In another non-limiting example, the first and second service-improvement events may be occlusion events.

In accordance with embodiments of the present disclosure, the method may include determining a first product-related task for addressing the first service-improvement condition and determining a second product-related task for addressing the second service-improvement condition (steps 3418 and 3420). In some embodiments, the product related tasks may be associated with the service-improvement conditions. For example, a cleaning task may be the product related task associated with a cleaning event, a restocking task may be the product related task associated with a restocking event, a rearrangement task may be the product related task associated with a rearrangement event, and an occlusion removal task may be the product related task associated with an occlusion event.

In accordance with embodiments of the present disclosure, the method may include accessing a database storing information indicative of a first employee and a second employee on duty during a time interval over which the plurality of images was received (step 3422). Processing device 202 may be configured to execute step 3422 to access a database (e.g. database 3324) that stores employee information including employee schedules and real-time updates of on-duty employees. The database may include time data associated with employees who are on-duty that allows the processing device 202 to determine at least a first employee (e.g. first employee 3328) and a second employee (e.g. second employee 3330) on duty during the time interval over which the plurality of images was received.

In accordance with embodiments of the present disclosure, the method may include assigning the first product-related task to the first employee and assigning the second product-related task to the second employee (step 3424). Processing device 202 may be configured to execute step 3424 to assign a first product related task to the first employee and the second product related task to the second employee.

In accordance with the present disclosure, when the first service-improvement condition and the second service-improvement condition include identified misplaced products, the method may include assigning the first product-related task to the first employee and the second product-related task to the second employee based on product categories associated with the identified misplaced products. Accordingly, product categories may be identified by analyzing the images, by the location of the shelf, using a planogram, applying a product model, etc. as described above. Processing device 202 may be configured to execute steps 3418 and 3420 to determine the first and second product related tasks, respectively.

Figure 35:
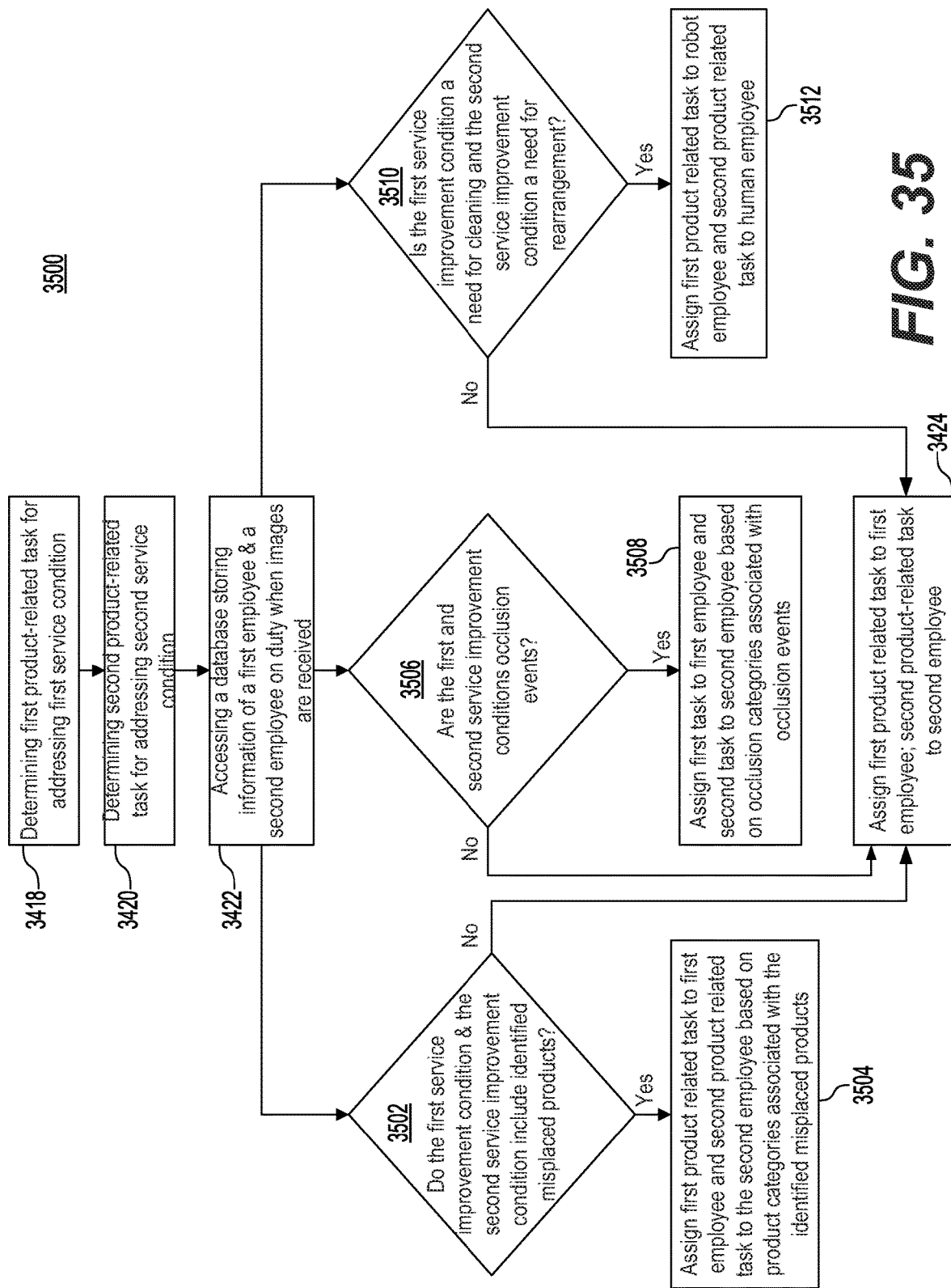
FIG. 35 illustrates an exemplary method for processing images captured in a retail store and automatically addressing detected conditions within the retail store.

FIG. 35 illustrates an example method 3500 for assigning product-related tasks to employees. For example, method 3500 may follow steps 3418, 3420, and 3422 as described above relative to FIG. 34. According to method 3500, processing device 202 may be configured to execute step 3502 to determine if the first service improvement condition and the second improvement condition include identified misplaced products and to execute step 3504 to assign the first product related task to the first employee and the second product-related task to the second employee based on the product categories assigned to the identified misplaced products. For example, some product categories may require a human employee, a robotic employee, a stronger employee, a smaller employee, etc. If the first service improvement condition and the second improvement condition do not include identified misplaced products, the method continues to step 3424 to assign a first product related task to the first employee and the second product related task to the second employee.

According to some embodiments of the present disclosure, when the first service-improvement condition and the second service-improvement condition are occlusion events, the method may include assigning the first product-related task to the first employee and the second product-related task to the second employee based on occlusion categories associated with the occlusion events. Processing device 202 may be configured to execute steps 3418 and 3420 to determine the first and second product related tasks. Processing device 202 may be configured to execute step 3506 to determine if the first and second service-improvement conditions are occlusion events. If the first and second service-improvement conditions are occlusion events, processing device 202 may execute step 3508 to assign the first product related task to the first employee and the second product-related task to second employee based on the occlusion categories assigned to the occlusion events. For example, some occlusion categories may require a human employee, a robotic employee, a stronger employee, a smaller employee, etc. If the first service improvement condition and the second improvement condition do not include occlusion events, the method continues to step 3424 to assign a first product related task to the first employee and the second product related task to the second employee.

When the first service-improvement condition is a need for cleaning and the second service-improvement condition is a need for rearrangement, the method may further include assigning the first product-related task to a robot employee and assigning the second product-related task to a human employee. Processing device 202 may be configured to execute steps 3314 and 3316 to determine the first service-improvement condition and the second service-improvement condition. Processing device 202 may be configured to execute step 3510 to determine whether the first service-improvement condition is a need for cleaning and the second service-improvement condition is a need for product rearrangement. Processing device 202 may be configured to execute step 3512 to assign the first product related task to a robot employee and the second product-related task to a human employee. If the first service improvement condition is not a need for cleaning and the second improvement condition is not a need for product rearrangement, the method continues to step 3424 to assign a first product related task to the first employee and the second product related task to the second employee.

According to some embodiments of this disclosure, when the first employee is a robot employee, the method may include obtaining data indicative of a current status of the robot employee for determining that the first service-improvement condition can be resolved by the robot employee, and based on the obtained data, determining that the first service-improvement condition can be resolved by the robot employee, before assigning the first product-related task to the first employee. Processing device 202 may access the capabilities (e.g. performance, skills)(e.g. from the employee information 3334 via database 3324) to ensure the robot employee is capable of resolving the first service-improvement condition by completing the first product-related task. Processing device 202 may also access the physical conditions (e.g. battery charge, remaining supplies, level of remaining cleaning liquid) to ensure the robot employee is capable of resolving the first service-improvement condition by completing the first product-related task before assigning the first-product related task to the first employee.

According to embodiments of this disclosure, a computer program product for processing images captured in a retail store and for automatically addressing detected conditions within the retail store is provided. The computer program product may be embodied in a non-transitory computer-readable medium and being executable by at least one processor. The computer program product for processing images captured in a retail store and automatically addressing detected conditions within the retail store may be implemented, for example in system 100, for analyzing information collected from retail stores 105 discussed above. Additionally, the systems, methods, and computer product programs for processing images captured in a retail store and automatically addressing detected conditions within the retail store may utilize image processing units 130, servers 135, databases 140, 3324, network 150, and processing device 202 as described above. The computer program product may include instructions for causing the at least one processor (e.g. processing device 202) to execute any or all of the method steps described above.

According to some embodiments of the present disclosure, systems 100, 3300 may further rely on: manual input (e.g. from a user such as a shift manager), inventory information (e.g. from backroom or nearby warehouses), pricing database, promotions database, planograms, store master file (catalog), checkout information (such as sales and/or returns), calendar (e.g. predicting demand based on calendar events and rearranging shelves accordingly), employee records (e.g. past performance records, expertise, etc.), shifts roster, and opening hours information. Additional inputs may be from pressure sensors and/or light sensors and may be used in tasks creation, monitoring, and performance quality ranking.

In some embodiments, the task may become redundant without an action from the employee. For example, an action of a customer may solve an issue (as described above) or render the problem irrelevant. In other cases, a task may change due to an action of a customer. The system may identify such cases and delete tasks/update tasks/reprioritize tasks accordingly.

Consistent with the present disclosure, the system may analyze images to determine tasks associated with shelves, assign the tasks to employees (and optionally prioritizing the tasks); and to monitor the execution of the tasks by analyzing images of the shelves. Optionally, the system may rank employees based on their performances, and/or assign tasks based on employees past performances.

In some embodiments, images may be analyzed to identify tasks associated with store shelves (for example, a first task associated with a first group of at least one store shelf and a second task associated with a second group of at least one store shelf). A database of store employees (for example, comprising at least a first employee and a second employee) may be accessed, and the tasks may be assigned to employees (for example, the first task may be assigned to the first employee and the second task may be assigned to the second employee). In some examples, the assignment of tasks to employees may be based on locations of the shelves associated with the tasks (for example, a location associated with the first group of at least one shelf and on a location associated with the second group of at least one shelf) and/or on locations associated with the plurality of store employees, for example, by preferring to assign the task associated with store shelves closer to an employee to the employee. In some examples, the assignment of tasks to employees is based on types of product associated with the tasks (for example, based on the types of product associated with the shelves that are associated with the task). For example, an employee may have an expertise related to some product types and/or a better past performances when dealing with some product types, and the system may prefer assigning tasks associated with those product types to that employee. In another example, tasks associated with product types that are more important and/or have more value to the store may be assigned to a more experienced employee and/or to an employee with better past performances. In some examples, the assignment of tasks to employees may be based on the types of tasks (for example, on a type of task associated with the first task and on a type of task associated with the second task). For example, an employee may have an expertise related to some types of tasks and/or a better past performances when dealing with some types of tasks, and the system may prefer assigning tasks of those types to that employee. In another example, tasks of a type that is more important and/or has more value to the store may be assigned to a more experienced employee and/or to an employee with better past performances. In some examples, the assignment of tasks to employees may be based on the plurality of tasks already assigned to employees (for example, on a first plurality of tasks already assigned to the first employee and on a second plurality of tasks already assigned to the second employee). For example, tasks that are more important and/or have more value to the store may be assigned to employee more available and/or predicted to get to the tasks sooner. In some examples, the assignment of tasks to employees may be based on past performances of the employees, for example, as described above. In some examples, the images may be analyzed to assign priorities to tasks (for example, a first priority to the first task and a second priority to the second task), and the assignment of tasks to employees may be based on the assigned priorities. In some examples, the images may be analyzed to prioritize the tasks assigned to an employee, and the prioritization of the tasks may be provided to the employee, for example, visually, textually, audibly, and so forth. In some examples, the images may be analyzed to identify a completion of the tasks. In some cases, a repository of tasks (that may be associated with employees) may be updated based on the identification of the completion of the first task. In some cases, the images may be further analyzed to determine a performance quality associated with the completed tasks, and a performances record associated with the employees may be updated based on the determined quality.

In some embodiments, recommended tasks may be selected to improve a scoring function, possibly under constraints related to possible arrangement of shelves, to price associated with different properties of shelves, to predict work time associated with the recommended tasks, and so forth.

According to some embodiments of the present disclosure, a system for processing images captured in a retail store is provided. The system may include at least one image sensor configured to capture at least one image of a plurality of products located on a plurality of store shelves, and at least one processing unit. The processing unit may be configured to analyze the at least one image to identify a first task associated with a first group of at least one shelf and a second task associated with a second group of at least one shelf; access a database of store employees comprising at least a first employee and a second employee; assign the first task to the first employee; and assign the second task to the second employee.

In some embodiments, the assignment of tasks to employees may be based on a location associated with the first group of at least one shelf and on a location associated with the second group of at least one shelf. The assignment of tasks to employees may be based on a location associated with the first store employee and on a location associated with the second store employee. The assignment of tasks to employees may be based on a type of product associated with the first group of at least one shelf and on a type of product associated with the second group of at least one shelf. The assignment of tasks to employees may be based on a type of the first task and on a type of the second task. The assignment of tasks to employees may be based on a first plurality of tasks already assigned to the first employee and on a second plurality of tasks already assigned to the second employee. The assignment of tasks to employees may be based on past performances of the first employee and on past performances of the second employee.

According to embodiments of this disclosure, the at least one processing unit may be further configured to analyze the at least one image to assign a first priority to the first task; analyze the at least one image to assign a second priority to the second task; and base the assignment of tasks to employees on the first priority and the second priority.

In some embodiments, the at least one processing unit may be further configured to: analyze the at least one image to identify a third task associated with a third group of at least one shelf; assign the third task to the first employee; analyze the at least one image to prioritize the first task and the third task; and provide the information associated with the prioritization to the first employee. The at least one processing unit may further configured to: analyze the at least one image to identify a completion of the first task. The at least one processing unit may be further configured to update a repository of tasks associated with the first employee based on the identification of the completion of the first task. The at least one processing unit may be further configured to analyze the at least one image to determine a performance quality associated with the first task and update a performances record associated with the first employee based on the determined quality.

In one embodiment, a monitoring system and method for identifying products in retail stores based on analysis of image data and for automatically generating performance indicators relating to the identified products is provided. In a retail store, a product may be offered in more than one position and location in the store. For example, the same product may be positioned on a regular shelf in a region corresponding to the category of the product but may also be present on a promotional shelf or a display presenting the product on sale. While an analysis of checkout and sales data may show the flow of products out of an entire store, this data may not provide information about the flow of products within the store itself. For example, when looking at sales data for a product that is placed on both a regular and promotional shelf, a user looking at overall sales data would not be able to determine whether more units of the product were sold from the promotional shelf or from the regular shelf, when those sales occurred, who was more likely to buy from one shelf or the other, etc.

Consistent with the disclosed embodiments, the system described herein may analyze images of the different positions in a retail store that hold the same product type to determine the flow of the product from different locations in the store. The flow of products may be associated with the different locations of the product in the store and may be automatically compared and/or analyzed to generate performance indicators and/or placement recommendations. For example, the system may determine the contribution or correlation of a specific product position within the store to sales, and may determine a recommendation (e.g., canceling or moving a display or shelving unit, enlarging or decreasing the viewing area of the shelving unit, and so forth) in order to increase product turnover. In some embodiments, future behavior of the inventory on the shelf and/or on the display may be predicted by the system.

Figure 36:
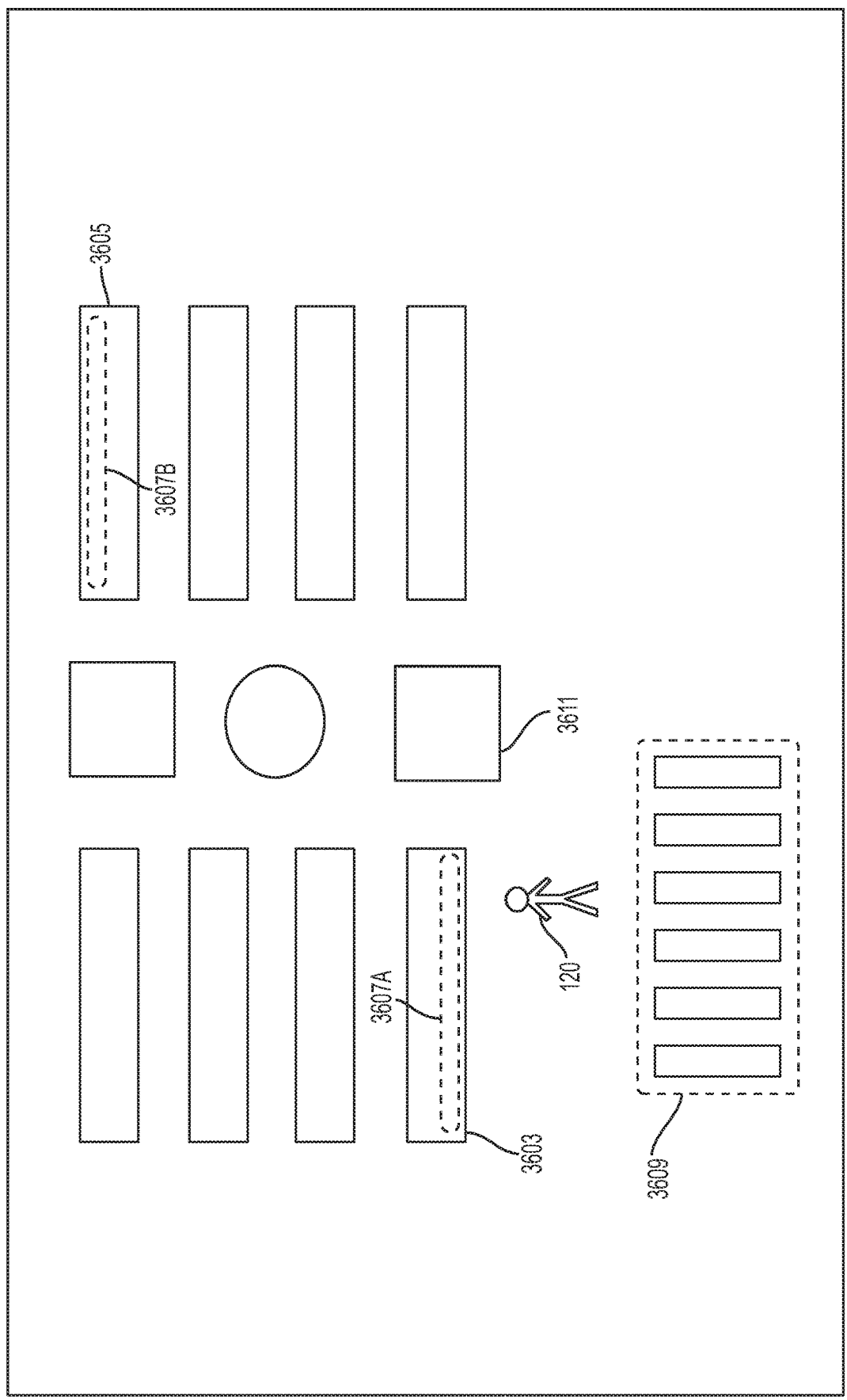
FIG. 36 is a diagrammatic illustration of an example configuration for the layout of a retail store, consistent with the disclosed embodiments.

FIG. 36 provides a diagrammatic illustration of an exemplary system environment 3600 for capturing image data (e.g., sets of images, video, information derived by analyzing images and/or video, etc.) from various locations in a retail store 3601 to determine product turnover data and associated performance indicators.

Consistent with the disclosed embodiments, the system may receive a first set of images (e.g., captured by any of the image capture devices described above) depicting a first plurality of products associated with selected product types (e.g., with a single product type, with a product category) displayed on a first shelving unit in a retail store. With reference to FIG. 36, a first shelving unit 3603 located in retail store 3601 may contain a first plurality of products 3607A. The system may analyze the first set of images of first shelving unit 3603 to determine first product turnover data associated with the first shelving unit 3603. For example, over a plurality of images, at least one processor may monitor events such as removal of a product from shelving unit 3603 (e.g., by a customer), restocking of the products on the shelves, etc. Based on one or more of the monitored events, the at least one processor may determine a rate at which the first plurality of products are removed from shelving unit 3603 for purchase. For example, the first set of images may be analyzed with a machine learning model trained using training examples to determine first product turnover data from a set of images. In another example, the first set of images may be analyzed with an artificial neural network configured to determine first product turnover data from a set of images.

In some embodiments, the plurality of products may be associated with a plurality of product types. For example, the plurality product types may correspond to a certain category of products. For example, in a grocery store, the category of products may include soft drinks; in an electronics store, the category of products may include cell phones; and so forth. In some cases, the plurality of product types may include a generic category of products (e.g., soft drinks, cereals, shampoos, produce, etc.). In other cases, the plurality of product types being monitored may correspond to a more particular category of products (e.g., bottled soft drinks, canned soft drinks, fruit yogurt, skim milk, etc.) In some embodiments, the plurality of products may be associated with a single product type, such as 16 oz. bottles of Coca Cola Zero, 1-gallon containers of skim milk, cherry tomatoes, etc.

The system may also receive a second set of images depicting a second plurality of products also associated with the selected product types. For example, where the first set of images depict a first plurality of products associated with a single product type, the second set of images may depict a second plurality of products also associated with the same single product type. In another example, where the first set of images depict a first plurality of products associated with a category of products, the second set of images may depict a second plurality of products also associated with the same category of products. This second set of images may be acquired of the second plurality of products as those products are displayed on a second shelving unit in the retail store nonadjacent to the first shelving unit. For example, with reference to FIG. 36, a second shelving unit 3605 located in retail store 3601 may contain a second plurality of products 3607B. In some examples, first plurality of products 3607A and second plurality of products 3607B both belong to and are associated with the same category of products (e.g., cellular phones, soft drinks, etc.). In some examples, first plurality of products 3607A and second plurality of products 3607B both belong to and are associated with a single product type (e.g., 6-pack of 16 oz. Coca-Cola Zero, cucumbers, and so forth). The system may analyze the second set of images of second shelving unit 3605 to determine second product turnover data associated with the second shelving unit 3605 (e.g., in a manner similar to the process described above for determining the product turnover data for the similar products located on shelving unit 3603).

In some embodiments, the first shelving unit 3603 may be located in a different area of the retail store 3601 than the second shelving unit 3605. As shown in FIG. 36, the first shelving unit 3603 may be located in the front portion of retail store 3601, while second shelving unit 3605 may be located in the back corner of retail store 3601.

In some embodiments, after receiving and analyzing the first and second set of images and determining first product turnover and second product turnover data, the system may automatically generate a performance indicator associated with the selected product types using the first product turnover data and the second product turnover data. For example, the selected product types may be a product category, and the first product turnover data and the second product turnover data may be used to automatically generate a performance indicator associated with the product category. In another example, the selected product types may be a single product type, and the first product turnover data and the second product turnover data may be used to automatically generate a performance indicator associated with the single product type. In some embodiments, the performance indicator may account for a contribution of each of the first shelving unit 3603 and the second shelving unit 3605 to overall sales of the selected product types (e.g., the single product type, the product category, etc.) by the retail store 3601. For example, the performance indicator may include information about the percentage of product sales for a product category or a single product type from first shelving unit 3603 as compared to second shelving unit 3605. Such information may enable the at least one processor to determine, among other things, which of the locations is more effective in generating sales of the selected product types.

In some embodiments, the processor may be further configured to store records of the performance indicator associated with a period of time and generate a report of the contribution of each of the first shelving unit 3603 and the second shelving unit 3605 to the overall sales of the single product type during the period of time. For example, the performance indicator may be generated and viewed for a single product type over various time periods, such as a day, week, month, and the like, and additionally or alternatively, may be viewed for certain operating hours of a day for retail store 3601 over similar periods of time.

In some embodiments, the processor may be further configured to determine, based on image analysis of the first and second set of images, demographics of customers that picked up the single product type. For example, various capture devices 125 that are placed throughout retail store 3601 may be further configured to capture face images to be included in the first and second set of images. The system may then determine/estimate the age and gender of customers 120 that picked up the single product type discussed herein. Such a determination may be made, for example, by a machine learning system trained to estimate the age of a person based on facial features, hair color, or any other visible characteristics, by an artificial neural network configured to estimate the age of a person from face images, and so forth. The processor may further generate a report showing the demographics of a first group of customers that picked up the single product type from the first shelving unit 3603 and the demographics of a second group of customers that picked up the single product type from the second shelving unit 3605. For example, age and/or gender distributions may be determined for the first group of customers and the second group of customers. Further, the distributions for the first group of customers and the distribution for the second group of customers may be compared. For example, a statistical distance (such as f-divergence, Kullback-Leibler divergence, Hellinger distance, Total variation distance, Rényi's divergence, Jensen-Shannon divergence, Lévy-Prokhorov metric, Bhattacharyya distance, Kantorovich metric, Tsallis divergence, etc.) between the two distributions may be computed. In some examples, the computed statistical distance may be included in the generated report. In some examples, the computed statistical distance may be compared with a selected threshold, and one report may be generated in response to a first result of the comparison, while a different report may be generated in response to a different result of the comparison. Similar analysis may be conducted by the system for other demographic characteristics. In yet further embodiments, the processor may also determine other types of products that customers buy in addition to the selected product types (for example, in addition to the single product type, in addition to the product category, and so forth), and may generate a report listing types of products that a first group of customers picked up and types of products that a second group of customers picked up. For example, the set of images may be analyzed to identify products in a cart associated with a customer, and the other types of products that the customer buy may be determined based on the products identified in the customer's cart. In another example, a customer may be tracked in the set of images as she moves through the retail store (for example, using a visual tracking algorithm, using face recognition, and so forth), products that the customer picks may be identified (for example, as described above), and the other types of products that the customer buy may be determined based on the identified products that the customer picked. In yet another example, face recognition algorithms may be used to identify the customer and access a loyalty program information associated with the customer, where the loyalty program information may include information about the other types of products that the customer purchases. This information may be used by the processor to automatically generate a report correlating purchases of a particular product or product type with factors such as product location in a store, customer demographics, product types commonly purchased together with the particular product or product type, etc.

In some embodiments, the processor may receive performance indicators from multiple retail stores and generate a report showing an average contribution of each of the first shelving unit 3603 and the second shelving unit 3605 to the overall sales of the single product type. For example, information from multiple retail stores may be aggregated, analyzed, and/or compared, to obtain various insights about the single product type. The multiple stores from which information is analyzed may correspond to certain parameters, such as: geographical areas, store chains, business units, store categories, and the like. In other embodiments, the system may identify and produce lists of performance indicators from the multiple retail stores to identify those shelving unit displays that are both effective and ineffective in producing turnover the single product type and may provide recommendations to the retail stores to enhance effectiveness of the shelving unit displays.

In some embodiments, the processor may identify an existence of promotions for a single product type in proximity to each of the first shelving unit 3603 and the second shelving unit 3605, based on image analysis of the first and second set of images. The processor may generate a report showing promotional effectiveness on the overall sales of the single product type at each of the first shelving unit 3603 and the second shelving unit 3605 as a result of a nearby promotion. For example, product kiosk 3611 may contain promotional information and/or employee representatives of retail store 3601 who are promoting a sale for the single product type stored on first shelving unit 3603 and second shelving unit 3605. Such a promotion may also include more passive elements, such as an endcap or product display featuring a particular product or indicating a sale or other promotional aspect relative to the particular product.

In some embodiments, the processor may use image data to identify a plurality of sell events where customers picked up products associated with the single product type. In such embodiments, the performance indicator may be determined based on a number of sell events associated with the first shelving unit 3603 and a number of sell events associated with the second shelving unit 3605. For example, the system may track the movement of user 120 throughout the retail store 3601 (e.g., based on sequential appearances of the user in a plurality of images captured at different locations throughout the retail store, using face recognition, and so forth). The processor may automatically detect sell events based on detected actions (represented in a plurality of captured images) associated with user 120 picking up a first product type at either first shelving unit 3603 or second shelving unit 3605, and eventually proceeding to the point-of-sale area 3609, where the first product type is purchased by the user 120. Such detected actions may be determined to constitute sell events.

In some embodiments, the processor may use image data to identify a plurality of near-sell events where customers showed interest in the single product type but did not pick up a product. In such embodiments, the performance indicator may be determined based on a number of identified near-sell events associated with the first shelving unit 3603 and a number of identified near-sell events associated with the second shelving unit 3605. For example, the image data may be analyzed to identify near-sell events using a machine learning model trained to detect near-sell events from a sequence of images, using an artificial neural network configured to detect near-sell events from a sequence of images, and so forth. In some embodiments, the system may track the movement of user 120, and determine a length of time a user 120 spends in front of either first shelving unit 3603 or second shelving unit 3605. In some examples, the performance indicator may be determined based on this length of time, which may be automatically determined. For example, the length of time may correspond to the amount of time that a user faces the shelving unit, the amount of time that a user is in proximity to the shelving unit, and so forth.

In some embodiments, the processor may use image data to identify a return event where a customer placed a product on at least one of the first shelving unit 3603 and the second shelving unit 3605. In such embodiments, the performance indicator may be determined based on a number of return events detected relative to the first shelving unit 3603 and a number of return events detected relative to the second shelving unit 3605. For example, the system may track the movement of user 120, and may capture images of first shelving unit 3603 and second shelving unit 3605 to determine when a user 120 has picked up a product, but later returned the same product to any shelving unit located in the retail store 3601, including shelving unit 3603 and 3605 (among others), rather than taking the product to point-of-sale area 3609 for purchase. Further, properties of a return event may be identified by analyzing the image data and used to determine the performance indicator. Some examples of such properties may include the amount of time that the customer picked up the product that was later returned, the amount of time that the customer returned the product, the elapsed time between picking up the product and returning the product, the location from which the product was picked up from (such as first shelving unit 3603, second shelving unit 3605, etc.), the location to which the product was returned to, whether the product was returned to the same location it was picked up from, and so forth. In some examples, the product of the return event may be associated with the single product type. In other examples, the product of the return event may be associated with a product type other than the single product type. In other embodiments, the system may identify a user 120 picking up a product from a single location, and replacing the product on a shelf, while taking an alternative product of the same product type. For example, with reference to FIG. 38, a user 120 may initially take a product from first shelving unit 3803 but may later return the product by placing it on second shelving unit 3805 and may take an alternative product of the same type from second shelving unit 3805. Information about such events may be recorded by the system and may be used to determine the performance indicator.

Figure 37:
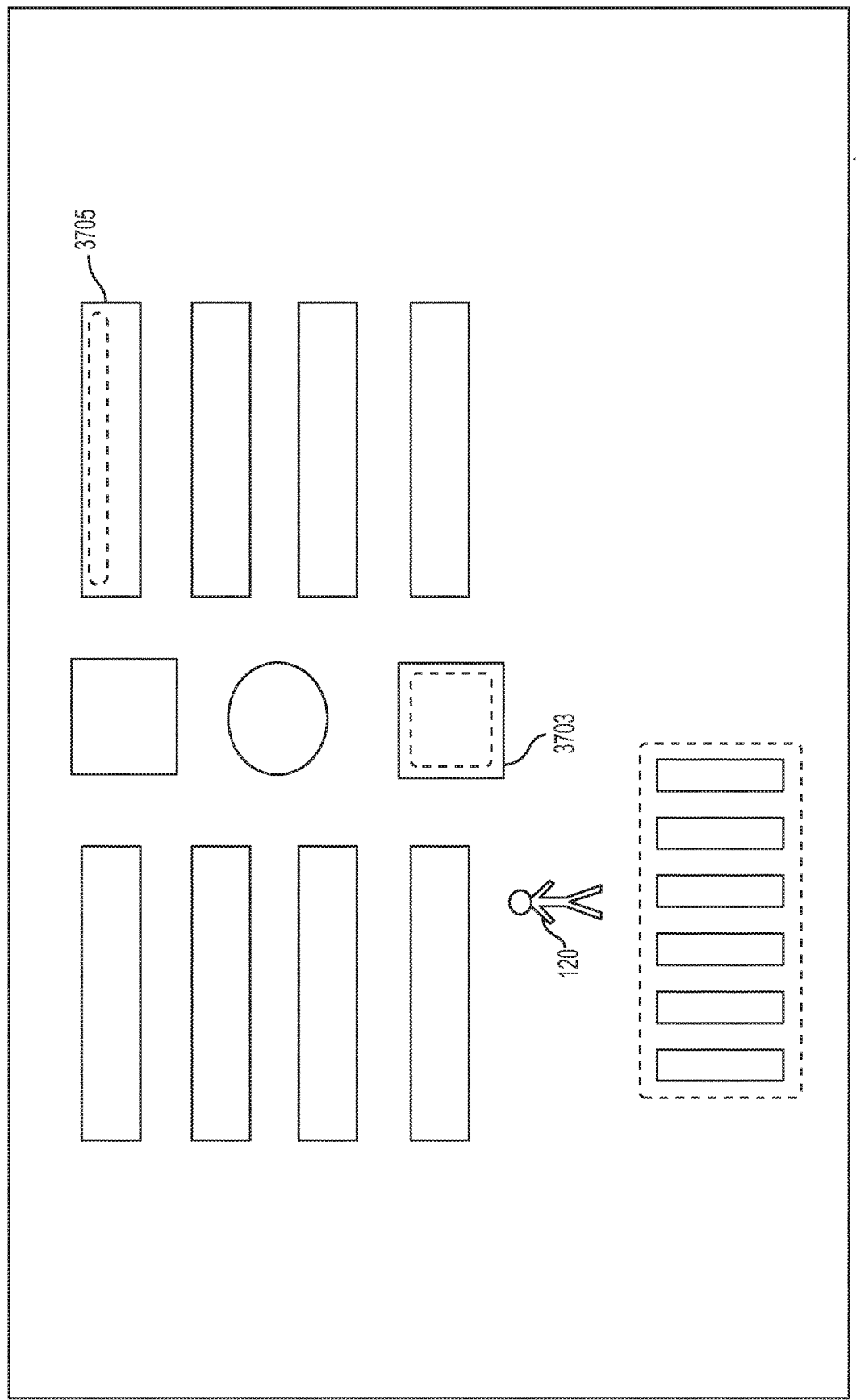
FIG. 37 is a diagrammatic illustration of an example configuration for the layout of a retail store, consistent with the disclosed embodiments.

FIG. 37 provides an additional diagrammatic illustration of an exemplary system environment 3700 for capturing sets of image data about retail store 3701 to determine product turnover data and associated performance indicators. In some embodiments, the processor may provide a recommendation to increase the overall sales of a single product type by changing a display parameter associated with at least one of the first shelving unit and the second shelving unit. For example, with reference to FIG. 37, first shelving unit 3703 may be of a different type than second shelving unit 3705. As shown in FIG. 37, first shelving unit 3703 is a promotional shelving square shelving unit, where the single product type may be displayed on all sides of the first shelving unit 3703, while second shelving unit 3705 may be a typical row shelving unit. The at least one processor may determine sales metrics for a product type (e.g., total sales, rate of sales, etc.) placed on shelving unit 3703 and shelving unit 3705. Based on this information, along with characteristics associated with shelving unit 3703 and shelving unit 3705, the processor may generate a report or other indicator of which shelving type and/or what shelving characteristics may be most effective in encouraging sales of a particular product. Such information may also be useful in generating recommendations for increasing product sales, for example by recognizing in captured images one or more shelving characteristics (e.g., stocking density, shelf configuration, shelf placement, shelf highest, shelf size, facings, color scheme, or any other shelving/product characteristic) and making a recommendation for changing at least one shelving/product characteristic to more closely match other configurations known to be associated with higher sales volumes. For example, the recommendation may be based on statistics gathered from other retail stores, which may be used to identify configurations associated with higher sales volume and configurations associated with lower sales volumes.

In some embodiments, the display parameter associated with a recommended change may also include at least one of a display location, a display size, and adjacent product types. As shown in FIG. 37, first shelving unit 3703 includes a central display location in retail store 3701, while second shelving unit 3705 is maintained at the back corner of the store. First shelving unit 3703 and second shelving unit 3705 may be of different display sizes, of different heights, and may also contain different adjacent product types. As described herein, the processor may analyze the sales and flow of the single product type from first shelving unit 3703 and second shelving unit 3705 to determine preferred display parameters for the single product type within retail store 3701.

FIG. 38 provides a diagrammatic illustration of different types of shelving units 3803 and 3805 to assist in determining product turnover data and associated performance indicators. In some embodiments, the processor may analyze a first set of images to recognize a first price listed on a label associated with the first shelving unit 3803 and may analyze the second set of images to recognize a second price listed on a label associated with the second shelving unit 3805. The processor may further inform a user when there is a price mismatch between the first price and the second price. For example, if the products placed on first shelving unit 3803 contain a sale price indicator, but the same products placed on second shelving unit 3805 do not contain the sale price, the user may be informed of the price mismatch. The prices may be recognized based on labels on products located on shelving units 3803 and 3805 or may be recognized based on price tags displayed directly on shelving units 3803 and 3805.

In some embodiments, the first shelving unit 3803 may have a different display size than the second shelving unit 3805. As shown in FIG. 38, first shelving unit 3803 is a square shelving unit that can display the product on all sides of the shelving unit. Second shelving unit 3805 is a traditional row-based shelving unit. Further, the first shelving unit 3803 may be located adjacent to at least one product type that is different from product types adjacent to the second shelving unit 3805. For example, assuming the single product type is soft drinks, first shelving unit 3803 may be located adjacent to snack foods (e.g., potato chips), while shelving unit 3805 may be located adjacent to other beverages (e.g., water, juice). The system may analyze the performance of first shelving unit 3803 and second shelving unit 3805 by analyzing the sales of the single product type, as well as the adjacent product types, to determine a performance indicator. Such a performance indicator may be automatically correlated with the size of the shelving units or based on any other characteristics of the shelving units or products placed on the shelving units.

In some embodiments, additional information about the product flow may be determined by the system. For example, the image sets may be analyzed to determine additional information about product flow, such as: the direction the customer approached the display or shelving unit (e.g., by using of a tracking algorithm applied to a series of captures images captured at different times); other products a customer possesses when deciding to pick up a unit of a single product type (e.g., by detecting in one or more captured images representations of products carried in a hand of a customer or in a cart or basket associated with the customer); whether the customer is part of a loyalty plan at the retail store (i.e., based on facial recognition, or alternatively by tracking the buyer throughout the store and comparing checkout data), and the like.

Figure 39:
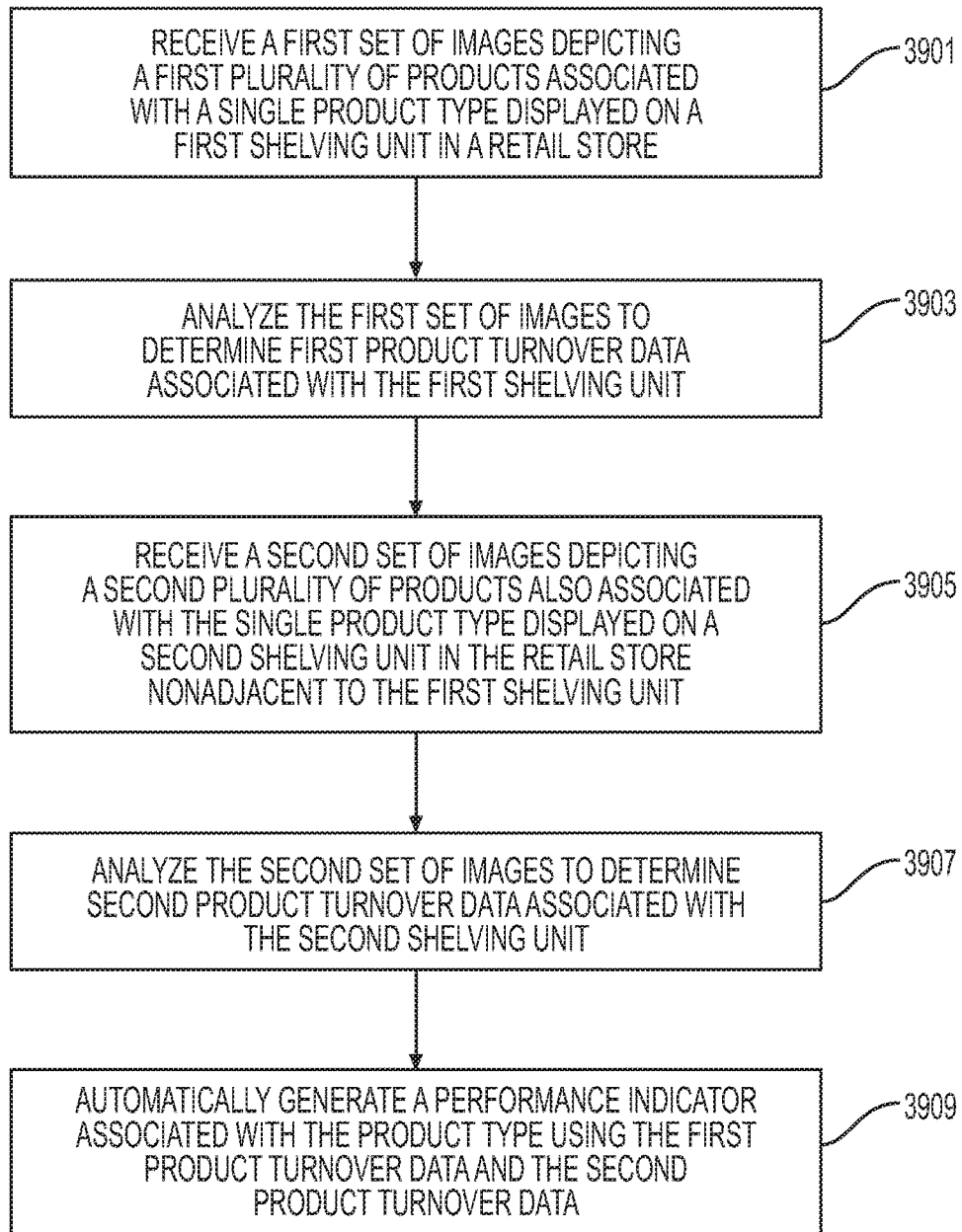
FIG. 39 is a flow chart illustrating an example of a method for monitoring a display and shelf consistent with the disclosed embodiments.

FIG. 39 is an example of identification method 3900, consistent with the disclosed embodiments. Method 3900 may, for example, be executed by the at least one processor configured to receive sets of captured images (e.g., image processing unit 130) or any other appropriate hardware and/or software. Further, when executing method 3900, the at least one processor may execute instructions and any of the concepts described above within the server 135 (which may include memory device 226 and database 140) and/or over communications network 150.

In step 3901, the at least one processor may receive a first set of images depicting a first plurality of products associated with a single product type displayed on a first shelving unit in a retail store. As described herein, image data may be captured by stationary cameras, by automated devices that patrol the store, by mobile devices of store employees, or by a combination these.

In step 3903, the processor may analyze the first set of images to determine first product turnover data associated with the first shelving unit. As described herein, the set of images may be analyzed to detect a display shelf associated with the single product type. The image data may be further analyzed to determine at least one characteristic of a flow of products of the product type associated with the shelf (e.g., a rate products are picked up from the shelf by customers, or any other appropriate metric indicative of product turnover). In some examples, the at least one characteristic may comprise a pattern indicating a need to restock the shelf.

In other embodiments, the set of images may be further analyzed to determine other information, such as a facing area of the shelf associated with the product type, a height of the shelf, a location of the shelf, and so forth. In some cases, a recommendation to increase or decrease the facing area of the shelf associated with the product type may be provided, for example based on the determined facing area and/or the at least one property of a flow of products of the product type associated with the shelf. In some cases, a recommendation to change at least one aspect of the shelf (such as height, location, etc.) may be provided, for example based on the determined properties of the shelf (such as height, location, etc.) and/or the at least one property of a flow of products of the product type associated with the shelf.

In step 3905, the processor may receive a second set of images depicting a second plurality of products also associated with the single product type displayed on a second shelving unit in the retail store nonadjacent to the first shelving unit. For example, as shown in FIGS. 36 and 37, the first shelving units (3603 and 3703) may be placed in a separate area of the retail store that is not adjacent to the second shelving units (3605 and 3705).

In step 3907, the processor may analyze the second set of images to determine second product turnover data associated with the second shelving unit. In step 3909, the processor may automatically generate a performance indicator associated with the product type using the first product turnover data and the second product turnover data.

In the retail world, an order from a virtual store is often fulfilled from a physical retail store close to the location of the customer. To fulfill the order, an employee of the retail store may go through the retail store and collect products listed in the order. The collected products may then be delivered to the customer's home or be prepared for pick-up by the customer. One of the challenges of online shopping is assuring that the goods offered to the customer at the time of purchase match the actual inventory available in the physical store. This challenge is heightened for virtual stores that sell products with a high turnover rate and limited shelf life, such as food products. Other than inaccuracies in the inventory records of the physical store, there is an inevitable gap between the time that customers order the products and the time the store employees collect the products listed in the orders. Communicating with customers while the products are being collected is one example of a current solution that retail stores use to resolve inconsistencies between the customers' orders and the actual inventory in the store. The present disclosure suggests a different solution that uses deployment of stationary image capturing devices (e.g., capturing devices 125) throughout the retail store to improve the online shopping experience.

Figure 40B:
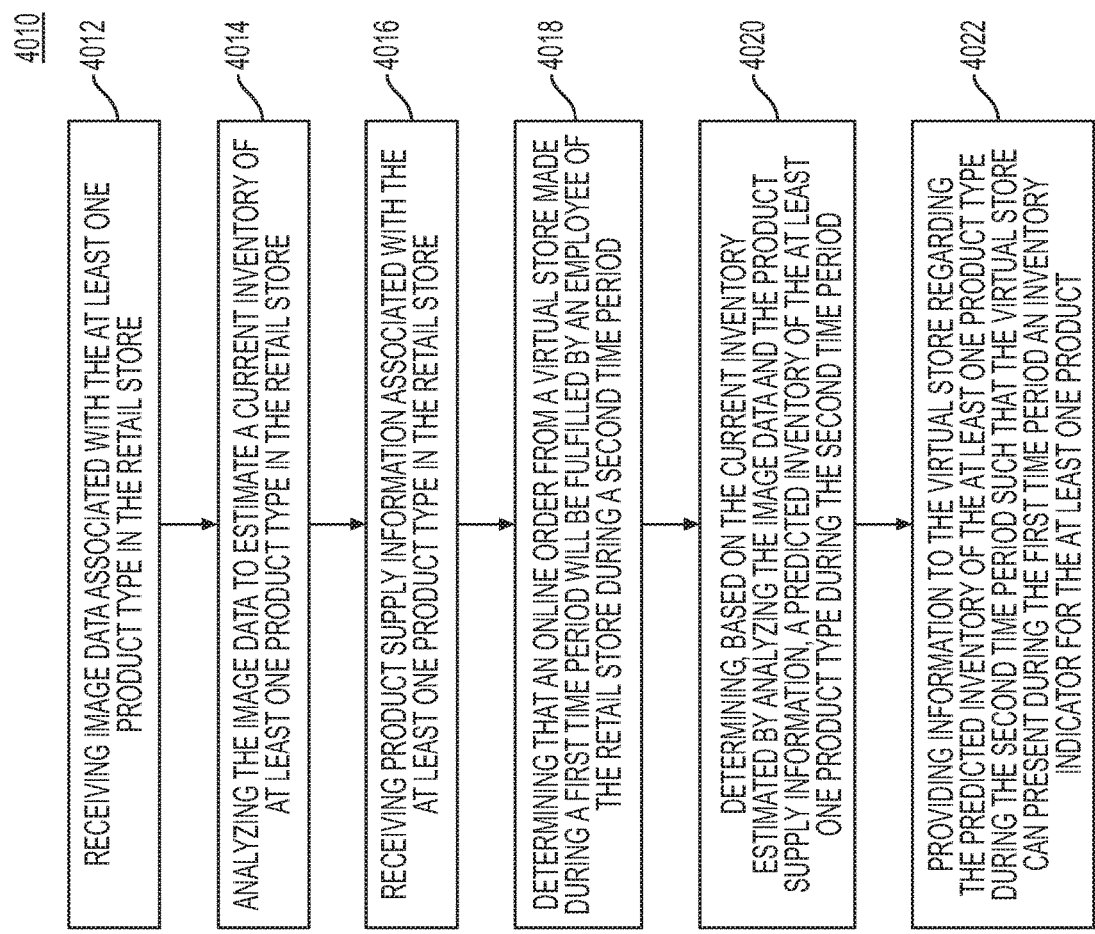
FIG. 40B is a flowchart of an exemplary method for identifying products and tracking inventory in a retail store, consistent with the present disclosure.
Figure 40A:
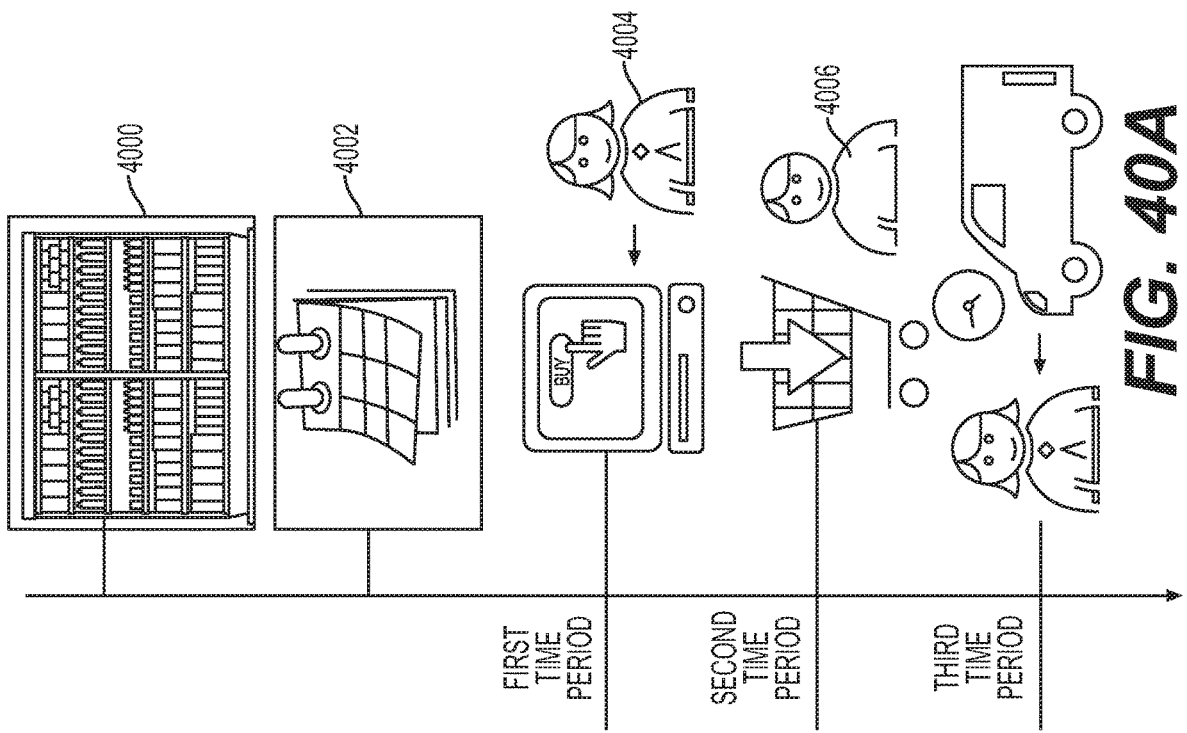
FIG. 40A is an illustration of a timeline associated with online shopping, consistent with the present disclosure.

Reference is now made to FIG. 40A, which illustrates a timeline associated with the exemplary solution of the present disclosure. Initially, the suggested method includes receiving image data 4000 to determine a current inventory in retail store 105, and receiving product supply information 4002 to determine a predicted inventory. Thereafter, at the end of a first time period, a customer 4004 of a virtual store may complete an online order. The online order may be fulfilled by an employee 4006 of retail store 105 during a second time period, and delivered to customer 4004 at the end of a third time period. The term "time period," includes, but is not limited to, an amount of time including a single point in time or a duration (for example, range of time) that extends from a first point in time to a second point in time. In a first example embodiment, the suggested method may include using image data 4000 and supply information 4002 to predict the inventory during the second time period and present to customer 4004 the predicted inventory at the time of ordering the products (e.g., during the first time period). In a second example embodiment, the suggested method may include using image data 4000 to estimate the quality of products during the third time period and presenting at the time of ordering the products (e.g., during the first time period) to customer 4004 an indicator of the estimated quality of the products.

The following demonstrates the two example embodiments. Assume customer 4004 is considering buying avocados online. At the time customer 4004 is ordering products from a virtual store (i.e., during the first time period), she wants to know if the store has avocados. Independently from or in connection with the activities of customer 4004, the virtual store may receive information indicating that at the time the order of customer 4004 is expected to be collected (i.e., during the second time period), retail store 105 is expected to have avocados in-stock but their quality is estimated to be below average (e.g., based on a determined average shelf time for in stock avocados and based on predetermined metrics such as average time to ripeness, based on predicted future restocking events, etc.). According to the first embodiment, the virtual store may present to customer 4004 at the first time period an indication that avocados are in-stock. According to the second embodiment, the virtual store may present to customer 4004 at the first time period an indication that the avocados' quality is estimated to be below average. Armed with this knowledge, customer 4004 can complete her online shopping and decide whether to buy or not to buy avocados at the virtual store.

FIG. 40B depicts an exemplary method 4010 in accordance with the first example embodiment. Method 4010 is used for identifying products and tracking inventory in retail store 105 based on analysis of image data 4000. For purposes of illustration, in the following description, reference is made to certain components of system 100. It will be appreciated, however, that other implementations are possible and that other components may be utilized to implement the exemplary method. It will also be readily appreciated that the illustrated method can be altered to modify the order of steps, delete steps, or further include additional steps.

At step 4012, a processing device (e.g., processing device 202) may receive image data 4000 associated with the at least one product type in retail store 105. In one embodiment, image data 4000 may be acquired by any one of capturing devices 125 illustrated in FIG. 4A-4C. For example, image data 4000 may be acquired by a plurality of image sensors mounted in retail store 105. Details of capturing devices mounted in retail store 105 and configured to acquire image data 4000 are described with references to FIGS. 5A-5C, for example. The acquired image data may include images captured by one or more capturing devices 125 (e.g., raw images, cropped images, video streams, and more) or processed data derived from captured images (e.g., data about products identified in captured images, data that may be used to construct a 3D image, and more). In one embodiment, the processing device may periodically receive image data that corresponds with the current inventory of the products on the shelf. For example, the processing device may receive image data 4000 at predetermined time intervals (e.g., every minute, every 5 minutes, every 15 minutes, every 30 minutes, etc.). In another embodiment, the processing device may receive image data 4000 in response to a detection of a certain identified event. In one example, the processing device may receive image data 4000 after an event, such as a detected lifting of a product from the retail shelving unit. In another example, the processing device may receive image data 4000 after receiving an indication that customer 4004 has entered a website associated with the virtual store, after customer 4004 has navigated to a particular inventory item, searched for a particular product, etc.

At step 4014, the processing device may analyze image data 4000 to estimate a current inventory of at least one product type in retail store 105. Consistent with the present disclosure, the current inventory of at least one product type in retail store 105 may include an estimation of the quantity of products from the at least one product type. In one example, the estimated quantity may be a number that corresponds to the number of products from the at least one product type (e.g., 37 units of 12 fl oz bottles of Coca-Cola Zero). In another example, the estimated quantity may be an indicator of the existing quantity of the at least one product type relative to the desired quantity of the at least one product type as identified in the relevant planogram (e.g., 65% of planogram inventory of 12 fl oz bottles of Coca-Cola Zero). In one embodiment, the processing device may estimate the current inventory of the at least one product type using a combination of image data 4000 and data from one or more additional sensors configured to detect a number of products placed on a store shelf. For example, the one or more additional sensors may include weight sensors, pressure sensors, touch sensors, light sensors, detection elements as described in relation to FIGS. 8A, 8B and 9, and so forth. Such sensors may be used alone or in combination with capturing devices 125, for example, to determine the area of the shelf covered by products. For example, the processing device may analyze the data received from the detection elements attached to store shelves as described above, alone or in combination with images captured from the retail store, to estimate current inventory of one or more product types. In another embodiment, the processing device may analyze image data 4000 to estimate the current inventory of one or more product types in retail store 105. The one or more of product types may include, for example, a plurality of product types, more than 50 product types, more than 100 product types, more than 250 product types, etc.

At step 4016, the processing device may receive product supply information 4002 associated with the at least one product type in retail store 105. Consistent with the present disclosure, the term "product supply information" may refer to any information indicative of future changes in the inventory of at least one product in retail store 105. For example, product supply information 4002 may include at least one of: a schedule of arrivals of additional products (e.g., dates, times, updates from a supplier, etc.), known orders of products (e.g., quantity of scheduled products), inventory records (e.g., the quantity of products that the retail store has in storage), checkout data (e.g., the number of sold items of the at least one product type), calendar data (e.g., holidays, sport games, etc.), historical product turnover data (e.g., the number of turkeys sold per day during the three weeks prior to Thanksgiving of last year), average turnover (e.g., per hour in a day, per day in a week, per special events). In one embodiment, product supply information 4002 may be obtained from multiple sources (e.g., market research entity 110, supplier 115, and multiple retail stores 105) and may include different types of parameters. In another embodiment, product supply information 4002 may be derived from image data 4000. For example, product supply information 4002 may include analytics of the turnover of the at least one product based on past image data 4000. In some embodiments, product supply information 4002 may be stored digitally in memory device 226, stored in database 140, obtained using network interface 206 through communication network 150, obtained from a user, and so forth.

At step 4018, the processing device may determine that an online order from a virtual store made during a first time period will be fulfilled by an employee of the retail store during a second time period. Different retail stores may have different policies regarding the times that online orders are being collected. For example, in some retail stores, online orders may be collected at predetermined times (e.g., between 11:00 AM to 2:00 PM), and in other retail stores, online orders may be collected only by certain employees. Consistent with the present disclosure, the processing device may access information about retail store 105 (e.g., store policies, employees' data, historical data, etc.). The processing device may use the information to estimate when future online orders will be collected. For example, the processing device may determine the following times listed in table 1.

TABLE 1

| Online order time (the first period) | Order fulfillment time (the second period) | Max time difference |
|---|---|---|
| 06:00-10:00 | 10:30-12:00 | 6:00 |
| 10:00-14:00 | 13:00-15:30 | 5:30 |
| 14:00-18:00 | 18:00-19:30 | 5:30 |
| 18:00-06:00 | 06:00-08:00 | 14:00 |

The times in the table may be updated periodically (e.g., once week, once a month, etc.) or updated in real-time or near real-time. For example, a retail store with several employees that called in sick may not be able to fulfill online orders according to the original schedule, and the times in the table may be updated in response to such call. In one embodiment, the processing device may determine the second time period based on a schedule associated with retail store 105. In one example, the schedule may be associated with the orders' delivery schedule.

At step 4020, the processing device may determine, based on the current inventory estimated by analyzing image data 4000 and product supply information 4002, a predicted inventory of the at least one product type during the second time period. Consistent with the present disclosure, the predicted inventory may include a quantity estimation of the at least one product type or just an indication that the at least one product type is estimated to be above a certain threshold (e.g., more than 25% of the number of products identified in the planogram). In one embodiment, the processing device may determine the turnover rate using product supply information 4002 (e.g., past image data). Thereafter, the processing device may calculate the predicted inventory of the at least one product type during the second time period from the current inventory and determined turnover rate. In another embodiment, the processing device may train a regression model (for example, an artificial neural network, a support vector regression, a linear regression, etc.) to calculate the predicted inventory of the at least one product type during the second time period. In some examples, the predicted inventory may include an in-stock/out-of-stock prediction, a predicted quantity of the at least one product type during the second time period, a confidence level, a range of possible future quantities, with corresponding probabilities, and so forth.

In some embodiments, step 4020 may further include determining, based on inputs as described above, probabilities that the quantity of the at least one product type during the second time period will be a certain amount or within a certain range of amounts. For example, step 4020 may provide a predicted probability that the quantity of the at least one product type during the second time period will be at at least a selected amount. In another example, step 4020 may provide a distribution of predicted quantities (i.e., assigning probabilities to a number of different quantities) of the at least one product type during the second time period. Some examples of such distributions may include normal distribution, Fisher's noncentral hypergeometric distribution, Wallenius' noncentral hypergeometric distribution, Poisson distribution, and so forth. In some examples, such probabilities and/or distributions may be estimated using a machine learning model trained to predict the probabilities and/or distributions from the inputs described above. In other examples, such probabilities and/or distributions may be estimated using an artificial neural network configured to predict the probabilities and/or distributions from the inputs described above.

At step 4022, the processing device may provide information to the virtual store regarding the predicted inventory of the at least one product type during the second time period. With reference to table 1 above, listing the order fulfillment times for retail store 105, table 2 below depicts an example of the information that may be provided to the virtual store regarding the predicted inventory of different products.

TABLE 2

| List of products | 10:30-12:00 | 13:00-15:30 | 18:00-19:30 | 06:00-08:00 |
|---|---|---|---|---|
| Product A | In-stock | Low | Out-of-stock | In-stock |
| Product B | In-stock | In-stock | Low | Out-of-stock |
| Product C | Out-of-stock | Out-of-stock | In-stock | In-stock |
| Product D | In-stock | In-stock | In-stock | In-stock |

Using the information provided, the virtual store can present (during the first time period) an inventory indicator for the at least one product, for example, assuming customer 4004 is making an order at 14:15 for products A, B, C, and D. At 14:15 customer 4004 may see in the virtual store that product A is out-of-stock, that product B may be out-of-stock, and that products C and D are in-stock. The virtual store may show these results based on the predicted inventory of these products between 18:00 to 19:30, which is the time store employee 4006 may be expected to fulfill the order of customer 4004 (i.e., the second time period). In this case, the predicted inventory may be based on the calculated turnover rate of products A, B, and D and the shipment schedule of product C. Additionally or alternatively to steps 4016, 4018, 4020 and 4022, the virtual store may show current inventory of at least one product type in the retail store to a user of the virtual store, such as the current inventory information estimated by step 4014 by analyzing images of products in the retail store and/or by analyzing sensor readings from detection elements attached to store shelves as described above with relation to methods 1000 and 1050.

According to one embodiment, the processing device may determine at least two predicted inventories of a group of product types, where each predicted inventory may be associated with a different second time period. For example, some retail stores may offer a VIP service and a regular service. In this example, a VIP online order from a virtual store made during a first time period may be fulfilled by an employee of the retail store during a first second-time-period. A regular online order from the virtual store made during the first time period may be fulfilled by an employee of the retail store during a second second-time-period. The second second-time-period may be later than the first second-time-period. With reference to the example above, assume customer 4004 is making an order at 14:15 for products A, B, C, and D and selects the VIP service. At 14:15 customer 4004 may see in the virtual store that product A may be out-of-stock, that product B is in-stock, that product C is out-of-stock, and that product D is in-stock. The virtual store may show these results based on the predicted inventory of these products within an hour from the time customer 4004 is making the VIP order. Consistent with this embodiment, the virtual store may receive a selection of service types from customer 4004 and present the predicted inventory of the products based on the selected service.

In some embodiments, step 4020 may include determining probabilities that the quantity of the at least one product type during the second time period will be a certain amount or within a certain range of amounts, as described above. For example, the system may provide, e.g., to the virtual store a distribution of predicted quantities of the at least one product type during the second time period. In some embodiments, the virtual store may show an indicator based on the probabilities or the distribution of predicted quantities provided by step 4020. For example, the indicator may comprise a function of the distribution, such as mean, median, standard deviation, variance, coefficient of variation, coefficient of dispersion, Fano factor, any function of the above. In another example, the distribution may be a Fisher's noncentral hypergeometric distribution, and the indicator may comprise a parameter of the Fisher's noncentral hypergeometric distribution (such as the odds ratio).

Figure 41:
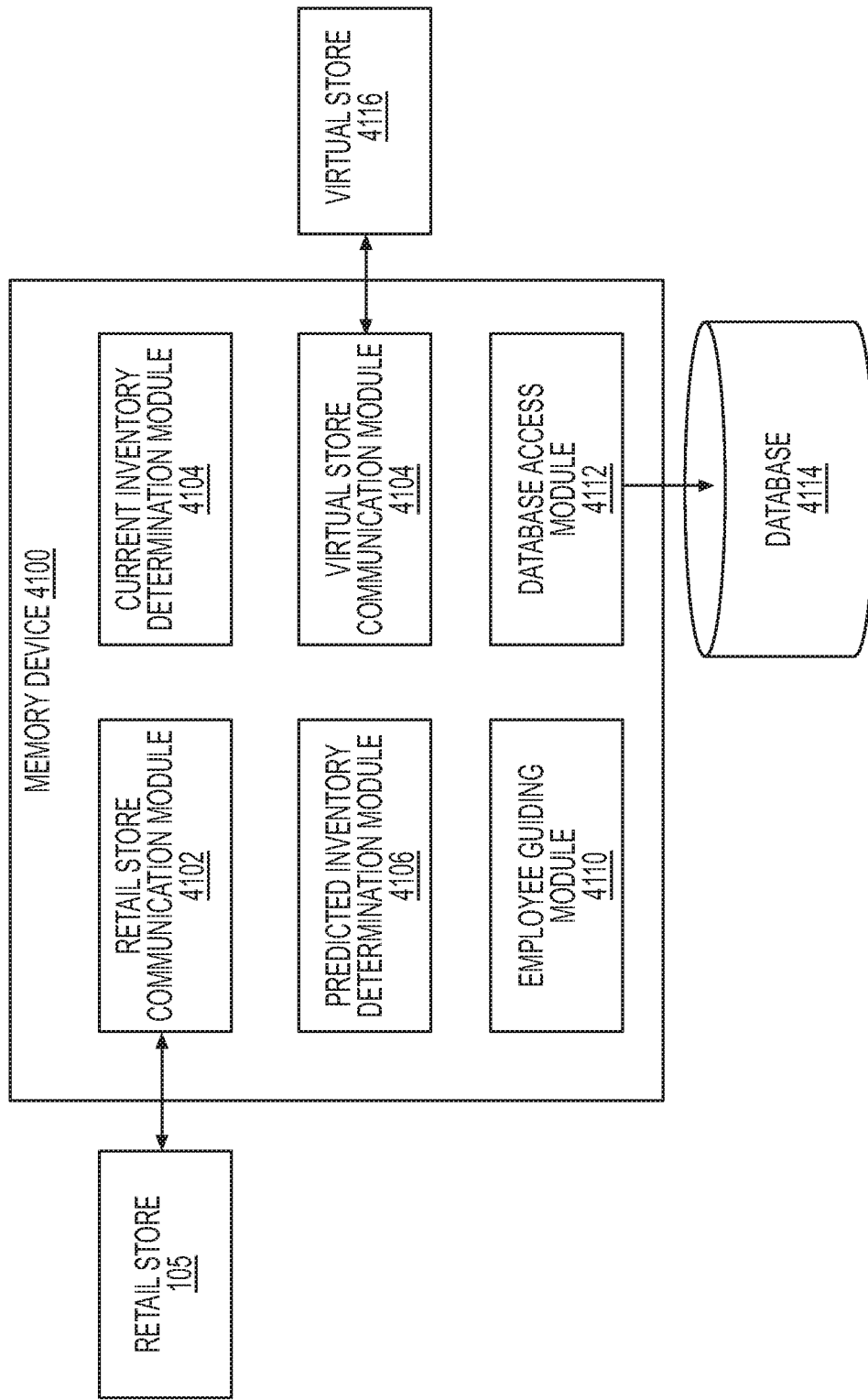
FIG. 41 is a block diagram that illustrates an exemplary embodiment of a memory containing software modules for executing the method depicted in FIG. 40B, consistent with the present disclosure.

FIG. 41 illustrates an exemplary embodiment of a memory 4100 containing software modules consistent with the present disclosure. In particular, as shown, memory 4100 may include a retail store communication module 4102, a current inventory determination module 4104, a predicted inventory determination module 4106, a virtual store communication module 4108, an employee guiding module 4110, a database access module 4112, and a database 4114. Modules 4102, 4104, 4106, 4108, 4110, and 4112 may contain software instructions for execution by at least one processor (e.g., processing device 202), included with image processing unit 130. Retail store communication module 4102, current inventory determination module 4104, predicted inventory determination module 4106, virtual store communication module 4108, employee guiding module 4110, database access module 4112, and database 4114 may cooperate to perform multiple operations. For example, retail store communication module 4102 may receive image data 4000 from a plurality of image capturing devices 125, current inventory determination module 4104 may use the received image data 4000 to determine the current inventory of at least one product, predicted inventory determination module 4106 may use information (e.g., product supply information 4002) stored in database 4114 to determine the turnover rate of the at least one product, virtual store communication module 4108 may provide information to virtual store 4116 regarding the predicted inventory of the at least one product type, and employee guiding module 4110 may generate a path for employee 4006 for collecting the products listed in the online order.

In some embodiments, memory 4100 may be included in, for example, memory 226. Alternatively, memory 4100 may be stored in an external database or an external storage communicatively coupled with server 135, such as one or more databases or memories accessible over network 150. Further, in other embodiments, the components of memory 4100 may be distributed in more than one server and more than one memory device.

In some embodiments, retail store communication module 4102 may receive information associated with retail store 105. For example, retail store communication module 4102 may receive image data 4000 and/or information derived by analyzing image data 4000 from a plurality of image sensors associated with retail store 105, receive product supply information 4002 associated with at least one product type in retail store 105, and receive data from one or more additional sensors configured to detect a number of products placed on a store shelf. In one embodiment, retail store communication module 4102 may receive product supply information 4002 from a memory device associated with a retail store. For example, the memory device may be associated with central communication device 630 located in retail store 105. In another embodiment, retail store communication module 4102 may receive product supply information 4002 from at least one memory device associated with multiple retail stores 105. For example, the at least one memory device may be associated with market research entity 110 or supplier 115. Retail store communication module 4102 may collect the information from the different entities and use database access module 4112 to store at least some of the received information in database 4114.

In some embodiments, current inventory determination module 4104 may process the information collected by retail store communication module 4102. In one embodiment, the current inventory determination module 4104 may estimate the current inventory of at least one product type solely based on image data received from capturing device 125. In another embodiment, the current inventory determination module 4104 may estimate the current inventory of at least one product type using a combination of image data and data from one or more additional sensors configured to detect a number of products placed on a store shelf (e.g., pressure sensitive pads, light detectors configured to be placed on shelves, etc.). For example, the current inventory determination module 4104 may analyze the data received from the detection elements attached to store shelves as described above, alone or in combination with images captured from the retail store, to estimate current inventory of the at least one product type. In some cases, determining the current inventory of at least one product type may require aggregating data from two or more locations in retail store 105. For example, in one embodiment, current inventory determination module 4104 may monitor the inventory of at least one product type displayed on a first shelving unit and on a second shelving unit. The processing device may predict the current inventory of at least one product type in the retail store based on aggregated data from the first shelving unit and the second shelving unit. For example, the first shelving unit may be located in a specific aisle and the second shelving unit may be located in a display next to the cashier.

In some embodiments, predicted inventory determination module 4106 may determine a predicted inventory of the at least one product type at a future time. Consistent with some embodiments of the disclosure, predicted inventory determination module 4106 may determine the predicted inventory before customer 4004 makes her order (i.e., the determination is made before the first time period). In one embodiment, predicted inventory determination module 4106 may determine the predicted inventory at different times (i.e., a plurality of second time periods) to match the time period customer 4004 makes her order (i.e., the first time period). In another embodiment, predicted inventory determination module 4106 may determine that an online order of customer 4004 from virtual store 4116 made during a first time period will be fulfilled by employee 4006 of retail store 105 during a second time period. In some cases, the first and the second time periods may overlap. In other cases, the first and the second time periods may not overlap. For example, the second time period may be at least 15 minutes after the first time period, the second time period may be at least 45 minutes after the first time period, the second time period may be at least 1.5 hours after the first time period, the second time period may be at least 3 hours after the first time period, the second time period may be less than 5 hours after the first time period, the second time period may be less than 2 hours after the first time period, the second time period may be between 5 minutes to 150 minutes after the first time period. Additionally, in one embodiment, predicted inventory determination module 4106 may use product supply information 4002 from retail store 105 to determine at least one rate of product turnover, and to determine the predicted inventory for different products in retail store 105 using the at least one rate of product turnover. In another embodiment, predicted inventory determination module 4106 may use a regression model on data obtained from multiple retail stores 105 to determine the predicted inventory. Predicted inventory determination module 4106 may also calculate a confidence level associated with the predicted inventory and may initiate a first automated action (e.g., updating virtual store 4116, adjust a price, etc.) when the confidence level is above a threshold. Predicted inventory determination module 4106 may also initiate a second automated action (e.g., sending a store employee to investigate, initiate additional data capturing, etc.) when the confidence level is below a threshold.

Figure 42A:
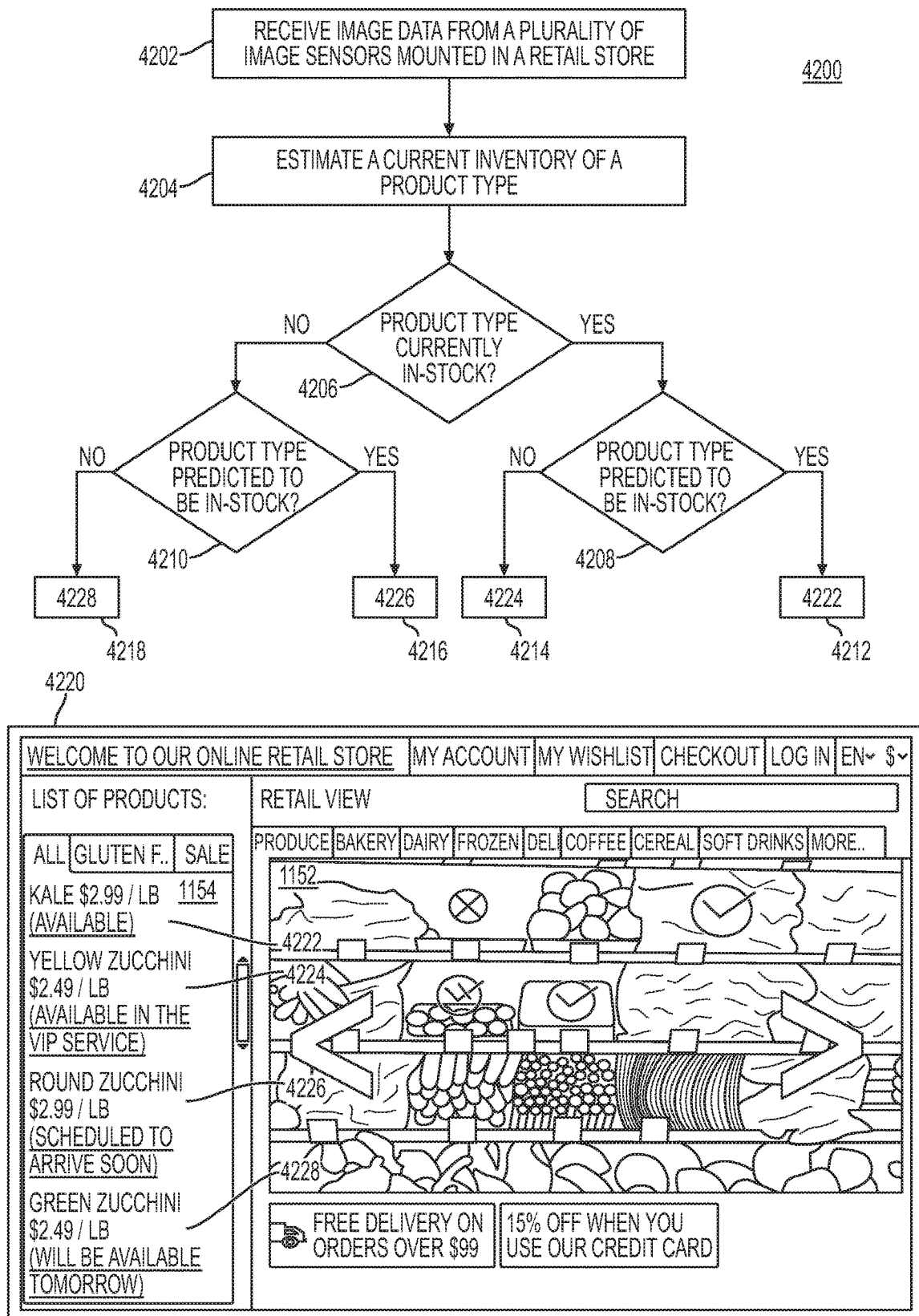
FIG. 42A provides a flowchart of an exemplary process for providing inventory information to a virtual store and an example GUI of the virtual store, consistent with the present disclosure.

In other embodiments, predicted inventory determination module 4106 may determine a predicted quality of a product type at a third time period when the products of the online order are estimated to be delivered to customer 4004 (or at a second time period when the certain product is estimated to be collected from retail store 105). For example, predicted inventory determination module 4106 may obtain product quality information associated with the product type and may determine the quality of the product type during the third time period (or at the second time period) based on the product quality information, for example using a regression model on the product quality information (and possibly additional inputs described below) to predict the quality of the product type during the third time period (or at the second time period). In one embodiment, the product quality information may be determined by analyzing image data 4000 (e.g., via image analysis techniques allowing for an assessment of product freshness, current status, etc.). In another embodiment, the product quality information may be determined from at least one of: textual information derived from image data 4000, visual appearance of products from the at least one product type, a duration of products from the product type on a shelf, turnover of products from the product type on the shelf, and storage requirements associated with the at least one product type. In some embodiments, image analysis techniques (such as artificial neural networks, convolutional neural networks, machine learning models, image regression models, etc.) may be used on image data 4000 to predict the quality of the product type during the third time period (or at the second time period). Consistent with the present disclosure, predicted inventory determination module 4106 may initiate at least one action when the predicted quality of the at least one product is below a threshold. In one example, when the predicted quality of the product type is below the threshold, the at least one processor may prevent virtual store 4116 from selling the at least one product type. In another example, when the predicted quality of the product type is below the threshold, the at least one processor may cause virtual store 4116 to adjust a price of the product type based on the predicted quality. In another example, when the predicted quality of the product type is below the threshold, the at least one processor may cause virtual store 4116 to present a quality indicator when offering the at least one product type. FIGS. 42A and 42B include user interfaces of virtual store 4116 that illustrate the different scenarios.

In some embodiments, virtual store communication module 4108 may communicate with virtual store 4116. Consistent with the present disclosure, virtual store communication module 4108 may receive queries from virtual store 4116 about specific products and/or a predicted inventory at specific times. Virtual store communication module 4108 may also provide information to virtual store 4116 about the inventory of retail store 105 and the quality of products in retail store 105. For example, virtual store communication module 4108 may provide information to virtual store 4116 regarding the predicted inventory of the at least one product type during the second time period. The provided information may enable virtual store 4116 to present during the first time period an inventory indicator and/or a quality indicator for the at least one product to customer 4004. In one embodiment, virtual store communication module 4108 may provide information to virtual store 4116 indicative of the predicted quality of the certain product type at a third time period when the certain product is estimated to be delivered to customer 4004 (or at a second time period when the certain product is estimated to be collected from retail store 105). In another embodiment, virtual store communication module 4108 may provide information to virtual store 4116 indicative of the inventory of the certain product type at a second time period when the certain product is estimated to be collected by employee 4006. In one example, when predicted inventory determination module 4106 determines that a certain product type will be available during the second time period, virtual store communication module 4108 may provide information to virtual store 4116 indicating that the at least one product type can be offered for sale. In another example, when predicted inventory determination module 4106 determines that a certain product type will be out of stock during the second time period, virtual store communication module 4108 may provide information to virtual store 4116 indicating that the at least one product type cannot be offered for sale. In one embodiment, in case predicted inventory determination module 4106 determines that a certain product type will be out of stock during the second time period, virtual store communication module 4108 may provide information to virtual store 4116 that includes an estimation indicating an expected time when the certain product type will be available for online orders.

In some embodiments, employee guiding module 4110 may receive the online order and generate a recommended path for collecting the items in the online order. In one embodiment, the recommended path may be provided to employee 4006, for example, as a series of navigation instructions, as a series of directions to move (for example, in a form of an arrow, in a form of an audible navigation guidance, in a form of a textual navigation guidance, etc.), as a visual indication displayed in an augmented reality system (for example, directing the store employee to a particular shelf or location identifying the product to pick up for inclusion in the online order), and so forth. Consistent with the present disclosure, the path for collecting the items in the online order may be based on image data indicative of the current inventory in retail store 105. For example, when products from the at least one product type are normally included on a first and a second shelving unit, the at least one processor may guide the employee to the second shelving unit when the at least one product type is predicted to be (or is currently) out-of-stock on the first shelving unit. Additionally, the at least one processor may guide the employee to the second shelving unit when the quality of products from the at least one product type is predicted to be (or is currently) better than the quality of products found on the first shelving unit.

In some embodiments, database access module 4112 may cooperate with database 4114 to retrieve product supply information. In some embodiments, database 4114 may include separate databases, including, for example, a vector database, raster database, tile database, viewport database, and/or a user input database, configured to store data. The data stored in database 4114 may be received from modules 4102-4112, server 135, from any communication device associated with retail stores 105, market research entity 110, suppliers 115, and users 120. Moreover, the data stored in database 4114 may be provided as input using data entry, data transfer, or data uploading. In one embodiment, the data stored in database 4114 may include product supply information, for example, a schedule of arrivals of additional products, inventory records, checkout data, calendar data, and historical product turnover data.

Modules 4102-4112 may be implemented in software, hardware, firmware, a mix of any of those, or the like. For example, if the modules are implemented in software, the modules may be stored in a server (e.g., server 135) or distributed over a plurality of servers. In some embodiments, any one or more of modules 4102-4112 and data associated with database 4114 may be stored in database 140 and/or located on server 135, which may include one or more processing devices. Processing devices of server 135 may be configured to execute the instructions of modules 4102-4112. In some embodiments, aspects of modules 4102-4112 may include software, hardware, or firmware instructions (or a combination thereof) executable by one or more processors, alone, or in various combinations with each other. For example, modules 4102-4112 may be configured to interact with each other and/or other modules of server 135 to perform functions consistent with disclosed embodiments.

FIG. 42A depicts a flowchart of an example process 4200 executed by a processing device of system 100 (e.g., processing device 202) for providing information to virtual store 4116. The provided information may relate to the predicted inventory of at least one product type during a second time period, such that virtual store 4116 can present to customer 4004 (during a first time period) an inventory indicator for the at least one product type. FIG. 42A also includes an example GUI 4220 showing different examples of inventory indicators (e.g., first inventory indicator 4222, second inventory indicator 4224, third inventory indicator 4226, and fourth inventory indicator 4228) that virtual store 4116 may output in response to the provided information.

Example process 4200 begins when the processing device receives image data 4000 from a plurality of image sensors mounted in a retail store (block 4202). Thereafter, the processing device may analyze image data 4000 to estimate a current inventory of a product type in retail store 105 (block 4204) and determine if the product type is available in the current inventory (decision block 4206). When the product type is currently in-stock, the processing device may determine if the product type is predicted to be available during a second time period in which employee 4006 expects to collect the items in the online order of customer 4004 (decision block 4208). When the product type is currently available and also is expected to be available during the second time period, the processing device may provide virtual store 4116 information that may cause virtual store 4116 to issue a first inventory indicator 4222 (block 4212). When the product type is currently available but expected to be out-of-stock during the second time period, the processing device may provide virtual store 4116 information that may cause virtual store 4116 to issue a second inventory indicator 4224 (block 4214). When the product type is currently out-of-stock, the processing device may still determine if the product type is predicted to be available during the second time period (decision block 4210). When the product type is currently out-of-stock but expected to be available during the second time period, the processing device may provide virtual store 4116 information that may cause virtual store 4116 to issue a third inventory indicator 4226 (block 4216). When the product type is currently out-of-stock and expected to remain out-of-stock during the second time period, the processing device may provide virtual store 4116 information that may cause virtual store 4116 to issue a fourth inventory indicator 4228 (block 4218).

GUI 4220 may be similar to GUI 1150 illustrated in FIG. 11E. It also may include first display area 1152 for showing the near real-time display and second display area 1154 for showing a product list including product types identified in the near real-time display. In the illustrated example, customer 4004 is virtually located at the produce section of retail store 105. Consistent with the present disclosure, virtual store 4116 may present one or more inventory indicators based on information received from a processing device of system 100 (e.g., processing device 202). The term "inventory indicator" means a displayed item or representation of information about the availability of products in retail store 105. The inventory indicator may include, for example, text, icons, graphics, or a combination thereof. In one embodiment, the inventory indicator may be overlaid on the acquired image data or in proximity to an identifier of the product (e.g., text, an image, an icon, etc.). In some embodiments, the inventory indicators in first display area 1152 may be partially transparent to avoid obscuring areas of interest in image data 4000. Further, the inventory indicators may include an indication that more information may be available upon interaction with GUI 4220, for example, using a clickable link.

As shown, first inventory indicator 4222 may include a text stating "Available" in second display area 1154 and a check mark in first display area 1152. Second inventory indicator 4224 may include a text stating "Available in the VIP service" in second display area 1154 and a half check mark in first display area 1152. Third inventory indicator 4226 may include text stating "Scheduled to arrive soon" in second display area 1154 and a check mark in first display area 1152. Fourth inventory indicator 4228 may include text stating "Will be available tomorrow" in second display area 1154 and an X mark in first display area 1152. Consistent with the present disclosure, the processing device may estimate, based on product supply information 4002, when the at least one product type will be available for online orders and provide information to virtual store 4116 such that virtual store 4116 can present an estimation when the at least one product type will be available for online orders (for example, fourth inventory indicator 4228).

Consistent with the present disclosure, the received image data may be analyzed to identify the condition and quality of fresh products, and the identified condition and quality may be used to provide information to a user. In some examples, the identified condition may include a spoiled condition. In some embodiments, image data 4000 may be analyzed to determine the duration that the fresh products stay on the store shelf. In some cases, a time threshold may be selected (for example, based on a type of the fresh product, the condition of the fresh product, etc.), and a notification may be provided to virtual store 4116 when the fresh products stay on the shelf for a duration longer than the selected time threshold. In some cases, statistics about the duration that the products stay on the store shelf may be generated and provided to an employee of the retail store (e.g., employee 4006) or to an online customer of a virtual store (e.g., customer 4004). In one embodiment, image data 4000 may be analyzed to determine a quantity associated with customers returning fresh products to the pile or product grouping (e.g., after picking the fresh products from the pile). In this embodiment, the ratio of products returned to the pile of the products picked may be determined to estimate the quality of the at least one product. The ratio of products returned to the pile or product grouping may be determined, based on a type of product, shelf, time of day, condition of the fresh products, and so forth. In yet another example, the number of products returned to the pile or product grouping may be calculated for selected time duration. In some examples, a notification (e.g., a quality indicator) may be provided to employee 4006 or customer 4004 when the number and/or ratio of products returned to the pile or product grouping exceed a selected threshold. For example, the notification to a store employee may include a suggestion to remove some of the fresh products that are of poor condition from the pile.

FIG. 42B depicts a flowchart of an example process 4250 executed by a processing device of system 100 (e.g., processing device 202) for providing information to virtual store 4116 regarding the quality of at least one product type, such that virtual store 4116 can present customer 4004 a quality indicator for the at least one product type during the first time period. FIG. 42B also includes an example GUI 4270 showing examples of quality indicators (e.g., first quality indicator 4272, second quality indicator 4274, third quality indicator 4276, and fourth quality indicator 4278) that virtual store 4116 may output in response to the received information.

Example process 4250 begins when the processing device obtains product quality information associated with the at least one product type (block 4252). Thereafter, the processing device may determine the quality of products from the at least one product type based on the product quality information (block 4254). Consistent with the present disclosure, the product quality information may be determined by analyzing image data 4000. For example, the product quality information may be determined from at least one of: textual information derived from image data 4000, visual appearance of products from the at least one product type, a duration of products from the at least one product type on a shelf, turnover of products from the at least one product type on the shelf, and storage requirements associated with the at least one product type. In one embodiment, the determined quality of products from the at least one product type reflects the current quality of products from the at least one product type. In another embodiment, the determined quality of the at least one product type reflects the predicted quality of products from the at least one product at the third time period when the products of the online order are estimated to be delivered to customer 4004. In one example, the third period of time may correspond to or be the same as the second period of time (e.g., such as in the case of picking up the online order directly from retail store 105).

Example process 4250 continues when the processing device determines if the quality of products from the at least one product type is below a threshold (decision block 4256). For example, the determination may include whether the average quality of products from the at least one product type is below the threshold. When the quality of products from the at least one product type is above a threshold, processing device may initiate an action of providing information to virtual store 4116 regarding the quality of products from at least one product type (block 4258). The provided information may allow virtual store 4116 to present customer 4004 a first quality indicator 4272 informing that products from the at least one product type are of a high quality, fresh quality, etc. If the quality of products from the at least one product is below a threshold, processing device may initiate one of several actions. In one embodiment, processing device may initiate an action of causing virtual store to 4116 to adjust a price of the at least one product type (block 4260). For example, processing device may provide information to virtual store 4116 regarding the quality of at least one product type such that virtual store 4116 can present customer 4004 a second quality indicator 4274 indicative of price adjustment due to the quality of products from at least one product type. In another embodiment, processing device may initiate an action to prevent virtual store 4116 from selling the at least one product type (block 4262). For example, processing device may provide information to virtual store 4116 regarding the quality of at least one product type such that virtual store 4116 can present customer 4004 a third quality indicator 4276 indicating that the at least one product type is unavailable due to low quality of at least one product type. In another embodiment, processing device may initiate an action of informing customer 4004 about the actual condition of products from the at least one product type (block 4264). For example, processing device may provide image data of the at least one product type to virtual store 4116 such that virtual store 4116 can present customer 4004 a fourth quality indicator 4278 when offering the at least one product type. Fourth quality indicator 4278 may be a near real-time image of the at least one product type.

GUI 4270 is another GUI example of virtual store 4116. GUI 4270 shows two lines of product types. The first line includes product types and their associated inventory indicators as discussed above with reference to FIG. 42A. The second line includes additional product types and their associated quality indicators. The term "quality indicator" means a displayed item or representation of information about the quality of products in retail store 105. Consistent with the present disclosure, when the predicted quality of products from the at least one product type is below the threshold, the processing device may use the estimated current inventory of retail store 105 to select at least one alternative product. Thereafter, the processing device may cause virtual store 4116 to present information about the selected at least one alternative product in proximity to a descriptor of the at least one product type. In one embodiment, the processing device may obtain product quality information associated with a plurality of alternative products and use the product quality information associated with the plurality of alternative products to select the at least one alternative product of the plurality of alternative products. An example of the presentation of the at least one alternative product is shown in next to third quality indicator 4276. In one embodiment, the product quality information associated with the plurality of alternative products may be determined by analyzing image data 4000. In addition, the product quality information may be used to determine a predicted quality of the plurality of alternative products at a third time period when the products of the online order are estimated be delivered to customer 4004.

In one embodiment, a method and system are disclosed for identifying products and monitoring planogram compliance using analysis of image data is provided. As used in the present disclosure, the term "planogram" may refer to any kind of specified diagram, model, or visual representation of a store's products on a display or shelving unit. In many situations, it may be desirable for a retail store to track or otherwise monitor its product placement as compared to one or more planograms in order to track planogram compliance. There may also be an interest in determining and tracking effects of planogram compliance or non-compliance on product sales. By analyzing various characteristics of planogram compliance, described in greater detail below, and comparing planogram compliance characteristics to checkout data (e.g., product sales data at one or more retail stores), the systems and methods described herein may estimate the impact of planogram compliance. The systems and methods may also identify actions that can be taken relative to planogram compliance to potentially improve sales.

Planogram compliance may be desirable for many reasons. In some cases, for example, a chain of retail stores may desire to have consistent product placement across a variety of stores and geographic locations in order to maintain a consistent look and feel of the retail space. Such a consistent look and feel may be affected by planogram compliance. In some cases, planograms represent contractual obligations of the retail store or the retail chain (for example, to suppliers 115), and non-compliance may represent a breach of the contractual obligations. Additionally, some planograms may be developed based on indicators suggesting such planograms may be more effective at promoting sales relative to other planograms or products arrangements. In such cases, planogram compliance may take advantage of the sales benefits the designed planogram is intended to have. On the other hand, non-compliance with such planograms may disrupt the intended sales benefits of the designed planogram.

In some cases, two or more different planograms may be compared and/or analyzed to determine or estimate their effects on product sales. For example, different planogram configurations for a common product may be evaluated at different locations with a retail store or at different retail stores to determine which configurations may bolster sales volume. Additionally or alternatively, product location may be evaluated separate from planogram variation. For example, similar planograms may be evaluated at different locations within a store or at different locations in different stores in order to determine which locations may bolster sales volume. The provided systems and methods described may compare planogram compliance across one or more retail stores.

Additionally, the systems and methods may monitor planogram compliance and take one or more actions in response to product displays determined to be out of compliance with relevant planograms. For example, the disclosed system may track when a planogram at a retail store goes out of compliance and may provide alerts and recommendations to a store administrator or employee of the store to correct the non-compliant product placement.

Figure 43:
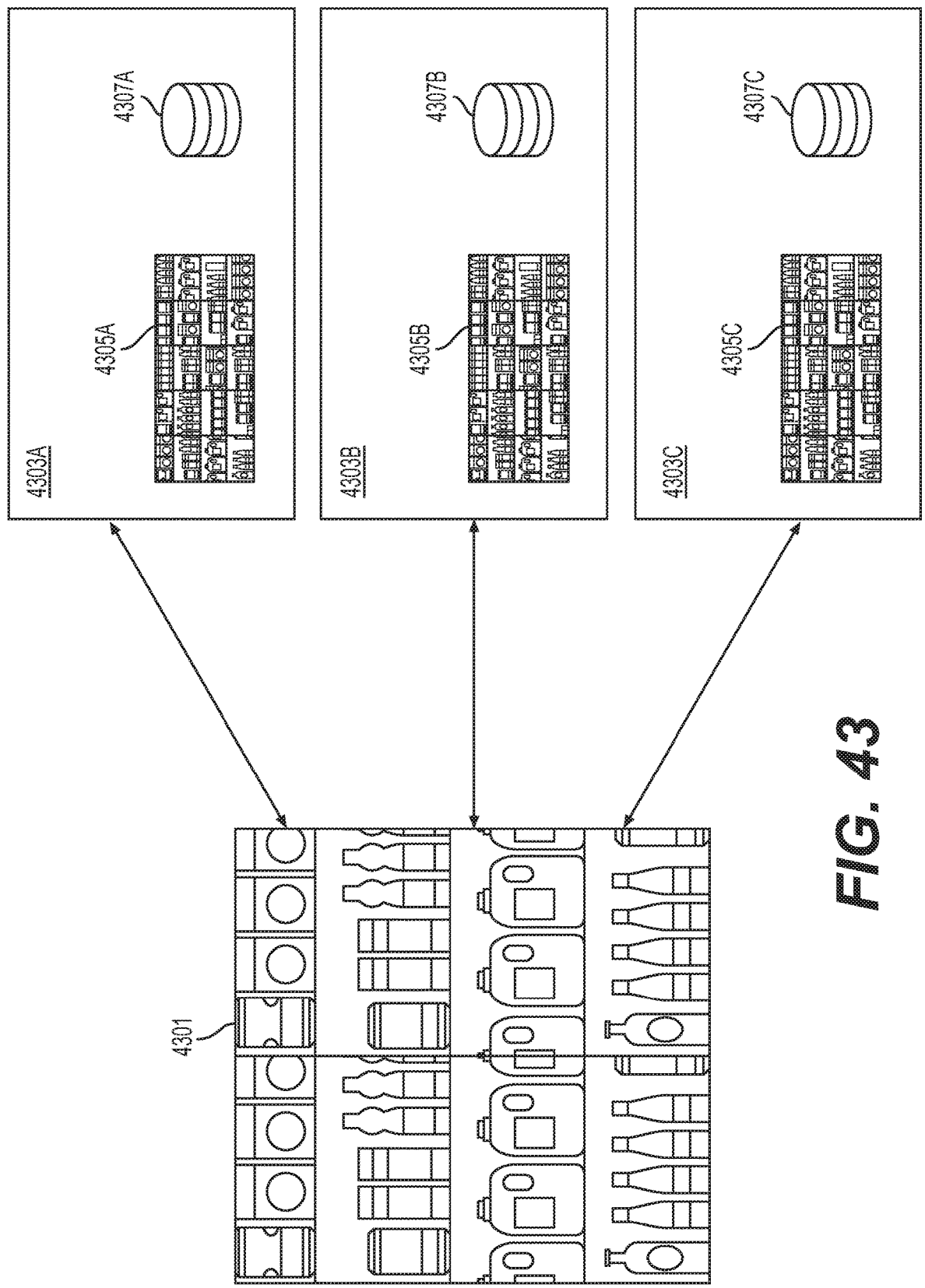
FIG. 43 is a diagrammatic illustration of an example of comparing planogram compliance to checkout data consistent with the disclosed embodiments.

The disclosed system may access at least one planogram (e.g., in a database stored in a memory, whether locally saved or available via a network connection, etc.) describing a desired placement of a plurality of product types on shelves of a plurality of retail stores. As shown in FIG. 43, which provides a diagrammatic representation of a planogram-based product arrangement system useful in comparing planogram compliance to checkout data across multiple retail locations, a planogram 4301 describing desired placement of a plurality of products on a shelf may be provided. Planogram 4301 may specify product placement/arrangement for a plurality of different products (e.g., where different products are provided by a common manufacturer or supplier) or may specify product placement/arrangement for a single product. Planogram 4301 may also specify a placement/arrangement of one or more products relative to one or more different products. For example, planogram 4301 may specify which products are to appear at eye level, which product is to appear on a higher shelf relative to one or more other products, which product is to be located nearer to an end of a shelf as compared to one or more other products, minimal quantity of products of a selected product type to be on a shelf at selected times or at all times, minimal number of facings of a selected product type at selected times or at all times, spacing (amount of space between products) of products of a selected product type, etc. Planogram 4301 may depict and describe a desired product placement location for certain retail stores, such as retail stores 4303A, 4303B, and 4303C.

In operation, the system may receive image data 4305A, 4305B, and 4305C from the plurality of retail stores 4303A, 4303B, and 4303C, and may analyze the image data 4305A, 4305B, and 4305C to determine an actual placement of a plurality of product types on shelves of the plurality of retail stores 4303A, 4303B, and 4303C. At least one processor may analyze the captured images showing actual product placement at the various retail stores (as described above) and may compare the actual product placements to one or more planograms to determine planogram compliance. For example, the at least one processor may compare planogram 4301 to actual product placements as represented by the captured image data 4305A, 4305B, and 4305C from retail stores 4303A, 4303B, and 4303C, respectively.

The at least one processor may determine at least one characteristic of planogram compliance based on detected differences between the at least one planogram 4301 and the actual placement of the plurality of product types on the shelves of the plurality of retail stores 4303A, 4303B, and 4303C. Any suitable characteristic of planogram compliance may be employed to determine a degree of compliance. Such characteristics or planogram compliance subfactors may include, for example, a total number of products, a number of products of certain product types, product packing density, product rotational orientation, product facing, product alignment, product stacking arrangement, product shelf location, location of a product within a particular retail environment (e.g., near the front of a store or back of a store, etc.), store aisle number, height of a shelf from a store floor, or any other characteristic. Planogram compliance may be determined as a binary quantity (e.g., in compliance or not in compliance) or may be quantified in terms of degree of compliance (e.g., as a percentage of satisfied elements of an ideal planogram, an amount of time of compliance versus an amount of time of non-compliance with respect to the entire planogram or with respect to one or more sub-factors, a calculated compliance factor, a compliance quality score, etc.). A degree of compliance may be determined based on a set of products compared to a planogram as a whole. Alternatively, planogram compliance may be determined and/or expressed relative to any one or more relevant planogram compliance subfactors (e.g., as listed above).

Planogram compliance metrics may be correlated with sales data to determine an effect of planogram compliance on sales or to identify potential product placement recommendations for potentially increasing sales. For example, after automatically determining or quantifying planogram compliance of one or more products, the system may receive checkout data 4307A, 4307B, and 4307C from a plurality of retail stores 4303A, 4303B, and 4303C reflecting sales of at least one product type from a plurality of product types. Based on the determined at least one characteristic of planogram compliance and based on the received checkout data 4307A, 4307B, and 4307C, the system may estimate an impact of the at least one characteristic of planogram compliance on the sales of at least one product type. As example, the system may determine by analyzing the image data 4305A, and comparing the image data to planogram 4301, whether retail store 4303A is out of compliance with a planogram 4301 specifying a product arrangement for 16 oz bottles of Coca Cola Zero and, if so, a degree of compliance with the planogram. Additionally, if a store is determined to be out of compliance with respect to a particular planogram, the at least one processor may determine and store the specific aspects of non-compliance (e.g., a lack of a specified number of product units on a shelf or display, a non-compliant product density, etc.). The system may then analyze checkout data 4307A from retail store 4303A to determine the impact of the detected non-compliance. Such an impact may be determined, for example, by comparing checkout data 4307A from retail store 4303A to checkout data 4307B from retail store 4303B, where retail store 4303B is in compliance with planogram 4301 or where retail store 4303B is more compliant with planogram 4301 than store 4303A. In some cases (e.g., where there may be a single aspect of non-compliance with a planogram or a small number of non-compliant aspects), the at least one processor may correlate the non-compliant aspects with sales information to determine a potential impact on sales of one or more particular non-compliance aspects.

Based on the estimated impact of planogram non-compliance (e.g., as a whole or relative to any particular characteristic of planogram non-compliance), the at least one processor of the system may identify an action, associated with the at least one characteristic of planogram compliance, for potentially increasing future sales of the at least one product type. For example, the system may determine that retail store 4303A is out of compliance relative to a planogram for 32 oz Pantene shampoo because the Pantene product display includes one or more bottles rotated such that their labels are at least partially obscured. The system may further determine that this non-compliance has negatively impacted sales of Pantene at store 4303A. Or, the system may already understand (e.g., based on previously correlated aspects of non-compliance with negative sale impacts) that the detected non-compliant display of Pantene shampoo is likely reducing sales of Pantene at store 4303A. In either case, the at least one processor may recommend an action to correct the product placement. For example, the processor may generate a recommendation that the Pantene bottles be aligned such that their labels face outward according to a relevant planogram. The generated recommendation may be automatically forwarded to retail store 4303A such that store employees can rearrange the products detected to be not in compliance with relevant planograms. For example, the generated recommendations may be provided in a similar way to what described above in relation to FIGS. 33-35.

In addition to providing the non-compliance information and/or product arrangement recommendations to an affected retail store, the at least one processor of the system may also provide the non-compliance information and/or the recommended actions to one or more other types of entity. In some embodiments, such entities may include a manufacturer or supplier of at least one product determined to be non-compliant with a relevant planogram. The information provided to such manufacturers or suppliers may include a recommendation for execution of at least one product rearrangement action in at least one retail store. In other cases, the system may provide alerts and product rearrangement recommendations to a manager of a retail store selling the at least one non-compliant product. Such alerts or recommendations may include any suitable format for conveying the non-compliance information to a particular entity. In some cases, the provided information may include at least one of:

an image depicting an example of product/planogram non-compliance, a video depicting an example of product-planogram non-compliance, details relating to an employee determined to as responsible for the product-planogram non-compliance, details of a retail store associated with the planogram non-compliance, location within a retail store associated with the planogram non-compliance, etc.

In addition to the planogram compliance factors described above, which the at least one processor may analyze in determining planogram compliance for a particular product, various other characteristics of planogram compliance that may be considered may include at least one of: product facing (e.g., the outward appearance and neatness of product placement on a shelf), product placement (e.g., the actual placement and organization of products on a shelf), planogram compatibility (e.g., a comparison of the image data to the planogram), price correlation (e.g., the prices of the various products on the shelf), promotion execution (e.g., whether a product is on sale), product homogeneity (e.g., whether non-homogenous products are present on the shelf), restocking rate (e.g., how quickly product turnover and restocking occurs), planogram compliance of adjacent products (e.g., whether other products adjacent to the target product are in compliance with a separate planogram), etc.

Figure 44:
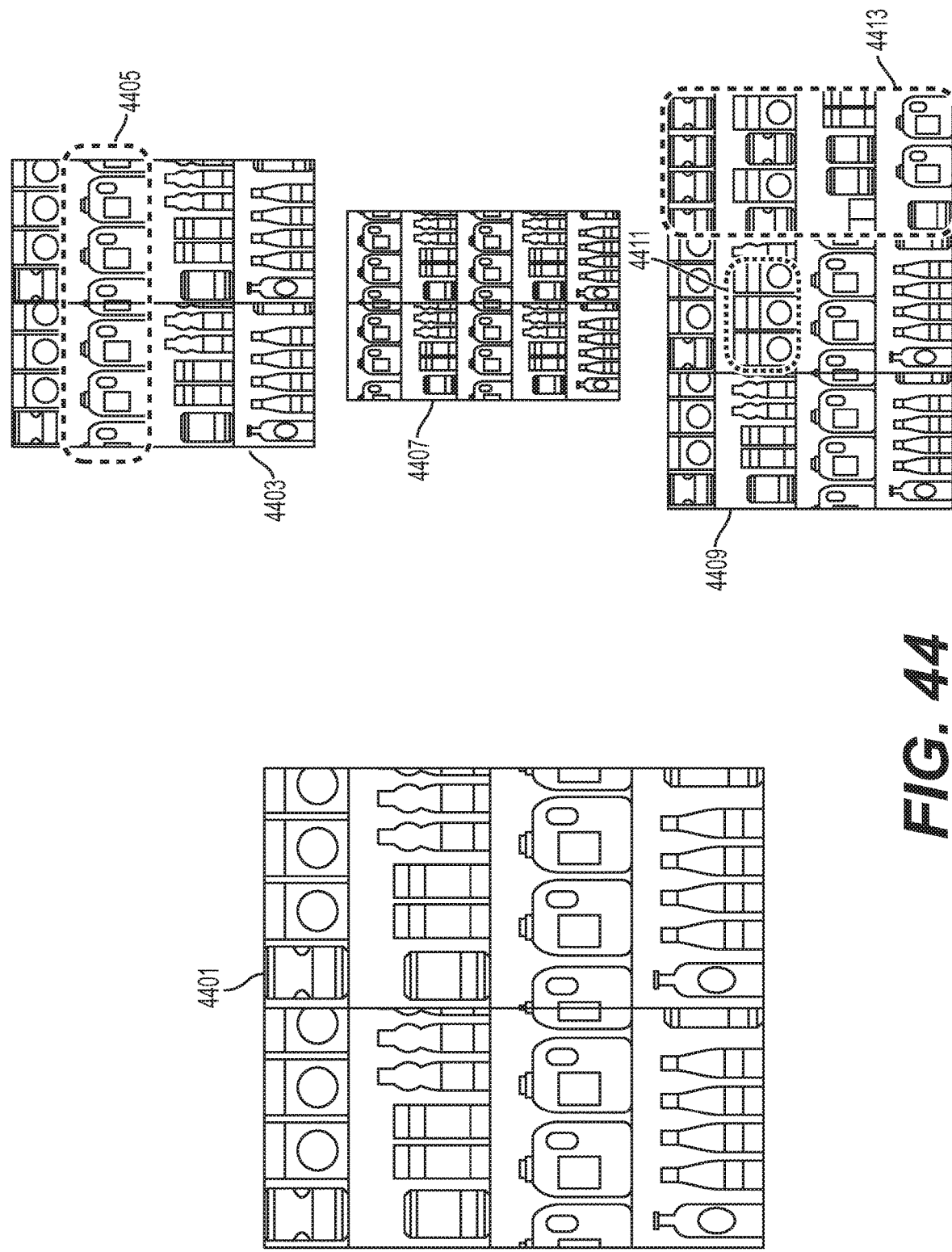
FIG. 44 is a diagrammatic illustration of an exemplary system for comparing planogram compliance, consistent with the disclosed embodiments.

In embodiments where the characteristic of planogram compliance is product facing, the at least one processor of the system may determine at least one value indicative of product facing compliance for the at least one product type. The at least one value of product facing compliance may be determined through image analysis and may be associated with a number of products of the at least one product type determined to be positioned differently than the desired placement described in at least one planogram. For example, as shown in FIG. 44, by comparing the planogram 4401 to image data 4403 (which may be collected from a retail store), the at least one processor may determine that the product placement in image data 4403 is not in compliance with planogram 4401. In further embodiments, the method may identify a retail store where the at least one value indicative of product facing compliance of the at least one product type is lower than a compliance threshold and the sales of the at least one product type are lower than a sales threshold.

A compliance threshold and a sales threshold may be determined in various ways. For example, a compliance threshold may correspond to a certain number of products (or percentage of products) misplaced relative to a particular planogram, such as planogram 4401. Similarly, a sales threshold may correspond to a certain volume of sales expected for a particular product associated with a planogram over a certain time period (e.g., daily, weekly, monthly). In some cases, the compliance threshold and sales threshold may be determined based on aggregated information across a plurality of retail stores. For example, the compliance threshold may be determined or set based on a function of values (e.g., an average of multiple values, weighted averaged, etc.) indicative of a certain aspect of planogram compliance (e.g., product facing compliance, etc.) of the at least one product type across a plurality of retail stores. Similarly, the sales threshold may be based on a function of the sales (e.g., average sales etc.) of the at least one product type across the plurality of retail stores. In other embodiments, the compliance threshold may be based on a contractual agreement of a retail store (e.g., that the products must be displayed such that a minimum compliance threshold (either overall or relative to any one or more planogram compliance aspects) is maintained), and the sales threshold may be based on marketing goals associated with the at least one product type (e.g., that a certain number of products shown in planogram 4401 must be sold, for example during selected time durations, to meet the sales threshold).

In another example, the characteristic of planogram compliance may be product placement. In such cases, the at least one processor may determine at least one value indicative of product placement compliance for the at least one product. The at least one value indicative of product placement compliance may be automatically determined by the processor through image analysis and may be associated with a number of products of the at least one product type determined to be placed differently than the desired placement described in the at least one planogram. For example, the system may determine that 8 instances of a product 4405 are placed incorrectly relative to planogram 4401.

In another example, the characteristic of planogram compliance may include planogram compatibility. In such cases, the at least one processor may determine at least one value indicative of planogram compatibility compliance for the at least one product type, where the at least one value indicative of planogram compatibility compliance may be automatically determined by the processor through image analysis and may be associated with a structural difference between a shelf size in the at least one planogram and physical dimensions of a shelf associated with the at least one product type. For example, the system may determine from image data 4407 that a different type and size of shelving unit is being used in a retail store as compared to planogram 4401.

In another example, the characteristic of planogram compliance may include price correlation. In such cases, the at least one processor may determine at least one value indicative of price correlation compliance for the at least one product type. The at least one value indicative of price correlation compliance may be automatically determined by the processor through image analysis and may be associated with a difference between a displayed price for the at least one product type and a price identified in the at least one planogram. For example, the system may determine from image data 4403 that product 4405 has a different displayed price than what is specified for that product in planogram 4401.

In another example, the characteristic of planogram compliance may include promotion execution. In such cases, the at least one processor may further determine at least one value indicative of promotion execution compliance for the at least one product type. The at least one value indicative of promotion execution compliance may be automatically determined by the processor through image analysis and may be associated with promotions for the at least one product type other than a promotion plan included in the at least one planogram. For example, the system may determine from image data 4403 that product 4405 should have a sale price, or that the entire shelving unit should have a "SALE" sign placed on it, or that a certain number of promotional indicators are required by comparing to planogram 4401. Non-compliance may be determined based on a number of promotional items included or excluded relative to a relevant planogram, based on the ratio of items included or excluded, based on the accuracy of the items, and so forth.

In another example, the characteristic of planogram compliance may include product homogeneity. The at least one processor may determine at least one value indicative of product homogeneity compliance for the at least one product type. The at least one value indicative of product homogeneity compliance may be automatically determined by the processor through image analysis and may be associated with a number of products other than the at least one product type found in at least one shelf associated with the at least one product type. For example, as shown in image data 4409, misplaced products 4411, which are not homogenous with the other products placed on a shelf, may be, advertently or inadvertently, placed on a shelf where they do not belong. Due to the presence of misplaced products 4411 in image data 4409, the system may identify image data 4409 as including one or more product displays out of compliance with planogram 4401. The degree of non-compliance may depend on the number of misplaced products detected, the ratio of misplaced products, and so forth. In some examples, the distribution of product types of products placed on a selected area of a shelf may be estimated, for example, based on products identified by analyzing one or more images depicting the products placed on the selected area of the shelf. For example, the estimated distributions may include one or more histograms. Some other examples of the estimated distribution may include a normal distribution, Fisher's noncentral hypergeometric distribution, Wallenius' noncentral hypergeometric distribution, Poisson distribution, and so forth. In some examples, such probabilities and/or distributions may be estimated using a machine learning model (such as regression models, density estimation models, etc.) trained using training examples to estimate the distribution from the inputs described above and/or from images depicting the products, using an artificial neural network configured to estimate the distribution from the inputs described above and/or from images depicting the products, and so forth. Further, the at least one value indicative of product homogeneity compliance may include a function of the distribution, such as mean, median, mode, standard deviation, variance, coefficient of variation, coefficient of dispersion, Fano factor, any function of the above, and so forth. In another example, the distribution may be a Fisher's noncentral hypergeometric distribution, and the at least one value indicative of product homogeneity compliance may be a function of a parameter of the Fisher's noncentral hypergeometric distribution (such as the odds ratio).

In some cases, the characteristic of planogram compliance evaluated may include a restocking rate. In such cases, the at least one processor may determine at least one value indicative of restocking rate compliance for the at least one product type. The at least one value indicative of restocking rate compliance may be automatically determined by the processor through image analysis (e.g., through analysis of a stream of images enabling a determination of a number of products added to a shelf location over a particular time period). The at least one value indicative of a restocking rate may also be associated with a detected product vacancy level and how that vacancy level is changing over a period of time, which may reflect a restocking rate of at least one shelf associated with the at least one product type. For example, the at least one processor may continually monitor image data 4403 in real time to determine the rate of product turnover for a product type on a shelf and the restocking rate of the product (i.e., how quickly the sold product is replaced on a shelf).

Product-planogram compliance may be based not only on a certain product type in isolation, but may also be based on other product types (e.g., adjacently located product types) in combination with a particular product type. For example, the at least one processor may determine a characteristic of planogram compliance for a product type based on a level of planogram compliance of products located adjacent to the product type in the at least one planogram. For example, as shown in FIG. 44, products adjacent to the single type of product (e.g., adjacent products 4413) may also be analyzed and compared with a planogram for compliance. In some cases, a planogram may specify that a certain product type is to be located adjacent to one or more particular types of specified products, which themselves may be governed by the same or different planogram.

Other product-compliance metrics may also be determined. For example, in some embodiments, the at least one processor may determine a characteristic of planogram compliance for at least one product type based on a rate that the at least one planogram goes out of compliance. For example, by analyzing a series of captured images a product display governed by a particular planogram may be monitored over time. As a result, not only may the processor determine whether there exists product-planogram compliance (or a certain degree of product-planogram compliance) at a particular time, but a rate of change of product-planogram compliance may also be determined. For example, in some cases, through normal interaction of customers with a product display, one or more aspects of the product display (e.g., product facing, product placement, etc.) may be disrupted such that the product display goes out of compliance with the relevant planogram. The rate at which the product display goes out of compliance may be determined by monitoring the change in compliance (e.g., a degree of compliance or non-compliance) over time, as represented by a plurality of captured images. Conversely, a rate that the at least one planogram returns to compliance after having been out of compliance may also be determined by monitoring a change in compliance (e.g., increasing compliance as products are rearranged, restocked, etc.) over a period of time represented by a plurality of captured images.

Planograms for a particular product may differ across retail stores, and those differences may be taken into account when comparing compliance information to sales information. For example, in some embodiments, the at least one processor may access a plurality of planograms for different retail stores and account for differences in the plurality of planograms when determining the characteristic of planogram compliance for at least one retail store. In other words, a planogram for a particular product may be specific to a particular retail store, and other retail stores may have different planograms for the same product. So that correlations between product-planogram compliance and sales data may be meaningful, product-planogram compliance for a particular product may be evaluated relative to a specific planogram for a specific retail store. Then, the particular product-planogram compliance figures from multiple retail stores may be aggregated, etc., as each of the product-planogram compliance figures may be normalized relative to differences in planogram for the particular product at different retail stores.

Product-planogram compliance may be monitored or determined at any suitable time interval. In some cases, product-planogram compliance may be determined at predetermined intervals (e.g., monthly, weekly, daily, hourly, every 10 minutes, every 5 minutes, every 1 minute, every 10 seconds, etc.). In some embodiments, the at least one processor may receive real-time image data from a plurality of image sensors fixedly mounted to store shelves and determine real-time (or nearly real-time) planogram compliance for at least one product type.

As noted above, product-planogram compliance may be determined based on more than one planogram compliance characteristic. For example, in determining product-planogram compliance, such compliance may be expressed in terms of multiple product-planogram compliance characteristics simultaneously. Each product-planogram compliance characteristic may separately impact sales. Thus, in some embodiments, the at least one processor may determine a plurality of characteristics of planogram compliance for the at least one product type. And based on analysis of the checkout data, the one or more processor may determine or estimate an impact of each of the plurality of characteristics of planogram compliance on the sales of the at least one product type. Based on the determined or estimated impact, the at least one processor may further rank an importance to product sales of each of the plurality of characteristics of planogram compliance for the at least one product type. For example, the at least one processor may analyze and rank any of the various characteristics of planogram compliance described above (e.g., product facing, product placement, planogram compatibility, price correlation, promotion execution, product homogeneity, restocking rate, planogram compliance of adjacent products, etc.) relative to checkout data. For example, the system may determine that product placement has a greater impact on sales than product facing, or that promotion execution has a greater impact that product homogeneity, and the like. In some embodiments, the provided information may include data for prioritizing actions associated with planogram compliance based on the ranking of the plurality of characteristics of planogram compliance for the at least one product type. For example, the characteristics of planogram compliance described herein may be ranked in a list in order of importance, and actions may be determined based on the ranking. For example, if the system determines that product placement has the greatest impact on sales for a given retail store, the system may determine actions to enhance product placement in the retail store. In such embodiments, the actions associated with planogram compliance may include at least two of: rearranging products to change product facing, rearranging products to change product placement, rearranging products to change product homogeneity, rearranging products to change adjacent products compliance, changing restocking rate, changing promotion execution, and changing price labels.

Figure 45:
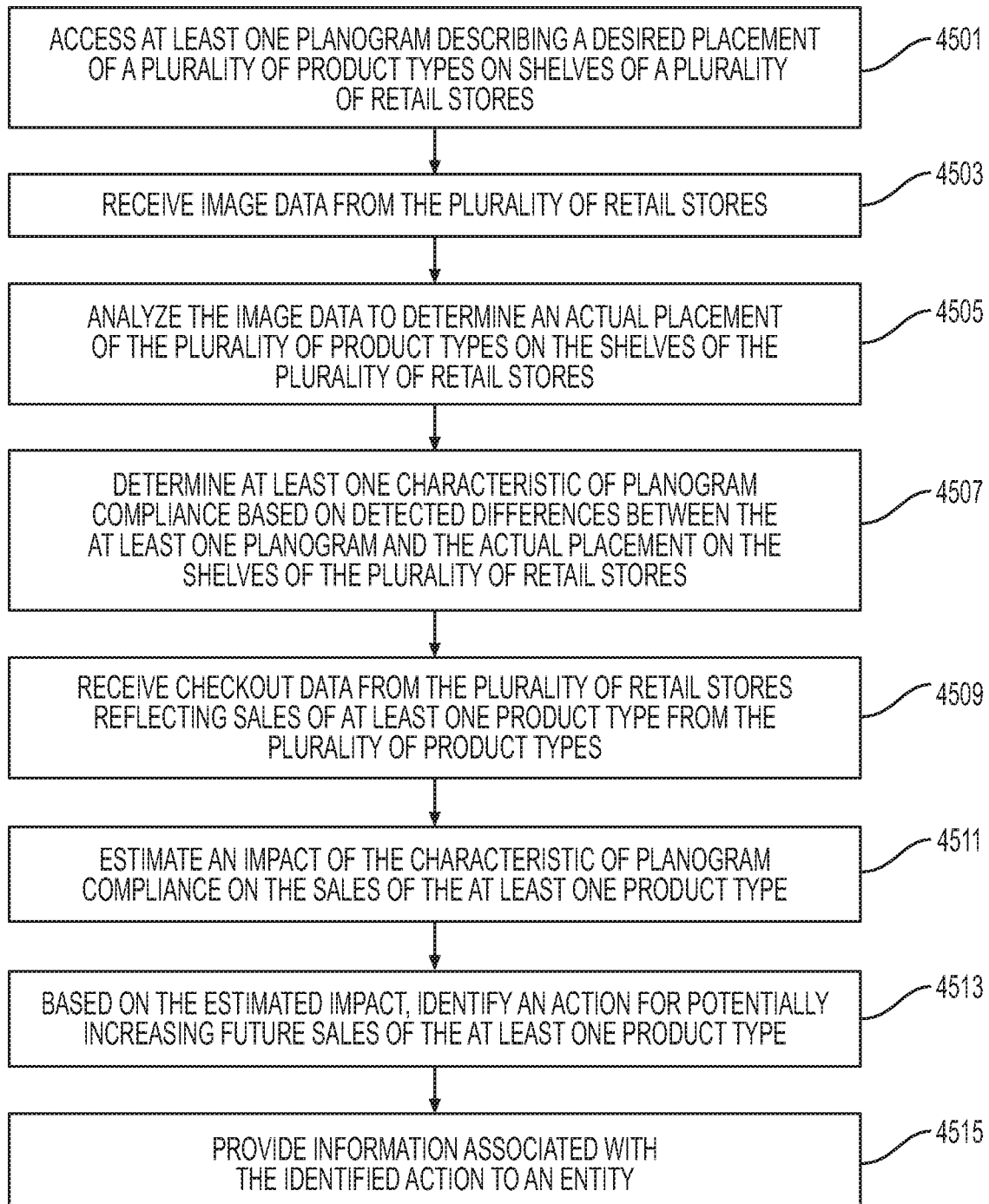
FIG. 45 is a flow chart illustrating an example of a method for comparing planogram compliance to checkout data consistent with the disclosed embodiments.

FIG. 45 is a flowchart representative of a method 4500, consistent with the disclosed embodiments. Method 4500 may, for example, be executed by the at least one processor configured to receive the sets of images depicting a plurality of products associated with a single product type. Such a processor may be included, for example, in an image processing unit (e.g., image processing unit 130) or any other appropriate hardware. When executing method 4500, the at least one processor may execute instructions stored locally and/or accessed from a remote location, for example, via communications network 150.

In step 4501, the at least one processor may access at least one planogram describing a desired placement of a plurality of product types on shelves of a plurality of retail stores.

In step 4503, the processor may receive image data from the plurality of retail stores in order to perform the remaining steps of the method. Additionally or alternatively to step 4503, the processor may receive readings from detection elements attached to store shelves in the plurality of retail stores, as described above in relation to FIGS. 8A, 8B and 9.

In step 4505, the processor may analyze the image data to determine an actual placement of the plurality of product types on the shelves of the plurality of retail stores, for example as described above. Additionally or alternatively to step 4505, the processor may analyze the received readings from the detection elements, alone or in combination with the image data, to determine the actual placement of the plurality of product types on the shelves of the plurality of retail stores, for example as described above.

In step 4507, the processor may determine at least one characteristic of planogram compliance based on detected differences between the at least one planogram and the actual placement of the plurality of product types on the shelves of the plurality of retail stores. Additionally or alternatively to step 4505 and/or step 4507, the processor may analyze the image data and/or the received readings from the detection elements to determine the at least one characteristic of planogram compliance. The estimated at least one characteristic of planogram compliance may include any of the various characteristics of planogram compliance described above (e.g., product facing, product placement, planogram compatibility, price correlation, promotion execution, product homogeneity, restocking rate, planogram compliance of adjacent products, and so forth). For example, the image data and/or the received readings from the detection elements may be analyzed by a machine learning model trained using training examples to determine the at least one characteristic of planogram compliance from images and/or from readings from detection elements attached to store shelves. In another example, the image data and/or the received readings from the detection elements may be analyzed by an artificial neural network configured to determine the at least one characteristic of planogram compliance from images and/or from readings from detection elements attached to store shelves.

In step 4509, the processor may receive checkout data from the plurality of retail stores reflecting sales of at least one product type from the plurality of product types.

In step 4511, the processor may estimate, based on the determined at least one characteristic of planogram compliance and based on the received checkout data, an impact of the at least one characteristic of planogram compliance on the sales of the at least one product type.

In step 4513, the processor may, based on the estimated impact, identify an action, associated with the at least one characteristic of planogram compliance, for potentially increasing future sales of the at least one product type.

In step 4515, the processor may provide information associated with the identified action to an entity The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/ AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for acquiring images of products in a retail store, the system comprising:
at least one first housing configured for location on a first side of a retail shelving unit;
at least one image capture device included in the at least one first housing and configured relative to the at least one first housing such that an optical axis of the at least one image capture device is directed toward an opposing retail shelving unit when the at least one first housing is fixedly mounted on the retail shelving unit;
a second housing configured for location on a second side of the retail shelving unit separate from the at least one first housing, the second housing containing at least one processor configured to control the at least one image capture device and also to control a network interface for communicating with a remote server; and
at least one data conduit extending between the at least one first housing and the second housing, the at least one data conduit being configured to enable transfer of control signals from the at least one processor to the at least one image capture device and to enable collection of image data acquired by the at least one image capture device for transmission by the network interface, wherein:
the at least one processor is further configured to enable real-time display of a field of view of the at least one image capture device on a handheld device of a user installing the image capturing device, and
the real-time display of the field of view of the at least one image capture device includes augmented markings indicating:
a location of a field of view of an adjacent image capture device,
a region of interest in the opposing retail shelving unit, and
a misplaced product.

2. The system of claim 1, wherein the at least one processor is further configured to detect an individual in a selected area between the retail shelving unit and the opposing retail shelving unit, and to cause the at least one image capture device to forgo image acquisition while the individual is within the selected area.

3. The system of claim 1, wherein the at least one processor is further configured to:
analyze a plurality of images acquired by the at least one image capture device;
identify at least one of the plurality of images that includes a representation of at least a portion of an individual located in an area between the retail shelving unit and the opposing retail shelving unit; and
avoid transmission of the at least one identified image to the remote server.

4. The system of claim 1, wherein the at least one processor is further configured to:
receive an output signal from at least one sensor located on the opposing retail shelving unit, the output signal being indicative of a sensed lifting of a product from the opposing retail shelving unit; and
cause the at least one image capture device to capture an image of the opposing retail shelving unit in response to receiving the output signal from the at least one sensor located on the opposing retail shelving unit.

5. The system of claim 1, wherein the at least one processor is further configured to cause the at least one image capture device to periodically capture images of products located on the opposing retail shelving unit.

6. The system of claim 1, wherein the retail shelving unit includes two adjacent horizontal shelves forming a continuous surface for product placement, and wherein the at least one first housing is configured to be fixedly mounted on the retail shelving unit in a slit between the two adjacent horizontal shelves.

7. The system of claim 1, wherein the retail shelving unit includes two adjacent horizontal shelves forming a continuous surface for product placement, and wherein the at least one first housing is configured to be fixedly mounted on a first shelf and the second housing is configured to be fixedly mounted on a second shelf.

8. The system of claim 1, wherein the retail shelving unit includes a horizontal shelf with at least one designated place for mounting a housing of an image capturing device, the at least one designated place is associated with connectors; and wherein the at least one first housing is configured to be fixedly mounted on a side of the horizontal shelf facing the opposing retail shelving unit using the connectors.

9. The system of claim 1, wherein the at least one first housing is configured to be fixedly mounted on the retail shelving unit on a first side of a horizontal shelf facing the opposing retail shelving unit.

10. The system of claim 9, wherein the second housing is configured to be fixedly mounted on the retail shelving unit on a second side of the horizontal shelf orthogonal to the first side.

11. The system of claim 10, wherein the retail shelving unit includes a third side of the horizontal shelf parallel to the first side, and the second housing is further configured to be fixedly mounted on the retail shelving unit on the second side closer to the third side than to the first side.

12. The system of claim 11, wherein the at least one data conduit includes flexible printed circuits and has an adjustable length for extending the at least one data conduit between the at least one first housing and the second housing when the at least one first housing is fixedly mounted on the first side and the second housing is fixedly mounted on the second side closer to the third side than to the first side.

13. The system of claim 1, wherein the at least one data conduit is configured for banding around an edge of a horizontal shelf of the retail shelving unit.

14. The system of claim 1, wherein the retail shelving unit includes a horizontal shelf and the at least one data conduit is configured for location inside an envelope of the horizontal shelf.

15. The system of claim 1, wherein the at least one image capture device includes a plurality of image capture devices, and wherein the at least one processor contained in the second housing is further configured to control the plurality of image capture devices, wherein each of the plurality of image capture devices has a field of view that at least partially overlaps with a field of view of at least one other image capture device from among the plurality of image capture devices.

16. The system of claim 15, wherein the at least one processor is further configured to control the plurality of image capture devices such that each of the plurality of image capture devices captures an image at a different time.

17. The system of claim 15, wherein the plurality of image capture devices includes at least a first image capture device and a second image capture device configured for location on a single horizontal shelf, and wherein image data acquired by the first image capture device and the second image capture device is configured to enable a calculation of depth information associated with at least one product positioned on the opposing retail shelving unit.

18. The system of claim 17, wherein a first distance between the first image capture device and the second image capture device is selected based on a second distance between the retail unit and the opposing retail shelving unit, wherein the first distance is at least 10 cm.

19. The system of claim 1, wherein the at least one processor is further configured to modify the image data acquired by the at least one image capture device based on at least one attribute associated with the opposing retail shelving unit.

20. The system of claim 1, wherein the at least one image capture device includes a plurality of image capturing devices configured for location on the retail shelving unit, wherein at least some of the plurality of image capturing devices are configured to be fixedly mounted on shelves at different heights.

21. The system of claim 1, wherein the at least one first housing includes at least one lens having a fixed focal length corresponding to a distance between the retail shelving unit and the opposing retail shelving unit, and wherein the at least one lens is associated with a fixed focal length having a fixed value between 2.5 mm and 4.5 mm.

22. The system of claim 1, wherein the at least one processor is further configured to control a projector and an image capture device configured for location on a single horizontal shelf, and wherein image data acquired by the image capture device includes reflections of light from the projector and enables a calculation of depth information associated with at least one product positioned on the opposing retail shelving unit.

23. The system of claim 1, wherein the second housing includes a power port for conveying energy from a power source in the second housing to the at least one first housing.

24. The system of claim 1, wherein the at least one first housing includes a field of view adjustment mechanism for setting the field of view of the at least one image capture device such that the field of view will at least partially encompass products placed both on a bottom shelf of the opposing retail shelving unit and on a top shelf the opposing retail shelving unit.

25. The system of claim 1, wherein an anti-theft device is located in at least one of the at least one first housing and the second housing.

26. The system of claim 1, wherein the at least one image capture device includes an image sensor having sufficient resolution to enable detection of text associated with labels on the opposing retail shelving unit.

27. A method for acquiring images of products in a retail store, the method comprising:

fixedly mounting on a first side of a retail shelving unit at least one first housing containing at least one image capture device such that an optical axis of the at least one image capture device is directed to an opposing retail shelving unit;

fixedly mounting on a second side of the retail shelving unit a second housing at a location spaced apart from the at least one first housing, the second housing containing at least one processor;

extending at least one data conduit between the at least one first housing and the second housing;

capturing images of the opposing retail shelving unit using the at least one image capture device;

transmitting at least some of the captured images from the second housing to a remote server configured to determine planogram compliance relative to the opposing retail shelving unit; and enabling real-time display of a field of view of the at least one image capture device on a handheld device of a user installing the image capturing device, wherein the real-time display of the field of view of the at least one image capture device includes augmented markings indicating:

a location of a field of view of an adjacent image capture device, a region of interest in the opposing retail shelving unit, and a misplaced product.

* * * * *